US012720565B2

(12) United States Patent
Lim et al.

(10) Patent No.: US 12,720,565 B2
(45) Date of Patent: Aug. 25, 2026

(54) METHOD AND DEVICE FOR PRECODER INDICATION FOR SUPPORTING MULTIPLE PANELS IN WIRELESS COMMUNICATION SYSTEM

(71) Applicant: Samsung Electronics Co., Ltd., Gyeonggi-do (KR)

(72) Inventors: Seongmok Lim, Gyeonggi-do (KR); Kyoungmin Park, Gyeonggi-do (KR); Ameha Tsegaye Abebe, Gyeonggi-do (KR); Youngrok Jang, Gyeonggi-do (KR); Hyoungju Ji, Gyeonggi-do (KR); Kyungjun Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 320 days.

(21) Appl. No.: 18/448,577

(22) Filed: Aug. 11, 2023

(65) Prior Publication Data

US 2024/0073923 A1 Feb. 29, 2024

(30) Foreign Application Priority Data

Aug. 11, 2022 (KR) ........................ 10-2022-0100795

(51) Int. Cl.
*H04W 72/232* (2023.01)
*H04B 7/0456* (2017.01)
(Continued)

(52) U.S. Cl.
CPC ........ *H04W 72/232* (2023.01); *H04B 7/0456* (2013.01); *H04B 7/063* (2013.01); *H04L 5/0048* (2013.01)

(58) Field of Classification Search
CPC ... H04W 72/232; H04B 7/0456; H04B 7/063; H04L 5/0048
See application file for complete search history.

(56) References Cited

U.S. PATENT DOCUMENTS

2022/0330258 A1* 10/2022 Xiao ..................... H04L 5/0057
2023/0017408 A1* 1/2023 Levitsky ............... H04L 5/0048
(Continued)

FOREIGN PATENT DOCUMENTS

EP 4572253 A1 * 6/2025 ........... H04L 5/0094
KR 1020220094660 7/2022
(Continued)

OTHER PUBLICATIONS

Vivo, "Further Discussion on Multi-TRP for PDCCH, PUCCH and PUSCH Enhancements", R1-2106572, 3GPP TSG RAN WG1 #106-e, Aug. 16-27, 2021, 28 pages.
(Continued)

*Primary Examiner* — Kenny S Lin
(74) *Attorney, Agent, or Firm* — The Farrell Law Firm, P.C.

(57) ABSTRACT

The disclosure relates to a fifth generation (5G) or sixth generation (6G) communication system for supporting a higher data transmission rate. A method performed by a user equipment (UE) in a wireless communication system is provided. The method comprises receiving, from a base station, downlink control information (DCI) including a sounding reference signal resource set indicator (SRSI), two sounding reference signal resource indicator (SRI) fields, and two transmission precoding matrix indicator (TPMI) fields and transmitting, to the base station, a physical uplink shared channel (PUSCH) based on the DCI.

16 Claims, 39 Drawing Sheets

(51) Int. Cl.

| | |
|---|---|
| ***H04B 7/06*** | (2006.01) |
| ***H04L 5/00*** | (2006.01) |

(56) References Cited

U.S. PATENT DOCUMENTS

| | | | | |
|---|---|---|---|---|
| 2024/0032045 | A1* | 1/2024 | Chen | H04L 5/0051 |
| 2024/0267934 | A1* | 8/2024 | Matsumura | H04W 16/28 |
| 2024/0357584 | A1* | 10/2024 | Gao | H04L 5/0035 |
| 2025/0024477 | A1* | 1/2025 | Matsumura | H04W 72/51 |
| 2025/0038905 | A1* | 1/2025 | Khoshnevisan | H04L 5/0094 |
| 2025/0047357 | A1* | 2/2025 | Zhu | H04W 72/23 |
| 2025/0141624 | A1* | 5/2025 | Chen | H04L 5/0051 |
| 2025/0183944 | A1* | 6/2025 | Lee | H04B 7/0404 |
| 2025/0211391 | A1* | 6/2025 | Liu | H04L 5/0044 |
| 2025/0233717 | A1* | 7/2025 | Liu | H04W 72/1268 |

FOREIGN PATENT DOCUMENTS

| | | | |
|---|---|---|---|
| KR | 10-2023-0106084 | 7/2023 | |
| WO | WO 2022/086259 | 4/2022 | |
| WO | WO-2024031237 A1 * | 2/2024 | H04L 5/0048 |

OTHER PUBLICATIONS

Vivo, “Views on UL Precoding Indication for Multi-Panel Transmission”, R1-2203546, 3GPP TSG RAN WG1 Meeting #109-e, May 9-20, 2022, 11 pages.

Apple Inc., “On Multi-TRP Reliability Enhancement”, R1-2107719, 3GPP TSG RAN WG1 Meeting #106-e, Aug. 16-27, 2021, 19 pages.

Xiaomi, “Enhancements on Multi-TRP for PDCCH, PUSCH and PUCCH”, R1-2107894, 3GPP TSG RAN WG1 Meeting #106-e, Aug. 16-27, 2021, 21 pages.

International Search Report dated Nov. 21, 2023 issued in counterpart application No. PCT/KR2023/012003, 8 pages.

Samsung, “Views on UL Precoding Indication for STxMP”, R1-2203893, 3GPP TSG RAN WG1 #109-e, May 9-20, 2022, 9 pages.

Moderator (OPPO), “Summary #2 on UL Precoding Indication for Multi-Panel Transmission”, R1-2205528, 3GPP TSG RAN WG1 #109-e, May 9-20, 2022, 2 pages.

European Search Report dated Nov. 24, 2025 issued in counterpart application No. 23853098.4-1206, 9 pages.

* cited by examiner

. . .

$C_N$ | TCI state $ID_{D,0,N}$ | Oct M-3

TCI state $ID_{D,0,N}$ | TCI state $ID_{U,0,N}$ | Oct M-2

R | TCI state $ID_{D,1,N}$ | Oct M-1 (Optional)

R | TCI state $ID_{U,1,N}$ | Oct M (Optional)

METHOD AND DEVICE FOR PRECODER INDICATION FOR SUPPORTING MULTIPLE PANELS IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0100795, filed on Aug. 11, 2022, in the Korean Intellectual Property Office, the disclosure of which is incorporated herein by reference in its entirety.

BACKGROUND

1. Field

The disclosure relates generally to operations of a terminal and a base station in a wireless communication system, and more specifically, to a method and a device for precoder indication for supporting multiple panels in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below.

Accordingly, an aspect of the disclosure is to provide a method and apparatus for simultaneously transmitting multiple UL channels by using multiple panels in a wireless communication system.

In accordance with an aspect of the disclosure, A method performed by a user equipment (UE) in a wireless communication system is provided. The method comprises receiving, from a base station, downlink control information (DCI) including a sounding reference signal resource set indicator (SRSI), two sounding reference signal resource indicator (SRI) fields, and two transmission precoding matrix indicator (TPMI) fields and transmitting, to the base station, a physical uplink shared channel (PUSCH) based on the DCI. In case that the SRSI includes a first value associated with a first SRS resource set, the PUSCH is transmitted based on a first SRI field of the two SRI fields and a first TPMI field of the two TPMI fields which are associated with the first SRS resource set, and in case that the SRSI includes a second value associated with a second SRS resource set, the PUSCH is transmitted based on the first SRI field of the two SRI fields and the first TPMI field of the two TPMI fields which are associated with the second SRS resource set.

In accordance with an aspect of the disclosure, A user equipment (UE) in a wireless communication system is provided. The UE comprises a transceiver and a controller coupled with the transceiver and configured to receive, from a base station, downlink control information (DCI) including a sounding reference signal resource set indicator (SRSI), two sounding reference signal resource indicator (SRI) fields, and two transmission precoding matrix indicator (TPMI) fields; and transmit, to the base station, a physical uplink shared channel (PUSCH) based on the DCI. In case that the SRSI includes a first value associated with a first SRS resource set, the PUSCH is transmitted based on a first SRI field of the two SRI fields and a first TPMI field of the two TPMI fields which are associated with the first SRS resource set, and in case that the SRSI includes a second value associated with a second SRS resource set, the PUSCH is transmitted based on the first SRI field of the two SRI fields and the first TPMI field of the two TPMI fields which are associated with the second SRS resource set.

In accordance with an aspect of the disclosure, A method performed by a base station in a wireless communication system is provide. the method comprises transmitting, to a user equipment (UE), downlink control information (DCI) including a sounding reference signal resource set indicator (SRSI), two sounding reference signal resource indicator (SRI) fields, and two transmission precoding matrix indicator (TPMI) fields and receiving, from the UE, a physical uplink shared channel (PUSCH) based on the DCI. In case that the SRSI includes a first value associated with a first SRS resource set, the PUSCH is received based on a first SRI field of the two SRI fields and a first TPMI field of the two TPMI fields which are associated with the first SRS resource set, and in case that the SRSI includes a second value associated with a second SRS resource set, the PUSCH is received based on the first SRI field of the two SRI fields and the first TPMI field of the two TPMI fields which are associated with the second SRS resource set.

In accordance with an aspect of the disclosure, A base station in a wireless communication system, the base station comprises a transceiver and a controller coupled with the transceiver and configured to transmit, to a user equipment (UE), downlink control information (DCI) including a sounding reference signal resource set indicator (SRSI), two sounding reference signal resource indicator (SRI) fields, and two transmission precoding matrix indicator (TPMI) fields and receive, from the UE, a physical uplink shared channel (PUSCH) based on the DCI. In case that the SRSI includes a first value associated with a first SRS resource set, the PUSCH is received based on a first SRI field of the two SRI fields and a first TPMI field of the two TPMI fields which are associated with the first SRS resource set, and in case that the SRSI includes a second value associated with a second SRS resource set, the PUSCH is received based on the first SRI field of the two SRI fields and the first TPMI field of the two TPMI fields which are associated with the second SRS resource set.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
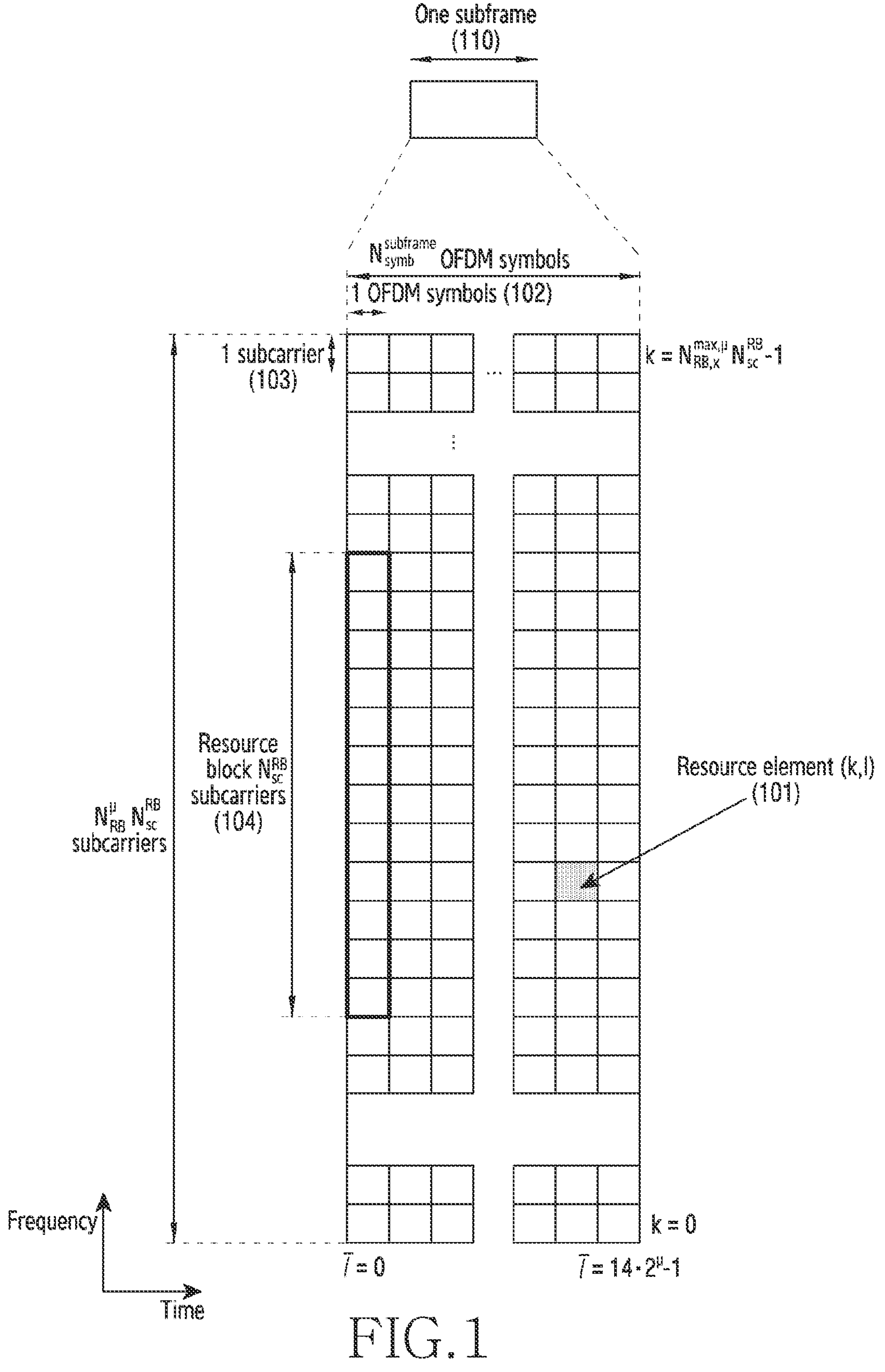
FIG. 1 illustrates a basic structure of a time-frequency domain in a wireless communication system according to an embodiment.

Hereinafter, embodiments of the disclosure will be described in detail with reference to the accompanying drawings.

In describing embodiments, descriptions related to technical contents well-known in the art and not associated directly with the disclosure will be omitted for the sake of clarity and conciseness.

In the accompanying drawings, some elements may be exaggerated, omitted, or schematically illustrated, and the size of each element does not completely reflect the actual size. Identical or corresponding elements are illustrated with identical reference numerals.

The advantages and features of the disclosure and manners to achieve them will be apparent by referencing embodiments in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure. Throughout the specification, the same or like reference numerals designate the same or like elements. The terms which will be described below are defined in consideration of the functions in the disclosure, and may differ according to users, intentions of the users, or customs. Therefore, the definitions of the terms should be made based on the contents throughout the specification.

Herein, an element may be expressed in the singular or the plural form according to embodiments. However, the singular form or plural form is selected for the convenience of description, and the disclosure is not limited thereto. Accordingly, an element expressed in the plural form may also include a single element or an element expressed in the singular form may include multiple elements.

The term "unit" as used herein indicates software or a hardware component such as a field programmable gate array (FPGA) or an application-specific integrated circuit (ASIC), and unit performs specific roles. However, unit is not limited to software or hardware. unit may be configured to reside on an addressable storage medium and configured to reproduce on one or more processors. Accordingly, unit may include components such as software, object-oriented software, class and task components, processes, functions, attributes, procedures, sub-routines, segments of program code, drivers, firmware, microcode, circuitry, data, databases, data structures, tables, arrays, and variables. The functionalities provided in the components and unit may be combined to fewer components and units or may be further separated into additional components and units. The components and units may be implemented to reproduce one or more central processing units (CPUs) within a device or a security multimedia card. A unit may include one or more processors.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

The three 5G services, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the above-described three services.

Referring to the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Furthermore, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Specifically, the disclosure relates to methods for, in a wireless communication system, performing simultaneous uplink transmission using multiple panels, UE capability reporting of a terminal for a corresponding operation, and simultaneous uplink transmission scheduling including precoder indication and higher-layer parameter configuration of a base station, and a device capable of performing the same.

Hereinafter, a BS is a subject that performs resource allocation to a terminal, and may be at least one of a gNode B, a gNB, an eNode B, a Node B, a radio access unit, a base station controller, or a node on a network. A terminal may include a UE, a mobile station (MS), a cellular phone, a smartphone, a computer, or a multimedia system capable of performing a communication function. Embodiments of the disclosure will be described using the 5G system as an example, but may also be applied to other communication systems having a similar technical background or channel type. For example, LTE or LTE-A mobile communication and a mobile communication technology developed after 5G may be included therein. Therefore, an embodiment of the disclosure may be applied to other communication systems via some modifications without departing from the scope of the disclosure, according to determination by those skilled in the art. Contents of the disclosure are applicable in frequency division duplex (FDD) and time division duplex (TDD) systems. Hereinafter, higher-layer signaling is a method of transferring a signal from a base station to a terminal by using a physical layer DL data channel or transferring a signal from a terminal to a base station by using a physical layer UL data channel, and may be referred to as radio resource control (RRC) signaling, PDCP signaling, or a MAC control element (CE).

Terms to be described hereinafter are terms defined in consideration of functions in the disclosure, and may vary depending on intention or usage of users or operators. Therefore, the definition should be based on contents throughout the specification.

Hereinafter, in description of the disclosure, higher-layer signaling may be signaling corresponding to at least one of or a combination of one or more of the following signaling types.

MIB (master information block)

SIB (system information block) or SIB X (X=1, 2, . . . )

RRC

MAC CE

In addition, L1 signaling may be signaling corresponding to at least one of signaling methods using the following physical layer channels or signaling types or a combination of one or more thereof.

PDCCH-DCI

Terminal-specific (UE-specific) DCI

Group common DCI

Common DCI

Scheduling DCI (e.g., DCI used for scheduling of DL or UL data)

Non-scheduling DCI (e.g., DCI not to scheduling DL or UL data)

PUCCH

UCI (UL control information)

Hereinafter, determination of the priority between A and B may be mentioned in various manners, such as selecting one having a higher priority according to a predetermined priority rule so as to perform an operation corresponding thereto, or omitting or dropping an operation having a lower priority.

Hereinafter, the term "slot" used in the disclosure is a general term that may refer to a specific time unit corresponding to a transmit time interval (TTI), and specifically, a slot may refer to a slot used in a 5G NR system and may also refer to a slot or subframe used in a 4G LTE system.

Hereinafter, descriptions of the examples will be provided via multiple embodiments, but these are not mutually exclusive, and it is possible that one or more embodiments are applied simultaneously or in combination.

For convenience of description, a cell, a transmission point, a panel, a beam, a transmission direction, or/and the like, which may be distinguishable via higher layer/L1 parameters, such as TCI state or spatial relation information, or indicators, such as a cell ID, a transmission and reception point (TRP) ID, and a panel ID, may be described as a transmission/reception point (TRP), a beam, or a TCI state in a unified manner. Therefore, in actual application, a TRP, a beam, or a TCI state may be appropriately replaced with one of the above terms.

NR Time-Frequency Resources

Fifth generation (5G) mobile communication technologies define broad frequency bands such that high transmission rates and new services are possible, and can be implemented not only in sub 6 gigahertz (GHz) bands such as 3.5 GHz, but also in above 6 GHz bands referred to as millimeter wave (mmWave) bands including 28 GHz and 39 GHz. It has been considered to implement sixth generation (6G) mobile communication technologies referred to as beyond 5G systems in terahertz (THz) bands, such as 95 GHz to 3 THz bands, to achieve transmission rates fifty times faster than 5G mobile communication technologies and ultra-low latencies one-tenth of 5G mobile communication technologies.

At the outset of the 5G mobile communication technology development, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies such as operating multiple subcarrier spacings for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as the industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access channel for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), and mixed reality (MR), 5G performance improvement and complexity reduction by utilizing artificial intelligence (AI) and machine learning (ML), AI service support, metaverse service support, and drone communication.

Such development of 5G mobile communication systems will serve as a basis for developing not only new waveforms for providing coverage in terahertz bands of 6G mobile communication technologies, multi-antenna transmission technologies such as full dimensional multiple input multiple output (FD-MIMO), array antennas and large-scale antennas, metamaterial-based lenses and antennas for improving coverage of terahertz band signals, high-dimensional space multiplexing technology using orbital angular momentum), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

A wireless communication system is advancing to a broadband wireless communication system for providing high-speed and high-quality packet data services using communication standards, such as high-speed packet access (HSPA) of third generation partnership project (3GPP), long-term evolution (LTE) or evolved universal terrestrial radio access (E-UTRA)}, LTE-advanced (LTE-A), LTE-Pro, high-rate packet data (HRPD) of 3GPP2, ultra-mobile broadband (UMB), IEEE 802.16e, as well as typical voice-based services.

For example, an LTE system employs an orthogonal frequency division multiplexing (OFDM) scheme in a downlink (DL) and employs a single carrier frequency division multiple access (SC-FDMA) scheme in an uplink (UL). The UL indicates a radio link through which a UE transmits data or control signals to a base station and the downlink indicates a radio link through which the base station transmits data or control signals to the UE. The above multiple access scheme may separate data or control information of respective users by allocating and operating time-frequency resources for transmitting the data or control information for each user so as to avoid overlapping and establish orthogonality.

With the development of communication systems, research on UL transmission or reception using multiple panels is being conducted and, in particular, a demand for improving UL control information transmission using multiple panels is increasing.

FIG. 1 illustrates a basic structure of a time-frequency domain that is a radio resource area in which a data channel or a control channel is transmitted in a 5G system according to an embodiment.

Referring to FIG. 1, a horizontal axis represents a time domain, and a vertical axis represents a frequency domain. A basic unit of a resource in the time and frequency domain is a resource element (RE) 101, and may be defined to be 1 OFDM symbol 102 on the time axis and 1 subcarrier 103 on the frequency axis.

$$N_{SC}^{RB}$$

(e.g., 12) consecutive REs in the frequency domain may constitute one resource block (RB) subcarrier 104. On the time axis, one subframe 110 may include multiple OFDM symbols 102. For example, a length of one subframe may be 1 ms.

Figure 2:
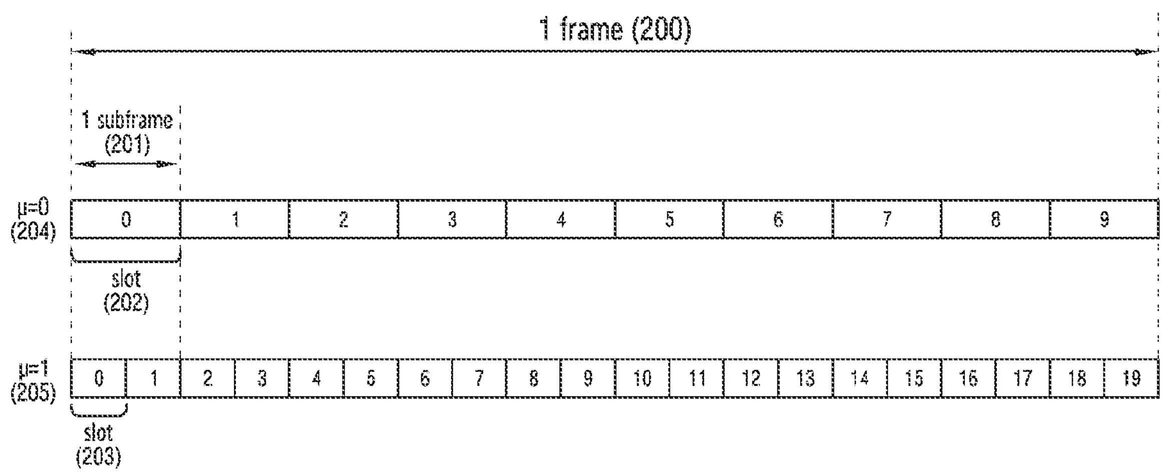
FIG. 2 illustrates a frame, a subframe, and a slot structure in a wireless communication system according to an embodiment.

FIG. 2 illustrates a frame, a subframe, and a slot structure in a wireless communication system according to an embodiment.

Referring to FIG. 2 a frame 200 may be defined to be 10 ms. A subframe 201 may be defined to be 1 ms, and therefore, one frame 200 may include a total of 10 subframes 201. A slot 202 or 203 may be defined to be 14 OFDM symbols (e.g., the number of symbols per slot $$(N_{symb}^{slot} = 14)).$$

One subframe 201 may include one or multiple slots 202 and 203, and the number of slots 202 and 203 per subframe 201 may vary according to configuration values μ 204 and 205 for subcarrier spacings. The example of FIG. 2 illustrates a case 204 where subcarrier spacing configuration value μ=0 and a case 205 where subcarrier spacing configuration value μ=1. If μ=0 204, one subframe 201 may include one slot 202, and if μ=1 205, one subframe 201 may include two slots 203. That is, the number $$(N_{slot}^{subframe,\mu})$$

of slots per subframe may vary according to configuration value μ for a subcarrier spacing, and accordingly, the number $$(N_{slot}^{frame,\mu})$$

of slots per frame may vary.

$$N_{slot}^{subframe,\mu} \text{ and } N_{slot}^{frame,\mu}$$

according to each subcarrier spacing configuration μ may be defined as shown below in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 3:
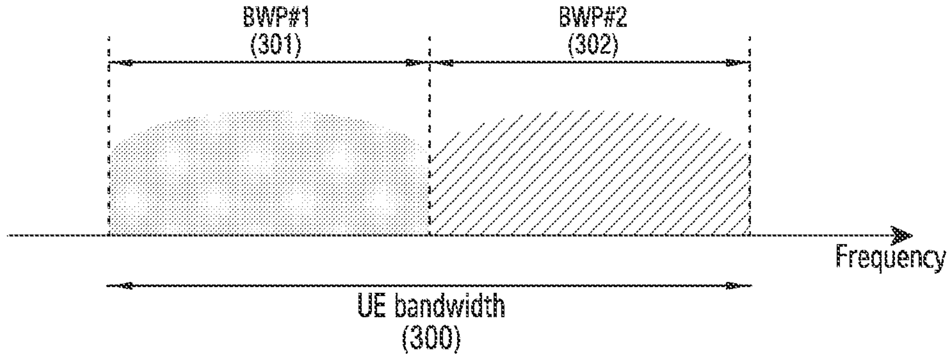
FIG. 3 illustrates a BWP configuration in a wireless communication system according to an embodiment.

FIG. 3 illustrates a BWP configuration in a wireless communication system according to an embodiment.

FIG. 3 illustrates an example in which a UE bandwidth 300 is configured to have two BWPs, i.e., BWP #1 301 and BWP #2 302. A base station may configure one or multiple BWPs for a terminal, and may configure at least some of information as shown below in Table 2 for each BWP.

TABLE 2

```
BWP ::=                         SEQUENCE {
bwp-Id                              BWP-Id,
(Bandwidth part identifier)
locationAndBandwidth                INTEGER (1..65536),
(Bandwidth part location)
subcarrierSpacing                   ENUMERATED {n0, n1, n2, n3, n4, n5},
(Subcarrier spacing)
cyclicPrefix                    ENUMERATED { extended }
(Cyclic prefix)
}
```

The disclosure is not limited to the above example, and in addition to the configuration information, various parameters related to a BWP may be configured for the terminal. The base station may transfer configuration information to the terminal via RRC signaling. At least one BWP among the configured one or multiple BWPs may be activated. Whether the configured BWP is activated may be semi-statically transferred via RRC signaling or may be dynamically transmitted via DCI, from the base station to the terminal.

The terminal before an RRC connection may be configured with an initial BWP for initial access via a master information block (MIB) by the base station. For example, during initial access, the terminal may receive configuration information for a search space and a control resource set (CORESET) in which a PDCCH for receiving system information (which may correspond to remaining system information (RMSI) or SIB1) required for the initial access may be transmitted via the MIB. Each of the search space and the CORESET configured via the MIB may be identified or considered to be an identifier (ID) 0. The base station may notify, via the MIB, the terminal of configuration information, such as frequency allocation information, time allocation information, and numerology for CORESET #0T, and may notify, via the MIB, the terminal of configuration information for a monitoring periodicity and monitoring occasion for control area #0, that is, the configuration information for search space #0. The terminal may consider a frequency domain configured to be CORESET #0, which is acquired from the MIB, as an initial BWP for initial access. In this case, an ID of the initial BWP may be considered to be 0.

The BWP configuration supported in 5G may be used for various purposes.

In case that a bandwidth supported by the terminal is smaller than a system bandwidth, this may be supported via the BWP configuration. For example, the base station may configure, for the terminal, a frequency position (e.g., configuration information 2) of the BWP, and the terminal may thus transmit and/or receive data at a specific frequency position within the system bandwidth.

To support different numerologies, the base station may configure multiple BWPs for the terminal. For example, in order to support data transmission or reception using both a subcarrier spacing of 15 kHz and a subcarrier spacing of 30 kHz for a certain terminal, the base station may configure two BWPs with the subcarrier spacings of 15 kHz and 30 kHz, respectively. Different BWPs may be FDMed, and when data is to be transmitted or received at a specific subcarrier spacing, a BWP configured with the subcarrier spacing may be activated.

To reduce power consumption of the terminal, the base station may configure, for the terminal, BWPs having different bandwidth sizes. For example, if the terminal supports a very large bandwidth such as 100 MHz, and always transmits or receives data via the corresponding bandwidth, excessive power consumption may occur. In particular, when there is no traffic, excessive power consumption may occur by performing unnecessary monitoring for a DL control channel with a large bandwidth of 100 MHz. To reduce power consumption of the terminal, the base station may configure, for the terminal, a BWP of a relatively small BWP of 20 MHz, for example. When there is no traffic, the terminal may perform monitoring in the BWP of 20 MHz, and when data is generated, the terminal may transmit or receive the data by using the BWP of 100 MHz according to an indication of the base station.

In BWP configuration, terminals before an RRC connection may receive configuration information for an initial BWP via a MIB during initial access. For example, the terminal may be configured with a CORESET for a DL control channel, on which DCI for scheduling of a SIB may be transmitted, from a MIB of a physical broadcast channel (PBCH). The bandwidth of the CORESET, which is configured via the MIB, may be considered or identified to be the initial BWP, and the terminal may receive a PDSCH, on which the SIB is transmitted, via the configured initial BWP. In addition to the purpose of receiving the SIB, the initial BWP may be used for other system information (OSI), paging, and/or random access.

Change of BWP

When one or more BWPs are configured for the terminal, the base station may indicate the terminal to change (or switch or shift) the BWP, by using a BWP indicator field in DCI. For example, in FIG. 3, in case that a currently active BWP of the terminal is BWP #1 301, the base station may indicate BWP #2 302 to the terminal by using the BWP indicator in the DCI, and the terminal may switch the BWP to BWP #2 302 indicated using the BWP indicator in the received DCI.

As described above, the DCI-based switching of the BWP may be indicated by the DCI for scheduling of a PDSCH or PUSCH. Therefore, when a request for switching a BWP is received, the terminal may need to easily perform transmission or reception of the PDSCH or PUSCH scheduled by the corresponding DCI in the switched BWP. To this end, requirements for a delay time ($T_{BWP}$) required during BWP switching are regulated in the standards, and may be defined as shown below in Table 3.

TABLE 3

| | NR Slot | BWP switch delay $T_{BWP}$ (slots) | |
|---|---|---|---|
| μ | length (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1: Depends on UE capability.

Note 2:

If the BWP switch involves changing of SCS, the BWP switch delay is determined by the larger one between the SCS before BWP switch and the SCS after BWP switch.

The requirements for the delay time of BWP switching may support type 1 or type 2 depending on capability of the terminal. The terminal may report a supportable BWP delay time type to the base station.

Based on the requirements for the delay time of BWP switching, in case that the terminal receives DCI including a BWP switching indicator in slot n, the terminal may complete switching to a new BWP indicated by the BWP switching indicator at a time point no later than slot $n+T_{BWP}$, and may perform transmission and/or reception of a data channel scheduled by the DCI in the switched new BWP. When the base station is to schedule the data channel with the new BWP, time domain resource allocation for the data channel may be determined by considering the BWP switching delay time ($T_{BWP}$) of the terminal. That is, in determining time domain resource allocation for the data channel when the base station schedules the data channel with the new BWP, the data channel may be scheduled after the BWP switching delay time. Accordingly, the terminal may not expect that DCI indicating BWP switching indicates a value of a slot offset (K0 or K2) less than a value of the BWP switching delay time ($T_{BWP}$).

In case that the terminal receives DCI (e.g., DCI format 1_1 or 0_1) indicating BWP switching, the terminal may not perform any transmission or reception during a time period from a third symbol of a slot in which a PDCCH including the DCI is received to a start point of a slot indicated by a slot offset (K0 or K2) value indicated via a time domain resource allocation indicator field in the DCI. For example, in case that the terminal receives the DCI indicating BWP switching in slot n, and the slot offset value indicated by the DCI is K, the terminal may not perform any transmission or reception from a third symbol of slot n to a symbol before slot n+K (i.e., the last symbol in slot n+K−1).

PDCCH: Relating to DCI

In the 5G system, scheduling information for UL data (PUSCH) or DL data (PDSCH) is transferred from the base station to the terminal via DCI. The terminal may monitor a fallback DCI format and a non-fallback DCI format for the PUSCH or PDSCH. The fallback DCI format may include a fixed field predefined between the base station and the terminal, and the non-fallback DCI format may include a configurable field.

The DCI may be transmitted on a PDCCH via channel coding and modulation. A cyclic redundancy check (CRC) is attached to a DCI message payload, and may be scrambled by a radio network temporary identifier (RNTI) corresponding to the identity of the terminal. For example, different RNTIs may be used depending on the purpose of the DCI message (e.g., terminal-specific (UE-specific) data transmission, a power control command, a random-access response, or the like). In other words, an RNTI is not transmitted explicitly, but is included in CRC calculation and transmitted. When the DCI message transmitted on the PDCCH is received, the terminal may check a CRC by using an assigned RNTI, and may identify or determine that the message is addressed to the terminal in case that the CRC check succeeds.

For example, DCI for PDSCH scheduling for system information (SI) may be scrambled by an SI-RNTI. DCI for PDSCH scheduling for a random-access response (RAR) message may be scrambled by an RA-RNTI. DCI for PDSCH scheduling for a paging message may be scrambled by a P-RNTI. DCI for notification of a slot format indicator (SFI) may be scrambled by an SFI-RNTI. DCI for notification of a transmit power control (TPC) may be scrambled by a TPC-RNTI. DCI for scheduling of a UE-specific PDSCH or PUSCH may be scrambled by a cell RNTI (C-RNTI).

A DCI format 0_0 may be used as fallback DCI for PUSCH scheduling, wherein a CRC is scrambled by a C-RNTI. DCI format 0_0 in which a CRC is scrambled by a C-RNTI may include the information as shown below in Table 4.

TABLE 4

Identifier for DCI formats (DCI format identifier) - [1] bit
Frequency domain resource assignment (Frequency domain resource assignment - $[\lceil \log_2(N_{RB}^{UL,BWP}(N_{PB}^{UL,BWP}+1)/2)\rceil]$ bits
Time domain resource assignment (Time domain resource assignment) - X bits
Frequency hopping flag (Frequency hopping flag) - 1 bit.
Modulation and coding scheme (Modulation and coding scheme) - 5 bits
New data indicator (NDI) - 1 bit
Redundancy version (RV) - 2 bits TABLE 4-continued hybrid automatic repeat request (HARQ) process number (HARQ process number) - 4 bits
TPC command for scheduled PUSCH (Transmit power control (TPC) command for scheduled PUSCH - [2] bits
UL/SUL indicator (UL/supplementary UL (UL/SUL) identifier) - 0 or 1 bit A DCI format 0_1 may be used as non-fallback DCI for PUSCH scheduling, wherein a CRC is scrambled by a C-RNTI. DCI format 0_1 in which a CRC is scrambled by a C-RNTI may include at least some of the information shown below in Table 5.

TABLE 5

- Carrier indicator (Carrier indicator) - 0 or 3 bits
- UL/SUL indicator - 0 or 1 bit
- Identifier for DCI formats - [1] bits
- BWP indicator - 0, 1 or 2 bits
- Frequency domain resource assignment
  - For resource allocation type 0 (For resource allocation type 0), $\lceil N_{RB}^{UL,BWP}/P\rceil$ bits
  - For resource allocation type 1 (For resource allocation type 1), $\lceil \log_2(N_{RB}^{UL,BWP}(N_{RB}^{UL,BWP}+1)/2)\rceil$ bits
- Time domain resource assignment - 1, 2, 3, or 4 bits
- VRB-to-PRB mapping (Virtual RB-to-physical RB mapping) - 0 or 1 bit, only for resource allocation type 1.
  - 0 bit if only resource allocation type 0 is configured;
  - 1 bit otherwise.
- Frequency hopping flag - 0 or 1 bit, only for resource allocation type 1.
  - 0 bit if only resource allocation type 0 is configured;
  - 1 bit otherwise.
- Modulation and coding scheme - 5 bits
- NDI - 1 bit
- RV - 2 bits
- HARQ process number - 4 bits
- 1st DL assignment index (First DL assignment index) - 1 or 2 bits
  - 1 bit for semi-static HARQ-ACK codebook (For semi-static HARQ-ACK codebook);
  - 2 bits for dynamic HARQ-ACK codebook with single HARQ-ACK codebook (When dynamic HARQ-ACK codebook is used with a single HARQ-ACK codebook).
- 2nd DL assignment index (Second DL assignment index) - 0 or 2 bits
  - 2 bits for dynamic HARQ-ACK codebook with two HARQ-ACK sub-codebooks (When dynamic HARQ-ACK codebook is used with two HARQ-ACK sub-codebooks);
  - 0 bit otherwise.
- TPC command for scheduled PUSCH - 2 bits
- *SRS* resource indicator (*SRS* resource indicator) – $\left\lceil \log_2\left(\sum_{k=1}^{L_{max}} \binom{N_{SRS}}{k}\right)\right\rceil$ or $\lceil \log_2(N_{SRS})\rceil$ bits
  - $\left\lceil \log_2\left(\sum_{k=1}^{L_{max}} \binom{N_{SRS}}{k}\right)\right\rceil$ bits for non-codebook based *PUSCH* transmission (When *PUSCH* transmission is not based on codebook);
  - $\lceil \log_2(N_{SRS})\rceil$ bits for codebook based PUSCH transmission (When PUSCH transmission is based on codebook).
- Precoding information and number of layers (Precoding information and the number of layers) - up to 6 bits
- Antenna ports (Antenna port) - up to 5 bits
- SRS request (Request SRS) - 2 bits
- CSI request (Channel state information request) - 0, 1, 2, 3, 4, 5, or 6 bits
- CBG transmission information (Code block group transmission information) - 0, 2, 4, 6, or 8 bits
- PTRS-DMRS association (Phase tracking reference signal (PTRS)-demodulation reference signal (DMRS) association) - 0 or 2 bits.
- beta_offset indicator (Beta offset indicator) - 0 or 2 bits
- DMRS sequence initialization (Demodulation reference signal sequence (DMRS) initialization) - 0 or 1 bit DCI format 1_0 may be used as fallback DCI for PDSCH scheduling, wherein a CRC is scrambled by a C-RNTI. DCI format 0_1 in which a CRC is scrambled by a C-RNTI may include at least some of the information shown below in Table 6.

TABLE 6

Identifier for DCI formats - [1] bit

Frequency domain resource assignment -

$\left[\left\lceil \log_2\left(N_{RB}^{DL,BWP}\left(N_{RB}^{DL,BWP}+1\right)/2\right)\right\rceil\right]$ bits Time domain resource assignment - X bits VRB-to-PRB mapping - 1 bit.

Modulation and coding scheme - 5 bits

NDI - 1 bit

RV - 2 bits

HARQ process number - 4 bits

DL assignment index - 2 bits

TPC command for scheduled PUCCH - [2] bits

PUCCH resource indicator (Physical UL control channel (PUCCH) resource indicator - 3 bits PDSCH-to-HARQ feedback timing indicator (PDSCH-to-HARQ feedback timing indicator)- [3] bits DCI format 1_1 may be used as non-fallback DCI for PDSCH scheduling, wherein a CRC is scrambled by a C-RNTI. DCI format 1_1 in which a CRC is scrambled by a C-RNTI may include at least some of the information shown below in Table 7.

TABLE 7

Carrier indicator - 0 or 3 bits
Identifier for DCI formats - [1] bits
BWP indicator - 0, 1 or 2 bits
Frequency domain resource assignment For resource allocation type 0, $\left\lceil N_{RB}^{DL,BWP}/P\right\rceil$ bits For resource allocation type 1, $\left\lceil \log_2\left(N_{RB}^{DL,BWP}\left(N_{RB}^{DL,BWP}+1\right)/2\right)\right\rceil$ bits Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator (Rate matching indicator) - 0, 1, or 2 bits
ZP CSI-RS trigger (Zero power (ZP) channel state information reference signal (CSI-RS) trigger) - 0, 1, or 2 bits
For transport block 1 (For first transmission block):
Modulation and coding scheme - 5 bits
NDI - 1 bit
RV - 2 bits
For transport block 2(For second transmission block):
Modulation and coding scheme - 5 bits
NDI - 1 bit
RV - 2 bits
HARQ process number - 4 bits
DL assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits TABLE 7-continued Transmission configuration indication (Transmission configuration indication)- 0 or 3 bits
SRS request - 2 bits
CBG transmission information - 0, 2, 4, 6, or 8 bits
CBG flushing out information (Code block group (CBG) flushing out information) - 0 or 1 bit
DMRS sequence initialization - 1 bit QCL, TCI State In the wireless communication system, one or more different antenna ports may be associated with each other by a quasi-co-location (QCL) configuration as shown below in Table 8, wherein the different antenna ports can be replaced with one or more channels and signals and combinations thereof, but in the description of the disclosure below, for convenience, reference is made collectively to different antenna ports.

A TCI state is for announcement of a QCL relation between a PDCCH (or PDCCH DMRS) and another RS or channel, wherein certain reference antenna port A (reference RS #A) and another target antenna port B (target RS #B) being QCLed each other indicates that the terminal is allowed to apply some or all of large-scale channel parameters estimated at antenna port A to channel measurement from antenna port B. For example, for QCL, it may be necessary to associate different parameters depending on situations, such as time tracking affected by an average delay and a delay spread, 2) frequency tracking affected by a Doppler shift and a Doppler spread, radio resource management (RRM) affected by average gain, and beam management (BM) affected by a spatial parameter. Accordingly, NR may support four types of QCL relations as shown below in Table 8.

TABLE 8

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may refer to some or all of various parameters, such as angle of arrival (AoA), power angular spectrum (PAS) of AoA, angle of departure (AoD), PAS of AoD, transmission/reception channel correlation, transmission/reception beamforming, and spatial channel correlation.

The QCL relation may be configurable for the terminal via RRC parameters TCI-State and QCL-Info, as shown below in Table 9. Referring to Table 9, the base station may configure one or more TCI states for the terminal so as to inform about up to two QCL relations (qcl-Type1 and qcl-Type2) for an RS, i.e., a target RS, referring to IDs of the TCI states. Each piece of QCL information (QCL-Info) included in each of the TCI states includes a serving cell index and a BWP index of a reference RS indicated by corresponding QCL information, a type and an ID of the reference RS, and/or a QCL type as shown below in Table 9 and Table 13.

TABLE 9

```
TCI-State ::=                SEQUENCE {
  tci-StateId                  TCI-StateId,
  (ID of corresponding TCI state)
  qcl-Type1                    QCL-Info,
  (QCL information of first reference RS of RS (target RS) referring to
corresponding TCI state ID)
  qcl-Type2                    QCL-Info            OPTIONAL,         -- Need R
  (QCL information of second reference RS of RS (target RS) referring to
corresponding TCI state ID)
  ...
}
QCL-Info ::=                 SEQUENCE {
  cell                         ServCellIndex       OPTIONAL,         -- Need R
  (Serving cell index of reference RS indicated by corresponding QCL information)
  bwp-Id                         BWP-Id              OPTIONAL, -- Cond
CSI-RS-Indicated
  (BWP index of reference RS indicated by corresponding QCL information)
  referenceSignal              CHOICE {
    csi-rs                       NZP-CSI-RS-ResourceId,
    ssb                            SSB-Index
    (either CSI-RS ID or SSB ID indicated by corresponding QCL information
)
  },
  qcl-Type                     ENUMERATED {typeA, typeB, typeC, typeD},
  ...
}
```

Figure 4:
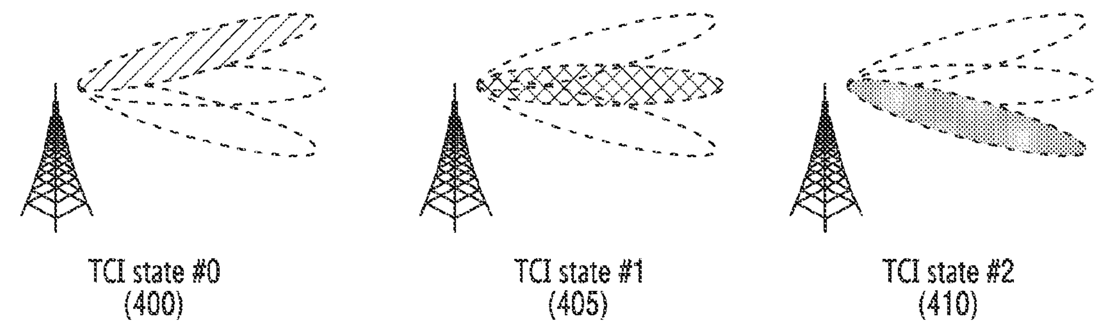
FIG. 4 illustrates a base station beam assignment according to a transmission configuration indicator (TCI) state configuration in a wireless communication system according to an embodiment.

FIG. 4 illustrates base station beam assignment according to a TCI state configuration according to an embodiment.

Referring to FIG. 4, a base station may transfer information on N different beams to a terminal via N different TCI states. For example, if N=3 as shown in FIG. 4, the base station may cause the qcl-Type2 parameters included in three TCI states, i.e., TCI state #0 400, TCI state #1 405, and TCI state #2 410 to be associated with CSI-RSs or SSBs corresponding to different beams and to be configured to be QCL type D, so as to announce that antenna ports referring to the different TCI states 400, 405, or 410 are associated with different spatial Rx parameters, i.e., different beams.

Table 10 to Table 14 as shown below provide valid TCI state configurations according to a target antenna port type.

Table 10 shows a valid TCI state configuration in case that a target antenna port is a CSI-RS for tracking (i.e., TRS). The TRS refers to an NZP CSI-RS, in which a repetition parameter is not configured and trs-Info is configured to be true, among CSI-RSs. Configuration No. 3 in Table 10 may be used for aperiodic TRS.

Table 10 may include a valid TCI state configuration when a target antenna port is a CSI-RS for TRS.

TABLE 10

| Valid TCI state configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 11 below shows a valid TCI state configuration when a target antenna port is a CSI-RS for CSI. The CSI-RS for CSI refers to an NZP CSI-RS, in which a parameter (e.g., repetition parameter) indicating repetition is not configured and trs-Info is not configured to be true, from among CSI-RSs.

TABLE 11

| Valid TCI state configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 12 below shows a valid TCI state configurations when a target antenna port is a CSI-RS for beam management (BM) (same as a CSI-RS for L1 reference signal received power (RSRP) reporting). The CSI-RS for BM refers to an NZP CSI-RS, in which a repetition parameter is configured and has a value of On or Off, and trs-Info is not configured to be true, among CSI-RSs.

TABLE 12

| Valid TCI state configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 13 below shows a valid TCI state configuration when a target antenna port is a PDCCH DMRS.

TABLE 13

| Valid TCI state configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |

TABLE 13-continued

| Valid TCI state configuration | DL RS 1 | qcl-Type1 | DL RS 2 (if configured) | qcl-Type2 (if configured) |
|---|---|---|---|---|
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 14 below shows a valid TCI state configuration when a target antenna port is a PDSCH DMRS.

TABLE 14

| Valid TCI state configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the typical QCL configuration methods in Table 10 to Table 14, the target antenna port and the reference antenna port for each operation are configured and operated as in "SSB"→"TRS"→"CSI-RS for CSI, CSI-RS for BM, PDCCH DMRS, or PDSCH DMRS. Based on this, it is possible to assist a reception operation of the terminal by associating, with respective antenna ports, statistical characteristics measurable from the SSB and the TRS.

PDSCH: Relating to Frequency Resource Allocation

Figure 5:
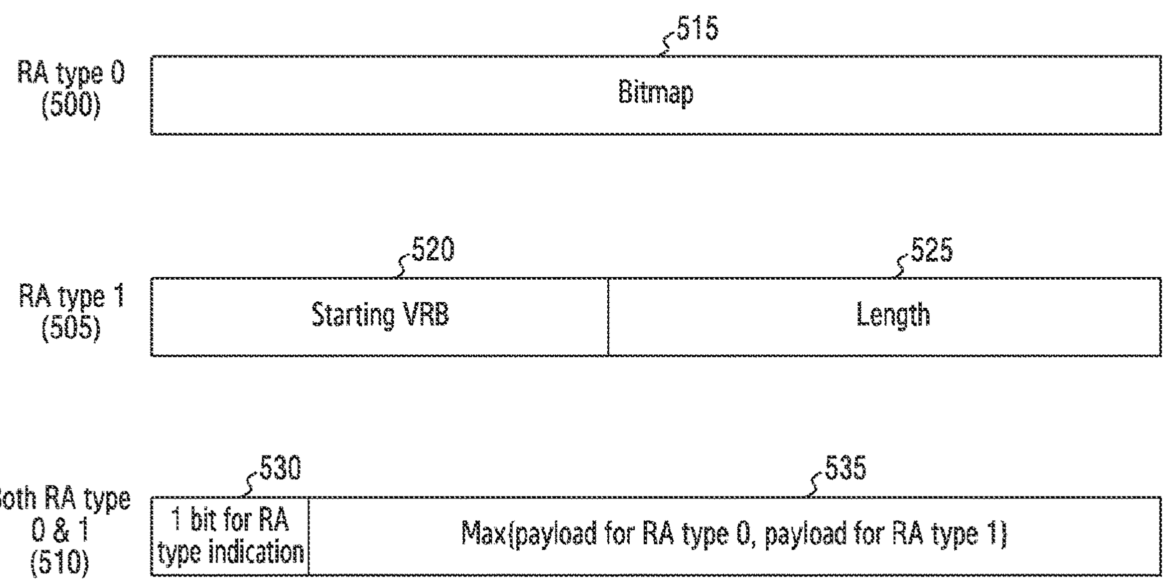
FIG. 5 illustrates frequency axis resource allocation of a physical DL shared channel (PDSCH) in a wireless communication system according to an embodiment.

FIG. 5 illustrates frequency axis resource allocation of a PDSCH in the wireless communication system embodiment.

Specifically, FIG. 5 illustrates three frequency axis resource allocation (RA) methods of type 0 500, type 1 505, and a dynamic switch of both RA type 0 & 1 510 which are configurable via a higher layer in the NR wireless communication system.

Referring to FIG. 5, in case that a terminal is configured 500, via higher-layer signaling, to use only resource type 0, a part of DCI for allocation of a PDSCH to the terminal may include a bitmap including N_RBG bits. In this case, N_RBG refers to the number of RB groups (RBGs) determined as shown below in Table 15 according to a BWP size assigned by a BWP indicator and higher-layer parameter rbg-Size, and data is transmitted to the RBG indicated to be 1 by a bit map.

TABLE 15

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In case that the terminal is configured 505, via higher-layer signaling, to use only resource type 1, some DCI for allocation of a PDSCH to the terminal may include frequency axis resource allocation information including $$\lceil \log_2(N_{RB}^{DL,BWP}(N_{RB}^{DL,BWP}+1)/2\rceil$$

bits. Based on this, the base station may configure a starting VRB 520 and a length 525 of a frequency axis resource contiguously allocated therefrom.

In case that the terminal is configured 510, via higher-layer signaling, to use both resource type 0 and resource type 1, some DCI for allocation of a PDSCH to the terminal may include frequency axis resource allocation information including bits of a maximum (max) value (or, large value) 535 among a payload 515 for configuration of resource type 0 and payloads 520 and 525 for configuration of resource type 1. In this case, one bit 530 may be added to the first part (most significant bit (MSB)) of the frequency axis resource allocation information in the DCI, and in case that the bit 530 has a value of "0", use of resource type 0 may be indicated, and in case that the bit has a value of "1", use of resource type 1 may be indicated.

PDSCH/PUSCH: Relating to Time Resource Allocation

The base station may configure, for the terminal via RRC signaling, a table for time domain resource allocation information on a PDSCH and a PUSCH. A table including up to 16 entries (maxNrofDL-Allocations=16) may be configured for a PDSCH, and a table including up to 16 entries (maxNrofUL-Allocations=16) may be configured for a PUSCH. The time domain resource allocation information may include a PDCCH-to-PDSCH slot timing (denoted as K0, and corresponding to a time interval in units of slots between a time point at which a PDCCH is received and a time point at which a PDSCH scheduled by the received PDCCH is transmitted), a PDCCH-to-PUSCH slot timing (denoted as K2, and corresponding to a time interval in units of slots between a time point at which a PDCCH is received and a time point at which a PUSCH scheduled by the received PDCCH is transmitted), and information on a position and a length of a start symbol in which the PDSCH or PUSCH is scheduled within a slot, a mapping type of the PDSCH or PUSCH. For example, at least a part of information shown below in Table 16 or Table 17 may be transmitted from the base station to the terminal.

TABLE 16

```
   PDSCH-TimeDomainResourceAllocationList information element
PDSCH-TimeDomainResourceAllocationList  ::=  SEQUENCE (SIZE(1..maxNrofDL-
Allocations)) OF PDSCH-TimeDomainResourceAllocation
PDSCH-TimeDomainResourceAllocation ::= SEQUENCE {
  k0                                        INTEGER (0...32)
OPTIONAL, -- Need S
  (PDCCH-to-PUSCH timing, slot unit)
  mapping Type                          ENUMERATED (typeA, typeB),
  (PUSCH mapping type)
  startSymbolAndLength                       INTEGER (0..127)
  (PUSCH start symbol and length)
}
```

TABLE 17

| PUSCH-TimeDomainResourceAllocation information element |
|---|
| PUSCH-TimeDomainResourceAllocationLIst ::= SEQUENCE (SIZE(1..maxNrofUL-Allocations)) of PUSCH-TimeDomainResourceAllocation<br>PUSCH-TimeDomainResourceAllocation ::= SEQUENCE {<br>K2 INTEGER (0..32) OPTIONAL, -- Need S<br>(PDCCH-to-PUSCH timing, slot unit)<br>mappingType ENUMERATED {typeA, typeB},<br>(PUSCH mapping type)<br>startSymbolAndLength INTEGER (0...127)<br>(PUSCH start symbol and length)<br>} |

The base station may notify the terminal of one of the entries in the tables relating to the time domain resource allocation information described above via L1 signaling (e.g., DCI) (e.g., the entry may be indicated by a "time domain resource allocation" field in the DCI). The terminal may acquire the time domain resource allocation information for the PDSCH or PUSCH, based on the DCI received from the base station.

Figure 6:
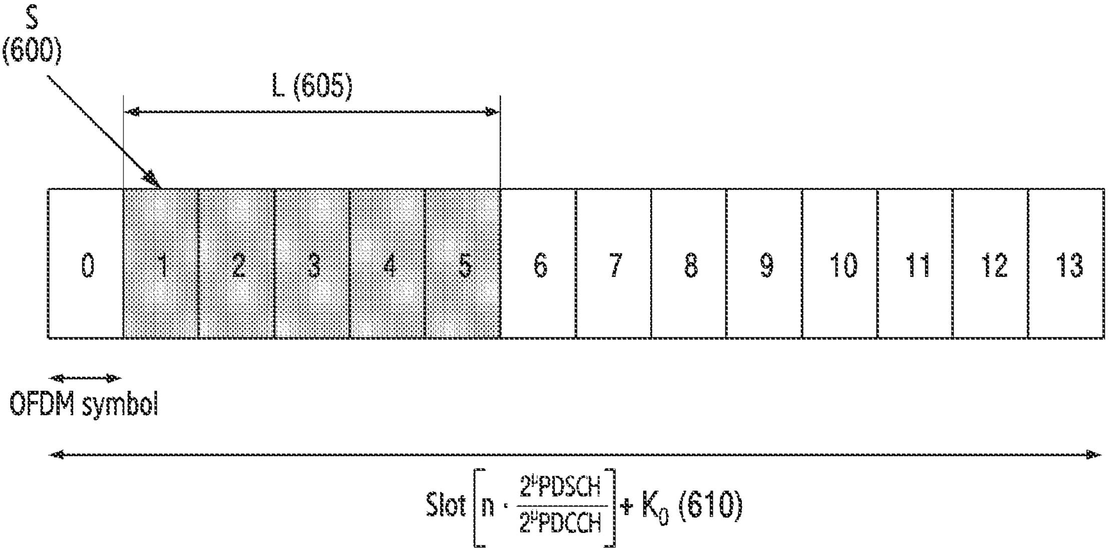
FIG. 6 illustrates time axis resource allocation of a PDSCH in a wireless communication system according to an embodiment.

FIG. 6 illustrates time axis resource allocation of a PDSCH in the wireless communication system embodiment.

Referring to FIG. 6, a base station may indicate a time axis position of a PDSCH resource according to a start position (S) 600 and a length (L) 605 of an OFDM symbol in one slot 610 dynamically indicated via DCI, a scheduling offset K0 value, and subcarrier spacings (SCSs) ($\mu_{PDSCH}$ and $\mu_{PDCCH}$) of a data channel and a control channel configured using a higher layer.

PDSCH: TCI State Activation MAC-CE

Figure 7:
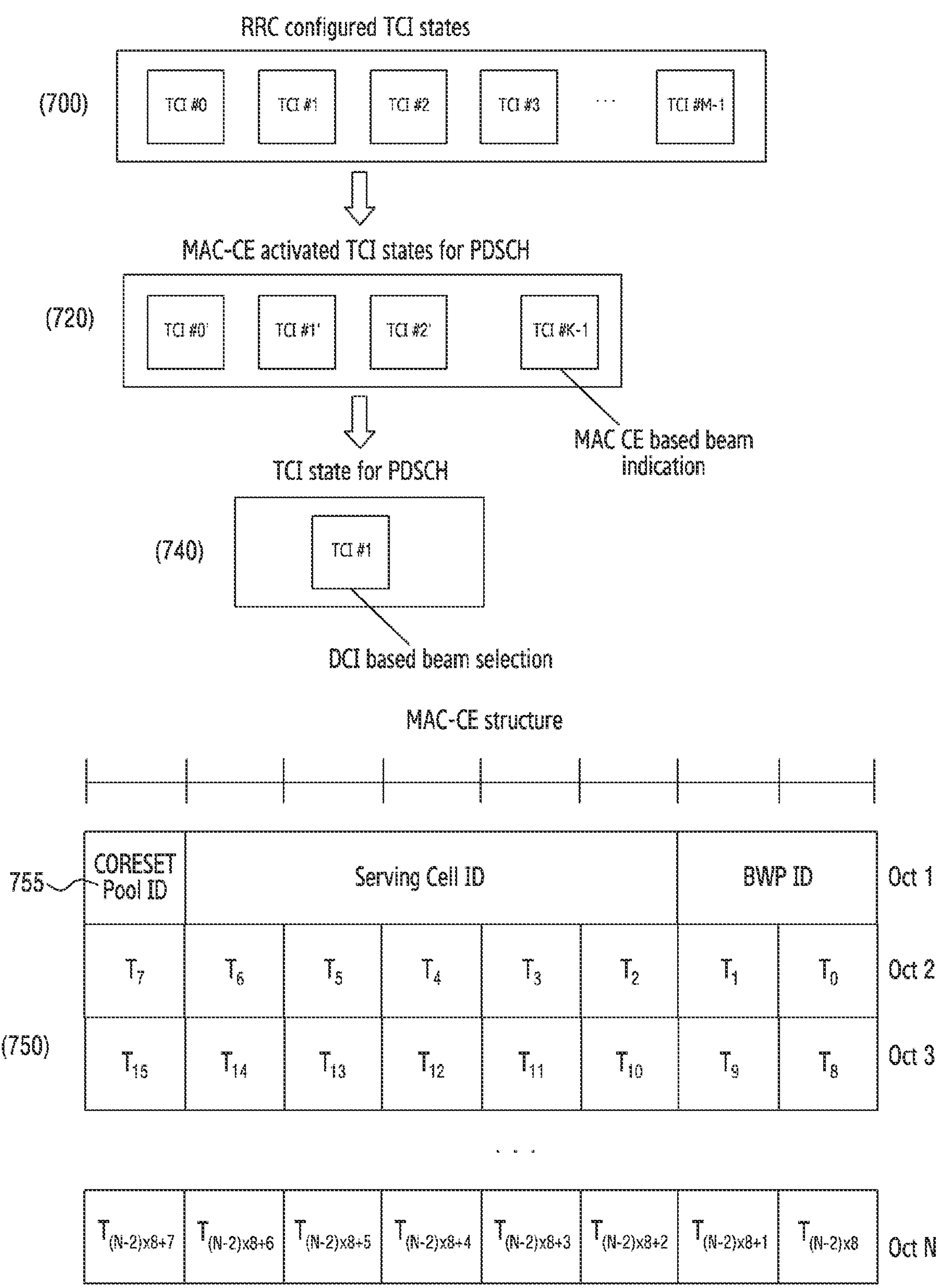
FIG. 7 illustrates a procedure for beam configuration and activation of a PDSCH according to an embodiment.

FIG. 7 illustrates a procedure for beam configuration and activation of a PDSCH according to an embodiment. A list of TCI states for a PDSCH may be indicated via a higher-layer list, such as RRC, in reference numeral 700. The list of TCI states may be indicated by tci-StatesToAddModList and/or tci-StatesToReleaseList in PDSCH-Config IE for each BWP. Next, some in the list of TCI states may be activated via a MAC-CE, in reference numeral 720. Among the TCI states activated via the MAC-CE, a TCI state for a PDSCH may be indicated via DCI, in reference numeral 740. The maximum number of the activated TCI states may be determined according to capabilities reported by the terminal. Reference numeral 750 illustrates an example of a MAC-CE structure for PDSCH TCI state activation/deactivation.

The meaning of each field in the MAC CE and a value configurable for each field may include at least some of the information shown below in Table 18.

TABLE 18

- Serving Cell ID (Serving cell ID): This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;
- BWP ID: This field indicates a DL BWP for which the MAC CE applies as the codepoint of the DCI BWP indicator field as specified in TS 38.212 [9]. The length of the BWP ID field is 2 bits. This field is disregarded if this MAC CE applies to a set of Serving Cells;
- $T_i$ (TCI state ID): If there is a TCI state with TCI-StateId i as specified in TS 38.331 [5], this field indicates the activation/deactivation status of the TCI state with TCI-StateId i, otherwise MAC entity shall disregard the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e. the first TCI State with Ti field set to 1 shall be mapped to the codepoint value 0, second TCI State with Ti field set to 1 shall be mapped to the codepoint value 1 and so on. The maximum number of activated TCI states is 8;
- CORESET Pool ID (CORESET Pool ID): This field indicates that mapping between the activated TCI states and the codepoint of the DCI Transmission Configuration Indication set by field Ti is specific to the ControlResourceSetId configured with CORESET Pool ID as specified in TS 38.331 [5]. This field set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0. If the coresetPoolIndex is not configured for any CORESET, MAC entity shall disregard the CORESET Pool ID field in this MAC CE when receiving the MAC CE. If the Serving Cell in the MAC CE is configured in a cell list that contains more than one Serving Cell, the CORESET Pool ID field shall be disregarded when receiving the MAC CE.

PUCCH: Relating to Transmission

In the NR system, the terminal may transmit control information (UCI) to the base station via a PUCCH. The control information may include at least one of HARQ-acknowledgement (HARQ-ACK) indicating a success or a failure of demodulation/decoding for a transport block (TB) received by the terminal via a PDSCH, a scheduling request (SR) for requesting resource allocation from the PUSCH base station by the terminal for UL data transmission, or CSI that is information for channel state reporting of the terminal.

PUCCH resources may be mainly divided into a long PUCCH and a short PUCCH according to a length of an assigned symbol. In the NR system, a long PUCCH has a length of 4 symbols or more in a slot, and a short PUCCH has a length of 2 symbols or fewer in a slot.

The long PUCCH may be used to improve UL cell coverage, and thus may be transmitted in a DFT-S-OFDM scheme, which is a single carrier transmission, rather than OFDM transmission. The long PUCCH supports transmission formats, such as PUCCH format 1, PUCCH format 3, and PUCCH format 4, depending on the number of supportable control information bits and whether terminal multiplexing via Pre-DFT OCC support at a previous stage of inverse fast Fourier transform (IFFT) is supported.

PUCCH format 1 is a DFT-S-OFDM-based long PUCCH format capable of supporting control information of up to 2 bits, and uses a frequency resource of 1 RB. The control information may include each of or a combination of HARQ-ACK and SR. In PUCCH format 1, an OFDM symbol including a DMRS and an OFDM symbol including UCI are configured in a repetitive manner.

For example, in case that the number of transmission symbols of PUCCH format 1 is 8 symbols, starting from a first start symbol of the 8 symbols, a DMRS symbol, a UCI symbol, a DMRS symbol, a UCI symbol, a DMRS symbol, a UCI symbol, a DMRS symbol, and a UCI symbol may be included in sequence. A DMRS symbol may be spread using an orthogonal code (or orthogonal sequence or spreading code, $w_i(m)$) on the time axis to a sequence corresponding to a length of 1 RB on the frequency axis within one OFDM symbol, and may be transmitted after IFFT is performed.

For a UCI symbol, the terminal may generate d(0) by BPSK-modulating 1-bit control information and QPSK-modulating 2-bit control information, multiply generated d(0) by a sequence corresponding to the length of 1 RB on the frequency axis so as to perform scrambling, perform spreading using the orthogonal code (or orthogonal sequence or spreading code, $w_i(m)$) on the time axis to the scrambled sequence, perform IFFT, and then perform transmission.

The terminal may generate the sequence, based on a configured ID and a group hopping or sequence hopping configuration received via higher-layer signaling from the base station, and generate a sequence corresponding to a length of 1 RB by cyclic shifting the generated sequence with an initial cyclic shift (CS) value configured via a higher signal.

$w_i(m)$ is determined as in $$w_i(m) = e^{\frac{j2\pi\phi(m)}{N_{SF}}}$$

in case that a length (NSF) of a spreading code is given, which is shown below in Table 19. i indicates an index of the spreading code itself, and m indicates indexes of elements of the spreading code. Numbers within [ ] in Table 19 refer to φ(m) in case that a length of the spreading code is 2 and an index of the configured spreading code is 0 (i=0), spreading code $w_i(m)$ becomes $w_i(0)=e^{j2\pi\cdot 0/N_{SF}}=1$ and $w_i(1)=e^{j2\pi\cdot 0/N_{SF}}=1$, so that $w_i(m)=[1\ 1]$.

TABLE 19

Spreading codes for PUCCH format 1 $w_i(m) = e^{j2\pi\varphi(m)/N_{SF}}$

| $N_{SF}$ | Ø(m) i = 0 | i = 1 | i = 2 | i = 3 | i = 4 | i = 5 | i = 6 |
|---|---|---|---|---|---|---|---|
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

PUCCH format 3 is a DFT-S-OFDM-based long PUCCH format capable of supporting control information exceeding 2 bits, and the number of used RBs is configurable via a higher layer. The control information may include each of or a combination of HARQ-ACK, SR, and CSI. In PUCCH format 3, a DMRS symbol position is shown below in Table 20 according to whether an additional DMRS symbol is configured and whether frequency hopping is configured within a slot.

TABLE 20

| | DMRS position within PUCCH format 3/4 transmission | | | |
|---|---|---|---|---|
| | No additional DMRS configured | | Additional DMRS configured | |
| Transmission length of PUCCH format 3/4 | No frequency hopping configured | Frequency hopping configured | No frequency hopping configured | Frequency hopping configured |
| 4 | 1 | 0, 2 | 1 | 0, 2 |
| 5 | 1, 4 | | 1, 4 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

If the number of transmission symbols of PUCCH format 3 is 8 symbols, starting with a first start symbol being 0 among the 8 symbols, DMRSs are transmitted via the first and fifth symbols. Table 20 is applied in the same manner as a DMRS symbol position of PUCCH format 4.

PUCCH format 4 is a DFT-S-OFDM-based long PUCCH format capable of supporting control information exceeding 2 bits, and uses a frequency resource of 1 RB. The control information may include each of or a combination of HARQ-ACK, SR, and CSI. A difference between PUCCH format 4 and PUCCH format 3 is that, for PUCCH format 4, PUCCH format 4 of multiple terminals may be multiplexed within one RB. Multiplexing of PUCCH format 4 of multiple terminals is possible via application of Pre-DFT orthogonal cover code (OCC) to control information at a previous stage of IFFT. However, the number of transmittable control information symbols of one terminal decreases according to the number of multiplexed terminals. The number of multiplexable terminals, that is, the number of different available OCCs, may be 2 or 4, and the number of OCCs and the OCC index to be applied may be configured via a higher layer.

The short PUCCH may be transmitted in both a DL centric slot and a UL centric slot and, in general, the short PUCCH may be transmitted at a last symbol of a slot or an OFDM symbol at the end (e.g., the last OFDM symbol, a second OFDM symbol from the last, or last 2 OFDM symbols at the end). Transmission of the short PUCCH at a random position in the slot is also possible. The short PUCCH may be transmitted using one OFDM symbol or two OFDM symbols, may be used to shorten a delay time compared to a long PUCCH when UL cell coverage is good, and may be transmitted in a CP-OFDM scheme.

For example, for HARQ-ACK of 1 bit, as shown below in Table 21, if ACK, the terminal may generate the final CS by adding 6 to the initial CS value, and if NACK, the terminal may generate the final CS by adding 0 to the initial CS. The CS value of 0 for NACK and the CS value of 6 for ACK are defined in the standard, and the terminal may generate PUCCH format 0 according to the value defined in the standard so as to transmit 1-bit HARQ-ACK.

TABLE 21

| 1-bit HARQ-ACK | NACK | ACK |
|---|---|---|
| Final CS | (initial CS + 0) mod 12 = initial CS | (initial cs + 6) mod 12 |

For example, in case that HARQ-ACK is 2 bits, as shown below in Table 22, the terminal adds 0 to the initial CS value for (NACK, NACK), adds 3 to the initial CS value for (NACK, ACK), adds 6 to the initial CS value for (ACK, ACK), and adds 9 to the initial CS value for (ACK, NACK). The CS value of 0 for (NACK, NACK), the CS value of 3 for (NACK, ACK), the CS value of 6 for (ACK, ACK), and the CS value of 9 for (ACK, NACK) are defined in the standard, and the terminal may generate PUCCH format 0 according to the value defined in the standard so as to transmit a 2-bit HARQ-ACK. In case that the final CS value exceeds 12 due to the CS value added to the initial CS value according to ACK or NACK, since a sequence length is 12, modulo 12 may be applied to the final CS value.

TABLE 22

| 2-bit HARQ-ACK | NACK, NACK | NACK, ACK | ACK, ACK | ACK, NACK |
|---|---|---|---|---|
| Final CS | (initial CS + 0) mod 12 = initial CS | (initial CS + 3) mod 12 | (initial CS + 6) mod 12 | (initial CS + 9) mod 12 |

The short PUCCH may support transmission formats, such as PUCCH format 0 and PUCCH format 2, according to the number of supportable control information bits. PUCCH format 0 is a short PUCCH format capable of supporting control information of up to 2 bits, and uses a frequency resource of 1 RB. For example, the control information may include each of or a combination of HARQ-ACK and SR. PUCCH format 0 has a structure of transmitting no DMRS and transmitting only a sequence mapped to 12 subcarriers in the frequency axis within one OFDM symbol. The terminal may generate a sequence, based on a configured ID and a group hopping or sequence hopping configuration received via a higher signal from the base station, cyclic-shifts the generated sequence by using a final CS value obtained by adding a different CS value to an indicated initial CS value depending on ACK or negative acknowledgement (NACK), and maps the cyclic-shifted sequence to 12 subcarriers, so as to perform transmission.

PUCCH format 2 is a short PUCCH format supporting control information exceeding 2 bits, and the number of used RBs may be configured via a higher layer. The control information may include each of or a combination of HARQ-ACK, SR, and CSI. When an index of a first subcarrier is #0, in PUCCH format 2, positions of subcarriers in which a DMRS is transmitted may be fixed to subcarriers having indexes of #1, #4, #7, and #10 within one OFDM symbol. The control information may be mapped to subcarriers remaining after excluding the subcarriers, in which the DMRS is positioned, via modulation after channel coding.

Values configurable for the aforementioned respective PUCCH formats and ranges of the values may be organized as shown below in Table 23, which illustrates N.A. when no value needs to be configured.

TABLE 23

| | | PUCCH Format 0 | PUCCH Format 1 | PUCCH Format 2 | PUCCH Format 3 | PUCCH Format 4 |
|---|---|---|---|---|---|---|
| Starting symbol | Configurability | ✓ | ✓ | ✓ | ✓ | ✓ |
| | Value range | 0-13 | 0-10 | 0-13 | 0-10 | 0-10 |
| Number of symbols in a slot | Configurability | ✓ | ✓ | ✓ | ✓ | ✓ |
| | Value range | 1, 2 | 4-14 | 1, 2 | 4-14 | 4-14 |
| Index for identifying starting PRB | Configurability | ✓ | ✓ | ✓ | ✓ | ✓ |
| | Value range | 0-274 | 0-274 | 0-274 | 0-274 | 0-274 |
| Number of PRBs | Configurability | N.A. | N.A. | ✓ | ✓ | N.A. |
| | Value range | N.A. (Default is 1) | N.A. (Default is 1) | 1-16 | 1-6, 8-10, 12, 15, 16 | N.A. (Default is 1) |
| Enabling frequency hopping (intra-slot) | Configurability | ✓ | ✓ | ✓ | ✓ | ✓ |
| | Value range | On/Off (only for 2 symbol) | On/Off | On/Off (only for 2 symbol) | On/Off | On/Off |
| Freq.cy resource of $2^{nd}$ hop if intra-slot frequency hopping is enabled | Configurability | ✓ | ✓ | ✓ | ✓ | ✓ |
| | Value range | 0-274 | 0-274 | 0-274 | 0-274 | 0-274 |
| Index of initial cyclic shift | Configurability | ✓ | ✓ | N.A. | N.A. | N.A. |
| | Value range | 0-11 | 0-11 | N.A. | N.A. | N.A. |
| Index of time-domain OCC | Configurability | N.A. | ✓ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | ✓ |
| | Value range | N.A. | N.A. | N.A. | N.A. | 2, 4 |
| Index of Pre-DFT OCC | Configurability | N.A. | N.A. | N.A. | N.A. | ✓ |
| | Value range | N.A. | N.A. | N.A. | N.A. | 0, 1, 2, 3 |

In order to improve UL coverage, multi-slot repetition may be supported for PUCCH formats 1, 3, and 4, and PUCCH repetition may be configured for each PUCCH format. The terminal may repeatedly transmit a PUCCH including UCI as many times as the number of slots configured via nrofSlots that is higher-layer signaling. For the repeated PUCCH transmission, PUCCH transmission in each slot may be performed using the same number of consecutive symbols, and the number of the consecutive symbols may be configured via nrofSymbols in PUCCH-format 1, PUCCH-format 3, or PUCCH-format 4, which is higher-layer signaling. For the repeated PUCCH transmission, PUCCH transmission in each slot may be performed using the same start symbol, and the start symbol may be configured via startingSymbolIndex in PUCCH-format 1, PUCCH-format 3, or PUCCH-format 4, which is higher-layer signaling. For the repeated PUCCH transmission, a single PUCCH-spatialRelationInfo may be configured for a single PUCCH resource. For the repeated PUCCH transmission, in case that the terminal is configured to perform frequency hopping in PUCCH transmission in different slots, the terminal may perform frequency hopping in units of slots.

If the terminal is configured to perform frequency hopping in PUCCH transmission in different slots, the terminal may start, in an even-numbered slot, the PUCCH transmission from a first PRB index configured via startingPRB that is higher-layer signaling, and the terminal may start, in an odd-numbered slot, the PUCCH transmission from a second PRB index configured via secondHopPRB that is higher-layer signaling. Additionally, in case that the terminal is configured to perform frequency hopping in PUCCH transmission in different slots, an index of a slot indicated to the terminal for first PUCCH transmission is 0, and during the configured total number of repeated PUCCH transmissions, a value of the number of repeated PUCCH transmissions may be increased in each slot regardless of execution of the PUCCH transmission.

If the terminal is configured to perform frequency hopping in PUCCH transmission in different slots, the terminal does not expect configuration of frequency hopping within the slot during PUCCH transmission. In case that the terminal is not configured to perform frequency hopping in PUCCH transmission in different slots, but is configured with frequency hopping within a slot, a first PRB index and a second PRB index are applied equally in the slot. If the number of UL symbols available for PUCCH transmission is less than nrofSymbols configured via higher-layer signaling, the terminal may not transmit a PUCCH. Even if the terminal fails to transmit a PUCCH in a certain slot during repeated PUCCH transmission, the terminal may increase the number of repeated PUCCH transmissions.

PUCCH: PUCCH Resource Configuration

The base station may be able to configure a PUCCH resource for each BWP via a higher layer for a specific terminal. The PUCCH resource configuration is shown below in Table 24.

TABLE 24

```
PUCCH-Config ::=                                          SEQUENCE {
  resourceSetToAddModList                                     SEQUENCE (SIZE (1..maxNrofPUCCH-
ResourceSets)) OF PUCCH-ResourceSet                       OPTIONAL, -- Need N
  resourceSetToReleaseList                                  SEQUENCE (SIZE (1..maxNrofPUCCH-ResourceSets))
OF PUCCH-ResourceSetId                             OPTIONAL, -- Need N
  resourceToAddModList                                        SEQUENCE (SIZE (1..maxNrofPUCCH-Resources))
OF PUCCH-Resource                                    OPTIONAL, -- Need N
  resourceToReleaseList                                     SEQUENCE (SIZE (1..maxNrofPUCCH-Resources)) OF
PUCCH-ResourceId                                   OPTIONAL, -- Need N
  format1                                               SetupRelease { PUCCH-FormatConfig }
OPTIONAL, -- Need M
  format2                                               SetupRelease { PUCCH-FormatConfig }
OPTIONAL, -- Need M
  format3                                               SetupRelease { PUCCH-FormatConfig }
OPTIONAL, -- Need M
  format4                                               SetupRelease { PUCCH-FormatConfig }
OPTIONAL, -- Need M
  schedulingRequestResourceToAddModList                       SEQUENCE (SIZE (1..maxNrofSR-Resources)) OF
SchedulingRequestResourceConfig
OPTIONAL, -- Need N
  schedulingRequestResourceToReleaseList                    SEQUENCE (SIZE (1..maxNrofSR-Resources)) OF
SchedulingRequestResourceId                                                                  OPTIONAL,
-- Need N
  multi-CSI-PUCCH-ResourceList                          SEQUENCE (SIZE (1..2)) OF PUCCH-ResourceId
OPTIONAL, -- Need M
  dl-DataToUL-ACK                                       SEQUENCE (SIZE (1..8) OF INTEGER (0..15)
OPTIONAL, -- Need M
  spatialRelationInfoToAddModList                         SEQUENCE (SIZE (1..maxNrofSpatialRelationInfos)) OF
PUCCH-SpatialRelationInfo
OPTIONAL, -- Need N
  spatialRelationInfoToReleaseList                        SEQUENCE (SIZE (1..maxNrofSpatialRelationInfos)) OF
PUCCH-SpatialRelationInfoId
OPTIONAL, -- Need N
  pucch-PowerControl                                      PUCCH-PowerControl
OPTIONAL, -- Need M
  ...,
  [[
  resourceToAddModListExt-r16                                 SEQUENCE (SIZE (1..maxNrofPUCCH-Resources))
OF PUCCH-ResourceExt-r16                             OPTIONAL, -- Need N
  dl-DataToUL-ACK-r16                                   SetupRelease { DL-DataToUL-ACK-r16 }
OPTIONAL, -- Need M
  ul-AccessConfigListDCI-1-1-r16                        SetupRelease { UL-AccessConfigListDCI-1-1-r16 }
OPTIONAL, -- Need M
  subslotLengthForPUCCH-r16                                   CHOICE {
    normalCP-r16                                                ENUMERATED {n2,n7},
    extendedCP-r16                                              ENUMERATED {n2,n6}
  }
OPTIONAL, -- Need R
  dl-DataToUL-ACK-DCI-1-2-r16                           SetupRelease { DL-DataToUL-ACK-DCI-1-2-r16}
OPTIONAL, -- Need M
  numberOfBitsForPUCCH-ResourceIndicatorDCI-1-2-r16                   INTEGER (0..3)
OPTIONAL, -- Need R
  dmrs-UplinkTransformPrecodingPUCCH-r16                      ENUMERATED {enabled}        OPTIONAL, --
Cond PI2-BPSK
  spatialRelationInfoToAddModListSizeExt-v1610                    SEQUENCE (SIZE
(1..maxNrofSpatialRelationInfosDiff-r16)) OF PUCCH-SpatialRelationInfo
OPTIONAL, -- Need N
  spatialRelationInfoToReleaseListSizeExt-v1610                 SEQUENCE (SIZE
(1..maxNrofSpatialRelationInfosDiff-r16)) OF PUCCH-SpatialRelationInfoId
OPTIONAL, -- Need N
  spatialRelationInfoToAddModListExt-v1610                    SEQUENCE (SIZE (1..maxNrofSpatialRelationInfos-
r16)) OF PUCCH-SpatialRelationInfoExt-r16
OPTIONAL, -- Need N
  spatialRelationInfoToReleaseListExt-v1610                   SEQUENCE (SIZE (1..maxNrofSpatialRelationInfos-
r16)) OF PUCCH-SpatialRelationInfoId-r16                     OPTIONAL, -- Need N
  resourceGroupToAddModList-r16                               SEQUENCE (SIZE (1..maxNrofPUCCH-
ResourceGroups-r16)) OF PUCCH-ResourceGroup-r16
OPTIONAL, -- Need N
  resourceGroupToReleaseList-r16                            SEQUENCE (SIZE (1..maxNrofPUCCH-
ResourceGroups-r16)) OF PUCCH-ResourceGroupId-r16
OPTIONAL, -- Need N
  sps-PUCCH-AN-List-r16                                 SetupRelease { SPS-PUCCH-AN-List-r16 }
OPTIONAL, -- Need M
  schedulingRequestResourceToAddModListExt-v1610                    SEQUENCE (SIZE (1..maxNrofSR-
Resources)) OF SchedulingRequestResourceConfigExt-v1610
OPTIONAL -- Need N
  ]]
}
```

In Table 24, one or multiple PUCCH resource sets in the PUCCH resource configuration for a specific BWP may be configured, and a maximum payload value for UCI transmission may be configured in some of the PUCCH resource sets. Each PUCCH resource set may include one or multiple PUCCH resources, and each of the PUCCH resources may belong to one of the aforementioned PUCCH formats.

For the PUCCH resource sets, a maximum payload value of a first PUCCH resource set may be fixed to be 2 bits. Accordingly, the value may not be separately configured via a higher layer. In case that the remaining PUCCH resource sets are configured, indexes of the PUCCH resource sets may be configured in ascending order according to maximum payload values, and a maximum payload value may not be configured for the last PUCCH resource set. Higher layer configurations for the PUCCH resource sets may be as shown below in Table 25.

TABLE 25

```
PUCCH-ResourceSet ::=       SEQUENCE {
  pucch-ResourceSetId         PUCCH-ResourceSetId,
  resourceList              SEQUENCE (SIZE (1..maxNrofPUCCH-ResourcesPerSe
t)) OF PUCCH-ResourceId,
  maxPayloadSize              INTEGER (4..256)
    OPTIONAL   -- Need R
}
```

Parameter resourceList in Table 25 may include IDs of PUCCH resources belonging to the PUCCH resource set.

During initial access or if no PUCCH resource set is configured, a PUCCH resource set as shown below in Table 26, which includes multiple cell-specific PUCCH resources in an initial BWP, may be used. The PUCCH resource to be used for initial access in this PUCCH resource set may be indicated via SIB1.

TABLE 26

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0,6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0,6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0,6} |

TABLE 26-continued

| Index | PUCCH format | First symbol | Number of symbols | PRB offset $RB_{BWP}^{offset}$ | Set of initial CS indexes |
|---|---|---|---|---|---|
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

A maximum payload of each PUCCH resource included in the PUCCH resource set may be 2 bits for PUCCH format 0 or 1, and may be determined based on a symbol length, the number of PRBs, and/or a maximum code rate for the remaining formats. The symbol length and the number of PRBs may be configured for each PUCCH resource, and the maximum code rate may be configured for each PUCCH format.

For SR transmission, a PUCCH resource for an SR corresponding to schedulingRequestID may be configured via a higher layer, as shown below in Table 27. The PUCCH resource may be a resource belonging to PUCCH format 0 or PUCCH format 1.

TABLE 27

```
SchedulingRequestResourceConfig ::=       SEQUENCE {
  schedulingRequestResourceId               SchedulingRequestResourceId,
  schedulingRequestID                       SchedulingRequestId,
  periodicityAndOffset                    CHOICE {
    sym2                                        NULL,
    sym6or7                                     NULL,
    sl1                                       NULL,              -- Recurs in
every slot
    sl2                                       INTEGER (0..1),
    sl4                                       INTEGER (0..3),
    sl5                                       INTEGER (0..4),
    sl8                                       INTEGER (0..7),
    sl10                                      INTEGER (0..9),
    sl16                                      INTEGER (0..15),
    sl20                                      INTEGER (0..19),
```

TABLE 27-continued

```
      sl40                             INTEGER (0..39),
      sl80                             INTEGER (0..79),
      sl160                            INTEGER (0..159),
      sl320                            INTEGER (0..319),
      sl640                            INTEGER (0..639)
   }                                                    OPTIONAL,
-- Need M
   resource                         PUCCH-ResourceId    OPTIONAL
-- Need M
}
```

For the configured PUCCH resource, a transmission period and an offset may be configured via parameter periodicityAndOffset of Table 27. In case that there is UL data to be transmitted by the terminal at a time point corresponding to the configured period and offset, the corresponding PUCCH resource may be transmitted. Otherwise, the corresponding PUCCH resource may not be transmitted.

For CSI transmission, a PUCCH resource for transmission of a periodic or semi-persistent CSI report via a PUCCH may be configured in parameter pucch-CSI-ResourceList as shown in Table 28. Parameter pucch-CSI-ResourceList may include a list of PUCCH resources specific to each BWP for a cell or CC in which a corresponding CSI report is to be transmitted. The PUCCH resource may belong to PUCCH format 2, PUCCH format 3, or PUCCH format 4. For the PUCCH resource, a transmission period and an offset may be configured via reportSlotConfig as shown below in Table 28.

TABLE 28

```
CSI-ReportConfig ::=          SEQUENCE {
   reportConfigId               CSI-ReportConfigId,
   carrier                      ServCellIndex      OPTIONAL,   --
Need S
   ...
   reportConfigType             CHOICE {
      periodic                     SEQUENCE {
         reportSlotConfig                CSI-ReportPeriodicityAndOffset,
         pucch-CSI-ResourceList          SEQUENCE (SIZE (1..maxNrofBWPs)) OF
PUCCH-CSI-Resource
      },
      semiPersistentOnPUCCH           SEQUENCE {
         reportSlotConfig                CSI-ReportPeriodicityAndOffset,
         pucch-CSI-ResourceList          SEQUENCE (SIZE (1..maxNrofBWPs)) OF
PUCCH-CSI-Resource
      },
      semiPersistentOnPUSCH           SEQUENCE {
         reportSlotConfig                ENUMERATED {sl5, sl10, sl20, sl40, sl80,
sl160, sl320},
         reportSlotOffsetList          SEQUENCE (SIZE (1.. maxNrofUL-Allocations)) OF
INTEGER(0..32),
         p0alpha                           P0-PUSCH-AlphaSetId
      },
      aperiodic                     SEQUENCE {
         reportSlotOffsetList          SEQUENCE (SIZE (1..maxNrofUL-Allocations)) OF
INTEGER(0..32)
      }
   },
   ...
}
```

For HARQ-ACK transmission, a resource set of PUCCH resources for transmission may be first selected according to a payload of UCI including corresponding HARQ-ACK. That is, a PUCCH resource set having a minimum payload that is greater than or equal to the UCI payload may be selected. A PUCCH resource in the PUCCH resource set may be selected via a PUCCH resource indicator (PRI) in DCI for scheduling of a TB corresponding to the HARQ-ACK, and the PRI may be the PUCCH resource indicator specified in Table 6 or Table 7. A relationship between the PRI and the PUCCH resource selected from the PUCCH resource set may be as shown below in Table 29.

TABLE 29

| PUCCH resource indicator | PUCCH resource |
|---|---|
| '000' | 1st PUCCH resource provided by pucch-Resourceid obtained from the 1st values of resourceList |
| '001' | 2nd PUCCH resource provided by pucch-Resourceid obtained from the 2nd values of resourceList |
| '010' | 3rd PUCCH resource provided by pucch-Resourceid obtained from the 3rd values of resourceList |

TABLE 29-continued

| PUCCH resource indicator | PUCCH resource |
|---|---|
| '011' | 4th PUCCH resource provided by pucch-Resourceid obtained from the 4th values of resourceList |

TABLE 29-continued

| PUCCH resource indicator | PUCCH resource |
|---|---|
| '100' | $5^{th}$ PUCCH resource provided by pucch-Resourceid obtained from the $5^{th}$ values of resourceList |
| '101' | $6^{th}$ PUCCH resource provided by pucch-Resourceid obtained from the $6^{th}$ values of resourceList |
| '110' | $7^{th}$ PUCCH resource provided by pucch-Resourceid obtained from the $7^{th}$ values of resourceList |
| '111' | $8^{th}$ PUCCH resource provided by pucch-Resourceid obtained from the $8^{th}$ values of resourceList |

If the number of selected PUCCH resources in the PUCCH resource set is greater than 8, the PUCCH resources may be selected based on Equation (1) below.

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil \text{ if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 \text{ if } \Delta_{PRI} \geq R_{PUCCH} \bmod 8 \end{cases} \quad \text{Equation (1)}$$

In Equation (1), $r_{PUCCH}$ denotes an index of a selected PUCCH resource in the PUCCH resource set, $R_{PUCCH}$ denotes the number of PUCCH resources belonging to the PUCCH resource set, $\Delta_{PRI}$ denotes a PRI value, $N_{CCE,p}$ denotes a total number of CCEs of CORESET p to which received DCI belongs, and $n_{CCE,p}$ denotes a first CCE index for the received DCI.

A point in time at which a PUCCH resource is transmitted is after $K_1$ slots from TB transmission which corresponds to corresponding HARQ-ACK. A candidate of value $K_1$ is configured via a higher layer, and more specifically, may be configured in parameter dl-DataToUL-ACK in PUCCH-Config specified in Table 27. One $K_1$ value among the candidates may be selected by a PDSCH-to-HARQ feedback timing indicator in the DCI for scheduling of the TB, and this value may be the value specified in Table 5 or Table 6. The unit of the $K_1$ value may be units of slots or units of sub slots. A sub slot is a unit of a length smaller than that of a slot, and one or multiple symbols may constitute one sub slot.

The terminal may transmit UCI via one or two PUCCH resources in one slot or sub-slot, and when UCI is transmitted via two PUCCH resources in one slot/sub-slot, i) respective PUCCH resources do not overlap in units of symbols, and ii) at least one PUCCH resource may be a short PUCCH. The terminal may not expect to transmit multiple PUCCH resources for HARQ-ACK transmission within one slot.

PUCCH: Relating to Transmission Beam

If the terminal does not have a UE-specific configuration for a dedicated PUCCH resource configuration, a PUCCH resource set is provided via pucch-ResourceCommon that is higher-layer signaling, wherein the beam configuration for PUCCH transmission conforms to a beam configuration used in PUSCH transmission scheduled via a random access response (RAR) UL grant.

In case that the terminal has a UE-specific configuration for a dedicated PUCCH resource configuration, the beam configuration for PUCCH transmission may be provided via pucch-spatialRelationInfoId that is higher signaling included in Table 24]. If the terminal is configured with one pucch-spatialRelationInfoId, the beam configuration for PUCCH transmission of the terminal may be provided via one pucch-spatialRelationInfoId. If the terminal is configured with multiple pucch-spatialRelationInfoIDs, the terminal may be indicated to activate one of the multiple pucch-spatialRelationInfoIDs via a MAC control element (CE). The terminal may be configured with up to eight pucch-spatialRelationInfoIDs via higher signaling, and may be indicated to activate only one pucch-spatialRelationInfoID therefrom. In case that the terminal is indicated to activate any pucch-spatialRelationInfoID via the MAC CE, the terminal may apply pucch-spatialRelationInfoID activation via the MAC CE from a slot that appears first after $$3N_{slot}^{subframe,\mu}$$

slots from a slot for HARQ-ACK transmission with respect to a PDSCH for transmission of the MAC CE including activation information of pucch-spatialRelationInfoID. μ is a neurology applied to PUCCH transmission, and $$N_{slot}^{subframe,\mu}$$

refers to the number of slots per subframe in a given neurology. A higher layer configuration for pucch-spatialRelationInfo may be as shown below in Table 30.

TABLE 30

```
PUCCH-SpatialRelationInfo ::=       SEQUENCE {
  pucch-SpatialRelationInfoId       PUCCH-SpatialRelationInfoId,
  servingCellId                       ServCellIndex
OPTIONAL,   -- Need S
  referenceSignal                     CHOICE {
    ssb-Index                             SSB-Index,
    csi-RS-Index                          NZP-CSI-RS-ResourceId,
    srs                                   PUCCH-SRS
  },
  pucch-PathlossReferenceRS-Id          PUCCH-PathlossReferenceRS-Id,
  p0-PUCCH-Id                             P0-PUCCH-Id,
  closedLoopIndex                        ENUMERATED { i0, i1 }
}
PUCCH-SpatialRelationInfoId ::=     INTEGER (1..maxNrofSpatialRelationInfos)
```

In Table 30, one referenceSignal configuration may exist in a specific pucch-spatialRelationInfo configuration, and the referenceSignal may be ssb-Index indicating a specific SS/PBCH, may be csi-RS-Index indicating a specific CSI-RS, or may be srs indicating a specific SRS. If referenceSignal is configured with ssb-Index, the terminal may configure, as a beam for PUCCH transmission, a beam used when receiving an SS/PBCH corresponding to ssb-Index among SS/PBCHs in the same serving cell, or if servingCellId is provided, a beam used when receiving an SS/PBCH corresponding to ssb-Index among SS/PBCHs in a cell indicated by servingCellId may be configured as the beam for PUCCH transmission.

In case that the referenceSignal is configured with csi-RS-Index, the terminal may configure, as a beam for PUCCH transmission, a beam used when receiving a CSI-RS corresponding to csi-RS-Index among CSI-RSs in the same serving cell, or if servingCellId is provided, a beam used when receiving a CSI-RS corresponding to csi-RS-Index among CSI-RSs in a cell indicated by servingCellId may be configured as the beam for PUCCH transmission.

In case that the referenceSignal is configured with srs, the terminal may configure, as a beam for PUCCH transmission, a transmission beam used when transmitting an SRS corresponding to a resource index provided via a higher signaling resource in the same serving cell and/or in an activated UL BWP, or if servingCellID and/or ULBWP are/is provided, a transmission beam used when transmitting an SRS corresponding to a resource index provided via a higher signaling resource in a cell indicated by servingCellID and/or ULBWP and/or in the UL BWP may be configured as a beam for PUCCH transmission. One pucch-PathlossReferenceRS-Id configuration may exist in a specific pucch-spatialRelationInfo configuration. PUCCH-PathlossReferenceRS as shown below in Table 31 may be mapped with pucch-PathlossReferenceRS-Id of Table 30, and up to 4 configurations are possible via pathlossReferenceRSs in higher signaling of PUCCH-PowerControl of Table 31. PUCCH-PathlossReferenceRS may be configured with ssb-Index if connected to an SS/PBCH via higher signaling of referenceSignal, and may be configured with csi-RS-Index if connected to a CSI-RS.

TABLE 31

```
PUCCH-PowerControl ::=              SEQUENCE {
  deltaF-PUCCH-f0                    INTEGER (−16..15)              OPTIONAL, --
Need R
  deltaF-PUCCH-f1                    INTEGER (−16..15)              OPTIONAL, --
Need R
  deltaF-PUCCH-f2                    INTEGER (−16..15)              OPTIONAL, --
Need R
  deltaF-PUCCH-f3                    INTEGER (−16..15)              OPTIONAL, --
Need R
  deltaF-PUCCH-f4                    INTEGER (−16..15)              OPTIONAL, --
Need R
  p0-Set                             SEQUENCE (SIZE (1..maxNrofPUCCH-P0-PerSet)) OF P0-
PUCCH                              OPTIONAL, -- Need M
  pathlossReferenceRSs               SEQUENCE (SIZE (1..maxNrofPUCCH-
PathlossReferenceRSs)) OF PUCCH-PathlossReferenceRS
OPTIONAL, -- Need M
  twoPUCCH-PC-AdjustmentStates        ENUMERATED {twoStates}         OPTIONAL, --
Need S
  ...,
  [[
  pathlossReferenceRSs-v1610        SetupRelease { PathlossReferenceRSs-v1610 }
OPTIONAL -- Need M
  ]]
}
P0-PUCCH ::=                         SEQUENCE {
  p0-PUCCH-Id                            P0-PUCCH-Id,
  p0-PUCCH-Value                         INTEGER (−16..15)
}
P0-PUCCH-Id ::=                      INTEGER (1..8)
PathlossReferenceRSs-v1610 : =      SEQUENCE (SIZE (1..maxNrofPUCCH-
PathlossReferenceRSsDiff-r16)) OF PUCCH-PathlossReferenceRS-r16
PUCCH-PathlossReferenceRS ::=              SEQUENCE {
  pucch-PathlossReferenceRS-Id             PUCCH-PathlossReferenceRS-Id,
  referenceSignal                         CHOICE {
    ssb-Index                                SSB-Index,
    csi-RS-Index                             NZP-CSI-RS-ResourceId
  }
}
PUCCH-PathlossReferenceRS-r16 ::=           SEQUENCE {
  pucch-PathlossReferenceRS-Id-r16            PUCCH-PathlossReferenceRS-Id-v1610,
  referenceSignal-r16                         CHOICE {
    ssb-Index-r16                               SSB-Index,
    csi-RS-Index-r16                            NZP-CSI-RS-ResourceId
  }
}
```

PUCCH: Group-Based Spatial Relation Activation

In NR release (Rel)-15, in case that the terminal is configured with a plurality of pucch-spatialRelationInfoID, the terminal may receive a MAC CE for activation of a spatial relation for each PUCCH resource, thereby determining a spatial relation of a PUCCH resource. However, such a method has a disadvantage of requiring excessive signaling overheads to activate the spatial relation of multiple PUCCH resources. Therefore, in Rel-16, a new MAC CE for adding a PUCCH resource group and activating a spatial relation in units of PUCCH resource groups has been introduced. For the PUCCH resource groups, up to 4 PUCCH resource groups may be configured via resourceGroupToAddModList of Table 24, and for each PUCCH resource group, multiple PUCCH resource IDs in one PUCCH resource group may be configured as a list as shown below in Table 32.

TABLE 32

```
PUCCH-ResourceGroup-r16 ::=      SEQUENCE {
  pucch-ResourceGroupId-r16          PUCCH-ResourceGroupId-r16,
  resourcePerGroupList-r16         SEQUENCE (SIZE (1..maxNrofPUCCH-ResourcesPerGroup-r16))
Of PUCCH-ResourceId
}
PUCCH-ResourceGroupId-r16 ::=    INTEGER (0..maxNrofPUCCH-ResourceGroups-1-r16)
PUCCH-ResourceGroup-r16 ::=            SEQUENCE {
  pucch-ResourceGroupId-r16                PUCCH-ResourceGroupId-r16,
  resourcePerGroupList-r16               SEQUENCE (SIZE (1..maxNrofPUCCH-ResourcesPe
rGroup-r16)) OF PUCCH-ResourceId
}
PUCCH-ResourceGroupId-r16 ::=          INTEGER (0..maxNrofPUCCH-ResourceGroups-1-r16)
```

In Rel-16, the base station may configure each PUCCH resource group for the terminal via resourceGroupToAddModList in Table 24 and the higher layer configuration of Table 32, and may configure a MAC CE for simultaneous activation of spatial relations of all PUCCH resources in one PUCCH resource group.

Figure 8:
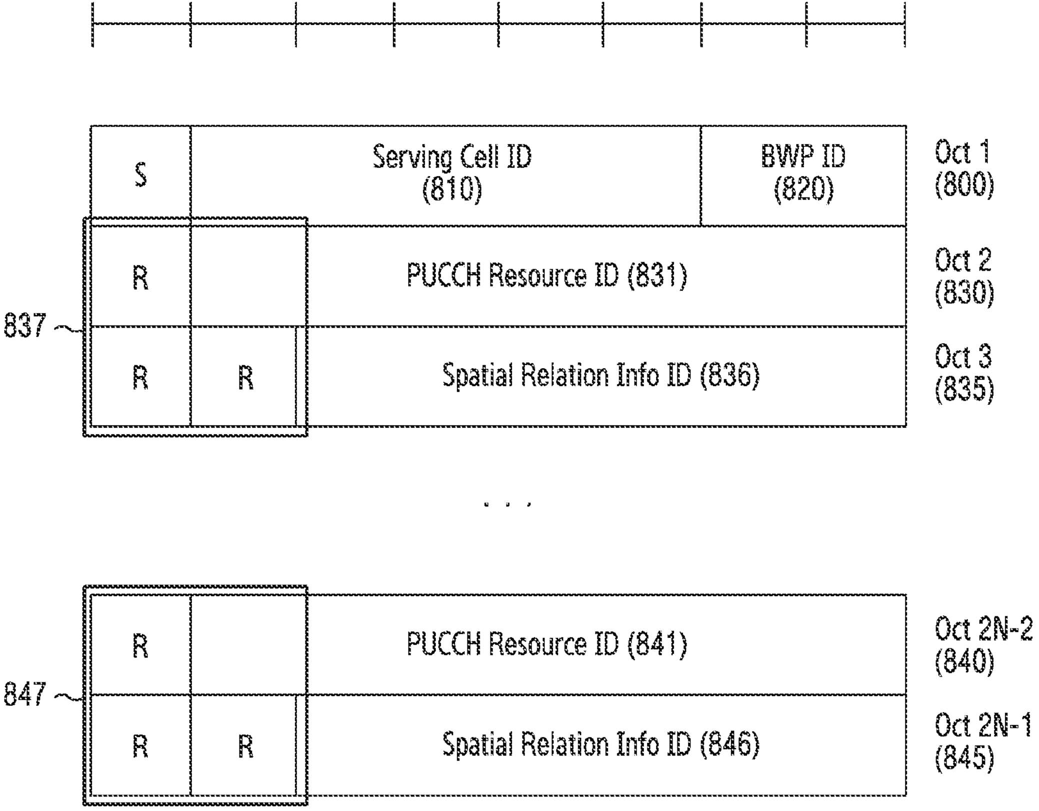
FIG. 8 illustrates a medium access control (MAC) control element (CE) for physical UL control channel (PUCCH) resource group-based spatial relation activation in a wireless communication system according to an embodiment.

FIG. 8 illustrates a MAC CE for PUCCH resource group-based spatial relation activation in the wireless communication system embodiment.

Referring to FIG. 8, a supported cell ID 810 and a BWP ID 820 configured with PUCCH resources, to which a MAC CE is to be applied, are indicated by Oct 1 800. PUCCH Resource IDs 831 which are indicated by Oct 2 830 and PUCCH Resource IDs 841 which are indicated by Oct 2N−2 840 indicate IDs of PUCCH resources. If the indicated PUCCH resources are included in a PUCCH resource group according to resourceGroupToAddModList, different PUCCH resource IDs in the same PUCCH resource group are not indicated by the same MAC CE, and all PUCCH resources in the same PUCCH resource group are activated with the same spatial relation info IDs 836 and 846 which are indicated by Oct 3 835 and Oct 2N−1 845, respectively. In this case, spatial relation info IDs 836 and 846 include a value corresponding to PUCCH-SpatialRelationInfoId−1 to be applied to the PUCCH resource group of Table 30.

Relating to SRS

A base station may configure at least one SRS configuration for each UL BWP to transfer configuration information for SRS transmission to a terminal, and may also configure at least one SRS resource set for each SRS configuration. For example, the base station and the terminal may transmit and receive higher-signaling information as follows to transfer information on the SRS resource set.

- srs-ResourceSetId: an SRS resource set index
- srs-ResourceIdList: a set of SRS resource indexes referenced by an SRS resource set
- resourceType: a time axis transmission configuration of an SRS resource referenced by an SRS resource set, wherein resourceType may be configured to be one of periodic, semi-persistent, and aperiodic. In case that resourceType is configured to be periodic or semi-persistent, associated CSI-RS information may be provided according to a usage of the SRS resource set. In case that resourceType is configured to be aperiodic, an aperiodic SRS resource trigger list and slot offset information may be provided, and associated CSI-RS information may be provided according to a usage of the SRS resource set.
- usage: a configuration for a usage of an SRS resource referenced by an SRS resource set, wherein the usage may be configured to be one of beamManagement, codebook, nonCodebook, and antennaSwitching.
- alpha, p0, pathlossReferenceRS, srs-PowerControlAdjustmentStates: providing parameter configurations for transmission power adjustment of an SRS resource referenced by an SRS resource set.

The terminal may understand that an SRS resource included in an SRS resource index set referenced by an SRS resource set conforms to information configured in the SRS resource set.

The base station and the terminal may transmit and/or receive higher-layer signaling information in order to transfer individual configuration information for the SRS resource. As an example, the individual configuration information for the SRS resource may include time-frequency axis mapping information within a slot of the SRS resource, which may include information on frequency hopping within a slot or between slots of the SRS resource. The individual configuration information for the SRS resource may include a time axis transmission configuration of the SRS resource, and may be configured to be one of periodic, semi-persistent, and aperiodic. This may be limited to having the time axis transmission configuration, such as the SRS resource set including the SRS resource. In case that the time axis transmission configuration of the SRS resource is configured to be periodic or semi-persistent, an additional SRS resource transmission period and slot offset (e.g., periodicityAndOffset) may be included in the time axis transmission configuration.

The base station may activate, deactivate, or trigger SRS transmission to the terminal via L1 signaling (e.g., DCI) or higher-layer signaling including MAC CE signaling or RRC signaling. For example, the base station may activate or deactivate periodic SRS transmission for the terminal via higher-layer signaling. The base station may indicate to activate an SRS resource set in which resourceType is configured to be periodic via higher-layer signaling, and the terminal may transmit an SRS resource referenced by the activated SRS resource set. Time-frequency axis resource mapping within a slot of the transmitted SRS resource conforms to resource mapping information configured in the SRS resource, and slot mapping including a transmission period and a slot offset conforms to periodicityAndOffset configured in the SRS resource. A spatial domain transmission filter applied to the transmitted SRS resource may refer to spatial relation info configured in the SRS resource, or may refer to associated CSI-RS information configured in the SRS resource set including the SRS resource. The terminal may transmit the SRS resource in a UL BWP activated for the periodic SRS resource activated via higher-layer signaling.

For example, the base station may activate or deactivate semi-persistent SRS transmission for the terminal via higher-layer signaling. The base station may indicate to activate an SRS resource set via MAC CE signaling, and the terminal may transmit an SRS resource referenced by the activated SRS resource set. The SRS resource set activated via MAC CE signaling may be limited to the SRS resource set in which resourceType is configured to be semi-persistent. Time-frequency axis resource mapping within a slot of the transmitted SRS resource conforms to resource mapping information configured in the SRS resource, and slot mapping including a transmission period and a slot offset conforms to periodicityAndOffset configured in the SRS resource. A spatial domain transmission filter applied to the transmitted SRS resource may refer to spatial relation info configured in the SRS resource, or may refer to associated CSI-RS information configured in the SRS resource set including the SRS resource. If spatial relation info is configured in the SRS resource, instead of conforming to the same, the spatial domain transmission filter may be determined by referring to configuration information on spatial relation info transferred via MAC CE signaling for activation of semi-persistent SRS transmission. The terminal may transmit the SRS resource in a UL BWP activated for the semi-persistent SRS resource activated via higher-layer signaling.

For example, the base station may trigger aperiodic SRS transmission to the terminal via DCI. The base station may indicate one of aperiodic SRS resource triggers (aperiodicSRS-ResourceTrigger) via an SRS request field of the DCI. The terminal may understand that an SRS resource set has been triggered, the SRS resource set including an aperiodic SRS resource trigger indicated via the DCI in an aperiodic SRS resource trigger list in configuration information of the SRS resource set. The terminal may transmit an SRS resource referenced by the triggered SRS resource set. Time-frequency axis resource mapping within a slot of the transmitted SRS resource conforms to resource mapping information configured in the SRS resource. In addition, slot mapping of the transmitted SRS resource may be determined via a slot offset between a PDCCH including the DCI and the SRS resource, which may refer to value(s) included in a slot offset set configured in the SRS resource set. Specifically, for the slot offset between the PDCCH including the DCI and the SRS resource, a value indicated by a time domain resource assignment field of the DCI from among offset value(s) included in the slot offset set configured in the SRS resource set may be applied. A spatial domain transmission filter applied to the transmitted SRS resource may refer to spatial relation info configured in the SRS resource, or may refer to associated CSI-RS information configured in the SRS resource set including the SRS resource. The terminal may transmit the SRS resource in a UL BWP activated for the aperiodic SRS resource triggered via the DCI.

When the base station triggers aperiodic SRS transmission to the terminal via the DCI, in order for the terminal to transmit an SRS by applying configuration information for the SRS resource, a minimum time interval between a PDCCH including the DCI triggering aperiodic SRS transmission and the transmitted SRS may be required. A time interval for SRS transmission of the terminal may be defined to be the number of symbols between the last symbol of the PDCCH including the DCI triggering aperiodic SRS transmission and the first symbol to which a first transmitted SRS resource among the transmitted SRS resource(s) is mapped. The minimum time interval may be determined by referring to a PUSCH preparation procedure time required for the terminal to prepare for PUSCH transmission.

The minimum time interval may have a different value depending on a usage of the SRS resource set including the transmitted SRS resource. For example, the minimum time interval may be determined to be N2 symbols defined in consideration of terminal processing capability according to the capability of the terminal by referring to the PUSCH preparation procedure time of the terminal. When a usage of the SRS resource set is configured to be codebook or antennaSwitching in consideration of the usage of the SRS resource set including the transmitted SRS resource, the minimum time interval may be determined to be N2 symbols. When the usage of the SRS resource set is configured to be nonCodebook or beamManagement, the minimum time interval may be determined to be N2+14 symbols. In case that the time interval for aperiodic SRS transmission is greater than or equal to the minimum time interval, the terminal may transmit an aperiodic SRS, and in case that the time interval for aperiodic SRS transmission is less than the minimum time interval, the terminal may disregard the DCI triggering an aperiodic SRS. The spatialRelationInfo configuration information is shown below in Table 33.

TABLE 33

```
SRS-Resource ::=              SEQUENCE {
  srs-ResourceId                SRS-ResourceId,
  nrofSRS-Ports                 ENUMERATED {port1, ports2, ports4},
  ptrs-PortIndex                ENUMERATED {n0, n1 }
OPTIONAL,   -- Need R
  transmissionComb                CHOICE {
    n2                                SEQUENCE {
      combOffset-n2                       INTEGER (0..1),
      cyclicShift-n2                    INTEGER (0..7)
    },
    n4                                SEQUENCE {
      combOffset-n4                       INTEGER (0..3),
      cyclicShift-n4                    INTEGER (0..11)
    }
  },
  resourceMapping                 SEQUENCE {
    startPosition                   INTEGER (0..5),
    nrofSymbols                         ENUMERATED {n1, n2, n4},
    repetitionFactor                  ENUMERATED {n1, n2, n4}
  },
```

TABLE 33-continued

```
  freqDomainPosition              INTEGER (0..67),
  freqDomainShift                 INTEGER (0..268),
  freqHopping                       SEQUENCE {
    c-SRS                                 INTEGER (0..63),
    b-SRS                                 INTEGER (0..3),
    b-hop                                 INTEGER (0..3)
  },
  groupOrSequenceHopping              ENUMERATED { neither, groupHopping,
sequenceHopping },
  resourceType                     CHOICE {
    aperiodic                            SEQUENCE {
      ...
    },
    semi-persistent                    SEQUENCE {
      periodicityAndOffset-sp                   SRS-PeriodicityAndOffset,
      ...
    },
    periodic                             SEQUENCE {
      periodicityAndOffset-p                    SRS-PeriodicityAndOffset,
      ...
    }
  },
  sequenceId                          INTEGER (0..1023),
  spatialRelationInfo             SRS-SpatialRelationInfo
OPTIONAL, -- Need R
  ...
}
```

The spatialRelationInfo configuration information in Table 33 refers to one reference signal and applies beam information of the reference signal to a beam used for corresponding SRS transmission. For example, the configuration of spatialRelationInfo may include information as shown below in Table 34.

TABLE 34

```
SRS-SpatialRelationInfo ::=  SEQUENCE {
  servingCellId              ServCellIndex      OPTIONAL,   -- Need
S
  referenceSignal            CHOICE {
    ssb-Index                  SSB-Index,
    csi-RS-Index               NZP-CSI-RS-ResourceId,
    srs                        SEQUENCE {
      resourceId                 SRS-ResourceId,
      uplinkBWP                    BWP-Id
    }
  }
}
```

Referring to the configuration of spatialRelationInfo, an SS/PBCH block index, a CSI-RS index, and/or an SRS index may be configured as an index of a reference signal to be referenced in order to use beam information of a specific reference signal. Higher-signaling referenceSignal may be referenced as configuration information indicating a reference signal, beam information of which is to be referenced for corresponding SRS transmission, ssb-Index may be referenced as an SS/PBCH block index, csi-RS-Index may be referenced as a CSI-RS index, and srs may be referenced as an SRS index. If a value of higher-signaling referenceSignal is configured to be ssb-Index, the terminal may apply, as a transmission beam of the SRS transmission, a reception beam used when receiving an SS/PBCH block corresponding to ssb-Index. If the value of higher-signaling referenceSignal is configured to be csi-RS-Index, the terminal may apply, as a transmission beam of the SRS transmission, a reception beam used when receiving a CSI-RS corresponding to csi-RS-Index. If the value of higher-signaling referenceSignal is configured to be srs, the terminal may apply, as a transmission beam of the SRS transmission, a transmission beam used when transmitting an SRS corresponding to srs.

PUSCH: Relating to Transmission Scheme

PUSCH transmission may be dynamically scheduled by a UL grant in DCI or may be operated by configured grant Type 1 or Type 2. Dynamic scheduling indication for PUSCH transmission is possible by DCI format 0_0 or 0_1.

For configured grant Type 1 PUSCH transmission, the UL grant in DCI may not be received, and configuration may be performed semi-statically via reception of configuredGrantConfig including rrc-ConfiguredUplinkGrant shown below in Table 35 via higher signaling. Configured grant Type 2 PUSCH transmission may be semi-persistently scheduled by the UL grant in DCI after reception of configuredGrantConfig that does not include rrc-ConfiguredUplinkGrant of Table 35 via higher signaling. When PUSCH transmission is operated by the configured grant, parameters applied to PUSCH transmission are applied via configuredGrantConfig that is higher signaling shown below in Table 38, except for dataScramblingIdentityPUSCH, txConfig, codebookSubset, maxRank, and scaling of UCI-OnPUSCH provided via pusch-Config that is higher signaling shown below in Table 36. If the terminal is provided with transformPrecoder in configuredGrantConfig which is higher signaling in Table 35, the terminal applies tp-pi2BPSK in pusch-Config of Table 36 to PUSCH transmission operated by the configured grant.

TABLE 35

```
ConfiguredGrantConfig ::=            SEQUENCE {
  frequencyHopping                       ENUMERATED {intraSlot, interSlot}
OPTIONAL,   -- Need S,
  cg-DMRS-Configuration                  DMRS-UplinkConfig,
  mcs-Table                              ENUMERATED {qam256, qam64LowSE}
OPTIONAL,   -- Need S
  mcs-TableTransformPrecoder             ENUMERATED {qam256, qam64LowSE}
OPTIONAL,   -- Need S
  uci-OnPUSCH                             SetupRelease { CG-UCI-OnPUSCH }
OPTIONAL,   -- Need M
  resourceAllocation                   ENUMERATED { resourceAllocationType0,
resourceAllocationType1, dynamicSwitch },
  rbg-Size                              ENUMERATED {config2}
OPTIONAL,   -- Need S
  powerControlLoopToUse                   ENUMERATED {n0, n1},
  p0-PUSCH-Alpha                          P0-PUSCH-AlphaSetId,
  transformPrecoder                     ENUMERATED {enabled, disabled}
OPTIONAL,   -- Need S
  nrofHARQ-Processes                     INTEGER(1..16),
  repK                                   ENUMERATED {n1, n2, n4, n8},
  repK-RV                                ENUMERATED {s1-0231, s2-0303, s3-0000}
OPTIONAL,   -- Need R
  periodicity                          ENUMERATED {
                                               sym2, sym7, sym1x14, sym2x14, sym4x14,
sym5x14, sym8x14, sym10x14, sym16x14, sym20x14,
                                               sym32x14, sym40x14, sym64x14, sym80x14,
sym128x14, sym160x14, sym256x14, sym320x14, sym512x14,
                                               sym640x14, sym1024x14, sym1280x14,
sym2560x14, sym5120x14,
                                               sym6, sym1x12, sym2x12, sym4x12, sym5x12,
sym8x12, sym10x12, sym16x12, sym20x12, sym32x12,
                                               sym40x12, sym64x12, sym80x12, sym128x12,
sym160x12, sym256x12, sym320x12, sym512x12, sym640x12,
                                               sym1280x12, sym2560x12
  },
  configuredGrantTimer                      INTEGER (1..64)
OPTIONAL,   -- Need R
  rrc-ConfiguredUplinkGrant               SEQUENCE {
     timeDomainOffset                          INTEGER (0..5119),
     timeDomainAllocation                      INTEGER (0..15),
     frequencyDomainAllocation                 BIT STRING (SIZE(18)),
     antennaPort                               INTEGER (0..31),
     dmrs-SeqInitialization                  INTEGER (0..1)
OPTIONAL,   -- Need R
     precodingAndNumberOfLayers                INTEGER (0..63),
     srs-ResourceIndicator                    INTEGER (0..15)
OPTIONAL,   -- Need R
     mcsAndTBS                                  INTEGER (0..31),
     frequencyHoppingOffset                    INTEGER (1.. maxNrofPhysicalResourceBlocks-1)
OPTIONAL,   -- Need R
     pathlossReferenceIndex                   INTEGER (0..maxNrofPUSCH-
PathlossReferenceRSs-1),
     ...
  }
OPTIONAL,   -- Need R
  ...
}
```

A DMRS antenna port for PUSCH transmission is the same as an antenna port for SRS transmission. PUSCH transmission may conform to each of a codebook-based transmission method and a non-codebook-based transmission method, depending on whether a value of txConfig in pusch-Config of Table 36, which is higher signaling, corresponds to codebook or nonCodebook.

As described above, PUSCH transmission may be dynamically scheduled via DCI format 0_0 or 0_1, and may be semi-statically configured by a configured grant. In case the terminal is indicated with scheduling for PUSCH transmission via DCI format 0_0, the terminal performs beam configuration for PUSCH transmission by using pucch-spatialRelationInfoID corresponding to a UE-specific PUCCH resource which corresponds to a minimum ID within an activated UL BWP in a serving cell. In this case, the PUSCH transmission is based on a single antenna port. The terminal does not expect scheduling for PUSCH transmission via DCI format 0_0, within a BWP in which a PUCCH resource including pucch-spatialRelationInfo is not configured. If the terminal is not configured with txConfig in pusch-Config of Table 36, the terminal does not expect to be scheduled via DCI format 0_1.

TABLE 36

```
PUSCH-Config ::=                          SEQUENCE {
  dataScramblingIdentityPUSCH               INTEGER (0..1023)
OPTIONAL,   -- Need S
  txConfig                                  ENUMERATED {codebook, nonCodebook}
OPTIONAL,   -- Need S
  dmrs-UplinkForPUSCH-MappingTypeA            SetupRelease { DMRS-UplinkConfig }
OPTIONAL,   -- Need M
  dmrs-UplinkForPUSCH-MappingTypeB            SetupRelease { DMRS-UplinkConfig }
OPTIONAL,   -- Need M
  pusch-PowerControl                        PUSCH-PowerControl
OPTIONAL,   -- Need M
  frequencyHopping                           ENUMERATED {intraSlot, interSlot}
OPTIONAL,   -- Need S
  frequencyHoppingOffsetLists              SEQUENCE (SIZE (1..4)) OF INTEGER (1..
maxNrofPhysicalResourceBlocks-1)
OPTIONAL,   -- Need M
  resourceAllocation                       ENUMERATED { resourceAllocationType0,
resourceAllocationType1, dynamicSwitch},
  pusch-TimeDomainAllocationList            SetupRelease { PUSCH-
TimeDomainResourceAllocationList }           OPTIONAL,   -- Need M
  pusch-AggregationFactor                   ENUMERATED { n2, n4, n8 }
OPTIONAL,   -- Need S
  mcs-Table                                 ENUMERATED {qam256, qam64LowSE}
OPTIONAL,   -- Need S
  mcs-TableTransformPrecoder                ENUMERATED {qam256, qam64LowSE}
OPTIONAL,   -- Need S
  transformPrecoder                         ENUMERATED {enabled, disabled}
OPTIONAL,   -- Need S
  codebookSubset                             ENUMERATED {fullyAndPartialAndNonCoherent,
partialAndNonCoherent,nonCoherent}
OPTIONAL, -- Cond codebookBased
  maxRank                                    INTEGER (1..4)
OPTIONAL, -- Cond codebookBased
  rbg-Size                                  ENUMERATED { config2}
OPTIONAL, -- Need S
  uci-OnPUSCH                                SetupRelease { UCI-OnPUSCH}
OPTIONAL, -- Need M
  tp-pi2BPSK                                ENUMERATED {enabled}
OPTIONAL, -- Need S
  ...
}
```

Codebook-based PUSCH transmission may be dynamically scheduled via DCI format 0_0 or 0_1 and may operate semi-statically by a configured grant. If a codebook-based PUSCH is dynamically scheduled by DCI format 0_1 or is configured semi-statically by a configured grant, the terminal determines a precoder for PUSCH transmission, based on an SRS resource indicator (SRI), a transmission precoding matrix indicator (TPMI), and a transmission rank indicating the number of PUSCH transmission layers.

In this case, the SRI may be given or configured to the UE via an SRS resource indicator field, in DCI or may be configured via srs-ResourceIndicator that is higher signaling. The terminal may be configured, during codebook-based PUSCH transmission, with at least one SRS resource and configured with up to two SRS resources. When the terminal is provided with the SRI via DCI, for an SRS resource indicated by the SRI, an SRS resource corresponding to the SRI may be referenced from among SRS resources transmitted before a PDCCH including the SRI. The TPMI and the transmission rank may be given or configured via a field of precoding information and number of layers, in DCI or may be configured via precodingAndNumberOfLayers that is higher signaling. For example, the TPMI is used to indicate a precoder applied to PUSCH transmission. If the terminal is configured with one SRS resource, the TPMI is used to indicate a precoder to be applied in the configured one SRS resource. If the terminal is configured with multiple SRS resources, the TPMI is used to indicate a precoder to be applied in the SRS resource indicated via the SRI.

A precoder to be used for PUSCH transmission is selected from a UL codebook having the same number of antenna ports as a value of nrofSRS-Ports in SRS-Config which is higher signaling. In codebook-based PUSCH transmission, the terminal determines a codebook subset, based on codebookSubset in pusch-Config, which is higher signaling, and the TPMI. codebookSubset in pusch-Config which is higher signaling may be configured to be one of fullyAndPartialAndNonCoherent, partialAndNonCoherent, or nonCoherent, based on UE capability reported to the base station by the terminal. If the terminal has reported partialAndNonCoherent as UE capability, the terminal does not expect that a value of codebookSubset which is higher signaling is configured to be fullyAndPartialAndNonCoherent. If the terminal has reported nonCoherent as UE capability, the terminal expects the value of codebookSubset, which is higher signaling, to be configured to neither fullyAndPartialAndNonCoherent nor partialAndNonCoherent. If nrofSRS-Ports in SRS-ResourceSet which is higher signaling indicates two SRS antenna ports, the terminal does not expect that the value of codebookSubset which is higher signaling is configured to be partialAndNonCoherent.

The terminal may be configured with one SRS resource set, in which a value of usage in SRS-ResourceSet that is higher signaling is configured to be codebook, and one SRS resource in the SRS resource set may be indicated via the SRI. If multiple SRS resources are configured in the SRS resource set in which the usage value in SRS-ResourceSet that is higher signaling is configured to be codebook, the terminal expects that the value of nrofSRS-Ports in SRS-Resource that is higher signaling is configured to be the same for all SRS resources.

The terminal transmits one or multiple SRS resources included in the SRS resource set, in which the value of usage is configured to be codebook, to the base station according to higher signaling, and the base station selects one of the SRS resources transmitted by the terminal and indicates the terminal to perform PUSCH transmission using transmission beam information of the corresponding SRS resource. In this case, in codebook-based PUSCH transmission, the SRI is used as information for selecting of an index of one SRS resource and is included in the DCI. The base station adds, to the DCI, information indicating the rank and TPMI to be used for PUSCH transmission by the terminal. The terminal uses the SRS resource indicated by the SRI to perform PUSCH transmission by applying the precoder indicated by the TPMI and the rank, which has been indicated based on a transmission beam of the SRS resource.

Non-codebook-based PUSCH transmission may be dynamically scheduled via DCI format 0_0 or 0_1 and may operate semi-statically by a configured grant. If at least one SRS resource is configured in an SRS resource set, in which the value of usage in SRS-ResourceSet that is higher signaling is configured to be nonCodebook, the terminal may be scheduled for non-codebook-based PUSCH transmission via DCI format 0_1.

For the SRS resource set in which the value of usage in SRS-ResourceSet that is higher signaling is configured to be nonCodebook, the terminal may be configured with one connected non-zero power (NZP) CSI-RS resource. The terminal may perform calculation on a precoder for SRS transmission via measurement for the NZP CSI-RS resource connected to the SRS resource set. If a difference between a last reception symbol of an aperiodic NZP CSI-RS resource connected to the SRS resource set and a first symbol of aperiodic SRS transmission in the terminal is less than 42 symbols, the terminal does not expect information on the precoder for SRS transmission to be updated.

In case that a value of resourceType in SRS-ResourceSet that is higher signaling is configured to be aperiodic, the connected NZP CSI-RS may be indicated via a field, SRS request, in DCI format 0_1 or 1_1. In this case, if the connected NZP CSI-RS resource is an aperiodic NZP CSI-RS resource, the presence of the connected NZP CSI-RS when a value of the field, SRS request, in DCI format 0_1 or 1_1 is not 00 is indicated. In this case, the DCI should indicate neither a cross carrier nor cross BWP scheduling. If the value of SRS request indicates the presence of the NZP CSI-RS, the NZP CSI-RS is located at a slot in which a PDCCH including the SRS request field has been transmitted. In this case, TCI states configured in scheduled subcarriers are not configured to be QCL-TypeD.

If a periodic or semi-persistent SRS resource set is configured, the connected NZP CSI-RS may be indicated via associated CSI-RS in SRS-ResourceSet that is higher signaling. For non-codebook-based transmission, the terminal does not expect that spatialRelationInfo, which is higher signaling for the SRS resource, and associated CSI-RS in SRS-ResourceSet that is higher signaling are configured together.

If multiple SRS resources are configured, the terminal may determine the precoder and transmission rank to be applied to PUSCH transmission, based on the SRI indicated by the base station. In this case, the SRI may be indicated via the field, SRS resource indicator, in DCI or may be configured via srs-ResourceIndicator that is higher signaling. As with the aforementioned codebook-based PUSCH transmission, when the terminal is provided with the SRI via the DCI, the SRS resource indicated by the SRI refers to an SRS resource corresponding to the SRI from among SRS resources transmitted before the PDCCH including the SRI. The terminal may use one or multiple SRS resources for SRS transmission, and the maximum number of SRS resources simultaneously transmittable in the same symbol within one SRS resource set may be determined by UE capability reported to the base station by the terminal. In this case, the SRS resources that the terminal simultaneously transmits occupy the same RB. The terminal configures one SRS port for each SRS resource. Only one SRS resource set, in which the value of usage in SRS-ResourceSet that is higher signaling is configured to be nonCodebook, may be configured, and up to 4 SRS resources for the non-codebook-based PUSCH transmission may be configured.

The base station transmits one NZP CSI-RS connected to the SRS resource set to the terminal, and the terminal calculates, based on a result of measurement during reception of the NZP CSI-RS, the precoder to be used during transmission of one or multiple SRS resources in the SRS resource set. The terminal applies the calculated precoder when transmitting, to the base station, one or multiple SRS resources in the SRS resource set in which usage is configured to be nonCodebook, and the base station may select one or multiple SRS resources from among the received one or multiple SRS resources. In this case, in non-codebook-based PUSCH transmission, the SRI indicates an index capable of expressing one SRS resource or a combination of multiple SRS resources, and the SRI may be included in the DCI. The number of SRS resources indicated by the SRI transmitted by the base station may be the number of PUSCH transmission layers, and the terminal may transmit the PUSCH by applying, to each layer, the precoder applied to SRS resource transmission.

PUSCH: Preparation Procedure Time

If the base station uses DCI format 0_0, 0_1, or 0_2 to schedule the terminal to transmit a PUSCH, the terminal may require a PUSCH preparation procedure time for transmitting the PUSCH by applying a method of transmission precoding for an SRS resource, the number of transmission layers, and/or s spatial domain transmission filter, indicated via the DCI. In NR, the PUSCH preparation procedure time is defined in consideration of the preparation time. The PUSCH preparation procedure time of the terminal may conform to Equation (2) below.

$$T_{proc,2} = \max((N_2 + d_{2,1} + d_2)(2048 + 144)k2^{-\mu}T_c + T_{ext} + T_{switch}, d_{2,2}) \quad (2)$$

Each variable in $T_{proc,2}$ described above using Equation (2) may have the following meaning.

$N_2$: The number of symbols determined according to numerology μ and UE processing capability 1 or 2 according to UE capability. If UE processing capability 1 is reported according to capability reporting of the terminal, $N_2$ may have values shown below in Table 37, and if UE processing capability 2 is reported and it is configured, via higher-layer signaling, that UE processing capability 2 is available, $N_2$ may have values shown below in Table 38.

TABLE 37

| μ | PUSCH preparation time $N_2$ [symbols] |
|---|---|
| 0 | 10 |
| 1 | 12 |
| 2 | 23 |
| 3 | 36 |

TABLE 38

| μ | PUSCH preparation time $N_2$ [symbols] |
|---|---|
| 0 | 5 |
| 1 | 5.5 |
| 2 | 11 for frequency range 1 |

$d_{2,1}$: The number of symbols determined to be 0 when all REs of a first OFDM symbol of PUSCH transmission are configured to include only DM-RSs, and otherwise determined to be 1.

K: 64

μ: μ follows one of $\mu_{DL}$ or $\mu_{UL}$, at which $T_{proc,2}$ has a greater value. $\mu_{DL}$ indicates a numerology of a DL in which a PDCCH including DCI for PUSCH scheduling is transmitted, and $\mu_{UL}$ indicates a numerology of a UL in which a PUSCH is transmitted.

$T_c$: $1/(\Delta f_{max} \cdot N_f)$, $\Delta f_{max}=480 \cdot 10^3$ Hz, $N_f=4096$ $d_{2,2}$: $d_{2,2}$ follows a BWP switching time when DCI for PUSCH scheduling indicates BWP switching, and has 0 otherwise.

$d_2$: If OFDM symbols of a PUCCH, a PUSCH with a high priority index, and a PUCCH with a low priority index overlap in time, a $d_2$ value of the PUSCH with the high priority index is used. Otherwise, $d_2$ is 0.

$T_{ext}$: If the terminal uses a shared spectrum channel access scheme, the terminal may calculate and apply $T_{ext}$ and to a PUSCH preparation procedure time. Otherwise, $T_{ext}$ is assumed to be 0.

$T_{switch}$: If a UL switching interval is triggered, $T_{switch}$, is assumed to be a switching interval time. Otherwise, $T_{switch}$, is assumed to be 0.

The base station and the terminal determine that the PUSCH preparation procedure time is insufficient when a first symbol of the PUSCH starts before a first UL symbol in which a CP starts after $T_{proc,2}$ from a last symbol of the PDCCH including the DCI for scheduling of the PUSCH, in consideration of time axis resource mapping information of the PUSCH scheduled via the DCI and a timing advance effect between the UL and the DL. Otherwise, the base station and the terminal determine that the PUSCH preparation procedure time is sufficient. If the PUSCH preparation procedure time is sufficient, the terminal transmits the PUSCH, and if the PUSCH preparation procedure time is insufficient, the terminal may disregard the DCI for scheduling of the PUSCH.

PUSCH: Relating to Transmission

In the 5G system, repeated PUSCH transmission type A and repeated PUSCH transmission type B are supported as two types of the method for repeated transmission of a UL data channel. The terminal may be configured with one of repeated PUSCH transmission type A or B via higher-layer signaling.

1. Repeated PUSCH Transmission Type A

A symbol length of a UL data channel and a position of a start symbol are determined by a time domain resource allocation method within one slot, and the base station may notify the terminal of the number of repeated transmissions via RRC signaling or L1 signaling (e.g., DCI).

The terminal may repeatedly transmit a UL data channel, which has the same length and start symbol as the configured length and start symbol of the UL data channel, in consecutive slots, based on the number of repeated transmissions received from the base station. In this case, when at least one symbol in symbols of the UL data channel configured for the terminal or a slot configured for DL for the terminal by the base station is configured for DL, the terminal omits UL data channel transmission, but may count the number of repeated transmissions of the UL data channel.

2. Repeated PUSCH Transmission Type B

A start symbol and a length of a UL data channel are determined by the time domain resource allocation method within one slot, and the base station may notify the terminal of the number of repeated transmissions, numberofrepetitions, via RRC signaling or L1 signaling (e.g., DCI).

Nominal repetition of the UL data channel may be determined as follows, based on the configured start symbol and length of the UL data channel. A slot in which n-th nominal repetition starts is given by $$K_s + \left\lfloor \frac{S + n \cdot L}{N_{symb}^{slot}} \right\rfloor,$$

and a symbol starting in the slot is given by $$\mathrm{mod}\left(S + n \cdot L,\ N_{symb}^{slot}\right).$$

A slot in which n-th nominal repetition ends is given by $$K_s + \left\lfloor \frac{S + (n+1) \cdot L - 1}{N_{symb}^{slot}} \right\rfloor,$$

and a symbol ending in the slot is given by $$\mathrm{mod}\left(S + (n+1) \cdot L - 1,\ N_{symb}^{slot}\right).$$

Here, n=0, . . . , numberofrepetitions-1, S is the configured start symbol of the UL data channel, and L indicates the configured symbol length of the UL data channel. $K_s$ indicates a slot in which PUSCH transmission starts, and $$N_{symb}^{slot}$$

indicates the number of symbols per slot.

The terminal may determine an invalid symbol for repeated PUSCH transmission type B. A symbol configured for DL by tdd-UL-DL-ConfigurationCommon or tdd-UL-DL-ConfigurationDedicated is determined as an invalid symbol for repeated PUSCH transmission type B. An invalid symbol may be configured by a higher-layer parameter (e.g., InvalidSymbolPattern). A higher-layer parameter (e.g., InvalidSymbolPattern) may provide a symbol-level bitmap over one slot or two slots so that an invalid symbol may be configured. 1 in the bitmap indicates an invalid symbol. A period and a pattern of the bitmap may be configured via a higher-layer parameter (e.g., periodicityAndPattern). If the higher-layer parameter (e.g., InvalidSymbolPattern) is configured, and parameter InvalidSymbolPatternIndicator-ForDCIFormat0_1 or InvalidSymbolPatternIndicator-ForDCIFormat0_2 indicates 1, the terminal may apply an invalid symbol pattern. If the parameter indicates 0, the terminal may not apply the invalid symbol pattern. If the higher-layer parameter (e.g., InvalidSymbolPattern) is configured, and parameter InvalidSymbolPatternIndicator-ForDCIFormat0_1 or InvalidSymbolPatternIndicator-ForDCIFormat0_2 is not configured, the terminal applies the invalid symbol pattern.

After an invalid symbol is determined, for each nominal repetition, the terminal may consider symbols other than the invalid symbol to be valid symbols. If one or more valid symbols are included in each nominal repetition, the nominal repetition may include one or more actual repetitions. Respective actual repetitions include consecutive sets of valid symbols available for repeated PUSCH transmission type B within one slot.

Figure 9:
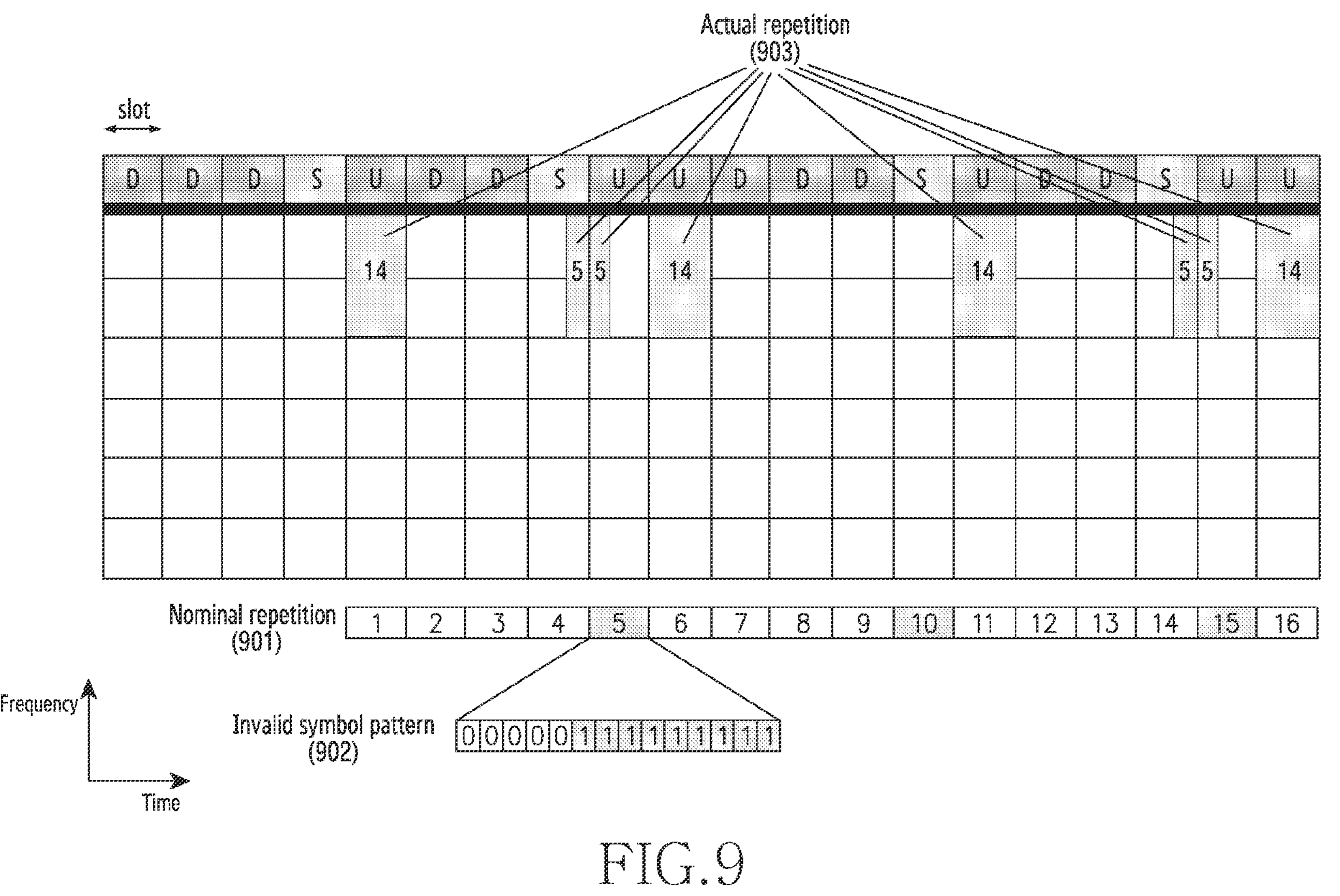
FIG. 9 illustrates repeated physical UL shared channel (PUSCH) transmission type B in a wireless communication system according to an embodiment.

FIG. 9 illustrates repeated PUSCH transmission type B in a wireless communication system according to an embodiment.

Referring to FIG. 9, for a terminal, a start symbol S of a UL data channel may be configured to be 0, a length L of the UL data channel may be configured to be 14, and the number of repeated transmissions may be configured to be 16. In this case, nominal repetition 901 is shown in 16 consecutive slots. Then, the terminal may determine, as an invalid symbol, a symbol configured to be a DL symbol in each nominal repetition 901. The terminal determines, as invalid symbols, symbols configured to be 1 in an invalid symbol pattern 902. In each nominal repetition 901, if valid symbols that are not invalid symbols include one or more consecutive symbols in one slot, actual repetition 903 is configured and transmission is performed.

With respect to repeated PUSCH transmission, in Rel-16, the following additional methods may be defined for UL grant-based PUSCH transmission and configured grant-based PUSCH transmission over slot boundaries.

- Method 1 (mini-slot level repetition): Via one UL grant, two or more repeated PUSCH transmissions are scheduled within one slot or over boundaries of consecutive slots. In addition, with respect to method 1, time domain resource allocation information in DCI indicates a resource of a first repeated transmission. Time domain resource information of the remaining repeated transmissions may be determined according to time domain resource information of the first repeated transmission and a UL or DL direction determined for each symbol of each slot. Each repeated transmission occupies consecutive symbols.
- Method 2 (multi-segment transmission): Via one UL grant, two or more repeated PUSCH transmissions are scheduled in consecutive slots. In this case, one transmission is designated for each slot, and start points or repetition lengths may be different for each transmission. In method 2, time domain resource allocation information in the DCI indicates start points and repetition lengths of all repeated transmissions. When repeated transmission is performed within a single slot via method 2, if there are multiple bundles of consecutive UL symbols in the slot, each repeated transmission is performed for each bundle of UL symbols. If a bundle of consecutive UL symbols exists uniquely in the slot, one repeated PUSCH transmission is performed according to the method of NR Rel-15.
- Method 3: Via two or more UL grants, two or more repeated PUSCH transmissions are scheduled in consecutive slots. In this case, one transmission is designated for each slot, and an n-th UL grant may be received before PUSCH transmission scheduled via an (n−1)th UL grant ends.
- Method 4: Via one UL grant or one configured grant, one or multiple repeated PUSCH transmissions within a single slot, or two or more repeated PUSCH transmissions over the boundaries of consecutive slots may be supported. The number of repetitions indicated to the terminal by the base station is a nominal value, and the number of repeated PUSCH transmissions actually performed by the terminal may be greater than the nominal number of repetitions. Time domain resource allocation information in DCI or in the configured grant refers to a resource of a first repeated transmission indicated by the base station. Time domain resource information of the remaining repeated transmissions may be determined by referring, at least in part, to resource information of the first repeated transmission and UL or DL directions of symbols. If the time domain resource information of repeated transmission indicated by the base station spans a slot boundary or includes a UL/DL switching point, the repeated transmission may be divided into multiple repeated transmissions. In this case, one repeated transmission may be included for each UL period in one slot.

PUSCH: Frequency Hopping Procedure

In 5G, as a frequency hopping method of a UL data channel, two methods may be supported for each repeated PUSCH transmission type. Repeated PUSCH transmission type A may support intra-slot frequency hopping and inter-slot frequency hopping, and repeated PUSCH transmission type B may support inter-repetition frequency hopping and inter-slot frequency hopping.

In the intra-slot frequency hopping method supported by repeated PUSCH transmission type A, the terminal changes an allocated resource of the frequency domain by a configured frequency offset in two hops within one slot and performs transmission. In intra-slot frequency hopping, a starting RB of each hop may be expressed via Equation (3) below.

$$RB_{start} = \begin{cases} RB_{start} & i = 0 \\ (RB_{start} + RB_{offset}) \bmod N_{BWP}^{size} & i = 1 \end{cases} \tag{3}$$

In Equation (3), i=0 and i=1 indicate a first hop and a second hop, respectively, and $RB_{start}$ indicates a starting RB in a UL BWP and is calculated based on a frequency resource allocation method. $RB_{offset}$ indicates a frequency offset between two hops via a higher-layer parameter. The number of symbols of the first hop may be indicated by $$\lfloor N_{symb}^{PUSCH,s}/2 \rfloor,$$

and the number of symbols of the second hop may be indicated by $$N_{symb}^{PUSCH,s} - \lfloor N_{symb}^{PUSCH,s}/2 \rfloor.\ N_{symb}^{PUSCH,s}$$

is a length of PUSCH transmission within one slot and is represented by the number of OFDM symbols.

In the inter-slot frequency hopping method supported by repeated PUSCH transmission types A and B herein, the terminal changes an allocated resource of the frequency domain by a configured frequency offset for each slot and performs transmission. In inter-slot frequency hopping, during $$N_s^\mu$$

slots, a starting RB may be expressed via Equation (4) below.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad (4)$$

In Equation (4), $$n_s^\mu$$

indicates a current slot number in multi-slot PUSCH transmission, and $RB_{start}$ indicates a starting RB in a UL BWP and is calculated based on the frequency resource allocation method. $RB_{offset}$ indicates a frequency offset between two hops via a higher-layer parameter.

The inter-repetition frequency hopping method supported by repeated PUSCH transmission type B includes performing transmission by moving resources allocated on the frequency domain as much as a configured frequency offset for one or multiple actual repetitions within each nominal repetition. $RB_{start}(n)$, which is an index of a starting RB in the frequency domain for one or multiple actual repetitions within an n-th nominal repetition, may conform to Equation (5) below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad (5)$$

In Equation (5), n indicates an index of nominal repetition, and $RB_{offset}$ indicates an RB offset between two hops via a higher-layer parameter.

Rate Matching for UCI Multiplexed on PUSCH

Prior to description of rate matching for UCI, a case in which UCI is multiplexed on a PUSCH is described. The terminal transmits multiple overlapping PUCCH(s) or overlapping PUCCH(s) and PUSCH(s) in one slot, the terminal is configured to multiplex different UCI types on one PUCCH. If at least one of the multiple overlapping PUCCH(s) or PUSCH(s) is a signal transmitted upon reception of a DCI format by the terminal, the terminal may multiplex all corresponding UCI types that satisfy the timeline condition as described in detail in the Standard. As an example of the timeline condition for UCI multiplexing, if one of PUCCH transmission or PUSCH transmission is scheduled via DCI, the terminal may perform UCI multiplexing only if the first symbol $S_0$ of the earliest PUCCH or PUSCH among the PUCCH and PUSCH overlapping in the slot satisfies the following conditions:

$S_0$ is not a symbol transmitted prior to a symbol including a CP starting after $$T_{proc,1}^{mux}$$

from the last symbol of a corresponding PDSCH. Here, $$T_{proc,1}^{mux}$$

is a maximum value of $$\{T_{proc,1}^{mux,1}, \ldots, T_{proc,1}^{mux,i}, \ldots\}$$

for an i-th PDSCH associated with HARQ-ACK transmitted on a PUCCH in an overlapping PUCCH and PUSCH group.

$$T_{proc,1}^{mux,i}$$

is a processing procedure time for the i-th PDSCH and is defined to be $$T_{proc,1}^{mux,i} = (N_1 + d_{1,1}) \cdot (2048 + 144) \cdot k \cdot 2^{-\mu} \cdot T_c.$$

Here, $d_{1,1}$ is a value determined for the i-th PDSCH with reference to the Standard, and $N_1$ is a PDSCH processing time value according to PDSCH processing capability. In addition, μ is a smallest subcarrier configuration value among all PUSCHs in the overlapping PUCCH and PUSCH groups, a PUCCH including HARQ-ACK for the i-th PDSCH, the i-th PDSCH, and a PDCCH for scheduling of the i-th PDSCH. $T_c$ is $1/(\Delta f_{max} \cdot N_f)$, where $\Delta f_{max}=480 \cdot 10^3$ Hz, and $N_f=4096$, and K is 64.

This is a part of the timeline condition for UCI multiplexing, and when the timeline condition is satisfied by referring to the Standard, the terminal may perform UCI multiplexing on the PUSCH. When a PUCCH and a PUSCH overlap, and the timeline condition for UCI multiplexing described in detail in the Standard including the above example is satisfied, the terminal may multiplex, on the PUSCH, HARQ-ACK and/or CSI information included in the PUCCH and may not transmit the PUCCH according to the UCI information included in the PUSCH.

If the PUCCH and PUSCH overlap, the timeline condition for UCI multiplexing is satisfied, and the terminal determines to multiplex UCI included in the PUCCH on the PUSCH, the terminal may perform UCI rate matching for UCI multiplexing. UCI multiplexing is performed in an order of HARQ-ACK, configured grant UL control information (CG-UCI), CSI part 1, and CSI part 2. The terminal performs rate matching in consideration of the UCI multiplexing order. Therefore, the terminal calculates coded modulation symbols per layer for HARQ-ACK and CG-UCI, and in consideration of the same, the terminal calculates coded modulation symbols per layer for CSI part 1. Thereafter, the terminal calculates coded modulation symbols per layer for CSI part 2 in consideration of the coded modulation symbols per layer for HARQ-ACK, CG-UCI, and CSI part 1.

When rate matching is performed according to each UCI type, a method for calculating the number of coded modulation symbols per layer varies depending on a repeated transmission type of the PUSCH on which UCI is multiplexed and whether UL data (UL shared channel, hereinafter, UL-SCH) is included. For example, when rate matching for HARQ-ACK is performed, equations for coded modulation symbols per layer according to a PUSCH on which UCI is multiplexed are shown in Equation (6), Equation (7) and Equation (8) below.

$$Q'_{ACK} = \min\left\{\left\lceil\frac{(O_{ACK}+L_{ACK})\cdot\beta_{offset}^{PUSCH}\cdot\sum_{l=0}^{N_{symb,all}^{PUSCH}-1}M_{sc}^{UCI}(l)}{\sum_{r=0}^{C_{UL-S}-1}K_r}\right\rceil, \left\lceil\alpha\cdot\sum_{l=l_0}^{N_{symb,all}^{PUSCH}-1}M_{sc}^{UCI}(l)\right\rceil\right\} \quad (6)$$

$$Q'_{ACK} = \min\left\{\left\lceil\frac{(O_{ACK}+L_{ACK})\cdot\beta_{offset}^{PUSCH}\cdot\sum_{l=0}^{N_{symb,nominal}^{PUSCH}-1}M_{sc,nominal}^{UCI}(l)}{\sum_{r=0}^{C_{UL-SCH}-1}K_r}\right\rceil, \left\lceil\alpha\cdot\sum_{l=0}^{N_{symb,nominal}^{PUSCH}-1}M_{sc,nominal}^{UCI}(l)\right\rceil, \sum_{l=0}^{N_{symb,nominal}^{PUSCH}-1}M_{sc,nominal}^{UCI}(l)\right\} \quad (7)$$

$$Q'_{ACK} = \min\left\{\left\lceil\frac{(O_{ACK}+L_{ACK})\cdot\beta_{offset}^{PUSCH}}{R\cdot Q_m}\right\rceil, \left\lceil\alpha\cdot\sum_{l=l_0}^{N_{symb,all}^{PUSCH}-1}M_{sc}^{UCI}(l)\right\rceil\right\} \quad (8)$$

Equation (6) is for coded modulation symbols per layer for HARQ-ACK multiplexed on a PUSCH other than repeated PUSCH transmission type B including a UL-SCH. Equation (7) is for coded modulation symbols per layer for HARQ-ACK multiplexed on repeated PUSCH transmission type B including a UL-SCH. Equation 8] is for coded modulation symbols per layer for HARQ-ACK multiplexed on a PUSCH that does not include a UL-SCH.

In Equation (6), $O_{ACK}$ is the number of HARQ-ACK bits. $L_{ACK}$ is the number of CRC bits for HARQ-ACK.

$$\beta_{offset}^{PUSCH}$$

is a beta offset for HARQ-ACK and is equal to $$\beta_{offset}^{HARQ-ACK}.\ C_{UL-S}$$

is the number of code blocks of a UL-SCH for PUSCH transmission, and $K_r$ is a code block size of an r-th code block.

$$M_{SC}^{UCI}(l)$$

indicates the number of REs available for UCI transmission in symbol l, and the number is determined according to the presence or absence of a DMRS and a PTRS of symbol l. If symbol l includes a DMRS, then $$M_{SC}^{UCI}(l) = 0.$$

For symbol l including no DMRS, $$M_{SC}^{UCI}(l) = M_{SC}^{PUSCH} - M_{SC}^{PT-RS}(l).\ M_{SC}^{PUSCH}$$

is the number of subcarriers for a bandwidth scheduled with PUSCH transmission, and $$M_{SC}^{PT-RS}(l)$$

is the number of subcarriers including a PTRS in symbol l.

$$N_{symb,all}^{PUSCH}$$

indicates a total number of symbols of a PUSCH. α is higher-layer parameter scaling, and refers to a ratio of resources, on which UCI may be multiplexed, among all PUSCH transmission resources. $l_o$ indicates an index of a first symbol including no DMRS after a first DMRS.

In Equation (7), $$M_{sc,nominal}^{UCI}(l)$$

indicates the number of REs available for UCI transmission for nominal repetition, and is 0 for a symbol including a DMRS.

$$M_{sc,nominal}^{UCI}(l) = M_{SC}^{PUSCH} - M_{sc,nominal}^{PT-RS}(l)$$

for a symbol including no DMRS, and $$M_{sc,nominal}^{PT-RS}(l)$$

is the number of subcarriers including a PTRS in symbol l for a PUSCH with an assumption of nominal repetition.

$$N_{symb,nominal}^{PUSCH}$$

indicates a total number of symbols for nominal PUSCH repetition.

$$M_{sc,actual}^{UCI}(l)$$

indicates the number of REs available for UCI transmission for actual repetition, and is 0 for a symbol including a DMRS.

$$M_{sc,actual}^{UCI}(l) = M_{SC}^{PUSCH} - M_{sc,actual}^{PT-RS}(l)$$

for a symbol including no DMRS, and $$M_{sc,actual}^{PT-RS}(l)$$

is the number of subcarriers including a PTRS in symbol l for actual PUSCH repetition.

$$N_{symb,actual}^{PUSCH}$$

indicates a total number of symbols for actual PUSCH repetition.

In Equation (8), R is a code rate of the PUSCH, and $Q_m$ is a modulation order of the PUSCH.

The number of coded modulation symbols per layer, for which rate matching of CSI part 1 has been performed, may be calculated similarly to HARQ-ACK, but the maximum number of allocable resources among all resources may be reduced to a value obtained by excluding the number of coded modulation symbols for HARQ-ACK/CG-UCI. Equations for coded modulation symbols per layer for CSI part 1 are as shown below in Equation (9), Equation (10), Equation (11), and Equation (12) according to a repeated PUSCH transmission type and whether or not a UL-SCH is included.

$$Q'_{CSI-1} = \min\left\{ \left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK/CG-UCI} \right\} \tag{9}$$

$$Q'_{CSI-1} = \min\left\{ \left\lceil \frac{(O_{CSI-1} + L_{CSI-1}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL}-1} K_r} \right\rceil, \left\lceil \alpha \cdot \sum_{l=0}^{N_{symb,nominal}^{PUSCH}-1} M_{sc,nominal}^{UCI}(l) \right\rceil - Q'_{ACK/CG-U}, \sum_{l=0}^{N_{symb,actual}^{PUSCH}-1} M_{sc,actual}^{UCI}(l) - Q'_{ACK/CG-UCI} \right\} \tag{10}$$

-continued $$Q'_{CSI-1} = \min\left\{ \left\lceil \frac{(O_{CSI-1} + L_{CSI-1}) \cdot \beta_{offset}^{PUSCH}}{R \cdot Q_m} \right\rceil, \sum_{l=0}^{N_{symb,all}^{PUSCH}-1} M_{sc}^{UCI}(l) - Q'_{ACK} \right\} \tag{11}$$

$$Q'_{CSI-1} = \sum_{l=0}^{N_{symb,all}^{PUSCH}-1} M_{sc}^{UCI}(l) - Q'_{ACK} \tag{12}$$

Equation (9) is for coded modulation symbols per layer for CSI part 1 multiplexed on a PUSCH other than repeated PUSCH transmission type B including a UL-SCH. Equation (10) is for coded modulation symbols per layer for CSI part 1 multiplexed on repeated PUSCH transmission type B including a UL-SCH. Equation (11) is for, when CSI part 1 and CSI part 2 are multiplexed on a PUSCH including no UL-SCH, obtaining coded modulation symbols per layer for multiplexed CSI part 1. Equation (12) is for, when CSI part 2 is not multiplexed on a PUSCH including no UL-SCH, obtaining coded modulation symbols per layer for multiplexed CSI part 1. In Equation 9], $O_{CSI-1}$ and $L_{CSI-1}$ refer to the number of bits for CSI part 1 and the number of CRC bits for CSI part 1, respectively.

$$\beta_{offset}^{PUSCH}$$

is a beta offset for CSI part 1 and is equal to $$\beta_{offset}^{CSI-part1} \cdot \; Q'_{ACK/CG-UCI}$$

is the number of coded modulation symbols per layer, which is calculated for HARQ-ACK and/or CG-UCI. Other parameters are the same as the aforementioned parameters required for calculating the number of coded modulation symbols per layer for HARQ-ACK.

The number of coded modulation symbols per layer, for which rate matching of CSI part 2 has been performed, may also be calculated similarly to CSI part 1, but the maximum number of allocable resources among all resources may be reduced to a value obtained by excluding the number of coded modulation symbols for CSI part 2 and the number of coded modulation symbols for HARQ-ACK/CG-UCI. Equations for coded modulation symbols per layer for CSI part 1 are as shown below in Equation (13), Equation (14), and Equation (15) according to a repeated PUSCH transmission type and whether a UL-SCH is included.

$$Q'_{CSI-2} = \min\left\{ \left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SC}-1} K_r} \right\rceil, \left\lceil \alpha \cdot \sum_{l=0}^{N_{symb,all}^{PUSCH}-1} M_{sc}^{UCI}(l) \right\rceil - Q'_{ACK/CG-UCI} - Q'_{CSI-1} \right\} \tag{13}$$

-continued $$Q'_{CSI-2} = \min\left\{\begin{array}{c}\left\lceil\frac{(O_{CSI-2}+L_{CSI-2})\cdot\beta_{offset}^{PUSCH}\cdot\sum_{l=0}^{N_{symb,nominal}^{PUSCH}-1}M_{sc,nominal}^{UCI}(l)}{\sum_{r=0}^{C_{UL-SCH}-1}K_r}\right\rceil,\\ \left\lceil\alpha\cdot\sum_{l=0}^{N_{symb,nominal}^{PUSCH}-1}M_{sc,nominal}^{UCI}(l)\right\rceil-\\ Q'_{ACK/CG-U}-Q'_{CSI-1},\ \sum_{l=0}^{N_{symb,actual}^{PUSCH}-1}M_{sc,actual}^{UCI}(l)-\\ Q'_{ACK/CG-UCI}-Q'_{CSI-1}\end{array}\right\} \quad (14)$$

$$Q'_{CSI-2} = \sum_{l=0}^{N_{symb,all}^{PUSCH}-1}M_{sc}^{UCI}(l)-Q'_{ACK}-Q'_{CSI-1} \quad (15)$$

Equation (13) is for coded modulation symbols per layer for CSI part 2 multiplexed on a PUSCH other than repeated PUSCH transmission type B including a UL-SCH. Equation (14) is for coded modulation symbols per layer for CSI part 2 multiplexed on repeated PUSCH transmission type B including a UL-SCH. Equation (15 is for coded modulation symbols per layer for CSI part 2 multiplexed on a PUSCH including no UL-SCH. In Equation (13, $O_{CSI\text{-}2}$ and $L_{CSI\text{-}2}$ refer to the number of bits for CSI part 2 and the number of CRC bits for CSI part 2, respectively.

$$\beta_{offset}^{PUSCH}$$

is a beta offset for CSI part 2 and is equal to $$\beta_{offset}^{CSI-part2}.$$

Other parameters are the same as the aforementioned parameters required for calculating the number of coded modulation symbols per layer for HARQ-ACK and CSI part 1.

The number of coded modulation symbols per layer, for which rate matching of CG-UCI has been performed, may also be calculated similarly to HARQ-ACK. Equation (16) below is for coded modulation symbols per layer for CG-UCI multiplexed on a PUSCH including a UL-SCH.

$$Q'_{CG-UCI} = \min\left\{\left\lceil\frac{(O_{CG-UC}+L_{CG-UCI})\cdot\beta_{offset}^{PUSCH}\cdot\sum_{l=0}^{N_{symb,all}^{PUSCH}-1}M_{sc}^{UCI}(l)}{\sum_{r=0}^{C_{UL-SCH}-1}K_r}\right\rceil,\ \left\lceil\alpha\cdot\sum_{l=l_0}^{N_{symb,all}^{PUSCH}-1}M_{sc}^{UCI}(l)\right\rceil\right\} \quad (16)$$

In Equation (16), $O_{CG\text{-}UCI}$ and $L_{CG\text{-}UCI}$ refer to the number of bits of CG-UCI and the number of CRC bits for CG-UCI, respectively.

$$\beta_{offset}^{PUSCH}$$

is a beta offset for CG-UCI and is equal to $$\beta_{offset}^{CG-UCI}.$$

Other parameters are the same as the aforementioned parameters required for calculating the number of coded modulation symbols per layer for HARQ-ACK.

When HARQ-ACK and CG-UCI are multiplexed on a PUSCH including a UL-SCH, the number of coded modulation symbols per layer for which rate matching of HARQ-ACK and CG-UCI has been performed may be calculated as shown below in Equation (17).

$$Q'_{CG-UCI} = \min\left\{\left\lceil\frac{(O_{ACK}+O_{CG-UCI}+L_{ACK})\cdot\beta_{offset}^{PUSCH}\cdot\sum_{l=0}^{N_{symb,all}^{PUSCH}-1}M_{sc}^{UCI}(l)}{\sum_{r=0}^{C_{UL-SCH}-1}K_r}\right\rceil,\ \left\lceil\alpha\cdot\sum_{l=l_0}^{N_{symb,all}^{PUSCH}-1}M_{sc}^{UCI}(l)\right\rceil\right\} \quad (17)$$

In Equation (17), $$\beta_{offset}^{PUSCH}$$

is a beta offset for HARQ-ACK and is equal to $$\beta_{offset}^{HARQ-ACK},$$

and other parameters are the same as the aforementioned parameters required for calculating the number of coded modulation symbols per layer for HARQ-ACK.

After calculating the number of coded modulation symbols per layer according to each UCI type as described above, the number $E_{UCI}$ of bits for the entire UCI may be calculated based on $E_{UCI}=N_L\cdot Q'\cdot Q_m$, wherein $N_L$ is the number of PUSCH transmission layers, $Q_m$ is a modulation order, and Q' is the number of coded modulation symbols per layer according to a UCI type, which may be $$O'_{ACK},\ O'_{CSI-1},\ O'_{CSI-2},\ or\ Q'_{CG-UCI}.$$

Relating to UE Capability Reporting

In LTE and NR, when a terminal is connected to a serving base station, the terminal may report, to the base station, capability that the terminal supports. This is referred to herein as UE capability reporting.

The base station may transfer, to the connected terminal, a UE capability enquiry message for requesting capability reporting. The message may include a UE capability request for each radio access technology (RAT) type of the base station. The request for each RAT type may include supported frequency band combination (BC) information and the like. In addition, for the UE capability enquiry message, UE capability for each of multiple RAT types may be requested via one RRC message container transmitted by the base station, or the base station may include multiple UE capability enquiry messages including the UE capability request for each RAT type so as to transfer the request to the terminal. That is, the UE capability enquiry is repeated multiple times within one message, and the terminal may configure a corresponding UE capability information message and report the message multiple times. In the next-generation mobile communication system, a UE capability request for multi-RAT dual connectivity (MR-DC) including E-UTRA-NR dual connectivity (EN-DC), LTE, and NR may be made. The UE capability enquiry message is generally transmitted initially after the terminal is connected to the base station, but may be requested by the base station under any conditions when necessary.

In the above method, the terminal having received, from the base station, a request for UE capability reporting may configure UE capability according to RAT type and band information requested from the base station. Hereinafter, a method of configuring UE capability by the terminal in the NR system will be described.

1. If the terminal receives, from the base station, a list of LTE and/or NR bands via a UE capability request, the terminal configures a BC for NR stand-alone (SA) and EN-DC. That is, the terminal configures a candidate list of BCs for NR SA and EN-DC, based on bands requested from the base station via FreqBandList. The bands have priorities in the order described in FreqBandList.
2. If the base station requests UE capability reporting by setting an eutra-nr-only flag or an eutra flag, the terminal completely removes NR SA BCs from the configured candidate list of BCs. This may occur only when the LTE base station (eNB) requests eutra capability.
3. Thereafter, the terminal removes fallback BCs from the candidate list of configured BCs. The fallback BC refers to a BC that is obtainable by removing, from a random BC, a band corresponding to at least one SCell. The band corresponding to at least one SCell can be omitted because the BC prior to the removal is already able to cover the fallback BC. This operation is also applied in MR-DC, i.e., LTE bands. The remaining BCs after this operation constitute a final candidate BC list.
4. The terminal selects BCs to be reported by selecting BCs conforming to the requested RAT type from the final candidate BC list. In this operation, the terminal configures supportedBandCombinationList in a predetermined order. That is, the terminal configures the BCs and UE capability to be reported according to a pre-configured rat-Type order (nr→eutra-nr→eutra). The terminal configures featureSetCombination for configured supportedBandCombinationList and configures a list of candidate feature set combinations from the candidate BC list from which a list of fallback BCs (including equal or lower-level capabilities) has been removed. Candidate feature set combinations may include both feature set combinations for NR and EUTRA-NR BCs. Candidate feature set combinations may be obtained from a feature set combination of UE-NR-Capabilities and UE-MRDC-Capabilities containers.
5. If the requested rat Type is eutra-nr and affects, featureSetCombinations is included in both of the two containers of UE-MRDC-Capabilities and UE-NR-Capabilities. However, the feature set of NR is included only in UE-NR-Capabilities.

After the UE capability is configured, the terminal transfers a UE capability information message including the UE capability to the base station. The base station performs appropriate scheduling and transmission or reception management with respect to the corresponding terminal at a later time, based on the UE capability received from the terminal.

Relating to CA/DC

Figure 10:
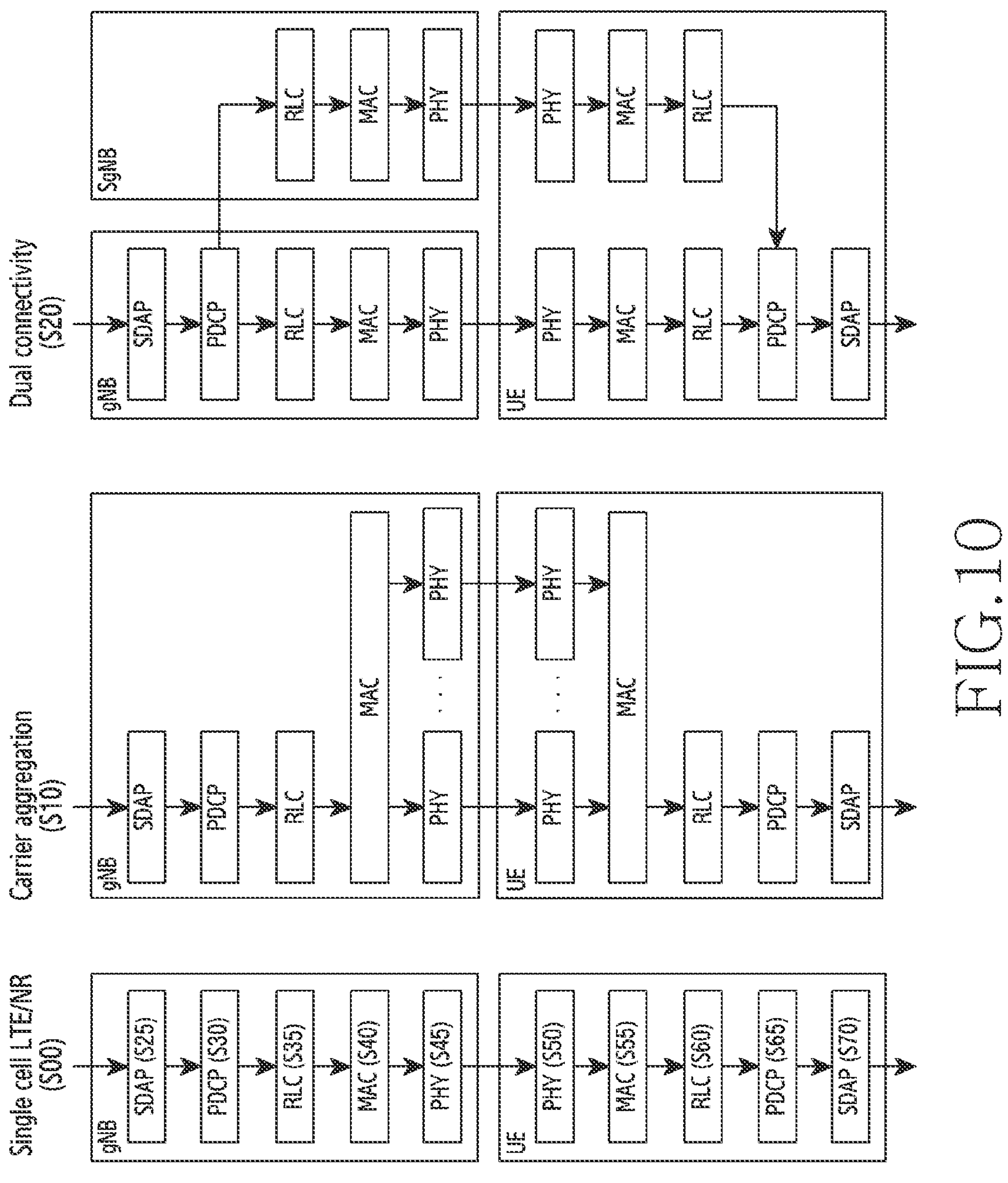
FIG. 10 illustrates radio protocol structures of a terminal and a base station in single cell, carrier aggregation, and dual connectivity situations in a wireless communication system according to an embodiment.

FIG. 10 illustrates a radio protocol structure of a base station and a terminal in single cell, carrier aggregation, and dual connectivity situations according to an.

Referring to FIG. 10, radio protocols of the next-generation mobile communication system include NR service data adaptation protocols (SDAPs) S25 and S70, NR packet data convergence protocols (PDCPs) S30 and S65, NR radio link controls (RLCs) S35 and S60, and NR MACS S40 and S55 in a terminal and an NR base station, respectively.

Functions of the NR SDAPs S25 and S70 may include at least some of the following functions.

User data transfer function (transfer of user plane data)

Mapping a QoS flow and a data bearer for a UL and a DL (mapping between a QoS flow and a DRB for both DL and UL)

Marking a QoS flow ID in a UL and a DL (marking QoS flow ID in both DL and UL packets)

Mapping reflective QoS flows to data bearers for UL SDAP PDUs (reflective QoS flow to DRB mapping for the UL SDAP PDUs)

For an SDAP layer device, the terminal may be configured, via an RRC message, whether to use a header of the SDAP layer device or whether to use a function of the SDAP layer device for each PDCP layer device, for each bearer, or for each logical channel. When the SDAP header is configured, the base station may indicate, using a 1-bit NAS reflective QoS configuration indicator and a 1-bit AS reflective QoS configuration indicator of the SDAP header, the terminal to update or reconfigure mapping information for data bearers and QoS flows of the UL and DL. The SDAP header may include QoS flow ID information indicating a QoS. The QoS information may be used as a data processing priority, scheduling information, etc. to support smooth services.

Main functions of the NR PDCPs S30 and S65 may include at least some of the following functions.

Header compression and decompression (ROHC only)

User data transmission (transfer of user data)

Sequential delivery (in-sequence delivery of upper layer PDUs)

Non-sequential delivery (out-of-sequence delivery of upper layer PDUs)

Reordering (PDCP PDU reordering for reception)

Duplicate detection (duplicate detection of lower layer SDUs)

Retransmission (retransmission of PDCP SDUs)

Encryption and decryption (ciphering and deciphering)

Timer-based SDU discard (timer-based SDU discard in UL)

The reordering function of the NR PDCP device refers to reordering PDCP PDUs received from a lower layer in order based on PDCP sequence numbers (SNs), and may include transferring data to a higher layer according to the reordered sequence. Alternatively, the reordering function of the NR PDCP device may include direct transfer without considering a sequence, include reordering the sequence to record lost PDCP PDUs, include reporting states of the lost PDCP PDUs to a transmission side, and include requesting retransmission of the lost PDCP PDUs.

Main functions of the NR RLCs S35 and S60 may include at least some of the following functions.

Data transmission (transfer of upper layer PDUs)

Sequential delivery (in-sequence delivery of upper layer PDUs)

Non-sequential delivery (out-of-sequence delivery of upper layer PDUs)

ARQ (error correction through ARQ)

Concatenation, segmentation, and reassembly (concatenation, segmentation and reassembly of RLC SDUs)

Re-segmentation (re-segmentation of RLC data PDUs)

Reordering (reordering of RLC data PDUs)

Duplicate detection

Error detection (protocol error detection)

RLC SDU discard

RLC re-establishment

The in-sequence delivery function of the NR RLC device may refer to sequentially transferring, to a higher layer, RLC SDUs received from a lower layer. The in-sequence delivery function of the NR RLC device may include, when originally one RLC SDU is segmented into multiple RLC SDUs and then received, reassembling and transferring the received RLC SDUs, include reordering the received RLC PDUs according to RLC SNs or SNs, include reordering a sequence and recording lost RLC PDUs, include reporting states of the lost RLC PDUs to a transmission side, and include requesting retransmission of the lost RLC PDUs.

The in-sequence delivery function of the NR RLC device may include, when there is a lost RLC SDU, sequentially transferring only RLC SDUs before the lost RLC SDU to a higher layer, or include, even if there is a lost RLC SDU, if a predetermined timer expires, sequentially transferring, to the higher layer, all the RLC SDUs received before the timer starts. Alternatively, the in-sequence delivery function of the NR RLC device may include, even if there is a lost RLC SDU, if a predetermined timer expires, sequentially transferring all currently received RLC SDUs to the higher layer. In the above, the RLC PDUs may be processed in the order of reception thereof (in the order of arrival, regardless of sequence numbers or the order of the sequence numbers) so as to be delivered to the PDCP device regardless of a sequence (out-of-sequence delivery). Segments stored in a buffer or to be received at a later time may be received, reconfigured into one complete RLC PDU, processed, and then delivered to the PDCP device. The NR RLC layer may not include a concatenation function, and the concatenation function may be performed in an NR MAC layer or may be replaced with a multiplexing function of the NR MAC layer.

The out-of-sequence delivery function of the NR RLC device refers to directly delivering the RLC SDUs received from a lower layer to a higher layer regardless of a sequence, and may include, when originally one RLC SDU is segmented into multiple RLC SDUs and then received, reassembling the segmented RLC SDUs and then delivering the same, and include storing the RLC SNs or the PDCP SNs of the received RLC PDUs and arranging the RLC SNs or PDCP SNs so as to record lost RLC PDUs.

The NR MACs S40 and S55 may be connected to multiple NR RLC layer devices included in one terminal, and main functions of the NR MACs may include at least some of the following functions.

Mapping (mapping between logical channels and transport channels)

Multiplexing and demultiplexing (multiplexing/demultiplexing of MAC SDUs)

Scheduling information reporting

HARQ (error correction through HARQ)

Priority handling between logical channels (priority handling between logical channels of one UE)

Priority handling between terminals (priority handling between UEs by means of dynamic scheduling)

MBMS service identification

Transport format selection

Padding

The NR PHY layers S45 and S50 may perform channel-coding and modulation of higher-layer data, make the channel-coded and modulated higher-layer data into OFDM symbols, and transmit the OFDM symbols via a radio channel, or may perform demodulation and channel-decoding of the OFDM symbols received via the radio channel and transfer the same to a higher layer.

The detailed structures of the radio protocol structures may be variously changed according to a carrier (or cell) operating method. For example, when the base station transmits, based on a single carrier (or cell), data to the terminal, the base station and the terminal use a protocol structure having a single structure for each layer, as shown in S00 in FIG. 10. However, when the base station transmits data to the terminal, based on carrier aggregation (CA) using multiple carriers in a single TRP, the base station and the terminal use a protocol structure in which up to the RLC has a single structure, but the PHY layer is multiplexed via the MAC layer, as shown in S10. As another example, when the base station transmits data to the terminal, based on dual connectivity (DC) using multiple carriers in multiple TRPs, the base station and the terminal use a protocol structure in which up to the RLC has a single structure but the PHY layer is multiplexed via the MAC layer, as shown in S20.

Non-Coherent Joint Transmission (NC-JT)

NC-JT may be used for the terminal to receive PDSCHs from multiple TRPs.

Unlike the conventional system, the 5G wireless communication system may support not only a service requiring a high transmission rate, but also a service having a very short transmission delay and a service requiring a high connection density. In a wireless communication network including multiple cells, TRPs, or beams, cooperative communication (coordinated transmission) between the respective cells, TRPs, or/and beams may satisfy various service requirements by enhancing the strength of a signal received by a terminal or efficiently performing interference control between the respective cells, TRPs, or/and beams.

Joint transmission (JT) is a representative transmission scheme for the aforementioned cooperative communication, and is a scheme for increasing the strength or throughput of signals received by a terminal, by transmitting the signals to one terminal via multiple different cells, TRPs, and/or beams. In this case, channels between the terminal and the respective cells, TRPs, and/or beams may have significantly different characteristics, and NC-JT supporting non-coherent precoding between the respective cells, TRPs, and/or beams may require individual precoding, modulation and coding scheme (MCS), resource allocation, TCI indication, etc. according to a channel characteristic for each link between the terminal and the respective cells, TRPs, and/or beams.

The aforementioned NC-JT transmission may be applied to at least one of a PDSCH, a PDCCH, a PUSCH, or a PUCCH. During PDSCH transmission, transmission information, such as precoding, MCS, resource allocation, and TCI, is indicated via DL DCI, and for NC-JT transmission, the transmission information should be independently indicated for each cell, TRP, and/or beam. This is important in increasing a payload required for DL DCI transmission, which may adversely affect reception performance of a PDCCH which transmits DCI. Therefore, in order to support JT of a PDSCH, it is necessary to carefully design a tradeoff between the amount of DCI information and control information reception performance.

Figure 11:
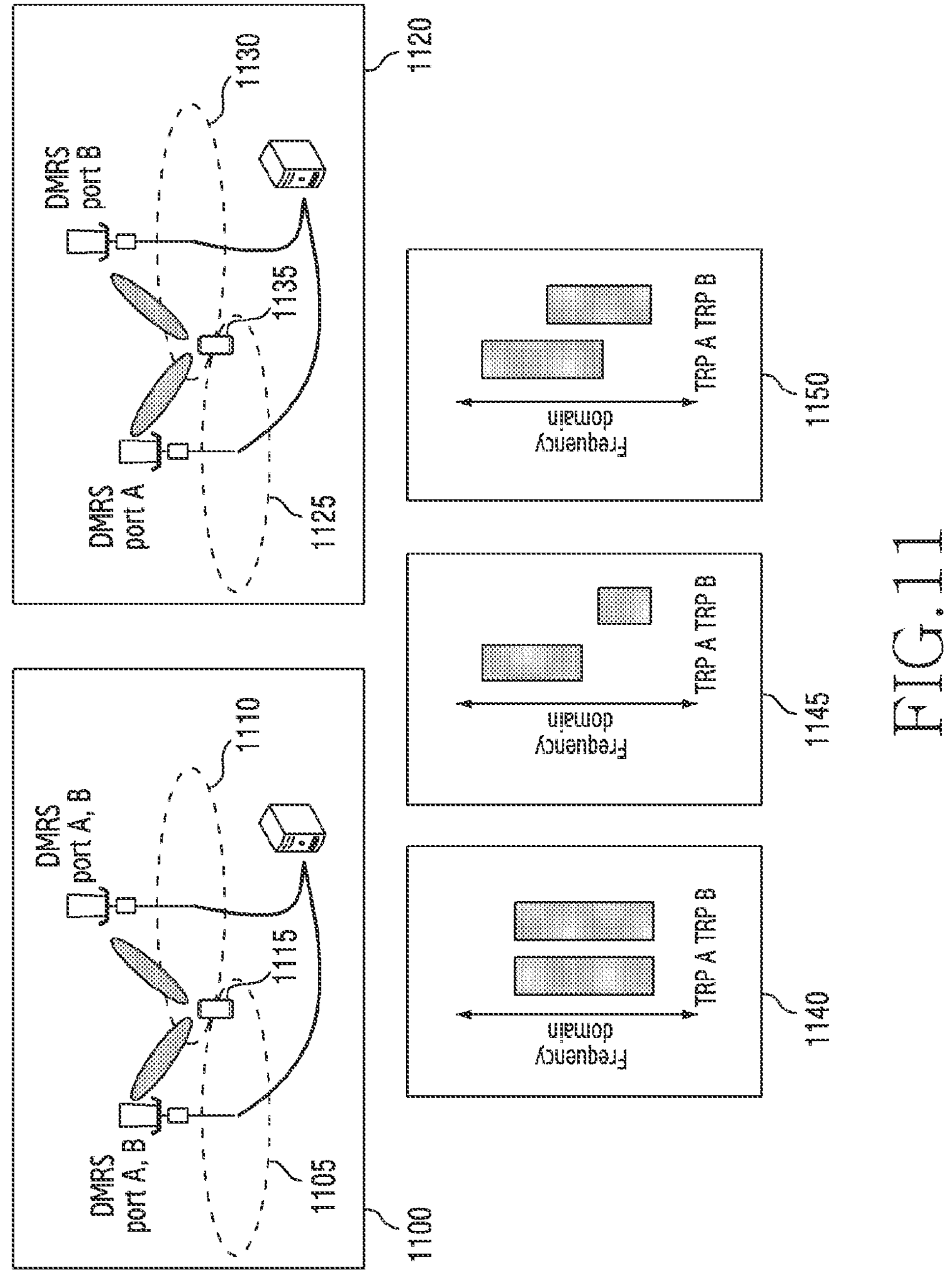
FIG. 11 illustrates an antenna port configuration and resource allocation for cooperative communication in a wireless communication system according to an embodiment.

FIG. 11 illustrates an antenna port configuration and resource allocation for PDSCH transmission using cooperative communication in a wireless communication system according to an embodiment.

Referring to FIG. 11, an example for PDSCH transmission is described for each JT scheme, and examples for radio resource allocation for each TRP are illustrated.

Referring to FIG. 11, an example 1100 for coherent JT (C-JT) supporting coherent precoding between respective cells, TRPs, or/and beams is illustrated.

For C-JT, TRP A 1105 and TRP B 1110 transmit single data (PDSCH) to a terminal 1115, and joint precoding may be performed in multiple TRPs. This may indicate that DMRSs are transmitted through identical DMRS ports in order for TRP A 1105 and TRP B 1110 to transmit the same PDSCH. For example, TRP A 1105 and TRP B 1110 may transmit DRMSs to the terminal through DMRS port A and DMRS port B, respectively. In this case, the terminal may receive one piece of DCI information for reception of one PDSCH demodulated based on the DMRSs transmitted through DMRS port A and DMRS port B.

FIG. 11 illustrates an example 1120 of NC-JT supporting non-coherent precoding between respective cells, TRPs, and/or beams for PDSCH transmission.

For NC-JT, a PDSCH is transmitted to a terminal 1135 for each cell, TRP, or/and beam, and individual precoding may be applied to each PDSCH. Respective cells, TRPs, and/or beams transmit different PDSCH layers or different PDSCHs to the terminal, thereby improving a throughput compared to single-cell, single-TRP, and/or single-beam transmission. In addition, respective cells, TRPs, and/or beams repeatedly transmit the same PDSCH to the terminal, thereby improving reliability compared to single-cell, single-TRP, and/or single-beam transmission. For convenience of description, a cell, a TRP and/or a beam is, hereinafter, collectively referred to as a TRP.

In this case, various radio resource allocations may be considered, such as a case 1140 where frequency and time resources used in multiple TRPs for PDSCH transmission are all identical, a case 1145 where frequency and time resources used in multiple TRPs do not overlap, and a case 1150 where some of frequency and time resources used in multiple TRPs overlap.

For NC-JT support, DCI of various types, structures, and relations may be considered to assign multiple PDSCHs simultaneously to a single terminal.

Figure 12:
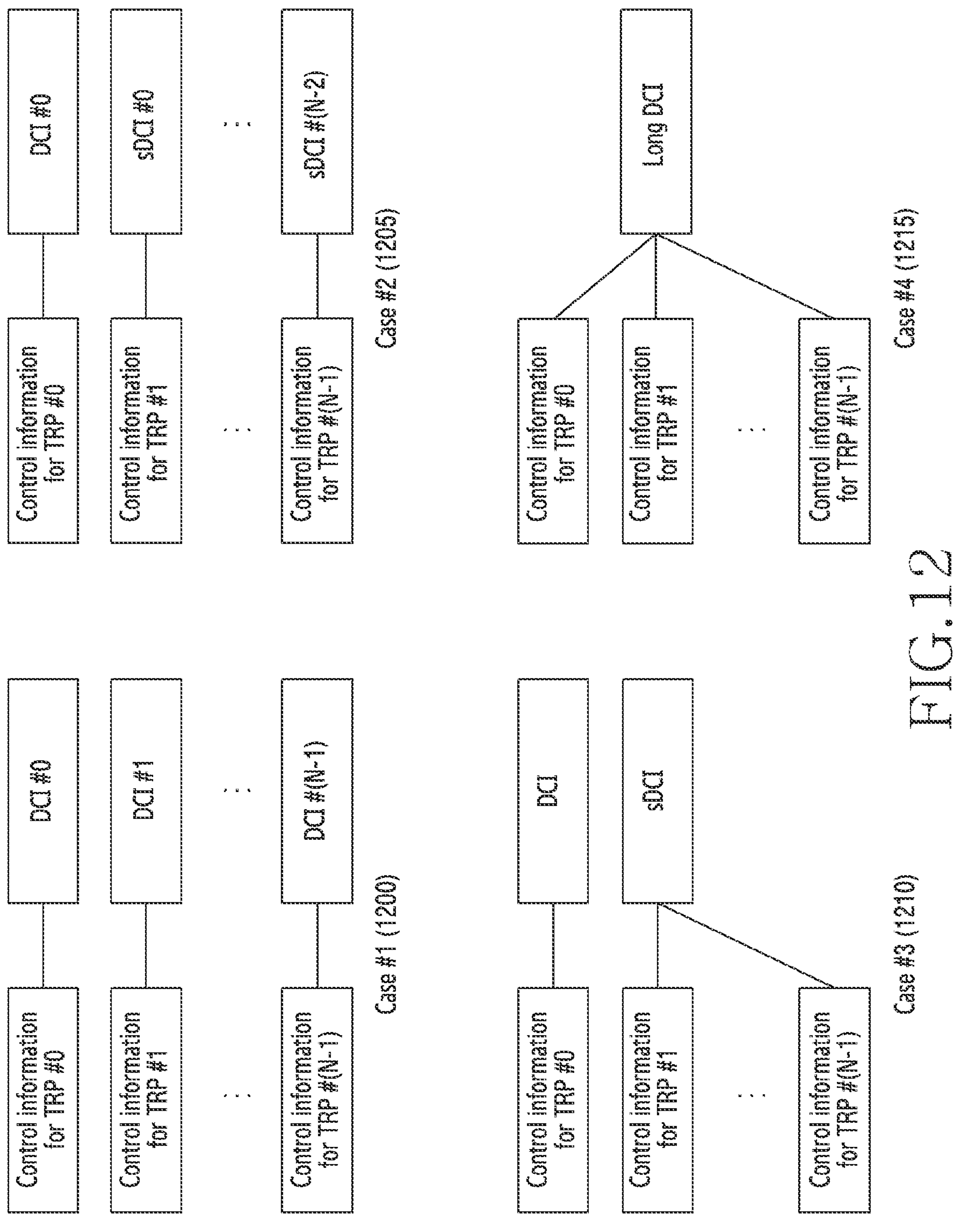
FIG. 12 illustrates a DCI configuration for cooperative communication in a wireless communication system according to an embodiment.

FIG. 12 illustrates a configuration of DCI for NC-JT in which respective TRPs transmit different PDSCHs or different PDSCH layers to a terminal in a wireless communication system according to an embodiment.

Referring to FIG. 12, case #1 1200 is an example in which, when different (N−1) PDSCHs are transmitted from (N−1) additional TRPs (TRP #1 to TRP #(N−1)) in addition to a serving TRP (TRP #0) used during single PDSCH transmission, control information for PDSCHs transmitted from the additional (N−1) TRPs is transmitted independently of control information for a PDSCH transmitted from the serving TRP. That is, the terminal may acquire control information for PDSCHs transmitted from different TRPs (TRP #0 to TRP #(N−1)) via independent pieces of DCI (DCI #0 to DIC #(N−1)). Formats between the independent pieces of DCI may be the same or different from each other, and payloads between the DCI may also be the same or different from each other. In aforementioned case #1, each PDSCH control or allocation freedom may be completely guaranteed, but if respective pieces of DCI are transmitted from different TRPs, a coverage difference per DCI may occur and thus reception performance may be deteriorated.

Case #2 1205 shows an example dependent on control information for a PDSCH, in which, when (N−1) different PDSCHs are transmitted from (N−1) additional TRPs (TRP #1 to TRP #(N−1)) in addition to a serving TRP (TRP #0) used during single PDSCH transmission, control information (DCI) for each of PDSCHs of the additional (N−1) TRPs is transmitted, and each piece of the DCI is transmitted from the serving TRP.

For example, DCI #0, which is control information for the PDSCH transmitted from the serving TRP (TRP #0), includes all information elements of DCI format 1_0, DCI format 1_1, and DCI format 1_2, but shortened DCI (hereinafter, sDCI) (sDCI #0 to sDCI #(N−2)), which is control information for the PDSCHs transmitted from the cooperative TRPs (TRP #1 to TRP #(N−1)), may include only some of the information elements of DCI format 1_0, DCI format 1_1, and DCI format 1_2. Accordingly, for sDCI for transmission of the control information for the PDSCHs transmitted from the cooperative TRPs, a payload is small compared to normal DCI (nDCI) for transmission of the control information related to the PDSCH transmitted from the serving TRP. Thus, it is possible to include reserved bits when compared to nDCI.

In aforementioned case #2 1205, each PDSCH control or allocation freedom may be restricted according to a content of an information element included in sDCI, but since reception performance of sDCI is superior to that of nDCI, a probability that a coverage difference occurs per DCI may be lowered.

Case #3 1210 shows an example dependent on control information for a PDSCH, in which, when (N−1) different PDSCHs are transmitted from (N−1) additional TRPs (TRP #1 to TRP #(N−1)) in addition to a serving TRP (TRP #0) used during single PDSCH transmission, one piece of control information for PDSCHs of the (N−1) additional TRPs is transmitted, and the DCI is transmitted from the serving TRP.

For example, DCI #0, which is control information for a PDSCH transmitted from the serving TRP (TRP #0), may include all information elements of DCI format 1_0, DCI format 1_1, and DCI format 1_2. In control information for the PDSCHs transmitted from the cooperative TRPs (TRP #1 to TRP #(N−1)), only some of the information elements of DCI format 1_0, DCI format 1_1, and DCI format 1_2 may be transmitted together in one secondary DCI (sDCI). For example, the sDCI may include at least one piece of HARQ-related information, such as frequency domain resource assignment, time domain resource assignment, and MCS of cooperative TRPs. Information that is not included in the sDCI, such as a BWP indicator or a carrier indicator, may be based on the DCI (DCI #0, normal DCI, or nDCI) of the serving TRP.

In case #3 1210, each PDSCH control or allocation freedom may be restricted according to a content of the information element included in the sDCI, but sDCI reception performance may be adjustable, and complexity of DCI blind decoding of the terminal may be reduced compared to case #1 1200 or case #2 1205.

Case #4 1215 is an example in which, when (N−1) different PDSCHs are transmitted from (N−1) additional TRPs (TRP #1 to TRP #(N−1)) in addition to a serving TRP (TRP #0) used during single PDSCH transmission, control information for PDSCHs transmitted from the (N−1) additional TRPs is transmitted in the same DCI (long DCI) as that for the control information for the PDSCH transmitted from the serving TRP. That is, the terminal may acquire the control information for the PDSCHs transmitted from different TRPs (TRP #0 to TRP #(N−1)) via single DCI. For case #4 1215, complexity of DCI blind decoding of the terminal may not increase, but a PDSCH control or allocation freedom may be low, such that the number of cooperative TRPs is limited according to long DCI payload restrictions.

Herein, sDCI may refer to various auxiliary DCI, such as shortened DCI, secondary DCI, and/or normal DCI (aforementioned DCI formats 1_0 to 1_1) including PDSCH control information transmitted from the coordinated TRPs, and if no particular limitation is specified, the description is similarly applicable to the various auxiliary DCI.

Aforementioned case #1 1200, case #2 1205, and case #3 1210, in which one or more pieces of DCI (PDCCHs) are used for NC-JT support, are classified as multiple PDCCH-based NC-JT, and aforementioned case #4 1215 in which single DCI (PDCCH) is used for NC-JT support may be classified as single PDCCH-based NC-JT. In multiple PDCCH-based PDSCH transmission, a CORESET in which DCI of the serving TRP (TRP #0) is scheduled and a CORESET in which DCI of the cooperative TRPs (TRP #1 to TRP #(N−1)) are scheduled may be differentiated. As a method for differentiating CORESETs, there may be a method for distinguishment via a higher-layer indicator for each CORESET, a method for distinguishment via a beam configuration for each CORESET, and/or the like. In the single PDCCH-based NC-JT, single DCI is for scheduling of a single PDSCH having multiple layers, instead of scheduling of multiple PDSCHs, and the aforementioned multiple layers may be transmitted from multiple TRPs. In this case, a connection relationship between a layer and a TRP for transmitting the layer may be indicated via a TCI indication for the layer.

Herein, “cooperative TRP” may be replaced with various terms, such as “cooperative panel” or “cooperative beam” when applied.

Herein, “when NC-JT is applied” may be interpreted in various ways depending on a situation, such as “when a terminal receives one or more PDSCHs at the same time in one BWP”, “when a terminal receives PDSCH based on two or more TCIs at the same time in one BWP”, “when a PDSCH received by a terminal is associated with one or more DMRS port groups”, etc., but one expression is used for convenience of description.

Herein, a radio protocol structure for NC-JT may be used in various manners according to a TRP deployment scenario. For example, if there is no backhaul delay or is a small backhaul delay between cooperative TRPs, a method (CA-like method) of using a structure based on MAC layer multiplexing is possible in a similar manner to S10 of FIG. 10. However, if a backhaul delay between cooperative TRPs is so large that the backhaul delay cannot be disregarded (e.g., when a time of 2 ms or longer is required for information exchange, such as CSI, scheduling, and HARQ-ACK, between the cooperative TRPs), a method (DC-like method) of securing characteristics robust to a delay by using an independent structure for each TRP from the RLC layer is possible in a similar manner to S20 of FIG. 10.

The terminal supporting C-JT/NC-JT may receive a C-JT/NC-JT-related parameter, setting value, or the like from a higher-layer configuration, and may set an RRC parameter of the terminal, based on the C-JT/NC-JT-related parameter or setting value. For the higher-layer configuration, the terminal may use a UE capability parameter, i.e., tci-StatePDSCH. The UE capability parameter (e.g., tci-StatePDSCH) may define TCI states for PDSCH transmission, the number of the TCI states may be configured to be 4, 8, 16, 32, 64, and 128 in FR1 and configured to be 64 and 128 in FR2, and among the configured numbers, up to 8 states that may be indicated by 3 bits of a TCI field in the DCI may be configured via a MAC CE message. The maximum value of 128 refers to a value indicated by maxNumberConfiguredTCIstatesPerCC in parameter tci-StatePDSCH included in capability signaling of the terminal. In this manner, a series of configuration procedures from the higher-layer configuration to the MAC CE configuration may be applied to a beamforming change command or a beamforming indication for at least one PDSCH in one TRP.

Multi-DCI Based Multi-TRP

In the multi-DCI-based multi-TRP transmission method, a DL control channel for NC-JT transmission may be configured based on a multi-PDCCH.

In multiple PDCCH-based NC-JT, when DCI for PDSCH scheduling for each TRP is transmitted, a CORESET or a search space differentiated for each TRP may be provided. The CORESET or search space for each TRP can be configured as at least one of the following cases.

Higher-layer index configuration for each CORESET: CORESET configuration information configured via a higher layer may include an index value, and a TRP for PDCCH transmission in a corresponding CORESET may be differentiated by a configured index value for each CORESET. That is, in a set of CORESETs having the same higher-layer index value, it may be considered that the same TRP transmits the PDCCH, or the PDCCH for scheduling of the PDSCH of the same TRP is transmitted. The aforementioned index for each CORESET may be named as CORESETPoolIndex, and for CORESETs for which the same CORESETPoolIndex value has been configured, it may be considered that PDCCHs are transmitted from the same TRP. For a CORESET for which no CORESETPoolIndex value has been configured, it may be considered that a default value of CORESETPoolIndex has been configured, where the default value is 0.

Herein, when is more than one type of CORESETPoolIndex that each of multiple CORESETs has, that is, in case that each CORESET has a different CORESETPoolIndex, the multiple CORESETs being included in PDCCH-Config that is higher-layer signaling, the terminal may consider that the base station may use the multi-DCI-based multi-TRP transmission method.

However, if there is one type of CORESETPoolIndex that each of multiple CORESETs has, the multiple CORESETs being included in PDCCH-Config that is higher-layer signaling, that is, if all CORESETs have the same CORESETPoolIndex of 0 or 1, the terminal may consider that the base station performs transmission using a single-TRP without using the multi-DCI-based multi-TRP transmission method.

Multiple PDCCH-Config configuration: A plurality of PDCCH-Configs in one BWP may be configured, and each PDCCH-Config may include a PDCCH configuration for each TRP. That is, a list of CORESETs for each TRP and/or a list of search spaces for each TRP may be configured in one PDCCH-Config, and one or more CORESETs and one or more search spaces included in one PDCCH-Config may be considered to correspond to a specific TRP.

CORESET beam/beam group configuration: A TRP corresponding to a corresponding CORESET may be differentiated via a beam or beam group configured for each CORESET. For example, if the same TCI state is configured in multiple CORESETs, it may be considered that the CORESETs are transmitted via the same TRP, or that the PDCCH for scheduling of a PDSCH of the same TRP is transmitted in the corresponding CORESET.

Search space beam/beam group configuration: A beam or beam group may be configured for each search space, and a TRP for each search space may be differentiated based on the configured beam or beam group. For example, when the same beam/beam group or TCI state is configured in multiple search spaces, it may be considered that the same TRP transmits a PDCCH in the corresponding search space or that the PDCCH for scheduling of a PDSCH of the same TRP is transmitted in the corresponding search space.

By differentiating the CORESET or search space for each TRP. Thus, it may be possible to independently generate an HARQ-ACK codebook and independently use a PUCCH resource for each TRP.

The described configuration may be independent for each cell or each BWP. For example, while two different CORESETPoolIndex values are configured for a PCell, a CORESETPoolIndex value may not be configured for a specific SCell. In this case, it may be considered that NC-JT transmission is configured for the PCell, whereas NC-JT transmission is not configured for the SCell in which the CORESETPoolIndex value is not configured.

A PDSCH TCI state activation/deactivation MAC-CE applicable to the multi-DCI-based multi-TRP transmission method may follow FIG. 7. If the terminal is not configured with CORESETPoolIndex for each of all CORESETs in higher-layer signaling of PDCCH-Config, the terminal may disregard the CORESET Pool ID field 755 in the corresponding MAC-CE 750. If the terminal is able to support the multi-DCI-based multi-TRP transmission method, that is, if the terminal has CORESETPoolIndex in which respective CORESETs in higher-layer signaling of PDCCH-Config are different, the terminal may activate the TCI state in DCI included in the PDCCHs transmitted from the CORESETs having the same CORESETPoolIndex value as the CORESET Pool ID field 755 value in the MAC-CE 750. For example, if the value of the CORESET Pool ID field 755 in the MAC-CE 750 is 0, the TCI state in DCI included in the PDCCHs transmitted from the CORESETs having a CORESETPoolIndex value of 0 may conform to activation information of the MAC-CE.

If the terminal is configured to use the multi-DCI-based multi-TRP transmission method from the base station, that is, if there is more than one type of CORESETPoolIndex that each of the multiple CORESETs included in higher-layer signaling of PDCCH-Config has, or if each CORESET has different CORESETPoolIndex, the terminal may recognize the presence of the following restrictions for PDSCHs scheduled from the PDCCHs in the respective CORESETs having two different CORESETPoolIndex values.

1) If PDSCHs indicated by the PDCCHs in the respective CORESETs, which have two different CORESETPoolIndex values, entirely or partially overlap, the terminal may apply the TCI states indicated by the respective PDCCHs to different CDM groups, respectively. That is, two or more TCI states may not be applied to one CDM group.
2) If PDSCHs indicated by the PDCCHs in the respective CORESETs, which have two different CORESETPoolIndex values, entirely or partially overlap, the terminal may expect that the actual number of front loaded DMRS symbols, the actual number of additional DMRS symbols, actual positions of the DMRS symbols, and DMRS types of the respective PDSCHs may not be different from each other.
3) The terminal may expect that BWPs indicated from the PDCCHs in the respective CORESETs having two different CORESETPoolIndex values are the same, and that subcarrier spacings thereof may also be the same.
4) The terminal may expect the respective PDCCHs to completely include information on the PDSCHs scheduled from the PDCCHs in the respective CORESETs having two different CORESETPoolIndex values.

Single-DCI-Based Multi-TRP

In the single-DCI-based multi-TRP transmission method, a DL control channel for NC-JT transmission may be configured based on a single-PDCCH.

In the single-DCI-based multi-TRP transmission method, PDSCHs transmitted by multiple TRPs may be scheduled via one piece of DCI. In this case, the number of TCI states may be used for a method of indicating the number of TRPs which transmit corresponding PDSCHs. That is, if the number of TCI states indicated in DCI for PDSCH scheduling is two, single PDCCH-based NC-JT transmission may be considered or identified, and if the number of TCI states is one, single-TRP transmission may be considered or identified. The TCI states indicated by the DCI may correspond to one or two TCI states among TCI states activated via a MAC-CE. If the TCI states of the DCI correspond to two TCI states activated via the MAC-CE, a correspondence is established between a TCI codepoint indicated in the DCI and the TCI states activated via the MAC-CE, and there may be two TCI states activated via the MAC-CE, which correspond to the TCI codepoint.

In case that at least one codepoint among all the codepoints of a TCI state field in the DCI indicates two TCI states, the terminal may consider that the base station may perform transmission based on the single-DCI-based multi-TRP method. In this case, at least one codepoint indicating two TCI states in the TCI state field may be activated via an enhanced PDSCH TCI state activation/deactivation MAC-CE.

Figure 13:
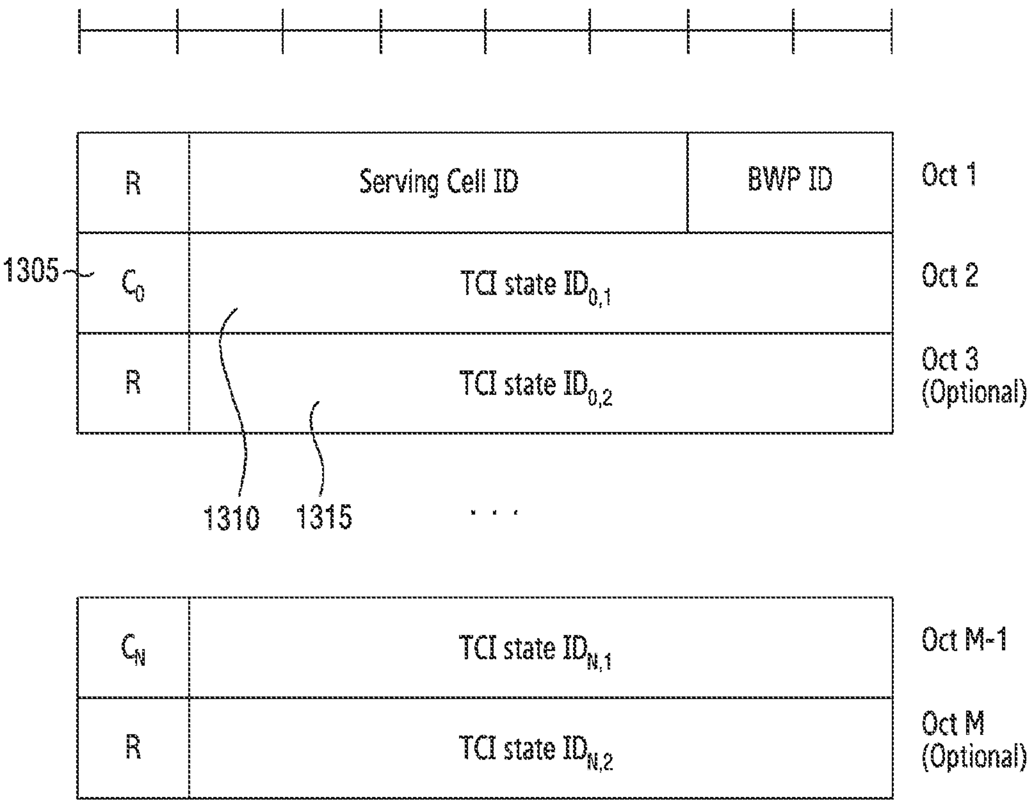
FIG. 13 illustrates an enhanced PDSCH TCI state activation/deactivation MAC-CE structure according to an embodiment.

FIG. 13 illustrates an enhanced PDSCH TCI state activation/deactivation MAC-CE structure. For example, the meaning of each field in a MAC CE and a value configurable for each field are as shown below in Table 39.

TABLE 39

- Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;

- BWP ID: This field indicates a DL BWP for which the MAC CE applies as the codepoint of the DCI bandwidth part indicator field as specified in TS 38.212 [9]. The length of the BWP ID field is 2 bits;

TABLE 39-continued

- $C_i$: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present;

- TCI state $ID_{i,j}$: This field indicates the TCI state identified by TCI-StateId as specified in TS 38.331 [5], where i is the index of the codepoint of the DCI Transmission configuration indication field as specified in TS 38.212 [9] and TCI state $ID_{i,j}$ denotes the j-th TCI state indicated for the i-th codepoint in the DCI Transmission Configuration Indication field. The TCI codepoint to which the TCI States are mapped is determined by its ordinal position among all the TCI codepoints with sets of TCI state $ID_{i,j}$ fields, i.e. the first TCI codepoint with TCI state $ID_{0,1}$ and TCI state $ID_{0,2}$ shall be mapped to the codepoint value 0, the second TCI codepoint with TCI state $ID_{1,1}$ and TCI state $ID_{1,2}$ shall be mapped to the codepoint value 1 and so on. The TCI state $ID_{i,2}$ is optional based on the indication of the Ci field. The maximum number of activated TCI codepoint is 8 and the maximum number of TCI states mapped to a TCI codepoint is 2.

- R: Reserved bit, set to "0".

In FIG. 13, if a value of a $C_0$ field 1305 is 1, a corresponding MAC-CE may include a TCI state $ID_{0,2}$ field 1315 in addition to a TCI state $ID_{0,1}$ field 1310. This may be referenced such that TCI state $ID_{0,1}$ and TCI state $ID_{0,2}$ are activated for a zeroth codepoint of the TCI state field included in DCI. If the base station indicates the codepoint to the terminal, the terminal may be indicated with two TCI states. If a value of the $C_0$ field 1305 is 0, the MAC-CE may not include the TCI state $ID_{0,2}$ field 1315, and this indicates that one TCI state corresponding to TCI state $ID_{0,1}$ is activated for the zeroth codepoint of the TCI state field included in the DCI.

The described configuration may be independent for each cell or each BWP. For example, a PCell may have up to two activated TCI states corresponding to one TCI codepoint, whereas a specific SCell may have up to one activated TCI state corresponding to one TCI codepoint. In this case, it may be considered or identified that NC-JT transmission is configured for the PCell, whereas NC-JT transmission is not configured for the aforementioned SCell.

Method for Distinguishing Single-DCI-Based Multi-TRP Repeated PDSCH Transmission Scheme (TDM/FDM/SDM)

Next, a method for distinguishing a single-DCI-based multi-TRP repeated PDSCH transmission scheme is described. The terminal may be indicated with different single-DCI-based multi-TRP repeated PDSCH transmission schemes (e.g., TDM, FDM, and SDM) according to a higher-layer signaling configuration and a value indicated via a DCI field from the base station. Table 40 below shows a method for distinguishing between a single-TRP-based scheme and a multi-TRP-based scheme indicated to the terminal according to a value of a specific DCI field and a higher-layer signaling configuration.

TABLE 40

| Combination | TCI state Number | CDM group Number | repetitionNumber configuration and indication condition | Relating to repetitionScheme configuration | Transmission scheme indicated to terminal |
|---|---|---|---|---|---|
| 1 | 1 | ≥1 | Condition 2 | Not configured | Single-TRP |
| 2 | 1 | ≥1 | Condition 2 | Configured | Single-TRP |
| 3 | 1 | ≥1 | Condition 3 | Configured | Single-TRP |
| 4 | 1 | 1 | Condition 1 | Configured or not configured | Single-TRP TDM scheme B |
| 5 | 2 | 2 | Condition 2 | Not configured | Multi-TRP SDM |
| 6 | 2 | 2 | Condition 3 | Not configured | Multi-TRP SDM |
| 7 | 2 | 2 | Condition 3 | Configured | Multi-TRP SDM |
| 8 | 2 | 2 | Condition 3 | Configured | Multi-TRP FDM scheme A/FDM scheme B/TDM scheme A |
| 9 | 2 | 2 | Condition 1 | Not configured | Multi-TRP TDM scheme B |

In Table 40, each column may be described as follows.

Number of TCI states (column 2): This refers to the number of TCI states indicated by the TCI state field in DCI, and the number of TCI states may be one or two.

Number of CDM groups (column 3): This refers to the number of different CDM groups of DMRS ports indicated by an antenna port field in DCI. The number of CDM groups may be 1, 2 or 3.

repetitionNumber configuration and indication condition (column 4): There may be three conditions depending on whether repetitionNumber is configured for all time domain resource allocation (TDRA) entries which may be indicated by the time domain resource allocation field in DCI, and whether an actually indicated TDRA entry has a configuration of repetitionNumber.

Condition 1: At least one of all TDRA entries that may be indicated by the time domain resource allocation field includes a configuration for repetitionNumber, and a TDRA entry indicated by the time domain resource allocation field in DCI includes a configuration for repetitionNumber greater than 1

Condition 2: At least one of all TDRA entries which may be indicated by the time domain resource allocation field includes a configuration for repetitionNumber, and a TDRA entry indicated by the time domain resource allocation field in DCI does not include a configuration for repetitionNumber Condition 3: All TDRA entries which may be indicated by the time domain resource allocation field do not include a configuration for repetitionNumber Relating to a configuration of repetitionScheme (column 5): repetitionScheme indicates whether repetitionScheme that is higher-layer signaling is configured. One of "tdmSchemeA", "fdmSchemeA", and "fdmSchemeB" may be configured for repetitionScheme that is higher-layer signaling.

Transmission scheme indicated to the terminal (column 6): This may refer to single-TRP or multi-TRP schemes indicated according to each combination (column 1) expressed as in Table 42 above.

Single-TRP: Single-TRP refers to single-TRP-based PDSCH transmission. If the terminal is configured with pdsch-AggegationFactor in higher-layer signaling PDSCH-config, the terminal may be scheduled with single-TRP-based repeated PDSCH transmission as many times as the configured number of times. Otherwise, the terminal may be scheduled with single-TRP-based single PDSCH transmission.

Single-TRP time division multiplexing (TDM) scheme B: This refers to repeated PDSCH transmission based on time resource division between slots based on a single TRP. According to condition 1 relating to repetitionNumber, the terminal repeatedly transmits PDSCHs on time resources as many times as repetitionNumber of slots, which is greater than 1 and configured in the TDRA entry indicated by the time domain resource allocation field. In this case, the same start symbol and symbol length of the PDSCH indicated by the TDRA entry are applied to each slot as many times as repetitionNumber, and the same TCI state is applied to each repeated PDSCH transmission. This scheme is similar to a slot aggregation scheme in view of performing repeated PDSCH transmission between slots on time resources, but is different from slot aggregation in that whether to indicate repeated transmission may be dynamically determined based on the time domain resource allocation field in DCI.

Multi-TRP SDM: This refers to a PDSCH transmission scheme based on multi-TRP-based spatial resource division. Multi-TRP SDM is a method for reception from each TRP by dividing layers, and although not a repeated transmission scheme, multi-TRP SDM enables transmission at a low coding rate by increasing the number of layers, so as to increase the reliability of PDSCH transmission. The terminal may receive the PDSCH by applying two TCI states, which are indicated via the TCI state field in the DCI, to two CDM groups indicated by the base station, respectively.

Multi-TRP FDM scheme A: This refers to a PDSCH transmission scheme based on multi-TRP-based frequency resource division, and although not for repeated transmission like multi-TRP SDM in view of having one PDSCH transmission occasion, multi-TRP FDM scheme A is a scheme that enables transmission with high reliability at a low coding rate by increasing the amount of frequency resources. In multi-TRP FDM scheme A, two TCI states indicated via the TCI state field in DCI may be applied to frequency resources that do not overlap each other, respectively. In case that a PRB bundling size is determined to be wideband, if the number of RBs indicated by the frequency domain resource allocation (FDRA) field is N, the terminal may receive first ceil(N/2) RBs by applying a first TCI state and receives the remaining floor(N/2) RBs by applying a second TCI state. ceil(.) and floor(.) are operators that indicate round up and round off to one decimal place. If the PRB bundling size is determined to be 2 or 4, even-numbered PRGs may be received by applying the first TCI state, and odd-numbered PRGs may be received by applying the second TCI state.

Multi-TRP FDM scheme B: This refers to a repeated PDSCH transmission scheme based on multi-TRP-based frequency resource division, wherein, when there are two PDSCH transmission occasions, multi-TRP FDM scheme B may enable repeated PDSCH transmission at each of the occasions. In multi-TRP FDM scheme B, as in multi-TRP FDM scheme A, two TCI states indicated via the TCI state field in DCI may be applied to frequency resources that do not overlap each other, respectively. If a PRB bundling size is determined to be wideband, when the number of RBs indicated by the FDRA field is N, the terminal receives first ceil(N/2) RBs by applying a first TCI state and receives the remaining floor(N/2) RBs by applying a second TCI state. ceil(.) and floor(.) are operators that indicate round up and round off to one decimal place. If the PRB bundling size is determined to be 2 or 4, even-numbered PRGs are received by applying the first TCI state, and odd-numbered PRGs are received by applying the second TCI state.

Multi-TRP TDM scheme A: This refers to a repeated PDSCH transmission scheme in a multi-TRP-based time resource division slot. The terminal has two PDSCH transmission occasions in one slot, and a first reception occasion may be determined based on a start symbol and a symbol length of a PDSCH indicated via the time domain resource allocation field in DCI. A start symbol of a second reception occasion of the PDSCH may be a position to which a symbol offset is applied as much as StartingSymbolOffsetK, which is higher-layer signaling, from the last symbol of a first transmission occasion, and a transmission occasion may be determined according to a symbol length indicated therefrom. If StartingSymbolOffsetK that is higher-layer signaling is not configured, the symbol offset may be considered to be 0.

Multi-TRP TDM scheme B: This refers to a repeated PDSCH transmission scheme between multi-TRP-based time resource division slots. The terminal has one PDSCH transmission occasion in one slot, and may receive repeated transmissions based on the same start symbol and symbol length of the PDSCH during slots of the repetitionNumber number of times indicated via the time domain resource allocation field in DCI. If repetitionNumber is 2, the terminal may receive, with respect to repeated PDSCH transmissions in first and second slots, PDSCHs by applying first and second TCI states, respectively. If repetitionNumber is greater than 2, the terminal may use a different TCI state applying scheme depending on a configuration of tciMapping that is higher-layer signaling. If tciMapping is configured to be cyclicMapping, the first and second TCI states are applied to the first and second PDSCH transmission occasions, respectively, and this TCI state applying method is equally applied to the remaining PDSCH transmission occasions. If tciMapping is configured to be sequentialMapping, the first TCI state is applied to the first and second PDSCH transmission occasions, and the second TCI state is applied to third and fourth PDSCH transmission occasions, wherein this TCI state applying method is applied to the remaining PDSCH transmission occasions in the same manner.

Relating to Radio Link Monitoring Reference Signal (RLM RS)

The terminal may be configured with a set of RLM RSs from the base station via RadioLinkMonitoringRS in RadioLinkMonitoringConfig, which is higher-layer signaling, for each DL BWP of SPCell, and a specific higher-layer signaling structure shown below in Table 41.

TABLE 41

```
RadioLinkMonitoringConfig ::=                    SEQUENCE {
  failureDetectionResourcesToAddModList   SEQUENCE
(SIZE(1..maxNrofFailureDetectionResources)) OF RadioLinkMonitoringRS   OPTIONAL, -- Need N
  failureDetectionResourcesToReleaseList SEQUENCE (SIZE(1..maxNrofFailureDetectionResources))
OF RadioLinkMonitoringRS-Id OPTIONAL, -- Need N
  beamFailureInstanceMaxCount ENUMERATED            {n1, n2, n3, n4, n5, n6, n8, n10}
                                                 OPTIONAL, -- Need R
  beamFailureDetectionTimer                        ENUMERATED {pbfd1, pbfd2, pbfd3, pbfd4, pbfd5, pbfd6, pbfd8,
pbfd10}                                          OPTIONAL, -- Need R
...
}
RadioLinkMonitoringRS ::=                        SEQUENCE {
  radioLinkMonitoringRS-Id                           RadioLinkMonitoringRS-Id,
  purpose                                        ENUMERATED {beamFailure, rlf, both},
  detectionResource                                  CHOICE {
    ssb-Index                                    SSB-Index,
    csi-RS-Index                                 NZP-CSI-RS-ResourceId
  },
...
}
```

Table 42 below may indicate the configurable or selectable number of RLM RSs for each specific use according to the maximum number ($L_{max}$) of SSBs per half frame. As shown below in Table 44, according to the $L_{max}$ value, $N_{LR\text{-}RLM}$ RSs may be used for link recovery or radio link monitoring, and $N_{RLM}$ RSs among $N_{LR\text{-}RLM}$ RSs may be used for radio link monitoring.

TABLE 42

| $N_{LR\text{-}RLM}$ and $N_{RLM}$ as a function of maximum number $L_{max}$ of $\frac{SS}{PBCH}$ blocks per half frame | | |
|---|---|---|
| $L_{max}$ | $N_{LR\text{-}RLM}$ | $N_{RLM}$ |
| 4 | 2 | 2 |
| 8 | 6 | 4 |
| 64 | 8 | 8 |

If the terminal is not configured with RadioLinkMonitoringRS that is higher-layer signaling, and the terminal is configured with a TCI state for receiving a PDCCH in a CORESET, and if at least one CSI-RS is included in the TCI state, the RLM RS may be selected according to the following RLM RS selection methods.

RLM RS selection method 1): If an activated TCI state to be used for PDCCH reception has one reference RS (e.g., one activated TCI state has only one of QCL-TypeA, B, or C), the terminal may select, as the RLM RS, a reference RS of the activated TCI state to be used for PDCCH reception.

RLM RS selection method 2): If an activated TCI state to be used for PDCCH reception has two reference RSs (e.g., one activated TCI state has one of QCL-TypeA, B, or C, and additionally has QCL-TypeD), the terminal may select a reference RS of QCL-TypeD as the RLM-RS. The terminal does not expect that two QCL-TypeDs are configured in one activated TCI state.

RLM RS selection method 3): The terminal does not expect that an aperiodic or semi-persistent RS is selected as the RLM RS.

RLM RS selection method 4): If $L_{max}$=4, the terminal may select $N_{RLM}$ RSs (since $L_{max}$ is 4, two may be selected). The RLM RS is selected from among the reference RSs of the TCI state configured in the CORESET for PDCCH reception, based on RLM RS selection methods 1 to 3, wherein a search space, to which the CORESET is linked, having a short period is determined to have a high priority, and the RLM RS is selected from the reference RS of the TCI state configured in the CORESET linked to a search space of a shortest period. If there are multiple CORESETs linked to multiple search spaces having the same period, the RLM RS is selected from the reference RS of the TCI state configured in a high CORESET index.

Figure 14:
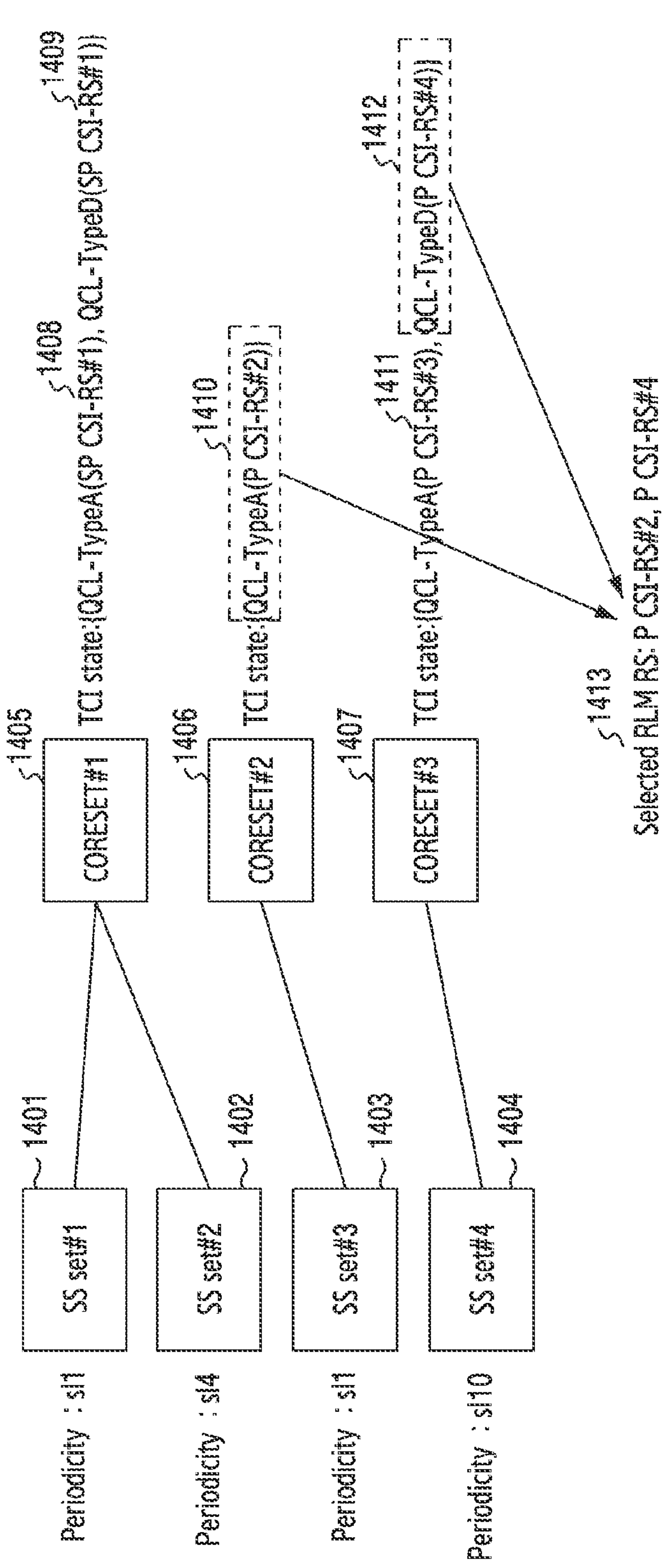
FIG. 14 illustrates a radio link monitoring (RLM) reference signal (RS) selection procedure according to an embodiment.

FIG. 14 illustrates an RLM RS selection procedure embodiment. FIG. 14 illustrates CORESET #1 to CORESET #3 1405 to 1407 linked to search space set #1 to search space set #4 1401 to 1404 having different periods within an activated DL BWP, and a reference RS of a TCI state configured in each CORESET. Based on RLM RS selection method 4, RLM RS selection uses a TCI state configured in a CORESET linked to a search space with a shortest period, but since search space set #1 1401 and search space set #3 1403 have the same period, a reference RS of a TCI state configured in CORESET #2 having a higher index between CORESET #1 1405 and CORESET #2 1406 linked to respective search spaces may be used as a reference RS having a highest priority in the RLM RS selection.

In addition, since the TCI state configured in CORESET #2 has only QCL-TypeA, and the reference RS thereof is a periodic RS, P CSI-RS #2 1410 may be first selected as the RLM RS according to RLM RS selection methods 1 and 3. The reference RS of QCL-TypeD may be a selection candidate according to RLM RS selection method 2 from among reference RSs of the TCI state configured in CORESET #1 having a subsequent priority, but the corresponding RS is a semi-persistent RS 1409 and therefore is not selected as the RLM RS according to RLM RS selection method 3. Therefore, reference RSs of the TCI state configured in CORESET #3 may be considered as having the subsequent priority, and the reference RS of QCL-TypeD may be a selection candidate according to RLM RS selection method 2, and since the reference RS is a periodic RS, P CSI-RS #4 1412 may be selected as a second RLM RS according to RLM RS selection method 3. Therefore, finally selected RLM RSs 1413 may be P CSI-RS #2 and P CSI-RS #4.

Single TCI State Activation and Indication Method Based on Unified TCI Scheme

The unified TCI scheme may refer to a scheme of integrating and managing a transmission/reception beam management scheme which is distinguished by a spatial relation info scheme used in UL transmission and a TCI state scheme used in DL reception by the terminal in existing Rel-15 and Rel-16. Therefore, if the terminal is indicated with a TCI state from the base station, based on the unified TCI scheme, beam management may be performed using the TCI state even for UL transmission.

If the terminal is configured with TCI-State that is higher-layer signaling having tci-stateId-r17 that is higher-layer signaling from the base station, the terminal may perform an operation based on the unified TCI scheme by using the corresponding TCI-State. TCI-State may exist in two types of a joint TCI state or a separate TCI state.

The first type is a joint TCI state, and the terminal may be indicated, by the base station via one TCI-State, with TCI-State to be applied to both UL transmission and DL reception. If the terminal is indicated with joint TCI state-based TCI-State, the terminal may be indicated with a parameter to be used for DL channel estimation by using an RS corresponding to qcl-Type1 in the joint TCI state-based TCI-State and a parameter to be used as a DL reception beam or reception filter by using an RS corresponding to qcl-Type2. If the terminal is indicated with joint TCI state-based TCI-State, the terminal may be indicated with a parameter to be used as a UL transmission beam or transmission filter by using an RS corresponding to qcl-Type2 in corresponding joint DL/UL TCI state-based TCI-State. In this case, if the terminal is indicated with joint TCI state-based TCI-State, the terminal may apply the same beam to both UL transmission and DL reception.

The second type is a separate TCI state, and the terminal may be indicated by the base station, with UL TCI-State to be applied to UL transmission and DL TCI-State to be applied to DL reception. If the terminal is indicated with a UL TCI state, the terminal may be indicated with a parameter to be used as a UL transmission beam or transmission filter by using a reference RS or a source RS configured within the UL TCI state. If the terminal is indicated with a DL TCI state, the terminal may be indicated with a parameter to be used for DL channel estimation by using an RS corresponding to qcl-Type1 and a parameter to be used as a DL reception beam or reception filter by using an RS corresponding to qcl-Type2, the parameters being configured in the DL TCI state.

If the terminal is indicated with both DL TCI state and UL TCI state, the terminal may be indicated with a parameter to be used as a UL transmission beam or transmission filter by using a reference RS or a source RS configured within the UL TCI state, and may be indicated with a parameter to be used for DL channel estimation by using an RS corresponding to qcl-Type1 and a parameter to be used as a DL reception beam or reception filter by using an RS corresponding to qcl-Type2, the parameters being configured in the DL TCI state. In this case, if the DL TCI state indicated to the terminal and the reference RS or source RS configured within the UL TCI state are different, the terminal may apply a UL transmission beam based on the indicated UL TCI state and apply a DL reception beam based on the DL TCI state.

The terminal may be configured with up to 128 joint TCI states for each specific BWP in a specific cell via higher-layer signaling by the base station, and may be configured, based on a UE capability report, with up to 64 or 128 DL TCI states among separate TCI states, for each specific BWP in a specific cell via higher-layer signaling. The joint TCI states and the DL TCI states among the separate TCI states may use the same higher-layer signaling structure. For example, if 128 joint TCI states are configured, and 64 DL TCI states among the separate TCI states are configured, the 64 DL TCI states may be included in the 128 joint TCI states.

Up to 32 or 64 UL TCI states among the separate TCI states may be configured based on the UE capability report, for each specific BWP in a specific cell via higher-layer signaling. Similar to the relationship between the joint TCI states and the DL TCI states among the separate TCI states, the same higher-layer signaling structure may also be used for the joint TCI states and the UL TCI states among separate TCIs. The UL TCI states among the separate TCIs may use a higher-layer signaling structure different from that for the joint TCI states and for the DL TCI states among the separate TCI states. As in the above, using the same higher-layer signaling structure or using different higher-layer signaling structures may be defined in the Standards. Using different higher-layer signaling structures or using the same higher-layer signaling structure may be distinguished via another higher-layer signaling configured by the base station, based on the UE capability report including information on whether there is a use scheme supportable by the terminal from among the two types.

The terminal may receive a transmission/reception beam-related indication in a unified TCI scheme by using one scheme among the joint TCI state and the separate TCI state configured by the base station. The terminal may be configured with whether to use one of the joint TCI state and the separate TCI state, by the base station via higher-layer signaling.

The terminal may receive a transmission/reception beam-related indication by using one scheme selected from among the joint TCI state and the separate TCI state via higher-layer signaling, wherein a method of transmission/reception beam indication from the base station may include two methods of a MAC-CE-based indication method and a MAC-CE-based activation and DCI-based indication method.

If the terminal is configured, via higher-layer signaling, to receive a transmission/reception beam-related indication by using the joint TCI state scheme, the terminal may receive a MAC-CE indicating the joint TCI state from the base station and perform a transmission/reception beam applying operation, and the base station may schedule, for the terminal, reception of a PDSCH including the MAC-CE via a PDCCH. If there is one joint TCI state included in the MAC-CE, the terminal may transmit, to the base station, a PUCCH including HARQ-ACK information indicating whether reception of the PDSCH including the MAC-CE is successful, and may determine a UL transmission beam or transmission filter and a DL reception beam or reception filter by using the indicated joint TCI state from 3 ms after transmission of the PUCCH.

If there are two or more joint TCI states included in the MAC-CE, the terminal may transmit, to the base station, the PUCCH including HARQ-ACK information indicating whether reception of the PDSCH including the MAC-CE is successful, identify, from 3 ms after transmission of the PUCCH, that multiple joint TCI states indicated by the MAC-CE correspond to respective codepoints of the TCI state field of DCI format 1_1 or 1_2, and activate the joint TCI states indicated by the MAC-CE. Thereafter, the terminal may receive DCI format 1_1 or 1_2, and apply one joint TCI state indicated by a TCI state field in the DCI to UL transmission and DL reception beams. In this case, DCI format 1_1 or 1_2 may include DL data channel scheduling information with or without DL assignment.

If the terminal is configured, via higher-layer signaling, to receive a transmission/reception beam-related indication by using the separate TCI state scheme, the terminal may receive a MAC-CE indicating the separate TCI state from the base station and perform a transmission/reception beam applying operation, and the base station may schedule, for the terminal, a PDSCH including the MAC-CE via a PDCCH. If there is one separate TCI state set included in the MAC-CE, the terminal may transmit, to the base station, the PUCCH including HARQ-ACK information indicating whether reception of the PDSCH is successful. From 3 ms after transmission of the PUCCH, the terminal may determine a UL transmission beam or transmission filter and a DL reception beam or reception filter by using separate TCI states included in the indicated separate TCI state set. In this case, the separate TCI state set may refer to a single separate TCI state or multiple separate TCI states that one codepoint of the TCI state field in DCI format 1_1 or 1_2 may have, and one separate TCI state set may include one DL TCI state, include one UL TCI state, or include one DL TCI state and one UL TCI state. If there are two or more separate TCI state sets included in the MAC-CE, the terminal may transmit, to the base station, the PUCCH including HARQ-ACK information indicating whether reception of the PDSCH is successful, identify, from 3 ms after transmission of the PUCCH, that multiple separate TCI state sets indicated by the MAC-CE correspond to respective codepoints of the TCI state field of DCI format 1_1 or 1_2, and activate the indicated separate TCI state sets. In this case, the respective codepoints of the TCI state field of DCI format 1_1 or 1_2 may indicate one DL TCI state, indicate one UL TCI state, or indicate each of one DL TCI state and one UL TCI state. The terminal may receive DCI format 1_1 or 1_2 and apply a separate TCI state set indicated by the TCI state field in the DCI to UL transmission and DL reception beams. In this case, DCI format 1_1 or 1_2 may include DL data channel scheduling information with or without DL assignment.

The MAC-CE used to activate or indicate the single joint TCI state and the separate TCI state described above may exist for each of the joint and separate TCI state schemes, and a TCI state may be activated or indicated based on one of the joint TCI state scheme or the separate TCI state scheme by using one MAC-CE.

Figure 15:
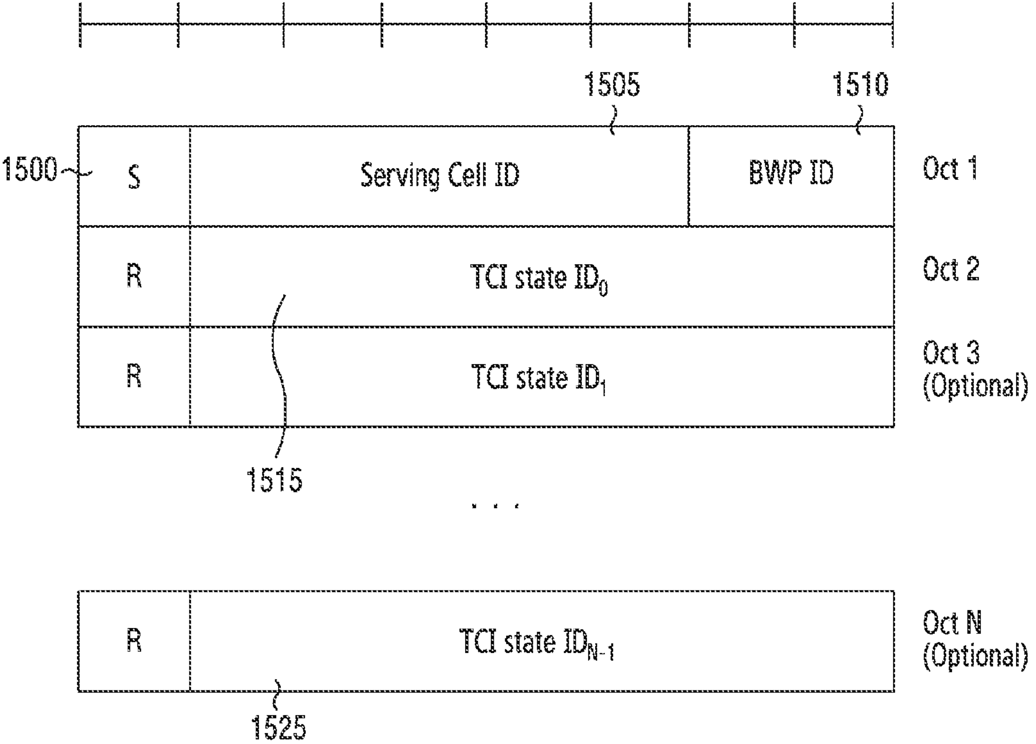
FIG. 15 illustrates a MAC-CE structure for activation and indication of a joint TCI state in a wireless communication system according to an embodiment.

FIG. 15 illustrates a MAC-CE structure for activation and indication of a joint TCI state in the wireless communication system embodiment.

Referring to FIG. 15, an S field 1500 may indicate the number of pieces of joint TCI state information included in a MAC-CE. If a value of the S field 1500 is 1, the MAC-CE may indicate one joint TCI state and may have a length of only up to a second octet. If the value of the S field 1500 is 0, the MAC-CE may include two or more pieces of joint TCI state information, respective joint TCI states may be activated at respective codepoints of the TCI state field of DCI format 1_1 or 1_2, and up to 8 joint TCI states may be activated. Configuring the values of 0 and 1 of the S field 1500 is not limited to the configuration method, wherein value 0 may indicate to include one joint TCI state, and value 1 may indicate to include two or more pieces of joint TCI state information. This interpretation of the S field may also be applied to other embodiments herein. TCI states indicated via a TCI state $ID_0$ field 1515 to a TCI state $ID_{N-1}$ field 1525 may correspond to a zeroth codepoint to an (N−1)th codepoint of the TCI state field of DCI format 1_1 or 1_2, respectively. A serving cell ID field 1505 may indicate a serving cell identifier (ID), and a BWP ID field 1510 may indicate a BWP ID. An R field may be a 1-bit reserve field that does not include indication information.

Figure 16:
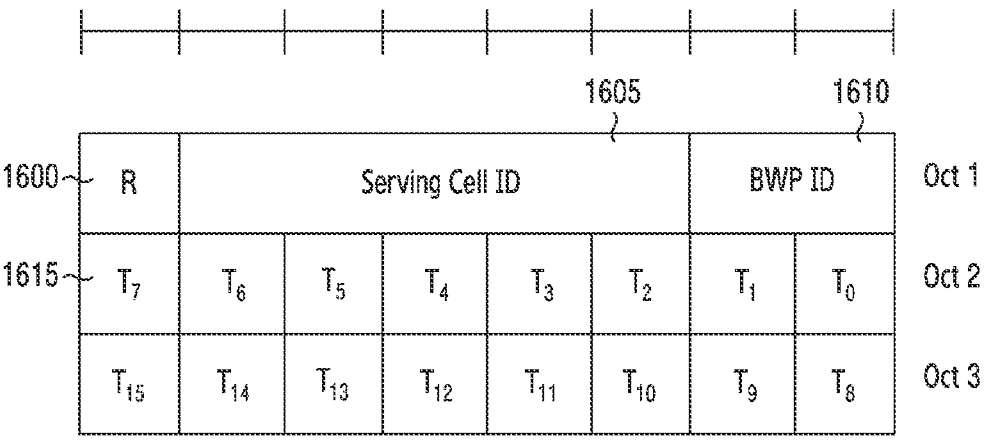
FIG. 16 illustrates a MAC-CE structure for activation and indication of a joint TCI state in a wireless communication system according to an embodiment.

FIG. 16 illustrates a MAC-CE structure for activation and indication of a joint TCI state in a wireless communication system according to an embodiment.

Referring to FIG. 16, a serving cell ID field 1605 may indicate a serving cell ID, and a BWP ID field 1610 may indicate a BWP ID. An R field 1600 may be a 1-bit reserve field that does not include indication information. Each field present in a second octet to an N-th octet is a bitmap indicating each joint TCI state configured via higher-layer signaling. As an example, $T_7$ 1615 may indicate whether an eighth joint TCI state configured via higher-layer signaling is indicated. If a TN value is 1, it may be interpreted that a corresponding joint TCI state is indicated or activated, and if the TN value is 0, it may be interpreted that a corresponding joint TCI state is not indicated or activated. Configuring values 0 and 1 is not limited to the above configuration method. If there is one joint TCI state transferred via the MAC-CE structure of FIG. 16, the terminal may apply the joint TCI state indicated via the MAC-CE to UL transmission and DL reception beams. If there are two or more joint TCI states transferred via the MAC-CE structure, the terminal may identify that the joint TCI states indicated via the MAC-CE correspond to respective codepoints of the TCI state field of DCI format 1_1 or 1_2, and may activate the respective joint TCI states, and starting from a joint TCI state having a lowest index from among the indicated joint TCI states, the joint TCI states sequentially corresponding to codepoints with low indexes of the TCI state field of DCI format 1_1 or 1_2 may be activated in order.

Figure 17:
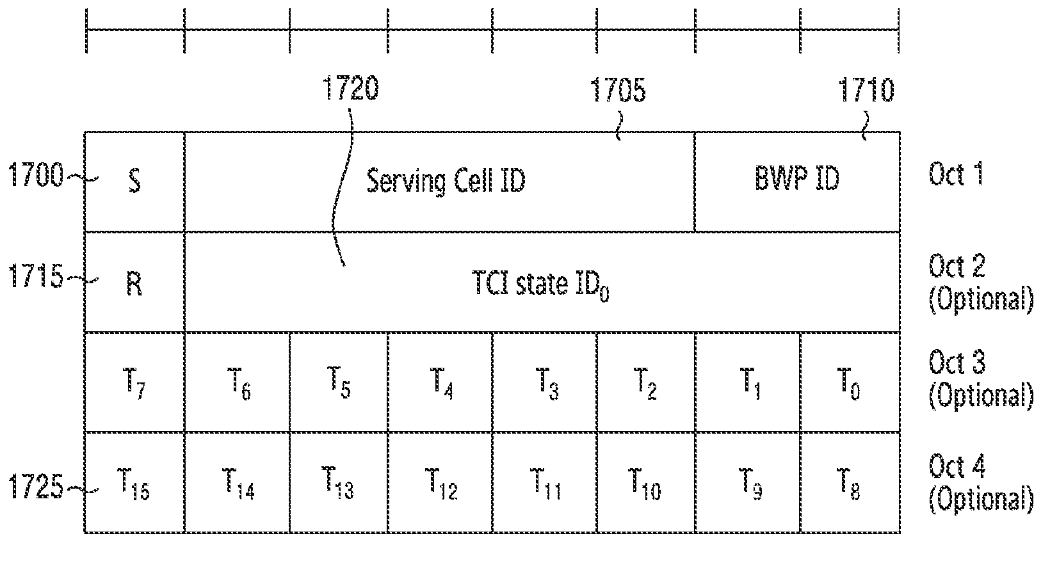
FIG. 17 illustrates a MAC-CE structure for activation and indication of a joint TCI state in a wireless communication system according to an embodiment.

FIG. 17 illustrates a MAC-CE structure for activation and indication of a joint TCI state in a wireless communication system according to an embodiment.

Referring to FIG. 17, a serving cell ID field 1705 may indicate a serving cell ID, and a BWP ID field 1710 may indicate a BWP ID.

An S field 1700 may indicate the number of pieces of joint TCI state information included in a MAC-CE. If a value of the S field 1700 is 1, the MAC-CE may indicate one joint TCI state and may include only up to a second octet, and the joint TCI state may be indicated to a terminal via a TCI state $ID_0$ field 1720. For example, if the value of the S field 1700 is 0, the MAC-CE may include two or more pieces of joint TCI state information, respective codepoints of the TCI state field of DCI format 1_1 or 1_2 may activate the respective joint TCI states, up to 8 joint TCI states may be activated, no second octet may exist, and there may be a first octet and a third octet to an (N+1)th octet on the MAC-CE structure of FIG. 17. Respective fields present in the third octet to the (N+1)th octet are bitmaps indicating respective joint TCI states configured via higher-layer signaling. For example, Tis 1725 may indicate whether a 16th joint TCI state configured via higher-layer signaling is indicated. An R field 1715 may be a 1-bit reserve field that does not include indication information.

If there is one joint TCI state transferred via the MAC-CE structure of FIG. 17, the terminal may apply the joint TCI state indicated via the MAC-CE to UL transmission and DL reception beams. If there are two or more joint TCI states transferred via the MAC-CE structure of FIG. 17, the terminal may identify that respective joint TCI states indicated via the MAC-CE correspond to respective codepoints of the TCI state field of DCI format 1_1 or 1_2, and may activate the respective joint TCI states. Starting from a joint TCI state having a lowest index from among the indicated joint TCI states, the joint TCI states sequentially corresponding to codepoints with low indexes of the TCI state field of DCI format 1_1 or 1_2 may be activated in order.

Figure 18:
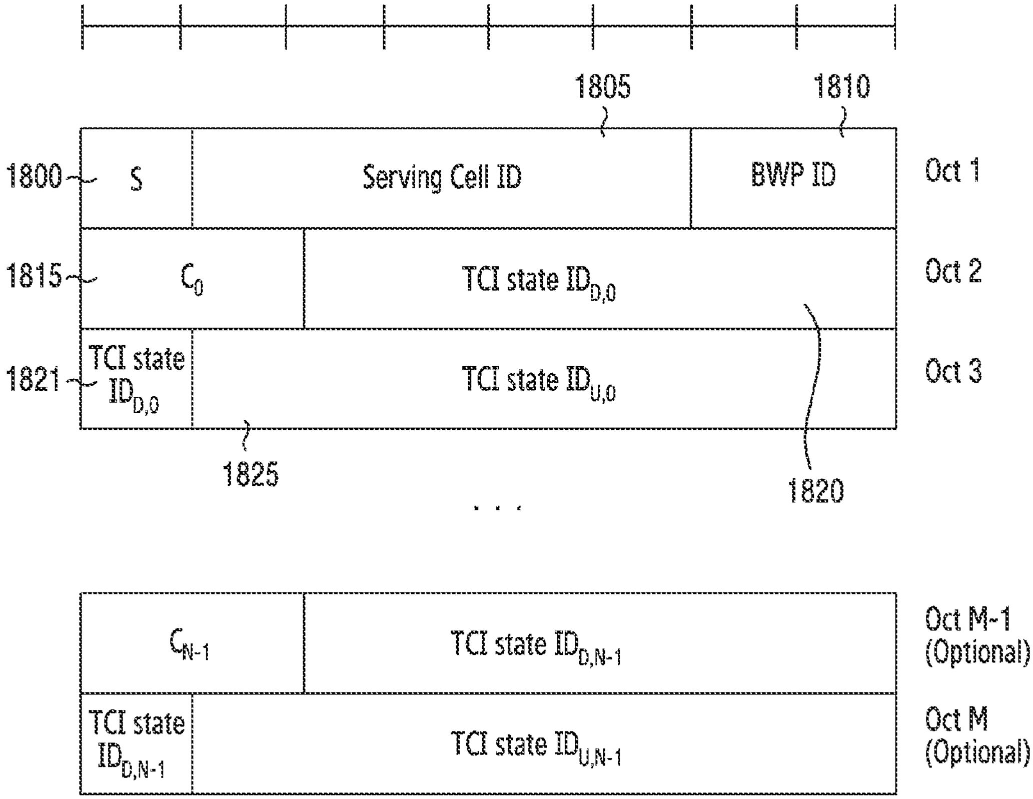
FIG. 18 illustrates a MAC-CE structure for activation and indication of a separate TCI state in a wireless communication system according to an embodiment.

FIG. 18 illustrates a MAC-CE structure for activation and indication of a separate TCI state in a wireless communication system according to an embodiment.

Referring to FIG. 18, a serving cell ID field 1805 may indicate a serving cell ID, and a BWP ID field 1810 may indicate a BWP ID.

An S field 1800 may indicate the number of pieces of separate TCI state set information included in a MAC-CE. If a value of the S field 1800 is 1, the MAC-CE may indicate one separate TCI state set and may include only up to a third octet. If the value of the S field 1800 is 0, the MAC-CE may include two or more pieces of separate TCI state set information, respective codepoints of the TCI state field of DCI format 1_1 or 1_2 may activate respective separate TCI state sets, and up to 8 separate TCI state sets may be activated. A $C_0$ field 1815 may indicate which separate TCI states are included in an indicated separate TCI state set. For example, for a value of the $C_0$ field, a value of "00" may indicate reserve, a value of "01" may indicate one DL TCI state, a value of "10" may indicate one UL TCI state, and a value of "11" may indicate one DL TCI state and one UL TCI state. However, this is merely an example, and the interpretation of the $C_0$ field 1815 is not limited thereto. A TCI state $ID_{D,0}$ field 1820 and a TCI state $ID_{U,0}$ field 1825 may refer to a DL TCI state and a UL TCI state which may be included in a zeroth separate TCI state set so as to be indicated, respectively. If the value of the $C_0$ field is "01", the TCI state $ID_{D,0}$ field 1820 may indicate a DL TCI state, and the TCI state $ID_{U,0}$ field 1825 may be disregarded. If the $C_0$ field value is "10", the TCI state $ID_{D,0}$ field 1820 may be disregarded, and the TCI state $ID_{U,0}$ field 1825 may indicate a UL TCI state. If the $C_0$ field value is "11", the TCI state $ID_{D,0}$ field 1820 may indicate a DL TCI state, and the TCI state $ID_{U,0}$ field 1825 may indicate a UL TCI state.

FIG. 18 illustrates an example of a MAC-CE when a UL TCI state among separate TCI states uses the same higher-layer signaling structure as that for a joint TCI state and for a DL TCI state among the separate TCI states.

In FIG. 18, lengths of the TCI state $ID_{D,0}$ field 1820 and the TCI state $ID_{U,0}$ field 1825 may be 7 bits to express up to 128 TCI states. Therefore, in order to use 7 bits for the TCI state $ID_{D,0}$ field 1820, 6 bits 1820 may be assigned to a second octet and 1 bit 1821 may be assigned to a third octet. In FIG. 18, a UL TCI state among the separate TCI states uses a higher-layer signaling structure different from that for a joint TCI state and for a DL TCI state among the separate TCI states. Accordingly, since the UL TCI state needs 6 bits to enable expression of up to 64 UL TCI states, a first bit of the TCI state $ID_{U,0}$ field 1825 may be fixed to be 0 or 1, and bits expressing an actual UL TCI state may correspond to only a total of 6 bits from a second bit to a seventh bit.

Figure 19:
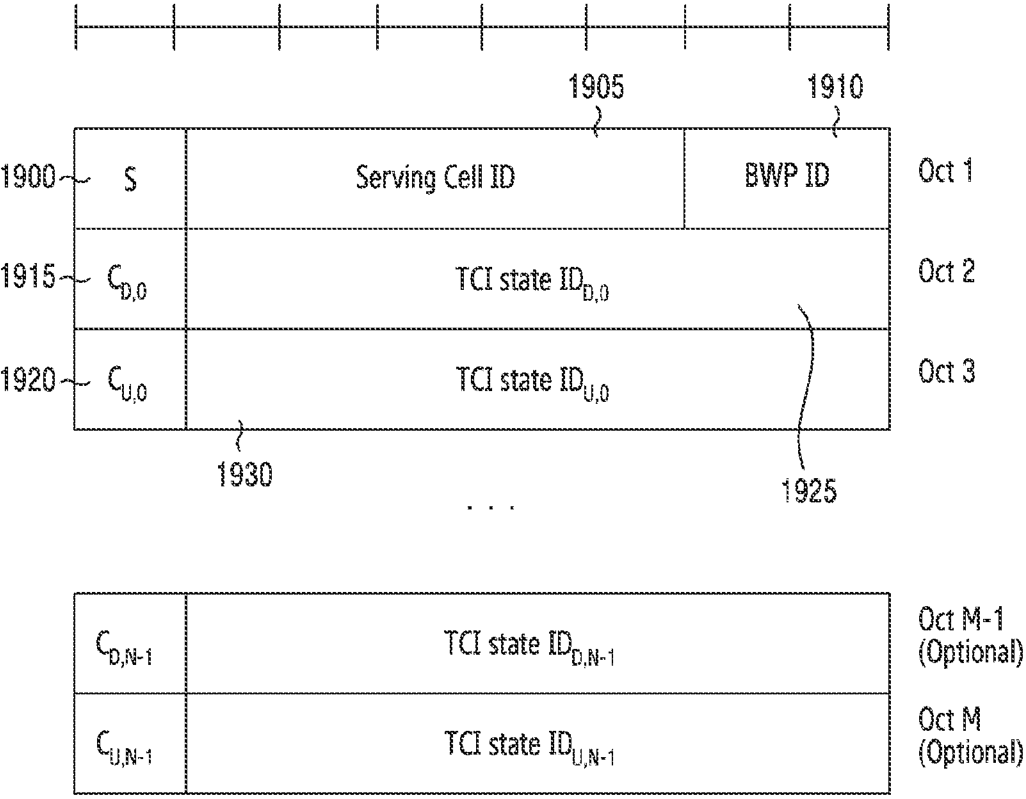
FIG. 19 illustrates a MAC-CE structure for activation and indication of a separate TCI state in a wireless communication system according to an embodiment.

FIG. 19 illustrates a MAC-CE structure for activation and indication of a separate TCI state in a wireless communication system according to an embodiment.

Referring to FIG. 19, a serving cell ID field 1905 may indicate a serving cell ID, and a BWP ID field 1910 may indicate a BWP ID. An S field 1900 may indicate the number of pieces of separate TCI state set information included in a MAC-CE. If a value of the S field 1900 is 1, the MAC-CE may indicate one separate TCI state set and may include only up to a third octet. If the value of the S field 1900 is 0, the MAC-CE may include two or more pieces of separate TCI state set information, respective codepoints of the TCI state field of DCI format 1_1 or 1_2 may correspond to respective separate TCI state sets, causing activation of the respective separate TCI state sets, and up to 8 separate TCI state sets may be activated. A $C_{D,0}$ field 1915 may indicate whether an indicated separate TCI state set includes a DL TCI state, wherein if a value of the $C_{D,0}$ field 1915 is 1, a DL TCI state may be included and the DL TCI state may be indicated via a TCI state $ID_{D,0}$ field 1925, and if the value of the $C_{D,0}$ field 1915 is 0, no DL TCI state is included and the TCI state $ID_{D,0}$ field 1925 may be disregarded. Similarly, a $C_{U,0}$ field 1920 may indicate whether an indicated separate TCI state set includes a UL TCI state, wherein if a value of the $C_{U,0}$ field 1920 is 1, a UL TCI state may be included and the UL TCI state may be indicated via a TCI state $ID_{U,0}$ field 1930, and if the value of the $C_{U,0}$ field 1920 is 0, no UL TCI state is included and the TCI state $ID_{U,0}$ field 1930 may be disregarded.

FIG. 19 illustrates an example of a MAC-CE when a UL TCI state among separate TCI states uses the same higher-layer signaling structure as that for a joint TCI state and for a DL TCI state among the separate TCI states.

In FIG. 19, lengths of the TCI state $ID_{D,0}$ field 1925 and the TCI state $ID_{U,0}$ field 1930 may be 7 bits to express up to 128 TCI states. Described is a MAC-CE when a UL TCI state among separate TCI states uses a higher-layer signaling structure different from that for a joint TCI state and for a DL TCI state among the separate TCI states. Accordingly, since the UL TCI state needs 6 bits to enable expression of up to 64 UL TCI states, a first bit of the TCI state $ID_{D,0}$ field 1925 may be fixed to be 0 or 1, and bits expressing an actual UL TCI state may correspond to only a total of 6 bits from a second bit to a seventh bit.

Figure 20:
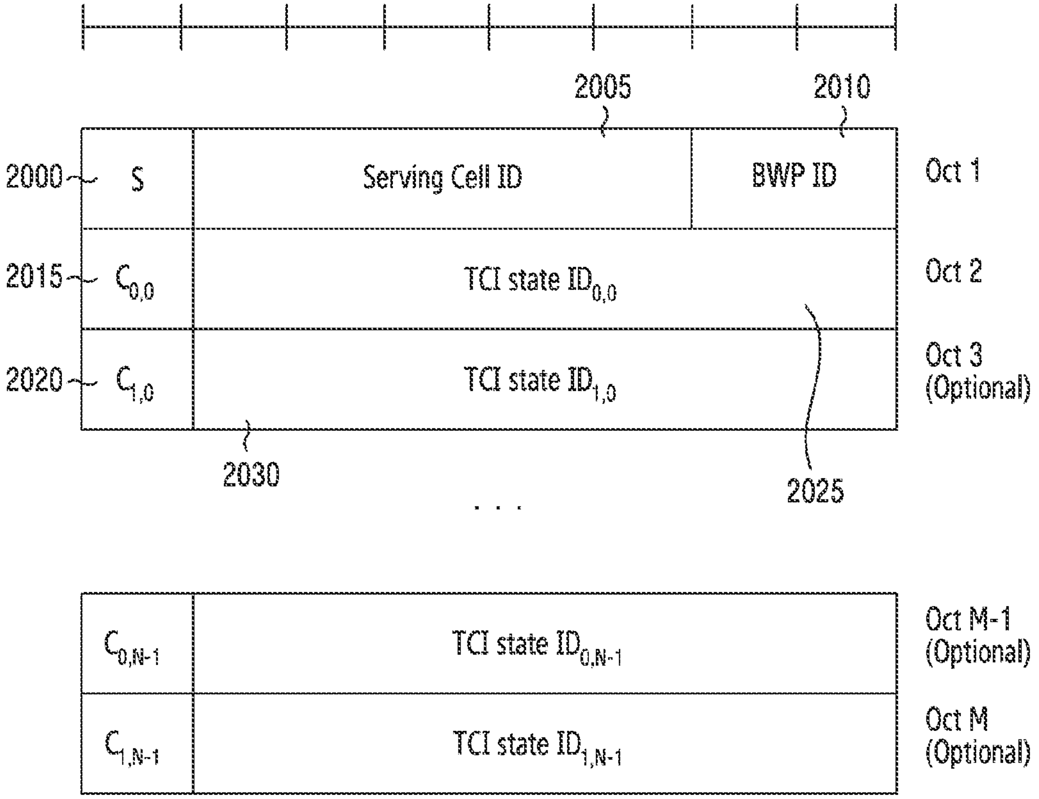
FIG. 20 illustrates a MAC-CE structure for activation and indication of a separate TCI state in a wireless communication system according to an embodiment.

FIG. 20 illustrates a MAC-CE structure for activation and indication of a separate TCI state in a wireless communication system according to an embodiment.

Referring to FIG. 20, a serving cell ID field 2005 may indicate a serving cell ID, and a BWP ID field 2010 may indicate a BWP ID. An S field 2000 may indicate the number of pieces of separate TCI state set information included in a MAC-CE. If a value of the S field 2000 is 1, the MAC-CE may indicate one separate TCI state set and may include only up to a third octet. The MAC-CE structure of FIG. 20 may indicate one separate TCI state set by using two octets, if the separate TCI state set includes a DL TCI state, the first octet of the two octets may indicate the DL TCI state, and the second octet may indicate a UL TCI state. This order may be changed.

For example, if the value of the S field 2000 is 0, the MAC-CE may include two or more pieces of separate TCI state set information, respective codepoints of the TCI state field of DCI format 1_1 or 1_2 may activate respective separate TCI state sets, and up to 8 separate TCI state sets may be activated. A $C_{0,0}$ field 2015 may have a meaning for distinguishing whether a TCI state indicated by a TCI state $ID_{0,0}$ field 2025 is a DL TCI state or a UL TCI state. A $C_{0,0}$ field 2015 value of 1 may indicate a DL TCI state, the DL TCI state may be indicated via the TCI state $ID_{0,0}$ field 2025, and a third octet may exist. In this case, if a value of a $C_{1,0}$ field 2020 is 1, a UL TCI state may be indicated via a TCI state $ID_{0,0}$ field 2030, and if the value of the $C_{1,0}$ field 2020 is 0, the TCI state $ID_{1,0}$ field 2030 may be disregarded. If the value of the $C_{0,0}$ field 2015 is 0, a UL TCI state may be indicated via the TCI state $ID_{0,0}$ field 2025, and a third octet may not exist. This interpretation of the $C_{0,0}$ field 2015 field and the $C_{1,0}$ field 2020 is merely an example, and an opposite arrangement of the $C_{0,0}$ field 2015 values of 0 and 1, or the DL TCI state and UL TCI state values is not excluded.

FIG. 20 illustrates an example of a MAC-CE when a UL TCI state among separate TCI states uses the same higher-layer signaling structure as that for a joint TCI state and for a DL TCI state among the separate TCI states.

In FIG. 20, the lengths of the TCI state $ID_{0,0}$ field 2025 and the TCI state $ID_{U,0}$ field 2030 may be 7 bits to express up to 120 TCI states. Alternatively, FIG. 20 may illustrate an example of a MAC-CE when a UL TCI state among separate TCI states uses a higher-layer signaling structure different from that for a joint TCI state and for a DL TCI state among the separate TCI states. Accordingly, the TCI state $ID_{0,0}$ field 2025 may be 7 bits enabling expression of both 6 bits to express up to 64 possible UL TCI states and 7 bits to express up to 120 possible DL TCI states. If the value of the $C_{1,0}$ field 2015 is 1 and thus the TCI state $ID_{0,0}$ field 2025 indicates a UL TCI state, a first bit of the TCI state $ID_{0,0}$ field 2025 may be fixed to be 0 or 1, and bits expressing an actual UL TCI state may correspond to only a total of 6 bits from a second bit to a seventh bit.

Figure 21:
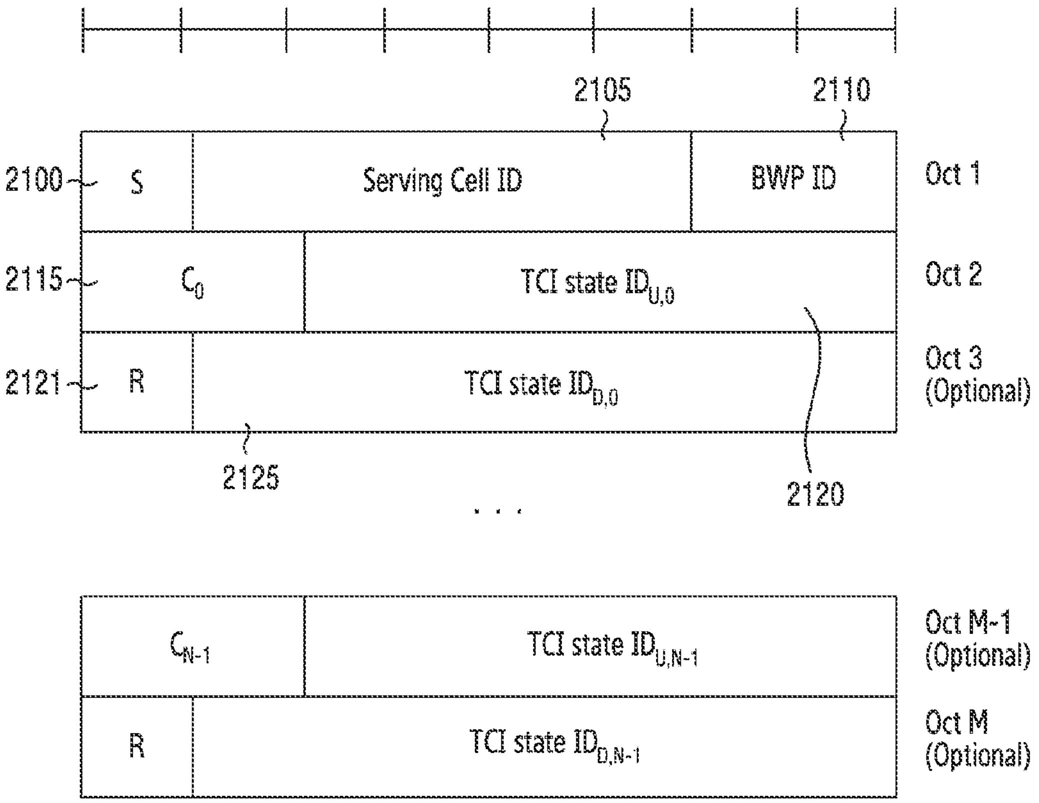
FIG. 21 illustrates a MAC-CE structure for activation and indication of a separate TCI state in a wireless communication system according to an embodiment.

FIG. 21 illustrates a MAC-CE structure for activation and indication of a separate TCI state in a wireless communication system according to an embodiment.

Referring to FIG. 21, a serving cell ID field 2105 may indicate a serving cell ID, and a BWP ID field 2110 may indicate each of a serving cell ID and a BWP ID. An S field 2100 may indicate the number of pieces of separate TCI state set information included in a MAC-CE. If a value of the S field 2100 is 1, the MAC-CE may indicate one separate TCI state set and may include only up to a third octet.

For example, if the value of the S field 2100 is 0, the MAC-CE may include two or more pieces of separate TCI state set information, respective codepoints of the TCI state field of DCI format 1_1 or 1_2 may activate respective separate TCI state sets, and up to 8 separate TCI state sets may be activated. A $C_0$ field 2115 may indicate which separate TCI states are included in an indicated separate TCI state set, and for a value of the $C_0$ field 2115, a value of "00" may indicate reserve, a value of "01" may indicate one DL TCI state, a value of "10" may indicate one UL TCI state, and a value of "11" may indicate one DL TCI state and one UL TCI state. However, this is merely an example, and the interpretation of the $C_0$ field 2115 is not limited thereto. A TCI state $ID_{U,0}$ field 2120 and a TCI state $ID_{D,0}$ field 2125 may refer to a UL TCI state and a DL TCI state which may be included in a zeroth separate TCI state set so as to be indicated, respectively. If the value of the $C_0$ field is "01", the TCI state $ID_{D,0}$ field 2125 may indicate a DL TCI state, and the TCI state $ID_{U,0}$ field 2120 may be disregarded. If the value of the $C_0$ field 2115 is "10", a third octet may be disregarded, and the TCI state $ID_{U,0}$ field 2120 may indicate a UL TCI state. If the value of the $C_0$ field 2115 is "11", the TCI state $ID_{D,0}$ field 2125 may indicate a DL TCI state, and the TCI state $ID_{U,0}$ field 2120 may indicate a UL TCI state. An R field 2121 may be a 1-bit reserve field that does not include indication information.

FIG. 21 illustrates an example of a MAC-CE used when a UL TCI state among separate TCI states uses a higher-layer signaling structure different from that for a joint TCI state and for a DL TCI state among the separate TCI states.

In FIG. 21, 7 bits may be used for a length of the TCI state $ID_{D,0}$ field 2125 in order to express up to 128 TCI states, and 6 bits may be used for a length of the TCI state $ID_{U,0}$ field 2120 in order to express up to 64 TCI states.

Figure 22:
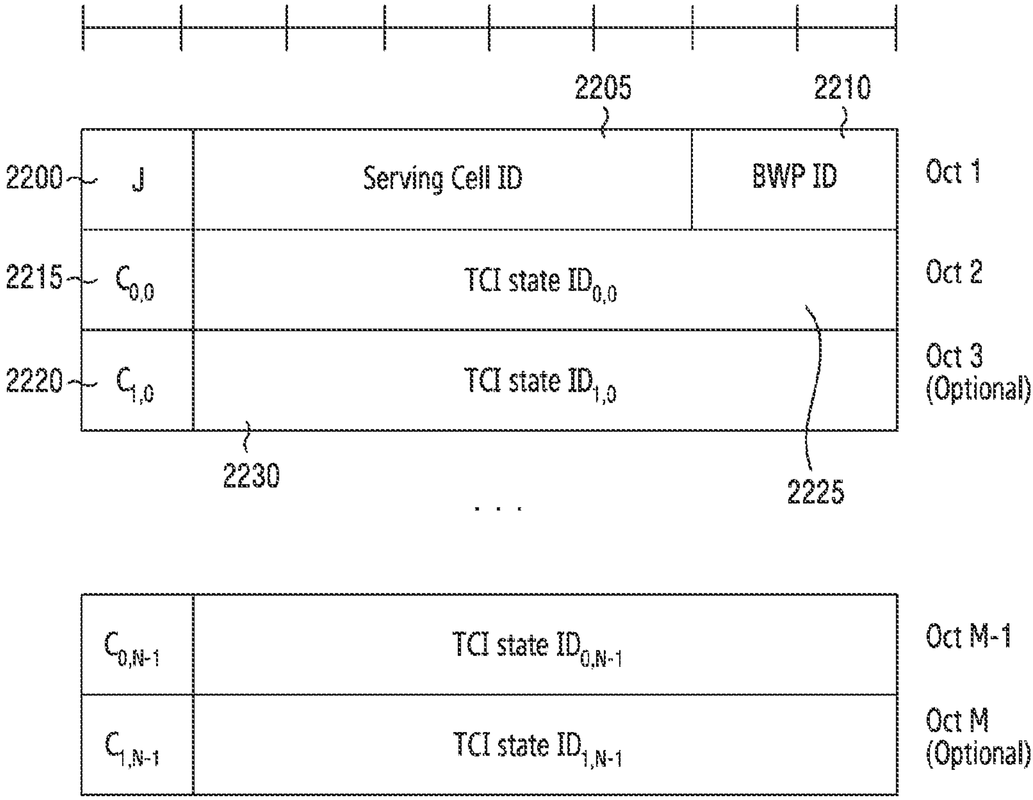
FIG. 22 illustrates a MAC-CE structure for activation and indication of a joint TCI state and a separate TCI state in a wireless communication system according to an embodiment.

FIG. 22 illustrates a MAC-CE structure for activation and indication of a joint TCI state and a separate TCI state in a wireless communication system according to an embodiment.

Referring to FIG. 22, a serving cell ID field 2205 may indicate a serving cell identifier (ID), and a BWP ID field 2210 may indicate a BWP ID. A J field 2200 may indicate whether a TCI state indicated via a MAC CE is a joint TCI state or a separate TCI state set. For example, if a value of the J field 2200 is 1, the MAC-CE may indicate a joint TCI state, and if the value of the J field 2200 is 0, the MAC-CE may indicate a separate TCI state set. The interpretation of the J field 2200 as described above is merely an example, and a different interpretation is not excluded.

If the MAC-CE indicates a joint TCI state, all odd-numbered octets (a third octet, a fifth octet, . . . ) other than a first octet may be disregarded. A $C_{0,0}$ field 2215 may indicate whether the MAC-CE indicates one joint TCI state or includes two or more pieces of TCI state information, and whether respective codepoints of the TCI state field of DCI format 1_1 or 1_2 activate respective TCI states. If a value of the $C_{0,0}$ field 2215 is 1, the MAC-CE may indicate one joint TCI state, and a third octet and more may not exist. If the value of the $C_{0,0}$ field 2215 is 0, two or more joint TCI states indicated by the MAC-CE may correspond to respective codepoints of the TCI state field of DCI format 1_1 or 1_2, and may be activated. The TCI state $ID_{0,0}$ may refer to a first indicated joint TCI state.

If the MAC-CE indicates a separate TCI state set, the $C_{0,0}$ field 2215 may have a meaning of distinguishing whether a TCI state indicated by a TCI state $ID_{0,0}$ field 2225 is a DL TCI state or a UL TCI state, a value of 1 may indicate a DL TCI state, the DL TCI state may be indicated via the TCI state $ID_{0,0}$ field 2225, and a third octet may exist. In this case, if a value of a $C_{1,0}$ field 2220 is 1, a UL TCI state may be indicated via a TCI state $ID_{1,0}$ field 2230, and if the value of the $C_{1,0}$ field 2220 is 0, the TCI state $ID_{1,0}$ field 2230 may be disregarded. If the value of the $C_{0,0}$ field 2215 is 0, a UL TCI state may be indicated via the TCI state $ID_{0,0}$ field 2225, and a third octet may not exist.

FIG. 22 illustrates a MAC-CE used when a UL TCI state among separate TCI states uses the same higher-layer signaling structure as that for a joint TCI state and for a DL TCI state among the separate TCI states. Accordingly, lengths of the TCI state $ID_{0,0}$ field 2225 and the TCI state $ID_{1,0}$ field 2230 may be 7 bits to express up to 128 TCI states. In addition, FIG. 22 illustrates a MAC-CE used when a UL TCI state among separate TCI states uses a higher-layer signaling structure different from that for a joint TCI state and for a DL TCI state among the separate TCI states. Accordingly, the TCI state $ID_{0,0}$ field 2225 may use 7 bits enabling expression of both 6 bits to express up to 64 possible UL TCI states and 7 bits to express up to 128 possible DL TCI states. If the value of the $C_{0,0}$ field 2215 is 1 and thus the TCI state $ID_{0,0}$ field 2225 indicates a UL TCI state, a first bit of the TCI state $ID_{0,0}$ field 2225 may be fixed to be 0 or 1, and bits expressing an actual UL TCI state may correspond to a total of 6 bits from a second bit to a seventh bit.

Figure 23:
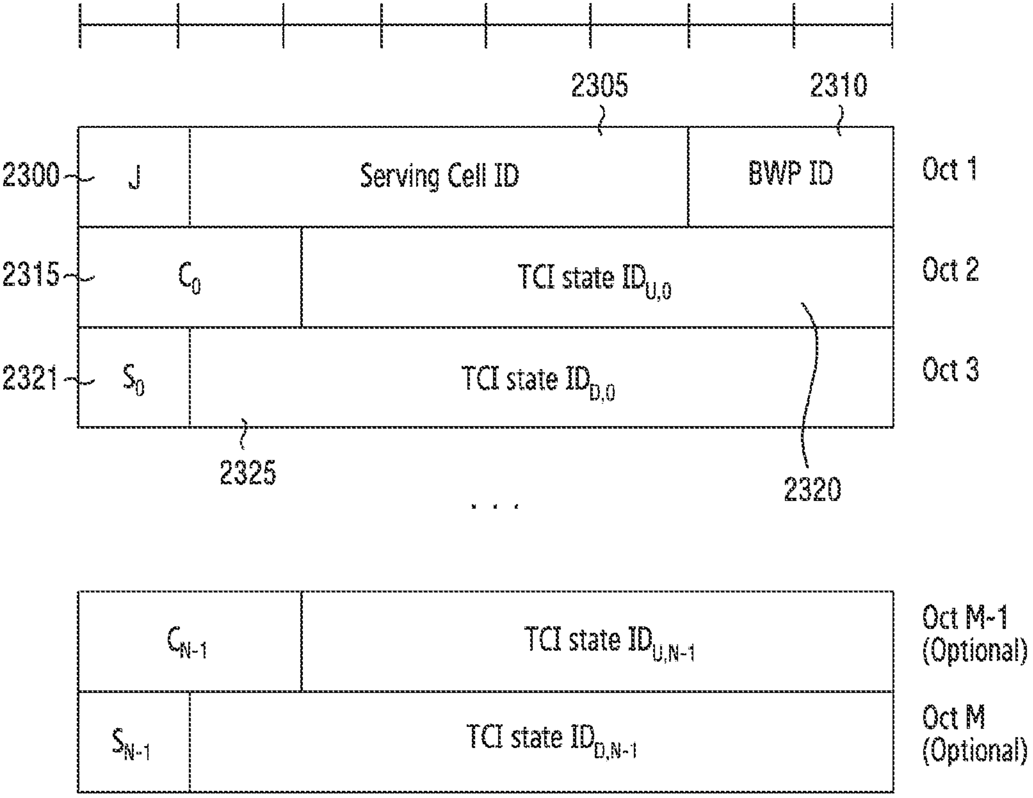
FIG. 23 illustrates a MAC-CE structure for activation and indication of a joint TCI state and a separate TCI state in a wireless communication system according to an embodiment.

FIG. 23 illustrates a MAC-CE structure for activation and indication of a joint TCI state and a separate TCI state in a wireless communication system according to an embodiment.

Referring to FIG. 23, a serving cell ID field 2305 and a BWP ID field 2310 may indicate a serving cell ID and a BWP ID, respectively. A J field 2300 may indicate whether a TCI state indicated via a MAC CE is a joint TCI state or a separate TCI state set. For example, if a value of the J field 2300 is 1, the MAC-CE may indicate a joint TCI state, and if the value of the J field is 0, the MAC-CE may indicate a separate TCI state set. The interpretation of the J field 2300 as described above is merely an example, and a different interpretation is not excluded.

If the MAC-CE indicates the joint TCI state, all even-numbered octets (a second octet, a fourth octet, . . . ) other than a first octet may be disregarded. An $S_0$ field 2321 may indicate whether the MAC-CE indicates one joint TCI state or whether two or more TCI states correspond to respective codepoints of the TCI state field of DCI format 1_1 or 1_2 and are activated. If a value of the $S_0$ field 2321 is 1, the MAC-CE may indicate one joint TCI state, and a third octet and more may not exist. If the value of the $S_0$ field 2321 is 0, the MAC-CE may include two or more pieces of joint TCI state information, and respective codepoints of the TCI state field of DCI format 1_1 or 1_2 may activate respective joint TCI states. The TCI state $ID_{D,0}$ may refer to a first indicated joint TCI state.

If the MAC-CE indicates a separate TCI state set, a $C_0$ field 2315 may indicate which separate TCI states are included in an indicated separate TCI state set. For a value of the $C_0$ field 2315, a value of “00” may indicate reserve, a value of “01” may indicate one DL TCI state, a value of “10” may indicate one UL TCI state, and a value of “11” may indicate one DL TCI state and one UL TCI state. These values are merely examples and the disclosure is not limited by these examples. A TCI state $ID_{U,0}$ field 2320 and a TCI state $ID_{D,0}$ field 2325 may refer to a UL TCI state and a DL TCI state which may be included in a zeroth separate TCI state set so as to be indicated, respectively. If the value of the $C_0$ field 2315 is “01”, the TCI state $ID_{D,0}$ field 2325 may indicate a DL TCI state, and the TCI state $ID_{U,0}$ field 2320 may be disregarded; if the value of the $C_0$ field 2315 is “10”, the TCI state $ID_{U,0}$ field 2320 may indicate a UL TCI state; and if the value of the $C_0$ field 2315 is “11”, the TCI state $ID_{D,0}$ field 2325 may indicate a DL TCI state. The TCI state $ID_{U,0}$ field 2320 may refer to a UL TCI state.

If the value of the $S_0$ field 2321 is 1, the MAC-CE may indicate one separate TCI state set, and a fourth octet and more may not exist. If the value of the $S_0$ field 2321 is 0, the MAC-CE may include two or more pieces of separate TCI state set information, respective codepoints of the TCI state field of DCI format 1_1 or 1_2 may activate respective separate TCI state sets, and up to 8 separate TCI state sets may be activated. For example, if the value of the $S_0$ field 2321 is 0, if values of $C_1, \ldots, C_{N-1}$ fields are “10”, this indicates that only UL TCI states are indicated, so that a fifth octet, a seventh octet, . . . , an M-th octet may be disregarded. Alternatively, an Sn field may indicate whether an octet for a subsequent separate TCI state set exists. For example, if a value of the Sn field is 1, a subsequent octet may not exist, and if the value of the Sn field is 0, subsequent octets including $C_{n+1}$ and TCI state $ID_{U,n+1}$ may exist. These Sn field values are merely examples, and the disclosure is not limited thereto.

FIG. 23 illustrates an example of a MAC-CE used when a UL TCI state among separate TCI states uses a higher-layer signaling structure different from that for a joint TCI state and for a DL TCI state among the separate TCI states.

In FIG. 23, a length of the TCI state $ID_{D,0}$ field 2325 may be 7 bits to express up to 128 TCI states, and a length of the TCI state $ID_{U,0}$ field 2320 may be 6 bits to express up to 64 TCI states.

If the terminal receives a transmission/reception beam-related indication by using a joint TCI state scheme or a separate TCI state scheme via higher-layer signaling, the terminal may receive a PDSCH including a MAC-CE indicating the joint TCI state or the separate TCI state from the base station so as to perform application to a transmission/reception beam. If there are two or more joint TCI states or separate TCI state sets included in the MAC-CE, from 3 ms after transmission of a PUCCH including HARQ-ACK information indicating the success or failure in reception of a corresponding PDSCH, the terminal may identify that multiple joint TCI states or separate TCI state sets indicated by the MAC-CE correspond to respective codepoints of the TCI state field of DCI format 1_1 or 1_2, and may activate the indicated joint TCI states or separate TCI state sets. Thereafter, the terminal may receive DCI format 1_1 or 1_2 and apply, to UL transmission and DL reception beams, one joint TCI state or separate TCI state set indicated by a TCI state field in corresponding DCI. In this case, DCI format 1_1 or 1_2 may include or not include DL data channel scheduling information (with or without DL assignment).

Figure 24:
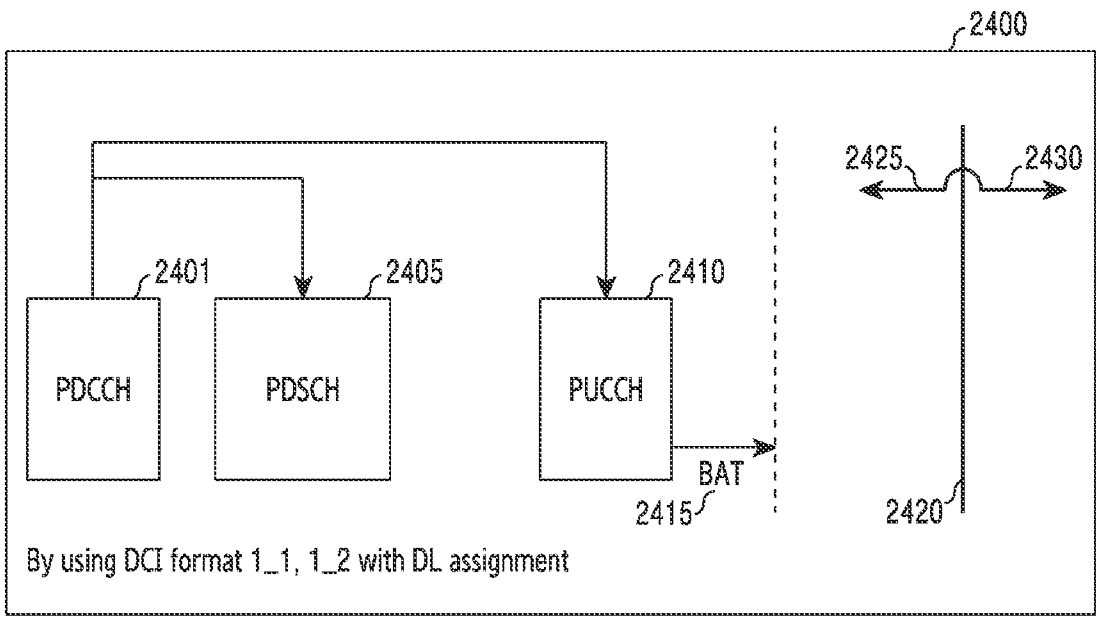
FIG. 24 illustrates a beam application time (BAT) that may be considered when a unified TCI scheme is used in a wireless communication system according to an embodiment.
Figure 24:
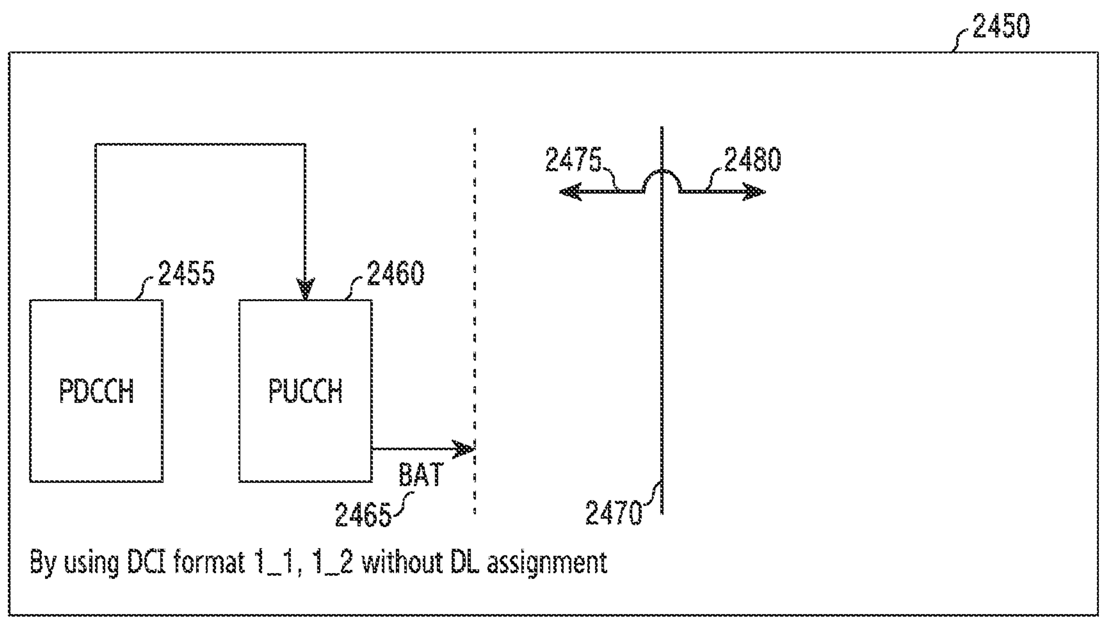

FIG. 24 illustrates a BAT that may be considered when a unified TCI scheme is used in a wireless communication system according to an embodiment.

Referring to FIG. 24, a terminal may receive DCI format 1_1 or 1_2 which includes or does not include DL data channel scheduling information from a base station, and apply one joint TCI state or separate TCI state set indicated by the TCI state field in DCI to UL transmission and DL reception beams.

DCI format 1_1 or 1_2 with DL assignment 2400: If the terminal receives PDCCH 2401 DCI format 1_1 or 1_2 including DL data channel scheduling information from the base station and indicates one joint TCI state or separate TCI state set based on a unified TCI scheme, the terminal may receive 2405 a PDSCH scheduled based on the received DCI, and transmit 2410, to the base station, a PUCCH including HARQ-ACK indicating the success or failure in reception of the PDSCH and the DCI. In this case, the HARQ-ACK may include the success or failure in reception of both the DCI and the PDSCH, the terminal may transmit NACK if at least one of the DCI and the PDSCH cannot be received, and the terminal may transmit ACK if both have been successfully received.

DCI format 1_1 or 1_2 without DL assignment 2450: If the terminal receives 2455 DCI format 1_1 or 1_2 including no DL data channel scheduling information from the base station and indicates one joint TCI state or separate TCI state set based on the unified TCI scheme, the terminal may assume the following for the DCI.

CRC scrambled using CS-RNTI is included.

Values of all bits assigned to all fields used as a RV field are 1.

Values of all bits assigned to all fields used as a MCS field are 1.

Values of all bits assigned to all fields used as an NDI field are 0.

Values of all bits assigned to an FDRA field are 0 for FDRA type 0, values of all bits assigned to the FDRA field are 1 for FDRA type 1, and if an FDRA scheme is dynamicSwitch, values of all bits assigned to the FDRA field are 0.

The terminal may transmit 2460, to the base station, a PUCCH including HARQ-ACK indicating the success or failure in reception of DCI format 1_1 or 1_2.

With respect to both DCI format 1_1 or 1_2 with DL assignment 2400 and without DL assignment 2450, if a new TCI state indicated via the DCI 2401 or 2455 is the same as a TCI state which has already been indicated and applied to UL transmission and DL reception beams, the terminal may maintain the previously applied TCI state. If the new TCI state is different from the previously indicated TCI state, the terminal may determine that a time point of applying the joint TCI state or separate TCI state set, which may be indicated from the TCI state field included in the DCI, is applied (interval of 2430 or 2480) from a start point 2420 or 2470 of a first slot after a BAT 2415 or 2465 subsequent to PUCCH transmission, and may use the previously indicated TCI-state until an interval 2425 or 2475 before the start point 2420 or 2470 of the slot.

With respect to both DCI format 1_1 or 1_2 with DL assignment 2400 and without DL assignment 2450, the BAT is a specific number of OFDM symbols and may be configured via higher-layer signaling based on UE capability report information. The BAT and a numerology for the first slot after the BAT may be determined based on a smallest numerology among all cells to which the joint TCI state or separate TCI state set indicated via the DCI is applied.

The terminal may apply one joint TCI state indicated via the MAC-CE or DCI to reception of CORESETs linked to all UE-specific search spaces, reception of a PDSCH scheduled via a PDCCH transmitted from a CORESET, transmission of a PUSCH, and transmission of all PUCCH resources.

If one separate TCI state set indicated via the MAC-CE or DCI includes one DL TCI state, the terminal may apply the one separate TCI state set to reception of CORESETs linked to all UE-specific search spaces and reception of a PDSCH scheduled via a PDCCH transmitted from a CORESET, and may apply the same to all PUSCH and PUCCH resources, based on a previously indicated UL TCI state.

If one separate TCI state set indicated via the MAC-CE or DCI includes one UL TCI state, the terminal may apply the separate TCI state set to all PUSCH and PUCCH resources, and based on the previously indicated DL TCI state, the terminal may apply the separate TCI state set to reception of CORESETs linked to all UE-specific search spaces and reception of a PDSCH scheduled via a PDCCH transmitted from a CORESET.

If one separate TCI state set indicated via the MAC-CE or DCI includes one DL TCI state and one UL TCI state, the terminal may apply the DL TCI state to reception of CORESETs linked to UE-specific search spaces and reception of a PDSCH scheduled via a PDCCH transmitted from a CORESET, and may apply the UL TCI state to all PUSCH and PUCCH resources.

In the examples of the MAC CE in FIG. 15 to FIG. 23, it is possible that one or more elements are coupled to each other.

In determining whether to apply cooperative communication, it is possible for a terminal to use various methods, in which a PDCCH(s) assigning a PDSCH to which the cooperative communication is applied has a specific format, a PDCCH(s) assigning a PDSCH to which the cooperative communication is applied includes a specific indicator indicating whether the cooperative communication is applied, a PDCCH(s) assigning a PDSCH to which the cooperative communication is applied is scrambled by a specific RNTI, applying of the cooperative communication in a specific section indicated by a higher layer is assumed, or the like. Hereinafter, for the convenience of description, a case in which a terminal receives a PDSCH to which cooperative communication has been applied based on conditions similar to the above will be referred to as an NC-JT case.

First Embodiment: Multi-TCI State Indication and Activation Method Based on Unified TCI Scheme A multi-TCI state indication and activation method may refer to when the number of indicated joint TCI states is extended to two or more and a case in which each of a DL TCI state and a UL TCI state included in one separate TCI state set is expanded to two or more. If one separate TCI state set can include up to two DL TCI states and up to two UL TCI states, a total of 8 combinations of DL TCI states and UL TCI states that one separate TCI state set can have may be possible ({DL,UL}={0,1}, {0,2}, {1,0}, {1,1}, {1,2}, {2,0}, {2,1}, {2,2}, where numbers indicate the number of TCI states).

If the terminal is indicated with multiple TCI states based on the MAC-CE by the base station, the terminal may receive two or more joint TCI states or one separate TCI state set from the base station via the MAC-CE. The base station may schedule reception of a PDSCH including the MAC-CE for the terminal via a PDCCH, and from 3 ms after transmission of a PUCCH including HARQ-ACK information indicating the success or failure of reception of the PDSCH including the MAC-CE, the terminal may determine a UL transmission beam or transmission filter and a DL reception beam or reception filter, based on the indicated two or more joint TCI states or one separate TCI state set.

If the terminal is indicated with multiple TCI states based on DCI format 1_1 or 1_2 from the base station, respective codepoints of one TCI state field in DCI format 1_1 or 1_2 may indicate two or more joint TCI states or two or more separate TCI state sets. In this case, the terminal may receive the MAC-CE from the base station, and activate two or more joint TCI states or two or more separate TCI state sets corresponding to the respective codepoints of one TCI state field in DCI format 1_1 or 1_2. The base station may schedule reception of a PDSCH including the MAC-CE for the terminal via a PDCCH, and the terminal may activate TCI state information included in the MAC-CE from 3 ms after transmission of a PUCCH including HARQ-ACK information indicating the success or failure of reception of the PDSCH including the MAC-CE.

If the terminal is indicated with multiple TCI states based on DCI format 1_1 or 1_2 from the base station, two or more TCI state fields may exist in DCI format 1_1 or 1_2, and one of two or more joint TCI states or two or more separate TCI state sets may be indicated based on the respective TCI state fields. In this case, the terminal may receive the MAC-CE from the base station and activate the joint TCI states or separate TCI state sets corresponding to respective codepoints of the two or more TCI state fields in DCI format 1_1 or 1_2. The base station may schedule reception of the PDSCH including the MAC-CE for the terminal via the PDCCH. The terminal may activate TCI state information included in the MAC-CE from 3 ms after transmission of the PUCCH including HARQ-ACK information indicating the success or failure of reception of the PDSCH including the MAC-CE. The terminal may be configured for the presence or absence of one or more additional TCI state fields via higher-layer signaling, the bit length of the additional TCI state fields may be the same as that of an existing TCI state field, or the length may be adjusted based on higher-layer signaling.

The terminal may receive a transmission/reception beam-related indication in a unified TCI scheme by using one scheme among the joint TCI state and the separate TCI state configured by the base station. The terminal may be configured for using one of the joint TCI state or the separate TCI state, by the base station via higher-layer signaling. With respect to the separate TCI state indication, the terminal may be configured via higher-layer signaling so that a bit length of the TCI state field in DCI format 1_1 or 1_2 is up to 4.

The MAC-CE used to activate or indicate the multiple joint TCI states and separate TCI states described above may exist for each of the joint and separate TCI state schemes, and a TCI state may be activated or indicated based on one of the joint TCI state scheme or the separate TCI state scheme by using one MAC-CE. For the MAC-CE used in the MAC-CE-based indication scheme and the MAC-CE-based activation scheme, one MAC-CE structure may be shared, and individual MAC-CE structures may be used.

Figure 25:
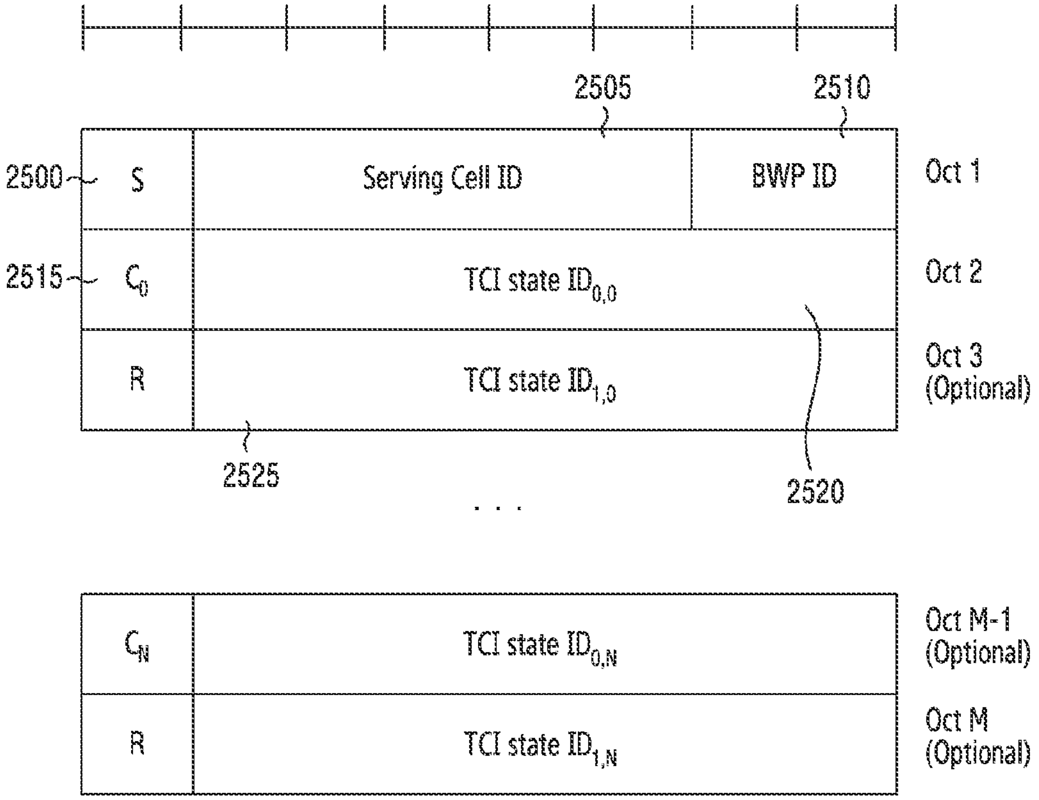
FIG. 25 illustrates a MAC-CE structure for activation and indication of multiple joint TCI states in a wireless communication system according to an embodiment.

FIG. 25 illustrates a MAC-CE structure for activation and indication of multiple joint TCI states in a wireless communication system according to an embodiment.

Referring to FIG. 25, a serving cell ID field 2505 may indicate a serving cell ID, and a BWP ID field 2510 may indicate a BWP ID. An R field may be a 1-bit reserve field that does not include indication information. An S field 2500 may indicate the number of pieces of joint TCI state set information included in a MAC-CE. If a value of the S field 2500 is 1, the MAC-CE may indicate one or two joint TCI states and may have a length of only up to a third octet. In this case, if a value of a $C_0$ field 2515 is 0, there may be no third octet, and one joint TCI state may be indicated via a TCI state $ID_{0,0}$ field 2520, and if the value of the $C_0$ field 2515 is 1, a third octet may exist, and two joint TCI states may be indicated via the TCI state $ID_{0,0}$ field 2520 and a TCI state $ID_{1,0}$ field 2525, respectively.

If the value of the S field 2500 is 0, the MAC-CE may activate one or two joint TCI states corresponding to respective codepoints of the TCI state field of DCI format 1_1 or 1_2, or may activate one joint TCI state corresponding to respective codepoints of two TCI state fields of DCI format 1_1 or 1_2, and joint TCI states for up to 8 codepoints may be activated. If one or two joint TCI states are activated for one codepoint of one TCI state field, a TCI state $ID_{0,Y}$ field and a TCI state $ID_{1,Y}$ field may refer to a first joint TCI state and a second joint TCI state among two joint TCI states activated at a Y-th codepoint of the TCI state field, respectively. If one joint TCI state is activated for one codepoint of two TCI state fields, the TCI state $ID_{0,Y}$ field and the TCI state IDLY field may refer to respective joint TCI states activated at the Y-th codepoint of the first and second TCI state fields, respectively.

Figure 26:
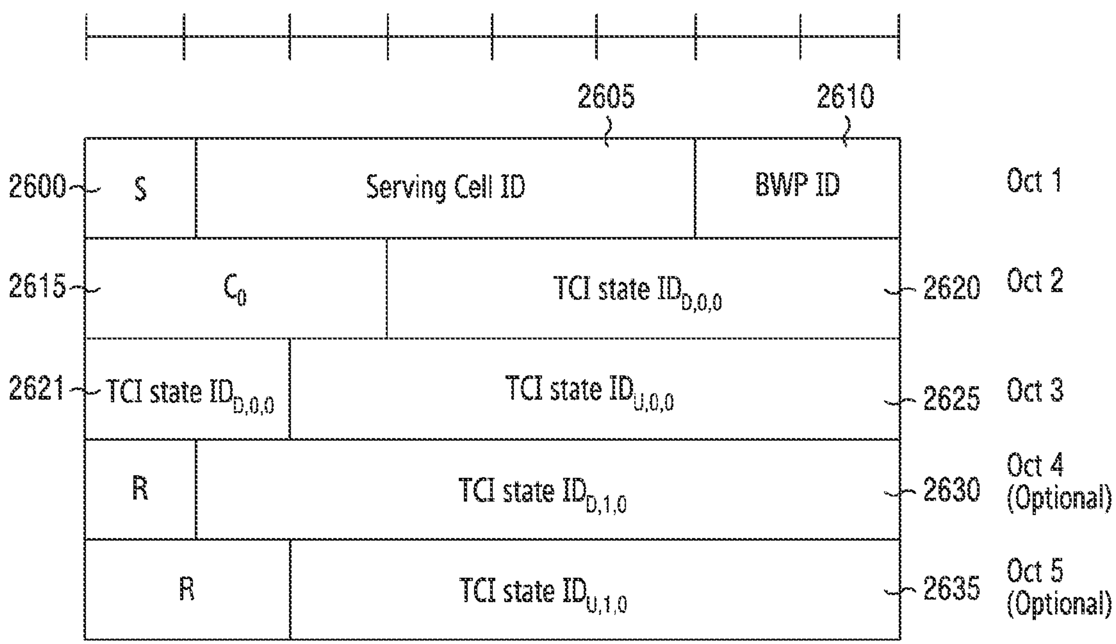
FIG. 26 illustrates a MAC-CE structure for activation and indication of multiple separate TCI states in a wireless communication system according to an embodiment.

FIG. 26 illustrates a MAC-CE structure for activation and indication of multiple separate TCI states in a wireless communication system according to an embodiment.

Referring to FIG. 26, a serving cell ID field 2605 may indicate a serving cell ID, and a BWP ID field 2610 may indicate a BWP ID. An R field may be a 1-bit reserve field that does not include indication information. An S field 2600 may indicate the number of pieces of separate TCI state set information included in a MAC-CE. If a value of the S field 2600 is 1, the MAC-CE may indicate one separate TCI state set and may include only up to a fifth octet. If the value of the S field 2600 is 0, the MAC-CE may include information on multiple separate TCI state sets, may activate one separate TCI state set corresponding to respective codepoints of the TCI state field of DCI format 1_1 or 1_2 or may activate one separate TCI state set corresponding to terminal codepoints of two TCI state fields of DCI format 1_1 or 1_2, and may activate separate TCI states for up to 8 or 16 codepoints via higher-layer signaling.

In the MAC-CE structure of FIG. 26, from a second octet, every 4 octets may correspond to one separate TCI state set. For example, a $C_0$ field 2615 may have a total of 8 values from "000" to "111", and as described above, the values may correspond to 8 number of cases that one separate TCI state set may have, respectively.

The $C_0$ field having a value of "000" may indicate that one separate TCI state set includes one UL TCI state, TCI state $ID_{D,0,0}$ fields 2620 and 2621 may be disregarded, and a TCI state $ID_{U,0,0}$ field 2625 may include one piece of UL TCI state information. In addition, fourth and fifth octets may be disregarded.

The $C_0$ field having a value of "001" may indicate that one separate TCI state set includes two UL TCI states, the TCI state $ID_{D,0,0}$ fields 2620 and 2621 may be disregarded, and the TCI state $ID_{U,0,0}$ field 2625 may include first UL TCI state information among the two UL TCI states. The fourth octet may be disregarded, and a TCI state $ID_{U,1,0}$ field 2635 may include second UL TCI state information among the two UL TCI states.

The $C_0$ field having a value of "010" may indicate that one separate TCI state set includes one DL TCI state, the TCI state $ID_{D,0,0}$ fields 2620 and 2621 may include one piece of DL TCI state information, and the TCI state $ID_{U,0,0}$ field 2625 and the fourth and fifth octets may be disregarded.

The $C_0$ field having a value of "011" may indicate that one separate TCI state set includes one DL TCI state and one UL TCI state, the TCI state $ID_{D,0,0}$ fields 2620 and 2621 may include one piece of DL TCI state information, and the TCI state $ID_{U,0,0}$ field 2625 may include one piece of UL TCI state information. The fourth and fifth octets may be disregarded.

The $C_0$ field having a value of "100" may indicate that one separate TCI state set includes one DL TCI state and two UL TCI states, the TCI state $ID_{D,0,0}$ fields 2620 and 2621 may include one piece of DL TCI state information, and the TCI state $ID_{U,0,0}$ field 2625 may include first UL TCI state information among the two UL TCI states. The fourth octet may be disregarded, and a TCI state $ID_{U,1,0}$ field 2635 may include second UL TCI state information among the two UL TCI states.

The $C_0$ field having a value of "101" may indicate that one separate TCI state set includes two DL TCI states, the TCI state $ID_{D,0,0}$ fields 2620 and 2621 may include first DL TCI state information among the two DL TCI states, and the TCI state $ID_{U,0,0}$ field 2625 and the fifth octet may be disregarded. The TCI state $ID_{D,1,0}$ field 2630 may include second DL TCI state information among the two DL TCI states.

The $C_0$ field having a value of "110" may indicate that one separate TCI state set includes two DL TCI states and one UL TCI state, the TCI state $ID_{D,0,0}$ fields 2620 and 2621 may include first DL TCI state information among the two DL TCI states, the TCI state $ID_{U,0,0}$ field 2625 may include one piece of UL TCI state information, the TCI state $ID_{D,1,0}$ field 2630 may include second DL TCI state information among the two DL TCI states, and the fifth octet may be disregarded.

The $C_0$ field having a value of "111" may indicate that one separate TCI state set includes two DL TCI states and two UL TCI states, the TCI state $ID_{D,0,0}$ fields 2620 and 2621 may include first DL TCI state information among the two DL TCI states, the TCI state $ID_{U,0,0}$ field 2625 may include first UL TCI state information among the two UL TCI states, the TCI state $ID_{D,1,0}$ field 2630 may include second DL TCI state information among the two DL TCI states, and the TCI state $ID_{U,1,0}$ field 2635 may include second UL TCI state information among the two UL TCI states.

FIG. 26 illustrates a MAC-CE used when a UL TCI state among separate TCI states uses a higher-layer signaling structure different from that for a joint TCI state and for a DL TCI state among the separate TCI states.

Referring to FIG. 26, since a UL TCI state needs 6 bits enabling expression of up to 64 UL TCI states, the TCI state $ID_{U,0,0}$ to TCI state $ID_{U,1,N}$ fields expressing UL TCI states may be expressed by 6 bits, whereas the TCI state $ID_{U,0,0}$ to TCI state $ID_{D,1,N}$ fields expressing DL TCI states may be expressed by 7 bits.

Figure 27:
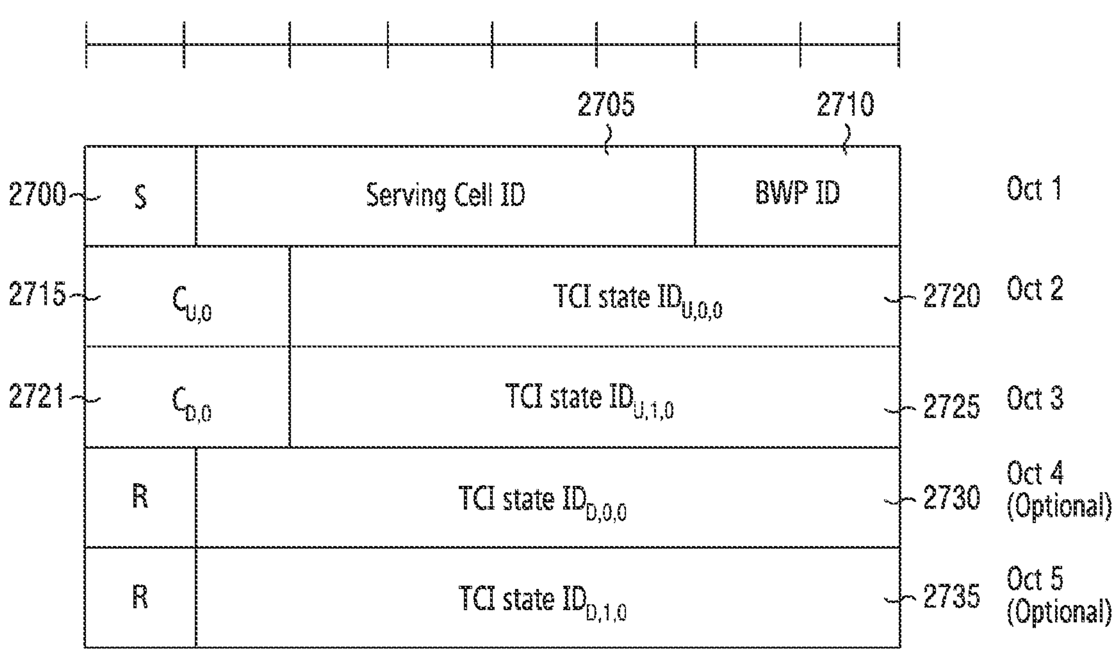
FIG. 27 illustrates a MAC-CE structure for activation and indication of multiple separate TCI states in a wireless communication system according to an embodiment.

FIG. 27 illustrates a MAC-CE structure for activation and indication of multiple separate TCI states in a wireless communication system according to an embodiment.

Referring to FIG. 27, a serving cell ID field 2705 may indicate a serving cell ID, and a BWP ID field 2710 may indicate a BWP ID. An R field may be a 1-bit reserve field that does not include indication information. An S field 2700 may indicate the number of pieces of separate TCI state set information included in a MAC-CE. For example, if a value of the S field 2700 is 1, the MAC-CE may indicate one separate TCI state set and may have a length of only up to a fifth octet.

For example, if the value of the S field 2700 is 0, the MAC-CE may include information on multiple separate TCI state sets, the MAC-CE may activate one separate TCI state set corresponding to respective codepoints of the TCI state field of DCI format 1_1 or 1_2 or may activate one separate TCI state set corresponding to respective codepoints of two TCI state fields of DCI format 1_1 or 1_2, and may activate separate TCI state sets corresponding to up to 8 or 16 codepoints via higher-layer signaling.

In the MAC-CE structure of FIG. 27, from a second octet, every 4 octets may correspond to one separate TCI state set. A $C_{U,0}$ field 2715 and a $C_{D,0}$ field 2721 may refer to the number of UL TCI states and the number of DL TCI states, which are included in one separate TCI state set, respectively, and may have meanings for respective codepoints as follows.

The $C_{U,0}$ field having a value of "00" indicates including no UL TCI state, and thus a TCI state $ID_{U,0,0}$ 2720 and a TCI state $ID_{U,1,0}$ 2725 may be disregarded.

The $C_{U,0}$ field having a value of "01" indicates including one UL TCI state, and thus the TCI state $ID_{U,0,0}$ 2720 may include one piece of UL TCI state information, and the TCI state $ID_{U,1,0}$ 2725 may be disregarded.

The $C_{U,0}$ field having a value of "10" indicates including two UL TCI states, and thus the TCI state $ID_{U,0,0}$ 2720 may include first UL TCI state information among the two UL TCI states, and the TCI state $ID_{U,1,0}$ 2725 may include second UL TCI state information among the two UL TCI states.

The $C_{D,0}$ field having a value of "00" indicates including no DL TCI state, and thus fourth and fifth octets may be disregarded.

The $C_{D,0}$ field having a value of "01" indicates including one DL TCI state, and thus a TCI state $ID_{D,0,0}$ 2730 may include one piece of DL TCI state information, and the fifth octet may be disregarded.

The $C_{D,0}$ field having a value of "10" indicates including two DL TCI states, and thus the TCI state $ID_{D,0,0}$ 2730 may include first DL TCI state information among the two DL TCI states, and a TCI state $ID_{D,1,0}$ field 2735 may include second DL TCI state information among the two DL TCI states.

FIG. 27 illustrates an example of a MAC-CE used when a UL TCI state among separate TCI states uses a higher-layer signaling structure different from that for a joint TCI state and for a DL TCI state among the separate TCI states.

In FIG. 27, since a UL TCI state needs 6 bits enabling expression of up to 64 UL TCI states, the TCI state $ID_{U,0,0}$ to TCI state $ID_{U,1,N}$ fields expressing UL TCI states may be expressed by 6 bits, whereas the TCI state $ID_{D,0,0}$ to TCI state $ID_{D,1,N}$ fields expressing DL TCI states may be expressed by 7 bits.

In the aforementioned examples of the MAC CE in FIG. 25 to FIG. 27, it is possible that at least one of the elements are coupled to each other.

Second Embodiment: Additional Single-TCI State and Multi-TCI State Indication and Activation Methods Based on Unified TCI Scheme The terminal may be scheduled with a PDSCH including a MAC-CE which may include at least one combination of various MAC-CE structures below from the base station, and from 3 slots after transmitting HARQ-ACK for the PDSCH to the base station, the terminal may interpret respective codepoints of the TCI state field in DCI format 1_1 or 1_2, based on information in the MAC-CE received from the base station. That is, the terminal may activate respective entries of the MAC-CE received from the base station, at the respective codepoints of the TCI state field in DCI format 1_1 or 1_2.

Figure 28:
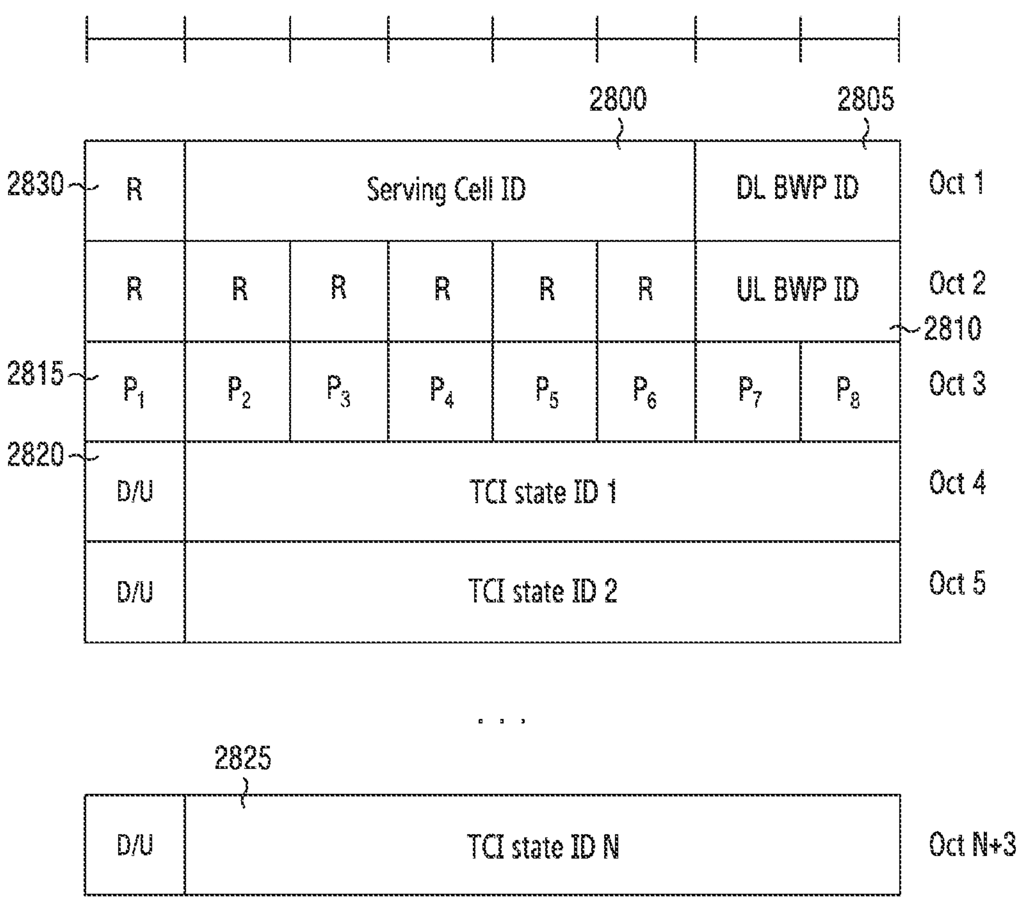
FIG. 28 illustrates a MAC-CE structure for activation and indication of a joint TCI state or a separate DL or UL TCI state in a wireless communication system according to an embodiment.

FIG. 28 illustrates a MAC-CE structure for activation and indication of a joint TCI state or a separate DL or UL TCI state in the wireless communication system embodiment.

Referring to FIG. 28, the meanings of respective fields in the MAC-CE structure are as follows.

Serving Cell ID 2800: This field may indicate a serving cell to which a corresponding MAC-CE is to be applied. A length of this field may be 5 bits. If a serving cell indicated by this field is included in one or more of simultaneousU-TCI-UpdateList1, simultaneousU-TCI-UpdateList2, simultaneousU-TCI-UpdateList3, and simultaneousU-TCI-UpdateList4, which are higher-layer signaling, the MAC-CE may be applied to all serving cells included in one or more lists among simultaneousU-TCI-UpdateList1, simultaneousU-TCI-UpdateList2, simultaneousU-TCI-UpdateList3, and simultaneousU-TCI-UpdateList4, which include the serving cell indicated by this field.

DL BWP ID 2805: The DL BWP ID field may indicate a DL BWP to which a corresponding MAC-CE is to be applied, and the meaning of each codepoint in this field may correspond to each codepoint of a BWP indicator in DCI. A length of this field may be 2 bits.

UL BWP ID 2810: The UL BWP ID field may indicate a UL BWP to which a corresponding MAC-CE is to be applied, and the meaning of each codepoint in this field may correspond to each codepoint of a BWP indicator in DCI. A length of this field may be 2 bits.

$P_i$ 2815: This field may indicate whether respective codepoints of a TCI state field in DCI format 1_1 or 1_2 have multiple TCI states or have one TCI state. A P1 value of 1 may indicate that an i-th codepoint has multiple TCI states, which may indicate that the codepoint may include a separate DL TCI state and a separate UL TCI state. A $P_i$ value of 0 may indicate that the i-th codepoint has a single TCI state, which may indicate that the codepoint may include one of a joint TCI state, a separate DCI TCI state, or a separate UL TCI state.

D/U 2820: This field may indicate whether a TCI state ID field in the same octet is a joint TCI state, a separate DL TCI state, or a separate UL TCI state. If this field is 1, the TCI state ID field in the same octet may be a joint TCI state or a separate DL TCI state, and if this field is 0, the TCI state ID field in the same octet may be a separate UL TCI state.

TCI state ID 2825: The TCI state ID field may indicate a TCI state that may be identified by TCI-StateId that is higher-layer signaling. If the D/U field is configured to be 1, this field may be used to express TCI-StateId that is expressible using 7 bits. If the D/U field is configured to be 0, an MSB of this field may be considered or identified to be a reserved bit, and the remaining 6 bits may be used to express UL-TCIState-Id that is higher-layer signaling. The maximum number of TCI states that may be activated may be 8 for a joint TCI state and may be 16 for a separate DL or UL TCI state.

R: R indicates a reserved bit and may be configured to be 0.

Irrespective of whether unifiedTCI-StateType-r17 in MIMOparam-r17 in ServingCellConfig, which is higher-layer signaling, is configured to be a joint or separate TCI state, a third octet including $P_1$, $P_2$, . . . , $P_8$ fields in FIG. 28 may be included in the corresponding MAC-CE structure. In this case, the terminal may perform TCI state activation using a fixed MAC-CE structure regardless of higher-layer signaling configured by the base station. As another example, with respect to the MAC-CE structure of FIG. 28 described above, when unifiedTCI-StateType-r17 in MIMOparam-r17 in ServingCellConfig, which is higher-layer signaling, is configured to be a joint TCI state, the third octet including $P_1$, $P_2$, . . . , $P_8$ fields in FIG. 28 may be omitted. In this case, the terminal may save up to 8 bits of a MAC-CE payload according to higher-layer signaling configured by the base station. All D/U fields positioned at a first bit from a fourth octet in FIG. 28 may be considered or identified to be R fields, and all R fields may be configured to be 0 bit.

If the terminal is configured with two different values of CORESETPoolIndex via higher-layer signaling and is configured with DLorJointTCIState or UL-TCIState, which is higher-layer signaling, the base station and the terminal may expect an R field 2830 present in a first octet to be interpreted as a field indicating a CORESET pool ID, in FIG. 28 which is one of the MAC-CE structures indicating activation of the unified TCI state. If a corresponding CORESET Pool ID is configured to be 0, the terminal may consider that the MAC-CE may be applied to each codepoint of a TCI state field in a PDCCH transmitted in a CORESET corresponding to CORESETPoolIndex 0. If the CORESET Pool ID is configured to be 1, the terminal may consider that the MAC-CE may be applied to each codepoint of a TCI state field in a PDCCH transmitted in a CORESET corresponding to CORESETPoolIndex 1.

Figure 29:
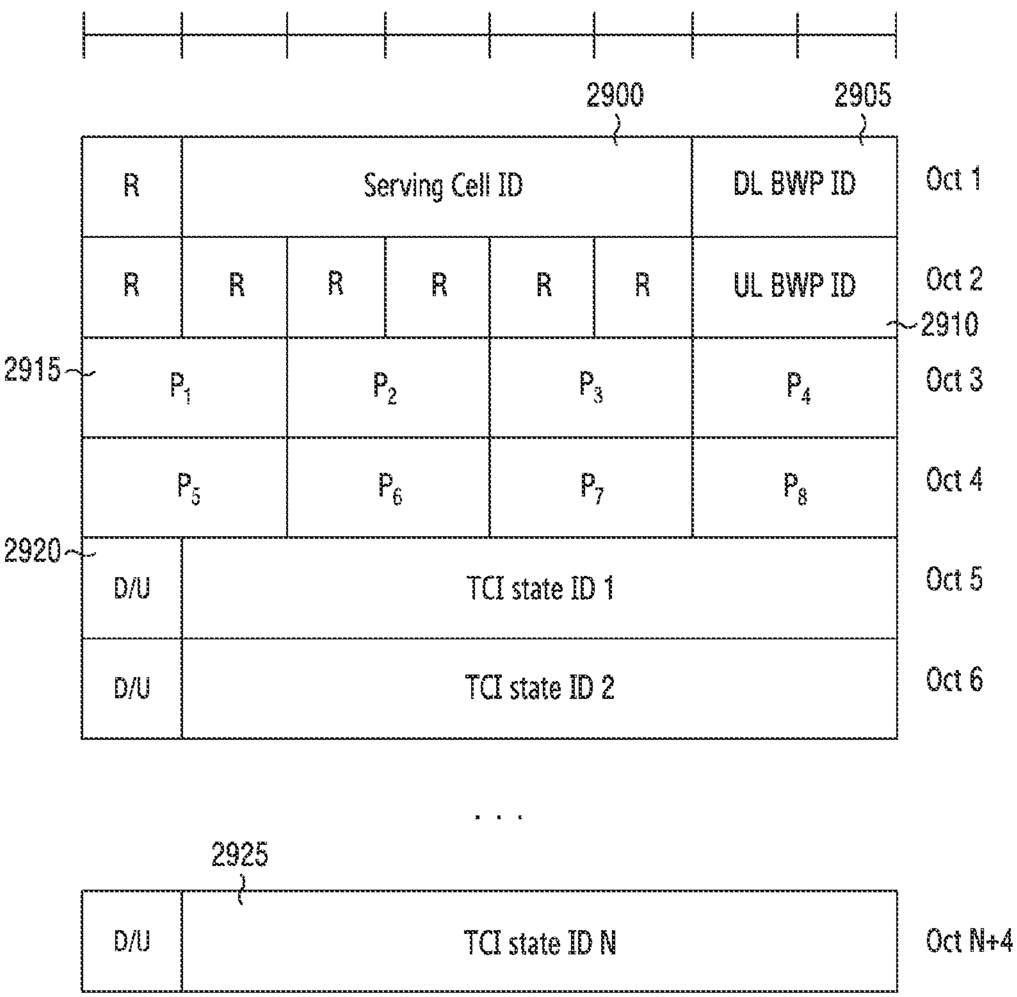
FIG. 29 illustrates a MAC-CE structure for activation and indication of multiple joint TCI states or separate DL or UL TCI states in a wireless communication system according to an embodiment.

FIG. 29 illustrates a MAC-CE structure for activation and indication of multiple joint TCI states or separate DL or UL TCI states in a wireless communication system according to an embodiment.

Referring to FIG. 29, the meanings of respective fields in the MAC-CE structure are as follows.

Serving Cell ID 2900: This field may indicate a serving cell to which a corresponding MAC-CE is to be applied. A length of this field may be 5 bits. If a serving cell indicated by this field is included in one or more of simultaneousU-TCI-UpdateList1, simultaneousU-TCI-UpdateList2, simultaneousU-TCI-UpdateList3, and simultaneousU-TCI-UpdateList4, which are higher-layer signaling, the MAC-CE may be applied to all serving cells included in one or more lists among simultaneousU-TCI-UpdateList1, simultaneousU-TCI-UpdateList2, simultaneousU-TCI-UpdateList3, and simultaneousU-TCI-UpdateList4, which include the serving cell indicated by this field.

DL BWP ID 2905: This field may indicate a DL BWP to which a corresponding MAC-CE is to be applied, and the meaning of each codepoint in this field may correspond to each codepoint of a BWP indicator in DCI. A length of this field may be 2 bits.

UL BWP ID 2910: This field may indicate a UL BWP to which a corresponding MAC-CE is to be applied, and the meaning of each codepoint in this field may correspond to each codepoint of a BWP indicator in DCI. A length of this field may be 2 bits.

$P_i$ 2915: This field may indicate whether respective codepoints of a TCI state field in DCI format 1_1 or 1_2 have multiple TCI states or have one TCI state.

- If unifiedTCI-StateType-r17 in MIMOparam-r17 in ServingCellConfig, which is higher-layer signaling, is configurable for one of a joint TCI state and a separate TCI state, the terminal may interpret this field as follows, regardless of configuration information on which one of the two TCI states is configured.
  - A $P_i$ value of “00” may indicate that a corresponding i-th codepoint has a single TCI state, which may indicate that the codepoint may include one of a joint TCI state, a separate DCI TCI state, or a separate UL TCI state.
  - A $P_i$ value of “01” may indicate that the i-th codepoint has two TCI states, which may indicate that the codepoint may include one set among a set of two joint TCI states, a set of one separate DL TCI state and one separate UL TCI state, a set of two separate DL TCI states, and a set of two separate UL TCI states.
  - A $P_i$ value of “10” may indicate that the i-th codepoint has three TCI states, which may indicate that the codepoint may include one set among a set of one separate DL TCI state and two separate UL TCI states, and a set of two separate DL TCI states and one separate UL TCI state.
  - A $P_i$ value of “11 may indicate that the i-th codepoint has four TCI states, which may indicate that the codepoint may include two separate DL TCI states and two separate UL TCI states.
- If unifiedTCI-StateType-r17 in MIMOparam-r17 in ServingCellConfig, which is higher-layer signaling, is configurable for one of joint, separate, and mixed modes, the terminal may interpret this field as follows, regardless of a configuration value used for configuration from among possible configuration values. The mixed mode may be expressed by one configuration value indicating that a common mixed mode of a joint TCI state and a separate DL or UL TCI state is possible, and may be expressed by multiple configuration values, such as “1joint+1DL” and “1joint+1UL” so as to be configured to indicate a specific combination of a specific number of joint TCI states and a specific number of separate DL or UL TCI states.
  - A $P_i$ value of “00” may indicate that the i-th codepoint has a single TCI state, which may indicate that the codepoint may include one of a joint TCI state, a separate DCI TCI state, or a separate UL TCI state.

- A $P_i$ value of "01" may indicate that the i-th codepoint has two TCI states, which may indicate that the codepoint may include one set among a set of two joint TCI states, a set of one joint TCI state and one separate DL TCI state, a set of one joint TCI state and one separate UL TCI state, a set of one separate DL TCI state and one separate UL TCI state, a set of two separate DL TCI states, and a set of two separate UL TCI states. If the terminal is configured with a value indicating that a general mixed mode of a joint TCI state and a separate DL or UL TCI state is possible as in the mixed mode of unifiedTCI-StateType-r17 in MIMOparam-r17 in ServingCellConfig, which is higher-layer signaling, then two modes of the set of one joint TCI state and one separate DL TCI state and the set of one joint TCI state and one separate UL TCI state described above may be possible. If the terminal is configured with one of "1joint+1DL" and "1joint+1UL" for unifiedTCI-StateType-r17 in MIMOparam-r17 in ServingCellConfig, which is higher-layer signaling, only a case corresponding to a configuration value of unifiedTCI-StateType-r17 among the set of one joint TCI state and one separate DL TCI state and the set of one joint TCI state and one separate UL TCI state described above may be possible.
- A $P_i$ value of "10" may indicate that the i-th codepoint has three TCI states, which may indicate that the codepoint may include a set of one separate DL TCI state and two separate UL TCI states, or a set of two separate DL TCI states and one separate UL TCI state.
- A $P_i$ value of "11 may indicate that the i-th codepoint has four TCI states, which may indicate that the codepoint may include two separate DL TCI states and two separate UL TCI states.

The corresponding field may be 2 bits.

D/U 2920: This field may indicate whether a TCI state ID field in the same octet is a joint TCI state, a separate DL TCI state, or a separate UL TCI state. If this field is 1, the TCI state ID field in the same octet may be a joint TCI state or a separate DL TCI state, and if this field is 0, the TCI state ID field in the same octet may be a separate UL TCI state.

TCI state ID N 2925: This field may indicate a TCI state that may be identified by TCI-StateId that is higher-layer signaling. If the D/U field is configured to be 1, this field may be used to express TCI-StateId that is expressible using 7 bits. If the D/U field is configured to be 0, a MSB of this field may be considered to be a reserved bit, and the remaining 6 bits may be used to express UL-TCIState-Id that is higher-layer signaling. The maximum number of TCI states that may be activated may be 8 for a joint TCI state and may be 16 for a separate DL or UL TCI state.

R: R indicates a reserved bit and may be configured to be 0.

Figure 30:
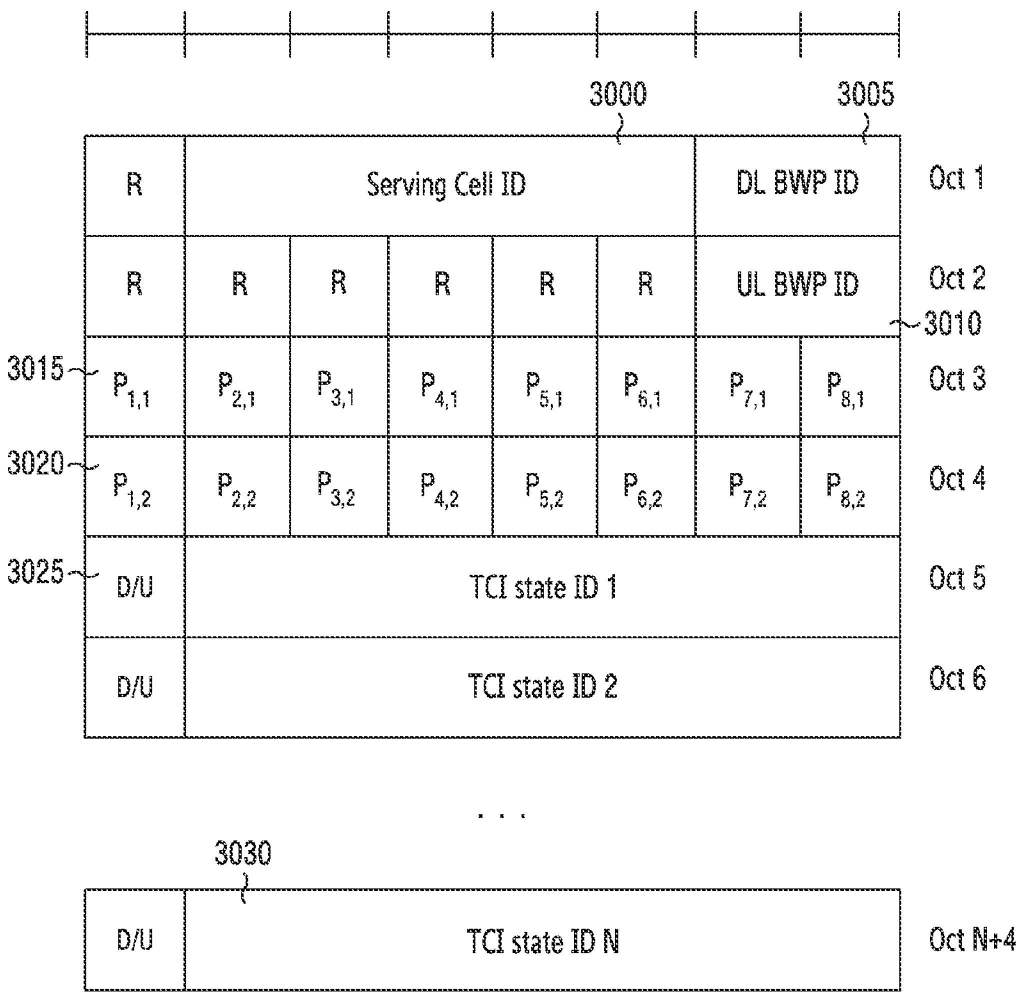
FIG. 30 illustrates a MAC-CE structure for activation and indication of multiple joint TCI states or separate DL or UL TCI states in a wireless communication system according to an embodiment.

FIG. 30 illustrates a MAC-CE structure for activation and indication of multiple joint TCI states or separate DL or UL TCI states in a wireless communication system according to an embodiment.

Referring to FIG. 30, the meanings of respective fields in the MAC-CE structure are as follows.

Serving Cell ID 3000: This field may indicate a serving cell to which a corresponding MAC-CE is to be applied. A length of this field may be 5 bits. If a serving cell indicated by this field is included in one or more of simultaneousU-TCI-UpdateList1, simultaneousU-TCI-UpdateList2, simultaneousU-TCI-UpdateList3, and simultaneousU-TCI-UpdateList4, which are higher-layer signaling, the MAC-CE may be applied to all serving cells included in one or more lists among simultaneousU-TCI-UpdateList1, simultaneousU-TCI-UpdateList2, simultaneousU-TCI-UpdateList3, and simultaneousU-TCI-UpdateList4, which include the serving cell indicated by this field.

DL BWP ID 3005: This field may indicate a DL BWP to which a corresponding MAC-CE is to be applied, and the meaning of each codepoint in this field may correspond to each codepoint of a BWP indicator in DCI. A length of this field may be 2 bits.

UL BWP ID 3010: This field may indicate a UL BWP to which a corresponding MAC-CE is to be applied, and the meaning of each codepoint in this field may correspond to each codepoint of a BWP indicator in DCI. A length of this field may be 2 bits.

$P_{i,1}$ 3015 and $P_{i,2}$ 3020: These two fields may indicate whether respective codepoints of the TCI state field in DCI format 1_1 or 1_2 have multiple TCI states or have one TCI state.

Figure 38:
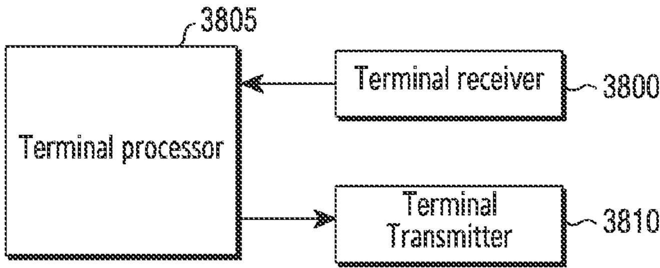
FIG. 38 illustrates a terminal in a wireless communication system according to an embodiment.

- For a case in which unifiedTCI-StateType-r17 in MIMOparam-r17 in ServingCellConfig, which is higher-layer signaling, is configurable for one of a joint TCI state and a separate TCI state, or one of joint, separate, and mixed modes is configurable, if the terminal is configured with unifiedTCI-StateType-r17, which is higher-layer signaling, for a joint TCI state, then a fourth octet including $P_{1,2}$, $P_{2,2}$, . . . , $P_{8,2}$ fields may be omitted in FIG. 38 and interpretation may be performed as follows only for $P_{i,1}$. The mixed mode may be expressed by one configuration value indicating that a common mixed mode of a joint TCI state and a separate DL or UL TCI state is possible, and may be expressed by multiple configuration values, such as "1joint+1DL" and "1joint+1UL" so as to be configured to indicate a specific combination of a specific number of joint TCI states and a specific number of separate DL or UL TCI states.
  - A $P_{i,1}$ value of "0" may indicate that a corresponding i-th codepoint has one TCI state, which may indicate that the codepoint includes one joint TCI state.
  - A $P_{i,1}$ value of "1" may indicate that the i-th codepoint has two TCI states, which may indicate that the codepoint includes two joint TCI states.
- For a case in which unifiedTCI-StateType-r17 in MIMOparam-r17 in ServingCellConfig, which is higher-layer signaling, is configurable for one of a joint TCI state and a separate TCI state, or one of joint, separate, and mixed modes is configurable, if the terminal is configured with unifiedTCI-StateType-r17, which is higher-layer signaling, for a separate TCI state, the terminal may consider $P_{i,1}$ of the third octet and $P_{i,2}$ of the fourth octet to be fields of 2 bits and perform interpretation as follows. The mixed mode may be expressed by one configuration value indicating that a common mixed mode of a joint TCI state and a separate DL or UL TCI state is possible, and may be expressed by multiple configuration values, such as "1joint+1DL" and "1joint+1UL" so as to be configured to indicate a specific combination of a specific number of joint TCI states and a specific number of separate DL or UL TCI states.
  - A case of $P_{i,1}$ value of "0" and a $P_{i,2}$ value of "0" may indicate that the i-th codepoint has a single TCI state, which may indicate that the codepoint may include one of a separate DL TCI state or a separate UL TCI state.

A case of $P_{i,1}$ value of "0" and a $P_{i,2}$ value of "1" may indicate that the i-th codepoint has two TCI states, which may indicate that the codepoint may include one set among a set of one separate DL TCI state and one separate UL TCI state, a set of two separate DL TCI states, and a set of separate UL TCI states.

A case of $P_{i,1}$ value of "1" and a $P_{i,2}$ value of "0" may indicate that the i-th codepoint has three TCI states, which may indicate that the codepoint may include a set of one separate DL TCI state and two separate UL TCI states or a set of two separate DL TCI states and one separate UL TCI state.

A case of $P_{i,1}$ value of "1" and a $P_{i,2}$ value of "1" may indicate that the i-th codepoint has four TCI states, which may indicate that the codepoint may include two separate DL TCI states and two separate UL TCI states.

For a case in which unifiedTCI-StateType-r17 in MIMOparam-r17 in ServingCellConfig, which is higher-layer signaling, is configurable for one of joint, separate, and mixed modes, if the terminal is configured with unifiedTCI-StateType-r17, which is higher-layer signaling, for the mixed mode, the terminal may interpret $P_{i,1}$ of the third octet as follows, and may not transmit the fourth octet. The mixed mode may be expressed by one configuration value indicating that a general mixed mode of a joint TCI state and a separate DL or UL TCI state is possible.

A $P_{i,1}$ value of "0" may indicate that the i-th codepoint includes one joint TCI state and one separate DL TCI state.

A $P_{i,1}$ value of "1" may indicate that the i-th codepoint includes one joint TCI state and one separate UL TCI state.

For a case in which unifiedTCI-StateType-r17 in MIMOparam-r17 in ServingCellConfig, which is higher-layer signaling, is configurable for one of joint, separate, and mixed modes, if the terminal is configured with unifiedTCI-StateType-r17, which is higher-layer signaling, for the mixed mode, the terminal may interpret $P_{i,1}$ of the third octet and $P_{i,2}$ of the fourth octet as follows. The mixed mode may be expressed by one configuration value indicating that a general mixed mode of a joint TCI state and a separate DL or UL TCI state is possible.

A $P_{i,1}$ value of "0" may indicate that the i-th codepoint includes only one joint TCI state. That is, since the mixed mode is not used, a value of $P_{i,2}$ may be disregarded.

A $P_{i,1}$ value of "1" may indicate that the i-th codepoint includes, in addition to one joint TCI state, one of one separate UL TCI state and one separate DL TCI state. That is, the mixed mode may be used for the codepoint, wherein one separate UL TCI state may be additionally used for a $P_{i,2}$ value of "0", and one separate UL TCI state may be additionally used for a $P_{i,2}$ value of "1".

D/U 3025: This field may indicate whether a TCI state ID field in the same octet is a joint TCI state, a separate DL TCI state, or a separate UL TCI state. If this field is 1, the TCI state ID field in the same octet may be a joint TCI state or a separate DL TCI state, and if this field is 0, the TCI state ID field in the same octet may be a separate UL TCI state.

TCI state ID N 3030: The TCI state ID N 3030 field may indicate a TCI state that may be identified by TCI-StateId that is higher-layer signaling. If the D/U field is configured to be 1, the TCI state ID field may be used to express TCI-StateId that may be expressed using 7 bits. If the D/U field is configured to be 0, an MSB of this field may be considered to be a reserved bit, and the remaining 6 bits may be used to express UL-TCIState-Id that is higher-layer signaling. The maximum number of TCI states that may be activated may be 8 for a joint TCI state and may be 16 for a separate DL or UL TCI state.

R: R indicates a reserved bit and may be configured to be 0.

For the aforementioned unifiedTCI-StateType-r17 in MIMOparam-r17 in ServingCellConfig, which is higher-layer signaling, a new parameter, such as unifiedTCI-StateType-r18 in MIMOparam-r18, which is higher-layer signaling in ServingCellConfig, may be defined, and an existing parameter may be reused.

Third Embodiment: Beam Reporting Method for Simultaneous Transmission Using Multiple Panels In NR Rel-17, schemes have been reinforced and newly introduced to enable support of beams, which are separately managed for a UL and a DL in the previous releases, by using one unified TCI framework. Based on the unified TCI, as described above, not only a reception beam for receiving a DL signal but also a transmission beam for transmitting a UL signal may be indicated via a TCI. The terminal may determine a transmission beam or a reception beam, based on a transmission filter or a reception filter used to transmit or receive a reference signal indicated by a TCI state.

In order for a terminal to simultaneously transmit UL signals by using multiple panels, a UL transmission filter for each panel may be required. If the terminal selects two panels from among multiple panels and transmits UL signals via respective transmission beams, two transmission beams need to be determined. As an extension of this, if the terminal selects N panels from among multiple panels and transmits UL signals via respective transmission beams, N transmission beams need to be determined.

The terminal may perform beam reporting for determining a transmission beam to a base station. In order to perform beam reporting, the terminal may use a beam reporting method supported up to NR Rel-17. Alternatively, the terminal may use a method that reinforces the beam reporting method supported up to NR Rel-17, or may introduce a new beam reporting method different from the beam reporting method supported up to NR Rel-17. For example, in order to support simultaneous UL transmission using multiple panels, beam reporting may be performed by additionally performing group-based beam reporting reinforced in NR Rel-17. For detailed descriptions of the reinforced group-based beam reporting, CSI information reported by the terminal to the base station may include at least some of the following information:

resource set indicator first and second CSI-RS resource indicators (CRIs) or SSB resource indicators (SSBRIs) for each resource group (up to four groups may be defined, and the number of groups configured for the terminal is determined based on a higher-layer parameter configured by the base station)

RSRP or differential RSRP for a reported CRI or SSBRI. In this case, RSRP is reported with 7 bits only for a first resource of a first resource group, and differential RSRP is reported with 4 bits for respective other resource groups and resource group resources.

CSI information reported by the terminal to the base station is a CSI reporting method supported by NR Rel-17, and the terminal may report, to the base station, additional CSI information for simultaneous multi-panel transmission by additionally reporting the following information:

CapabilityIndex (or UE capability set index, etc. which may correspond to an indicator of any name capable of indicating a maximum number of SRS ports that the terminal is able to support for the reported CRI or SSBRI) for indicating a capability value for the reported CRI or SSBRI is reported with 2 bits for each resource group and resource group resource.

That is, the terminal may additionally report the maximum number of SRS ports supportable for each beam group and resources within the group, thereby supporting the base station to use the same to configure two TCI states for simultaneous support using multiple panels. For example, the base station may expect to receive two resources included in the same group via different panels. If a resource group and a corresponding CSI resource set are configured in this way, the base station may activate two TCI states by using a reported beam group pair. That is, with respect to a MAC CE for activating/deactivating the unified TCI state reinforced in NR Rel-17, a conventional operation enabling indication of only one TCI state in one codepoint may be extended to an operation enabling indication of up to two TCI states in one codepoint, and in this case, reference may be made to the beam group pair of the beam group report via which two TCI states, indicated by one codepoint, for supporting simultaneous transmission using multiple panels are reported from the terminal. In the above description, for convenience of description, indication of two TCI states has been described. However, for simultaneous transmission using $N_{UL,panel}$ panels which are more than 2, $N_{UL,panel}$ TCI states may be indicated by one codepoint, instead of two TCI states being indicated by one codepoint. In an example, the base station may configure the same CSI resource for each CSI resource set in the same group via higher-layer configuration, and may also consider receiving the same CSI resource by using different panels. This may be used as a method in which simultaneous transmission or reception of a single TRP via multiple panels may be considered.

In another example, when reporting a beam to the base station, the terminal may perform reporting by configuring, as additional CSI information, panel information for the reported beam. For example, when the maximum number of panels supportable by the terminal is defined to be $N_{panel}$, the terminal may inform the base station of panel information by adding $\log_2 N_{panel}$ bits to each reported CRI or SSBRI. This may be defined as "panel index" or may be configured by other types of CSI report information which enables implicit indication instead of explicit indication as panel information.

For example, if the number of resources in a CSI resource set associated with CSI reporting is 8, and a CSI-RS resource in which a CRI corresponds to 0, 1, 2, or 3 is received via a first panel of two panels operable by the terminal, the terminal may perform reporting by configuring additional one bit to be "0" along with the CRI and corresponding RSRP (or signal-to-interference-plus-noise ratio (SINR) or any channel measurement information may be applicable). That is, the terminal may report, to the base station, that reception has been performed via the first panel of the two panels. Similarly, if a CSI-RS resource in which a CRI corresponds to 4, 5, 6, or 7 is received via a second panel of two panels operable by the terminal, the terminal may perform reporting by configuring additional one bit to be "1" along with the CRI and corresponding RSRP (or SINR or any channel measurement information may be applicable). As such, when additional information is added to CSI reporting, the base station may configure a beam combination enabling simultaneous transmission using multiple panels, based on reported beam information and corresponding panel information, and the base station may transmit, via the beam combination, a MAC CE for configuring multiple TCI states with one codepoint to the terminal.

The terminal may receive the MAC CE from the base station and activate the TCI states, and finally one codepoint is indicated via DCI format 1_1 or DCI format 1_2, and this may be applied to UL transmission from a BAT time. Even in case of adding panel information in this way, the base station may configure the same CSI resource for each CSI resource set in the same group via higher-layer configuration, and may also consider receiving the same CSI resource by using different panels. As such, even when the same CSI resource is configured for different resource sets in a group, the terminal may similarly report, to the base station, a corresponding CRI and corresponding RSRP (or SINR or any channel measurement information may be applicable) and panel information (configured by $\log_2 N_{panel}$ bits as described above).

In the second embodiment, the terminal may report beam information to the base station and, based on this, the base station may configure a higher-layer parameter for supporting simultaneous transmission using multiple panels and may transmit a MAC CE to the terminal to activate a TCI state. In this case, for the MAC CE transmitted to the terminal from the base station, a MAC CE for indicating unified TCI-based multiple TCI states as shown in FIG. 25 to FIG. 27 of the aforementioned first embodiment may be used. Alternatively, in order to indicate multiple TCI states by one codepoint, the multiple TCI states for supporting multi-panel simultaneous transmission may be activated in one codepoint by configuring the MAC CE as shown in FIG. 29 or FIG. 30. The multiple TCI states activated in one codepoint via the MAC CE as described above may be multiple TCI states which may be simultaneously transmitted using multiple panels, and may be multiple TCI states in which simultaneous transmission using multiple panels is not supported. The former and the latter may be identified and configured by the base station via a group-based beam report transmitted from the terminal to the base station, and the terminal and the base station may implicitly realize or identify, via the received group-based beam report, whether the multiple TCI states are a TCI state combination available for simultaneous transmission using multiple panels or a TCI state combination unavailable for simultaneous transmission using multiple panels.

Alternatively, an indicator indicating multi-panel simultaneous transmission may be added to each codepoint by using an unused field of a reserved area (R area). Alternatively, an indicator area for indicating multi-panel simultaneous transmission may be newly added using a new octet (8 bits) indicating that the reserved area corresponding to a total number of codepoints cannot be secured. For example, if there are a total of 8 codepoints, additional bits to indicate multi-panel simultaneous transmission may include a total of 8 bits, and a MAC CE may be configured using a reserved area or by adding a new octet. In this case, when an MSB is configured to be 1 and multiple (e.g., two) TCI states are indicated for a first codepoint, TCI states may be activated to perform simultaneous UL transmission using multiple panels based on the multiple TCI state. Alternatively, when the MSB is configured to be 0 and multiple (e.g., two) TCI states are indicated for the first codepoint, it may indicate that simultaneous UL transmission using multiple panels cannot be performed based on the multiple TCI states. As such, if simultaneous transmission using multiple panels is not performed, multiple TCI states indicated by a codepoint may support TDM-based multiple TRP transmission.

Fourth Embodiment: SRS Configuration Method for Codebook-Based Simultaneous PUSCH Transmission Using Multiple Panels When simultaneous UL transmission using multiple panels is possible according to capability of the terminal, the terminal may configure that corresponding UE capability is supportable, and report the same to the base station. For example, a UE capability reporting parameter reported by the terminal to the base station may be "simulTx-PUCCH-PUSCH", and the terminal may configure a value for the parameter to be "supported", "enabled", or the like so as to report that simultaneous PUCCH or PUSCH transmission using multiple panels is possible. In this case, the terminal may perform, using multiple panels, multiple PUCCH transmissions or repeated PUCCH transmissions simultaneously or multiple PUSCH transmissions or repeated PUSCH transmissions simultaneously. However, simultaneous PUCCH and PUSCH transmission using multiple panels may not be supported. UE capability reporting parameter "simulTx-PUCCH-PUSCH" reported by the terminal to the base station is merely an example, and the terminal may report that simultaneous UL transmission using multiple panels is possible, to the base station via a parameter with a different name, which enables similar or identical UE capability reporting.

The base station may then configure higher-layer parameters for supporting the terminal, and the configured higher-layer parameters may include a higher-layer parameter for simultaneous UL transmission using multiple panels. If the base station configures, for the terminal, a higher-layer parameter for simultaneous UL transmission using multiple panels, the base station may configure an SRS resource set for PUSCH transmission. In this case, if a codebook-based PUSCH is supported using multiple panels, an SRS resource set in which "usage" of the SRS resource set is configured to be "codebook" may be configured for the terminal. One or multiple SRS resource sets, in which "usage" for codebook-based simultaneous PUSCH transmission using multiple panels is "codebook", may be configured. Configuration of multiple SRS resource sets in which "usage" is "codebook" may indicate that UL signals may be transmitted to multiple TRPs according to the relationship between as many TCI states to be described later as the number of configured SRS resource sets. For example, if two SRS resource sets in which "usage" is "codebook" are configured for the terminal by the base station, this may indicate that the terminal may transmit UL signals to up to two TRPs.

Herein, description is provided based on a method of simultaneously transmitting UL signals to two TRPs, but an extension may be made based on the described method so that UL signals may be simultaneously transmitted to more than two TRPs. When the base station configures multiple SRS resource sets in which "usage" is "codebook", one or more SRS resources may be configured in each SRS resource set. When configuring, for the terminal, a higher-layer parameter for the SRS resource set, the base station may additionally configure "followUnifiedTCTstate-r17". If "followUnifiedTCTstate-r17" is configured in the SRS resource set, the terminal may transmit SRS resources in the SRS resource set according to a spatial relation referring to an RS (e.g., SRS) or an RS (e.g., CSI-RS or SSB) used to determine a UL transmission spatial filter in which "qcl-Type" in "QCL-Info" is configured to be typeD, such as indicated "DLorJoint-TCIstate-r17" (or "TCI-State" if higher-layer parameter "unifiedTCI-StatType" is configured to be "joint") or "UL-TCIstate" (or "TCI-UL-State" if higher-layer parameter "unifiedTCI-StatType" is configured to be "separate"). In this case, a reference RS indicated by DLorJoint-TCIstate-r17 may be a CSI-RS in NZP-CSI-RS-ResourceSet in which a higher-layer parameter of repetition is configured, or a CSI-RS in NZP-CSI-RS-ResourceSet in which a higher-layer parameter of trs-Info is configured. Alternatively, a reference RS indicated by "UL-TCIstate" may be a CSI-RS in NZP-CSI-RS-ResourceSet in which a higher-layer parameter of repetition is configured, a CSI-RS in NZP-CSI-RS-ResourceSet in which a higher-layer parameter of trs-Info is configured, an SRS resource in which "usage" is configured to be "beamManagement", or an SSB associated with the same PCI as that of or different PCI from that of a serving cell.

Herein, it is assumed that higher-layer parameter "followUnifiedTCTstate-r17" is configured in configured multiple SRS resource sets, and SRS resources are transmitted according to spatial relations determined by referring to TCI states (e.g., DLorJoint-TCIstate-r17 or UL-TCIstate) indicated by DCI.

As described in the third embodiment, in order to support simultaneous UL transmission using multiple panels, if the terminal receives a MAC CE for activation of multiple TCI states from the base station, and one codepoint including multiple (e.g., N) TCI states is indicated via DCI, etc., a first SRS resource set among multiple SRS resource sets may be associated with a first TCI state among the indicated N TCI states. That is, the terminal may transmit all SRS resources in the first SRS resource set according to a spatial relation determined by referring to the first TCI state among the indicated N TCI states. For example, the first SRS resource set refers to an SRS resource set having a smallest SRS-ResourceSetId value among multiple SRS resource sets (in the fourth and fifth embodiments, it is referred to that an SRS resource set in which "usage" is a "codebook") in which "usage" is configured to be "codebook". For another example, a second SRS resource set among multiple SRS resource sets may be associated with a second TCI state among the indicated N TCI states. That is, the terminal may transmit all SRS resources in the second SRS resource set according to a spatial relation determined by referring to the second TCI state among the indicated N TCI states. Similarly, even for more than two SRS resource sets and TCI states, the terminal may transmit all SRS resources included in an n-th SRS resource set according to a spatial relation determined by referring to an n-th TCI state. In this case, if multiple SRS resources are included in one SRS resource set, each of the SRS resources may be associated with a panel according to the following methods. When the terminal reports, via UE capability reporting, that the terminal is able to perform simultaneous UL transmission using multiple panels, and the base station configures, in consideration thereof, a higher-layer parameter for simultaneous UL transmission using multiple panels, an associative relation between the SRS resource and the panel described above may be established.

Associative relation 1—Each SRS resource included in an SRS resource set may be associated with one panel supported by the terminal. For example, a first SRS resource in a first SRS resource set may be associated with a first panel (The order between panels among multiple panels may be determined by implementation of the terminal if panel information is implicitly configured and indicated. For another example, if the panel information is explicitly configured and indicated, the first panel may be determined by a lowest panel indicator. A second panel, a third panel, etc. may then be similarly defined.) among panels supported by the terminal. The second SRS resource in the first SRS resource set may be associated with a second panel among the panels supported by the terminal. The described configuration method is merely an example, the number of SRS resources other than two SRS resources may be configured in one SRS resource set, and each SRS resource may be associated with any panel supported by the terminal. However, this associative relation should be configured to allow the base station and the terminal to have the same understanding, and a method of defining associative relations between SRS resources and panels supported by the terminal may be considered in order as in the above example. The aforementioned group-based beam reporting information may be used in order for the base station and the terminal to have the same understanding of the associative relation between the SRS resource and the panel. Alternatively, configuration may be performed explicitly by adding information on the panel supported by the terminal to SRS-Resource configured via a higher-layer parameter. For example, a higher-layer parameter, such as "panel_Index", may be added to higher-layer parameter SRS-Resource, and indication may be made by one of values from 0 to $N_{panel}-1$.

Figure 31:
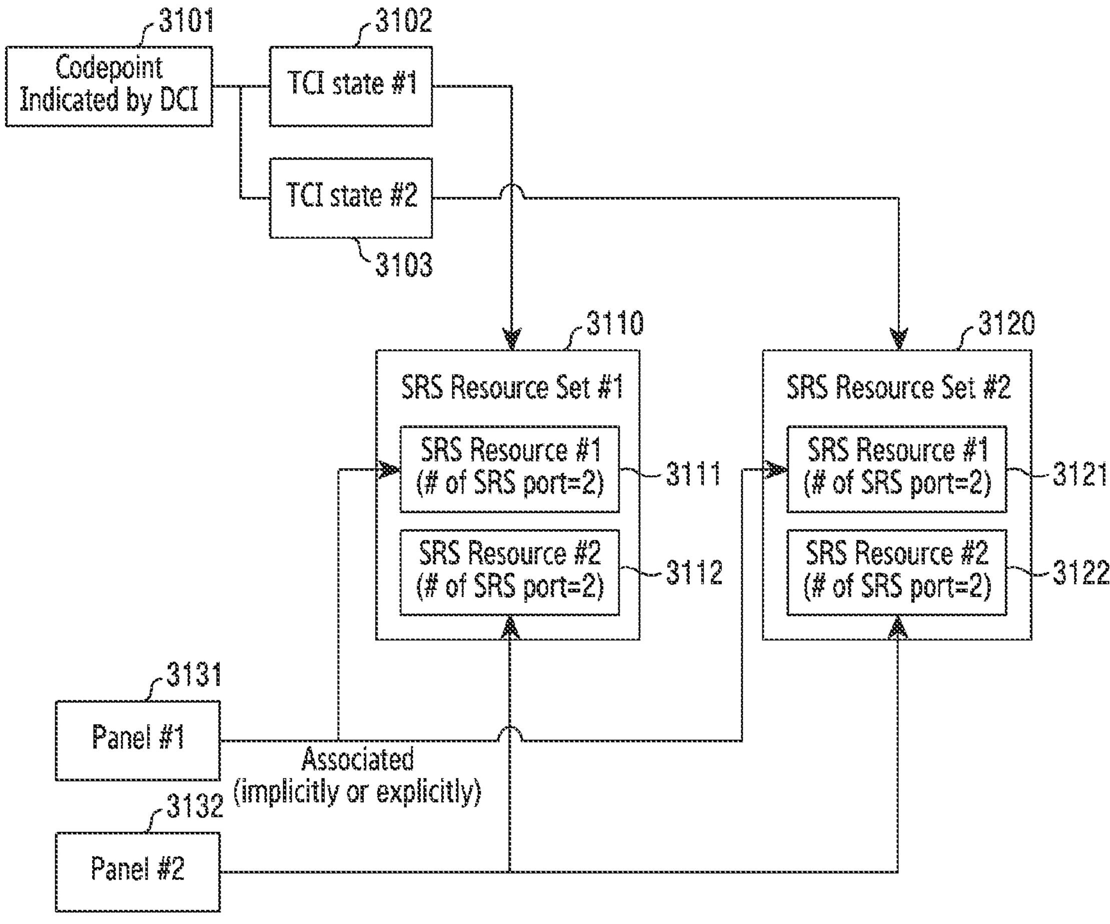
FIG. 31 illustrates when two SRS resources are included in each of two SRS resource sets, and a terminal may support simultaneous UL transmission using two panels in a wireless communication system according to an embodiment.

FIG. 31 illustrates when two SRS resources are included in each of two SRS resource sets, and a terminal supports simultaneous UL transmission using two panels in a wireless communication system according to an embodiment.

Referring to FIG. 31, a codepoint indicated by a TCI field of DCI 3101 received by a terminal from a base station indicates two TCI states 3102 and 3103 for simultaneous transmission using multiple panels. In this case, a first TCI state 3102 may be used to determine a spatial relation for transmission of SRS resources 3111 and 3112 in a first SRS resource set 3110. A second TCI state 3103 may be used to determine a spatial relation for transmission of SRS resources 3121 and 3122 in a second SRS resource set 3120. A first panel 3131 of the terminal may be implicitly or explicitly associated with the first SRS resource 3111 in the first SRS resource set 3110.

In case that the first TCI state 3102 includes, as a reference RS, an RS transmitted from a first TRP among multiple TRPs, the terminal may understand or identify that the first SRS resource 3111 in the first SRS resource set 3110 is configured to be transmitted to the first TRP by using the first panel 3131 of the terminal. The first panel 3131 may also be implicitly or explicitly associated with the first SRS resource 3121 in the second SRS resource set 3120. In case that the second TCI state 3103 includes, as a reference RS, an RS transmitted from a second TRP among multiple TRPs, the terminal may understand that the first SRS resource 3111 in the first SRS resource set 3110 is configured to be transmitted to the second TRP by using the first panel 3131 of the terminal. A second panel 3132 of the terminal may be implicitly or explicitly associated with the second SRS resource 3112 in the first SRS resource set 3110.

In case that the first TCI state 3102 includes, as the reference RS, the RS transmitted from the first TRP among multiple TRPs, the terminal may understand that the first SRS resource 3111 in the first SRS resource set 3110 is configured to be transmitted to the first TRP by using the second panel 3132 of the terminal. The second panel 3132 may also be implicitly or explicitly associated with the second SRS resource 3122 in the second SRS resource set 3120.

In case that the second TCI state 3103 includes, as the reference RS, the RS transmitted from the second TRP among multiple TRPs, the terminal may understand that the second SRS resource 3122 in the second SRS resource set 3120 is configured to be transmitted to the second TRP by using the second panel 3132 of the terminal. FIG. 31 illustrates a case where the number of SRS ports of SRS resources included in each SRS resource set is 2.

Associative relation 2—SRS resources included in an SRS resource set may be associated with one panel or multiple panels. For example, the first SRS resource in the first SRS resource set may be associated with the first panel (or the second panel) among panels supported by the terminal, and the second SRS resource in the first SRS resource set may be associated with the first panel and the second panel among the panels supported by the terminal. As another example, the first SRS resource in the second SRS resource set may be associated with the second panel (or the first panel) among the panels supported by the terminal, and the second SRS resource in the second SRS resource set may be associated with the first panel and the second panel among the panels supported by the terminal. This configuration method is merely an example, the number of SRS resources other than two SRS resources may be configured in one SRS resource set, and each SRS resource may be associated with any panel supported by the terminal. Alternatively, a first SRS resource in an SRS resource set may be associated with multiple panels. However, as in associative relation 1, associative relation 2 should also be configured to allow the base station and the terminal to have the same understanding, and the above example may be considered as one method of defining an associative relation between an SRS resource and a panel supported by the terminal. The aforementioned group-based beam reporting information may be used in order for the base station and the terminal to have the same understanding of the associative relation between the SRS resource and the panel. Alternatively, configuration may be performed explicitly by adding information on the panel supported by the terminal to SRS-Resource configured via a higher-layer parameter. For example, a higher-layer parameter, such as "panel_Index", may be added to higher-layer parameter SRS-Resource, and indication may be made by one or multiple of values from 0 to $N_{panel}-1$. Alternatively, "panel_Index" may be configured to be 1 for a panel associated with a corresponding SRS resource by using a bitmap format, and an unassociated panel may be indicated to be 0 so as to be configured via a higher-layer parameter. In this case, "panel_Index" may include $N_{panel}$ bits. Alternatively, "panel_Index" may be configured by $$\left\lceil \log_2\left(\sum_{k=1}^{N_{panel}} \binom{N_{panel}}{k}\right)\right\rceil$$

bits so that the entire combination of supported panels may be considered.

Figure 32:
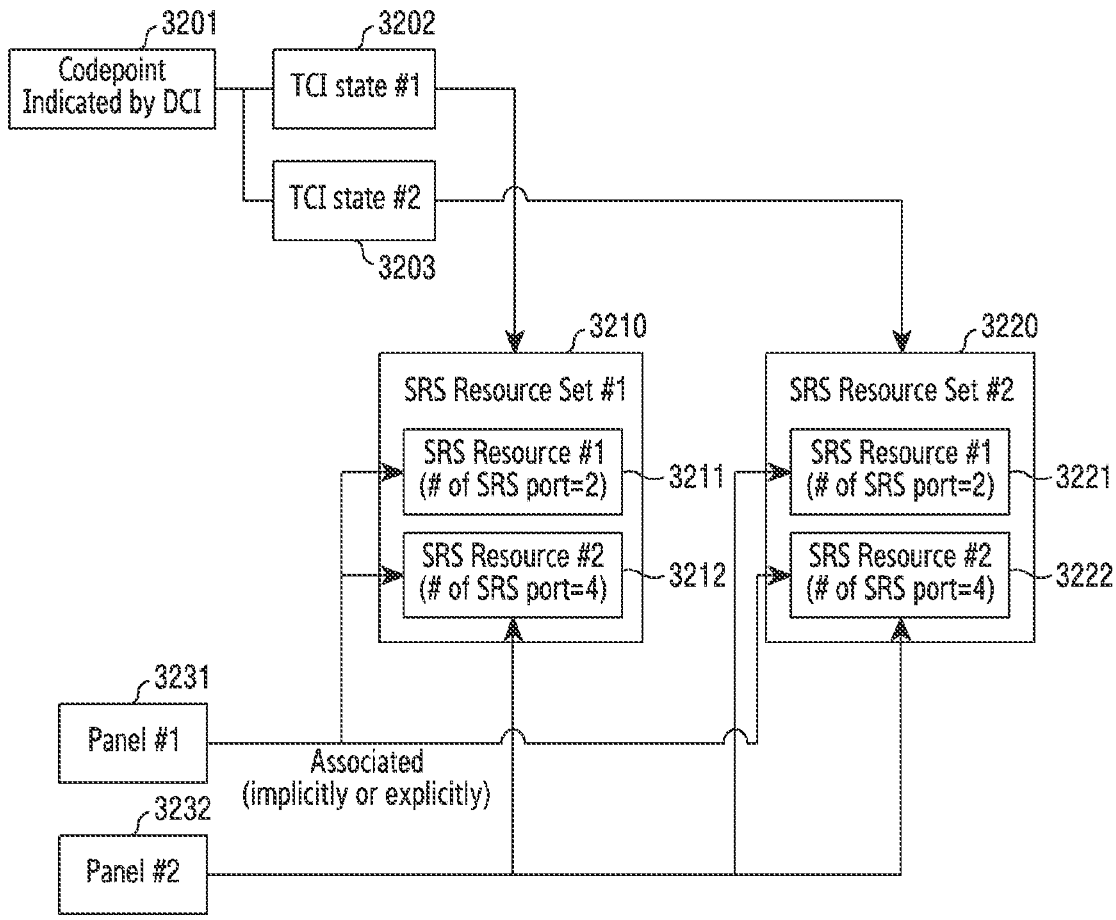
FIG. 32 illustrates when two SRS resources are included in each of two SRS resource sets, and a terminal may support simultaneous UL transmission using two panels in a wireless communication system according to an embodiment.

FIG. 32 illustrates when two SRS resources are included in each of two SRS resource sets, and a terminal may support simultaneous UL transmission using two panels in the wireless communication system embodiment.

A codepoint indicated by a TCI field of DCI 3201 received by a terminal from a base station indicates two TCI states 3202 and 3203 for simultaneous transmission using multiple panels. For example, a first TCI state 3202 may be used to determine a spatial relation for transmission of SRS resources 3211 and 3212 in a first SRS resource set 3210. For example, a second TCI state 3203 may be used to determine a spatial relation for transmission of SRS resources 3221 and 3222 in a second SRS resource set 3220. A first panel 3231 of the terminal may be implicitly or explicitly associated with the first SRS resource 3211 in the first SRS resource set 3210. In case that the first TCI state includes, as a reference RS, an RS transmitted from a first TRP among multiple TRPs, the terminal may understand that the first SRS resource 3211 in the first SRS resource set 3210 is configured to be transmitted to the first TRP by using the first panel 3231 of the terminal. In this case, the number of SRS ports configured in the first SRS resource 3211 in the first SRS resource set 3210 may be equal to 2. A second panel 3232 of the terminal may also be implicitly or explicitly associated with the first SRS resource 3221 in the second SRS resource set 3220. In case that the second TCI state 3203 includes, as a reference RS, an RS transmitted from a second TRP among multiple TRPs, the terminal may understand that the first SRS resource 3221 in the second SRS resource set 3220 is configured to be transmitted to the second TRP by using the second panel 3232 of the terminal. In this case, the number of SRS ports configured in the first SRS resource 3221 in the second SRS resource set 3220 may be equal to 2.

The second SRS resource 3212 configured in the first SRS resource set 3210 may be implicitly or explicitly associated with the first panel 3231 and the second panel 3232 which are all panels supported by the terminal. If the first TCI state includes, as the reference RS, the RS transmitted from the first TRP among multiple TRPs, it may be understood that the second SRS resource 3212 in the first SRS resource set 3210 is configured to be transmitted to the first TRP by using the first panel 3231 and the second panel 3232 which are all panels of the terminal. In this case, the number of SRS ports configured in the second SRS resource 3212 in the first SRS resource set 3210 may be equal to 4, which is a number supportable using both of the two panels. The first two SRS ports may be associated with the first panel 3231, and the remaining subsequent two SRS ports may be associated with the second panel 3232.

The relationship between the SRS ports and multiple panels may be implicitly associated in order, or may be explicitly indicated via a new higher-layer parameter. For example, as many panel_Index as the number of SRS ports for the SRS resources may be configured in the form of a sequence. The second SRS resource 3222 configured in the second SRS resource set 3220 may be implicitly or explicitly associated with the first panel 3231 and the second panel 3232 which are all panels supported by the terminal. If the second TCI state includes, as the reference RS, the RS transmitted from the second TRP among multiple TRPs, it may be understood that the second SRS resource 3222 in the second SRS resource set 3220 is configured to be transmitted to the second TRP by using the first panel 3231 and the second panel 3232 which are all panels of the terminal. In this case, the number of SRS ports configured in the second SRS resource 3222 in the second SRS resource set 3220 may be equal to 4 which is a number supportable using both of the two panels. Like the second SRS resource 3212 in the first SRS resource set 3210, an implicit or explicit associative relation may be configured between the SRS ports and the panels supported by the terminal.

The details described above have been provided specifically on an assumption that SRS resources are transmitted based on the indicated TCT states. However, even if "followUnifiedTCTstate-r17" is not configured, simultaneous transmission using multiple panels may be supported by applying the aforementioned methods based on spatial relation info configured in SRS resources in each SRS resource set. In this case, the first TCI state described above may be replaced with spatialRelationInfo configured via a higher-layer parameter for the SRS resources in the first SRS resource set, and the second TCI state may be replaced with spatialRelationInfo configured via a higher-layer parameter for the SRS resources in the second SRS resource set.

Fifth Embodiment: Method of Indicating Precoder and SRS Resources for Codebook-Based Simultaneous PUSCH Transmission Using Multiple Panels, and Method of Simultaneously Transmitting UL Data Channels In the fifth embodiment, descriptions are provided for a method of indicating a precoder (e.g., a precoding information and number of layers field in DCI, and a transmit precoding matrix indicator, hereinafter, TPMI) and an SRS resource indicator (hereinafter, SRI) in DCI in order to perform codebook-based simultaneous PUSCH transmission based on the SRS resource set configuration described in the fourth embodiment above, and a method of codebook-based simultaneous PUSCH transmission using multiple panels by applying an indicated SRI and TPMI to scheduled PUSCH resources.

Descriptions with specific examples have been provided for configuration which may be performed for the relationship between multiple TCI states and multiple SRS resource sets, and the implicit or explicit associative relation between multiple SRS resources included in the SRS resource sets and multiple panels supported by the terminal, according to associative relation 1 or associative relation 2 in the fourth embodiment. In the fifth embodiment, by referring to the examples described in detail in the fourth embodiment, description is provided for a method of applying the SRI and TPMI, which are indicated for the SRS resource sets and SRS resources configured via each of [associative relation 1] or [associative relation 2], according to the SRS resource set indicator field included in DCI.

Figure 33:
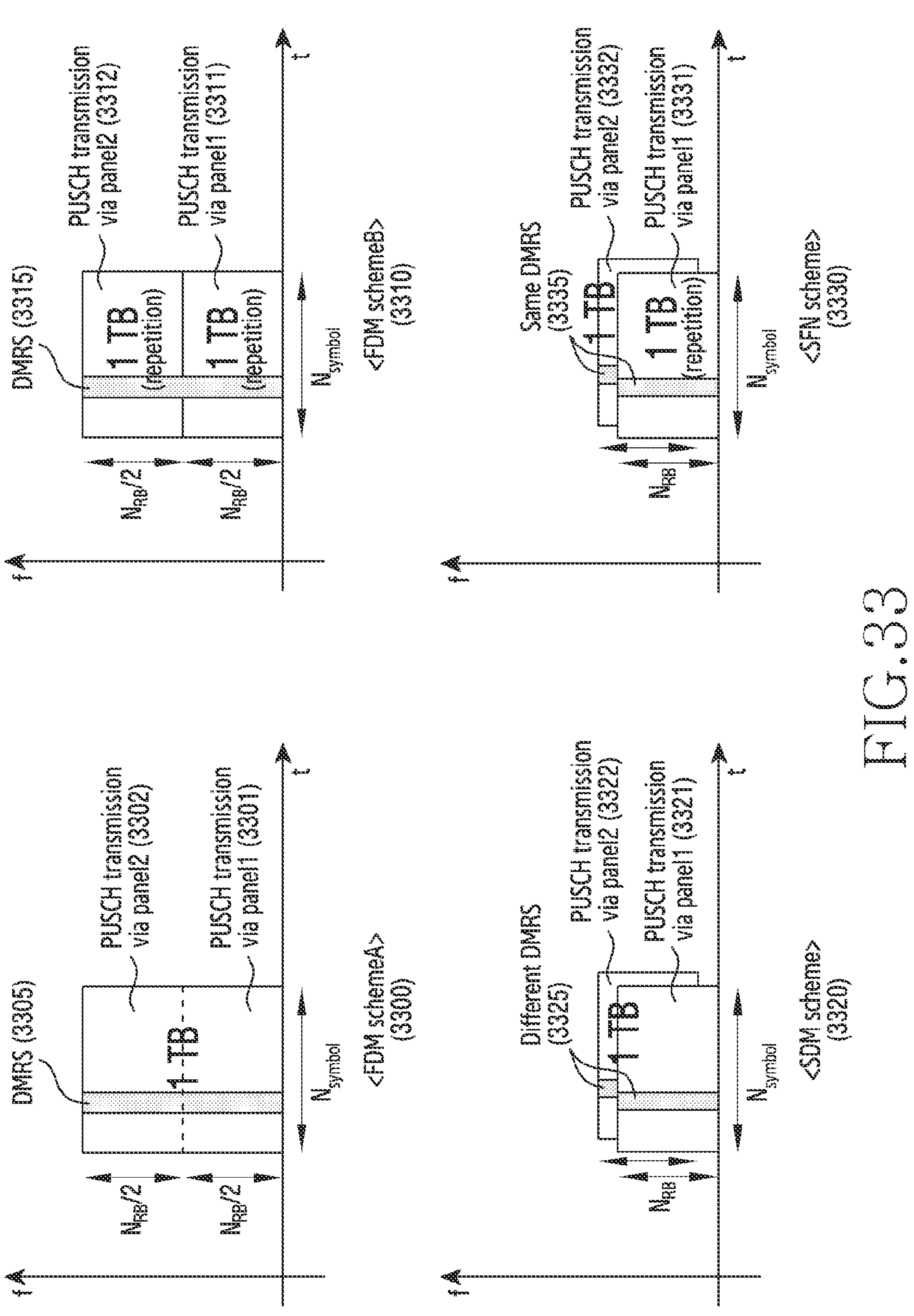
FIG. 33 illustrates panels for resource allocation and transmission for UL transmission in frequency division multiplexing (FDM), spatial division multiplexing (SDM), and single frequency network (SFN) schemes for supporting simultaneous transmission with multiple panels (ST×MP) in a wireless communication system according to an embodiment.

FIG. 33 illustrates examples of the simultaneous transmission method using multiple panels before describing the method of applying SRI and TPMI according to values indicated in the SRS resource set indicator field. Specifically, FIG. 33 illustrates a transmission panel and resource allocation for UL transmission in FDM, SDM, and SFN schemes for supporting ST×MP in a wireless communication system according to an embodiment. For convenience of description, a PUSCH has been described as an example, but this is merely an example, and contents proposed hereinafter may be similarly applied to a PUCCH, an SRS, or other UL channels.

FDM schemeA 3300 is a scheme of configuring all resources of one scheduled PUSCH to be one TB, and encoding information bits based thereon. Thereafter, according to the FDM scheme, resources may be divided in half in the frequency domain so as to be simultaneously transmitted at the same time point by using respective panels. For example, a terminal may transmit 3301 a first part (a part including an RB of a low index) of all the PUSCH resources via a first panel, and may transmit 3302 a second part (a part other than the first part) of all the PUSCH resources via a second panel. This is merely an example, and respective parts may be mapped to panels so as to be transmitted in a sequence different from that in the example (e.g., the first part of all the PUSCH resources may be transmitted via the second panel, and the second part of all the PUSCH resources may be transmitted via the first panel). In this case, if one TB is divided in half and transmitted via respective panels, and the transmission is performed to different TRPs by using the respective panels, a part of one TB is received in one TRP. Thereafter, the base station may, according to implementation of the base station, collect the parts into one and perform joint decoding or separate decoding, thereby receiving a signal transmitted by the terminal. DMRSs may be transmitted 3305 over all the PUSCH resources in FDM schemeA 3300. Alternatively, the DMRSs may be transmitted on respective PUSCH parts transmitted to different TRPs, wherein, for the DMRSs transmitted to different TRPs, different DMRS ports may be configured or different DMRS sequences may be used.

FDM schemeB 3310 is a scheme of first dividing resources of one scheduled PUSCH in half in the frequency domain according to the FDM scheme, configuring, to be one TB, the respective divided PUSCH resources to be transmitted using respective panels, and then encoding information bits. Thereafter, the terminal transmits the same TB via the respective panels. In this case, the TB transmitted via respective panels may have the same RV sequence or may have a different RV sequence. Since a result is obtained by rate matching according to each RV sequence in one buffer of encoded bits encoded via one TB, the FDM scheme 3310 may be referred to as repeated transmission. For example, the terminal may transmit 3311 the first repeatedly transmitted part via the first panel, and transmit 3312 the second repeatedly transmitted part via the second panel. In this case, if repeatedly transmitted TBs are transmitted via respective panels and the transmissions are performed to different TRPs by using the respective panels, the repeatedly transmitted TBs are received into one TRP. Thereafter, the base station may, according to implementation, collect the parts into one and perform joint decoding or separate decoding, thereby receiving a signal transmitted by the terminal.

DMRSs may be transmitted 3315 over all the PUSCH resources in FDM schemeB 3310. Alternatively, the DMRSs may be transmitted on respective PUSCH parts transmitted to different TRPs, wherein, for the DMRSs transmitted to different TRPs, different DMRS ports may be configured or different DMRS sequences may be used.

An SDM scheme 3320 may be referenced as a scheme of configuring, to be one TB, all resources of one scheduled PUSCH in consideration of a total number of layers, and encoding information bits based thereon. Thereafter, according to the SDM scheme, the terminal may divide the resources in half in the spatial domain so as to simultaneously transmit the resources at the same time point by using respective panels. That is, the terminal divides different layers and transmits the same via respective panels. For example, the terminal may transmit 3321 a first part (e.g., a part including a layer of a low index) via a first panel, and may transmit 3322 a second part (a part other than the first part) via a second panel. This is merely an example, and respective parts may be mapped to panels so as to be transmitted in a sequence different from that in the example (for example, the first part may be transmitted via the second panel, and the second part may be transmitted via the first panel). For DMRSs 3325 of the PUSCH transmitted via respective panels, different DMRS ports may be configured, and the different DMRS ports may be included in different CDM groups. Alternatively, the DMRSs may be included in the same CDM group with different DMRS ports. In this case, if one TB is divided in half and transmitted via respective panels, and the transmission is performed to different TRPs by using the respective panels, a part of one TB is received in one TRP. Thereafter, the base station may, according to implementation of the base station, collect the parts into one and perform joint decoding or separate decoding, thereby receiving a signal transmitted by the terminal.

An SFN scheme 3330 may be referenced as a scheme of performing transmission by configuring the same DMRS and exactly the same TB in the same frequency resource and the same time resource. PUSCHs transmitted via respective panels may include the same data and the same DMRS. That is, the terminal may transmit 3331 a first part via a first panel and transmit 3332 a second part via a second panel. This is merely an example, and respective parts may be mapped to panels so as to be transmitted in a sequence different from that in the example (for example, the first part may be transmitted via the second panel, and the second part may be transmitted via the first panel). In this case, if the same TB is transmitted via respective panels and transmitted to different TRPs by using the respective panels, the same TB is received into one TRP. Thereafter, the base station may, according to implementation, collect the parts into one and perform joint decoding or separate decoding, thereby receiving a signal transmitted by the terminal. In the SFN scheme 3330, DMRSs transmitted via respective panels may be configured with the same DMRS port 3335.

In addition to the transmission method described above in FIG. 32, repeated transmission of transmitting the same TB based on the SDM scheme may be supported. That is, any scheme capable of simultaneous transmission in the time domain by using different panels may follow the UCI multiplexing method according to the embodiment.

In consideration of various transmission schemes for supporting ST×MP as described above, transmission channel configuration methods in two directions may be considered. For example, as a first transmission channel configuration method, the terminal may repeatedly transmit the same information by using respective panels. For example, as a second transmission channel configuration method, the terminal may transmit different information by using different panels via spatial multiplexing (SM). According to the second transmission channel configuration method, the terminal may configure the same TB and perform resource mapping to different frequency domains or different layers so as to transmit the TB, and the terminal may configure different TBs according to respective panels and map the TBs to different frequency domains or different layers so as to transmit the TBs. Up to NR Rel-17, transmission using only one TB (or may be expressed as a codeword (CW)) has been supported for UL support, so that, in order to support a TB greater than the one TB, a higher-layer configuration therefor and a new DCI field configuration within DCI may be required.

In NR Rel-17, in order to support repeated TDM-based multi-TRP (mTRP) PUSCH transmission, it has been reinforced so that up to two SRS resource sets having usage of "codebook" or "nonCodebook" may be configured. An SRS resource set indicator field in DCI has been added to support dynamic switching between mTRP transmission or single-TRP (sTRP) transmission. The SRS resource set indicator includes 2 bits, and 4 code points may be interpreted according to Table 7.3.1.1.2-36 of 3GPP Technical Specification 38.212. In summary, in case that the SRS resource set indicator is "0", a first SRI field and a first TPMI field in the DCI are associated with a first SRS resource set (indicating an SRS resource set having lower SRS-ResourceSetId from among SRS resource sets in which usage is "codebook"), and a second SRI field and a second TPMI field are not used. In case that the SRS resource set indicator is "1", the first SRI field and the first TPMI field in the DCI are associated with a second SRS resource set (indicating an SRS resource set having higher SRS-ResourceSetId from among SRS resource sets in which usage is "codebook"), and the second SRI field and the second TPMI field are not used. In case that the SRS resource set indicator is "2", the first SRI field and the first TPMI field in the DCI are associated with the first SRS resource set, and the second SRI field and the second TPMI field are associated with the second SRS resource set. In addition, during mTRP repeated transmission, when "cyclicalMapping" or "sequentialMapping" is performed according to repeated PUSCH transmission, the order thereof is determined so that transmission for the first SRS resource set is performed first and then transmission for the second SRS resource set is performed.

In case that the SRS resource set indicator is "3", the first SRI field and the first TPMI field in the DCI are associated with the first SRS resource set, and the second SRI field and the second TPMI field are associated with the second SRS resource set. In addition, during mTRP repeated transmission, when "cyclicalMapping" or "sequentialMapping" is performed according to repeated PUSCH transmission, the order thereof is determined so that transmission for the second SRS resource set is performed first and then transmission for the first SRS resource set is performed. That is, the value of "0" or "1" indicated by the SRS resource set indicator may indicate sTRP PUSCH transmission. The value of "2" or "3" indicated by the SRS resource set indicator may indicate mTRP PSCH transmission. In NR Rel-17, TDM mTRP repeated PUSCH transmission or sTRP transmission may be selected and supported according to an indication value of the SRS resource set indicator. In NR Rel-18, simultaneous mTRP PUSCH transmission using multiple panels or simultaneous sTRP PUSCH transmission using multiple panels may be additionally distinguished and indicated according to a value indicated via SRI/TPMI, a value indicated via the SRS resource set indicator, the associative relation between SRS resources and panels supported by the terminal, and the SRS resource set configuration method described in the fourth embodiment.

The terminal may select an SRS resource set used for PUSCH transmission from among multiple SRS resource sets, by referring to the SRS resource set indicator field included in DCI for PUSCH scheduling received from the base station. For example, if the SRS resource set indicator is indicated as "0" or "1", the first or second SRS resource set is selected from among two SRS resource sets configured according to the fourth embodiment herein, so as to be used for PUSCH transmission. For another example, if the SRS resource set indicator is indicated as "2" or "3", two SRS resource sets configured according to the fourth embodiment are selected so as to be used for PUSCH transmission.

The terminal may interpret multiple SRI fields according to values indicated via the SRS resource set indicator field and may determine SRS resources to be used for PUSCH transmission. If the SRS resource set indicator is indicated as "0" or "1", all the multiple SRI fields may be used to select SRS resource(s) in the SRS resource set indicated by the SRS resource set indicator. If the SRS resource set indicator is indicated as "2" or "3", each SRI field may be used to select SRS resource(s) in each associated SRS resource set.

For example, description is provided for a method of performing simultaneous PUSCH transmission using multiple panels by interpreting multiple SRI fields according to values indicated by the SRS resource set indicator field and selecting, based on the interpretation, SRS resources in the SRS resource set.

According to associative relation 1 described in the fourth embodiment of the SRS resource selection method based on associative relation 1, multiple SRS resource sets may be configured to support multiple TRPs, and multiple (or one of) SRS resources in the associative relation with one panel among panels supported by the terminal may be configured in each SRS resource set. If PUSCH transmission using only the first SRS resource set is scheduled via the SRS resource set indicator, all multiple SRI fields included in the same DCI may be used to select SRS resources in the first SRS resource set. In this case, a larger number of codepoints may be used by interpreting, as one field, all bits for the multiple SRI fields. For example, one SRI field including 1 bit may indicate two codepoints, which may be used to indicate one of two SRS resources if there are two SRS resources in the SRS resource set. If two SRI fields including 1 bit are used, 2 bits may be used to indicate SRS resources in one SRS resource set, and up to four codepoints may be indicated. If four codepoints are available, not only one of the two SRS resources in the SRS resource set may be indicated, but also the two resources may be indicated. That is, each SRI field includes $\lceil \log_2 N_{SRS} \rceil$ bits according to the number $N_{SRS}$ of SRS resources included in each SRS resource set, and if only one SRS resource set among M SRS resource sets is selected by the SRS resource set indicator, a combination of SRS resources to be used for PUSCH transmission, which are in the selected SRS resource set, may be determined using all $M \cdot \lceil \log_2 N_{SRS} \rceil$ bits of all M SRI fields. All codepoints expressed by $M \cdot \lceil \log_2 N_{SRS} \rceil$ bits may be used to indicate SRS resources, or only some of the codepoints may be used.

If only one SRS resource set is selected and one SRS resource is indicated using all the multiple SRI fields as above, the terminal may perform PUSCH transmission using a panel associated with the indicated SRS resource. For this, sTRP PUSCH transmission may be performed using a single panel. If only one SRS resource set is selected and multiple SRS resources associated with different panels are indicated using all the multiple SRI fields, the terminal may perform simultaneous PUSCH transmission using panels associated with the indicated SRS resources, respectively. For this, simultaneous sTRP PUSCH transmission may be performed using multiple panels.

In case that PUSCH transmission using multiple SRS resource sets is scheduled via the SRS resource set indicator, respective SRI fields are applied to respective associated SRS resource sets in order to determine SRS resources for PUSCH transmission in the respective SRS resource sets. In this case, simultaneous PUSCH transmission performed at the same time point may be supported according to panels associated with the SRS resources determined from the respective SRS resource sets. To perform simultaneous PUSCH transmission using multiple panels, the SRS resources in the respective SRS resource sets, which are determined via respective SRI fields, need to be associated with different panels. If SRS resources associated with the same panel are selected from multiple SRS resource sets via multiple SRIs, since PUSCH transmission associated with respective SRS resources needs to be performed via the same panel, simultaneous transmission cannot be performed. In this case, mTRP PUSCH transmission based on TDM may be performed rather than simultaneous transmission. If SRS resources associated with different panels are selected from multiple SRS resource sets via multiple SRIs, since PUSCH transmission associated with respective SRS resources may be performed via different panels, simultaneous PUSCH transmission may be performed. In this case, simultaneous mTRP PUSCH transmission using multiple panels may be supported. Specific operations will be described below with reference to FIG. 31 described above. The base station may configure two SRS resource sets 3110 and 3120 for the terminal, and since each SRS resource set includes two SRS resources, a first SRI field associated with the first SRS resource set may be configured by $\log_2 2=1$ bit, and a second SRI field associated with the second SRS resource set may also be configured by $\log_2 2=1$ bit in the same manner.

If the SRS resource set indicator in DCI for PUSCH scheduling indicates "0", the terminal performs PUSCH transmission based on the SRS resource set 3110. In this case, both 1 bit of the first SRI field and 1 bit of the second SRI field may be used to select an SRS resource used for PUSCH transmission from among the two SRS resources 3111 and 3112 in the first SRS resource set 3110. 2 bits of "00" configured via the two SRI fields may indicate the first SRS resource 3111 among the SRS resources in the first SRS resource set 3110. This may indicate, during PUSCH transmission, a terminal operation of performing PUSCH transmission to a first TRP, based on the first TCI state, by using the first panel among panels available to the terminal. 2 bits of "01" configured via the two SRI fields may indicate the second SRS resource 3112 among the SRS resources in the first SRS resource set 3110. This may indicate, during PUSCH transmission, a terminal operation of performing PUSCH transmission to the first TRP, based on the first TCI state, by using the second panel among panels available to the terminal. 2 bits of "11" configured via the two SRI fields may indicate both the first SRS resource 3111 and the second SRS resource 3112 among the SRS resources in the first SRS resource set 3110. This may indicate that, during PUSCH transmission, both the first panel and the second panel among the panels available to the terminal are used to perform PUSCH transmission to the first TRP based on the first TCI state, and this also indicates that scheduling is performed for simultaneous PUSCH transmission using multiple panels to the first TRP.

If the SRS resource set indicator in DCI for PUSCH scheduling indicates "1", the terminal performs PUSCH transmission based on the SRS resource set 3120. In this case, both 1 bit of the first SRI field and 1 bit of the second SRI field may be used to select an SRS resource used for PUSCH transmission from among the two SRS resources 3121 and 3122 in the second SRS resource set 3120. 2 bits of "00" configured via the two SRI fields may indicate the first SRS resource 3121 among the SRS resources in the second SRS resource set 3120. This may indicate, during PUSCH transmission, a terminal operation of performing PUSCH transmission to a second TRP, based on the second TCI state, by using the first panel among panels available to the terminal. 2 bits of "01" configured via the two SRI fields may indicate the second SRS resource 3122 among the SRS resources in the second SRS resource set 3120. This may indicate, during PUSCH transmission, a terminal operation of performing PUSCH transmission to the second TRP, based on the second TCI state, by using the second panel among panels available to the terminal. 2 bits of "11" configured via the two SRI fields may indicate both the first SRS resource 3121 and the second SRS resource 3122 among the SRS resources in the second SRS resource set 3120. This may indicate that, during PUSCH transmission, both the first panel and the second panel among the panels available to the terminal are used to perform PUSCH transmission to the second TRP based on the second TCI state, and this may also indicate that scheduling is performed for simultaneous PUSCH transmission using multiple panels to the second TRP.

If the SRS resource set indicator in DCI for PUSCH scheduling indicates "2", the terminal may perform PUSCH transmission using the two SRS resource sets 3110 and 3120. 1 bit which is a first SRI field is used to indicate SRS resources in the first SRS resource set 3110, and 1 bit which is a second SRI field is used to indicate SRS resources in the second SRS resource set 3120. If the first SRI field is "0" and the second SRI field is "0", the first SRS resource 3111 is indicated in the first SRS resource set 3110, and the first SRS resource 3121 is indicated in the second SRS resource set 3120. In this case, since the two SRS resources 3111 and 3121 are both associated with the first panel 3131, simultaneous transmission using multiple panels cannot be supported, and TDM-based mTRP PUSCH transmission may be supported. That is, this case indicates that scheduling is performed for the terminal to perform TDM-based mTRP PUSCH transmission using the first panel 3131.

If the SRS resource set indicator in DCI for PUSCH scheduling indicates "2", the first SRI field is "0", and the second SRI field is "1", then the first SRS resource 3111 is indicated in the first SRS resource set 3110, and the second SRS resource 3122 is indicated in the second SRS resource set 3120. In this case, since the two SRS resources 3111 and 3122 are associated with two different panels 3131 and 3132, simultaneous transmission using multiple panels may be supported. That is, supporting of simultaneous transmission using multiple panels may indicate that scheduling is performed for the terminal to perform simultaneous mTRP PUSCH transmission using the two panels 3131 and 3132. When simultaneous transmission using multiple panels is supported, PUSCH transmission is performed to the first TRP by using the first panel 3131, and PUSCH transmission is performed to the second TRP by using the second panel 3132.

In case that the SRS resource set indicator in DCI for PUSCH scheduling indicates "2", the first SRI field is "1", and the second SRI field is "0", then the second SRS resource 3112 is indicated in the first SRS resource set 3110, and the first SRS resource 3121 is indicated in the second SRS resource set 3120. In this case, since the two SRS resources 3112 and 3121 are associated with two different panels 3132 and 3131, simultaneous transmission using multiple panels may be supported. That is, supporting of simultaneous transmission using multiple panels indicates that scheduling is performed for the terminal to perform simultaneous mTRP PUSCH transmission using the two panels 3132 and 3131. In case that the SRS resource set indicator in DCI for PUSCH scheduling indicates "2", the first SRI field is "1", and the second SRI field is "1", then the second SRS resource 3112 is indicated in the first SRS resource set 3110, and the second SRS resource 3122 is indicated in the second SRS resource set 3120. In this case, since the two SRS resources 3112 and 3122 are both associated with the second panel 3132, simultaneous transmission using multiple panels cannot be supported, and TDM-based mTRP PUSCH transmission may be supported. That is, this case indicates that scheduling is performed for the terminal to perform TDM-based mTRP PUSCH transmission using the second panel 3132.

If the SRS resource set indicator indicates "3", SRS resources for mTRP PUSCH transmission may be selected using two SRI fields in the same way as in the case where the SRS resource set indicator indicates "2". In this case, the order of mapping, which will be described later, PUSCH transmission based on the SRS resources indicated in the first SRS resource set 3110 and PUSCH transmission based on the SRS resources indicated in the second SRS resource set 3120 to scheduled PUSCH resources may be different from the case where the SRS resource set indicator is "2". That is, during TDM-based mTRP PUSCH transmission, depending on whether the SRS resource set indicator is indicated as "2" or "3", an operation may be performed similarly to that the order of SRS resource sets associated with each PUSCH transmission occasion may be configured differently.

Performing transmission to a first TRP or a second TRP may be used similar to performing transmission by determining a spatial relation with reference to a first TCI state or a second TCI state among two TCI states indicated by DCI.

Under an assumption that the numbers of SRS ports configured in multiple SRS resources are the same, a method of determining the number of bits of a TPMI field and a method of applying multiple TPMI fields are described as follows. In NR Rel-17, since the number of layers indicated by a first TPMI field and a second TPMI field are the same, the number of bits of the second TPMI field may be less than or equal to that of the first TPMI field. Even for simultaneous transmission using multiple panels, if, as in NR Rel-17, the number of layers of PUSCHs simultaneously transmitted via respective panels is restricted to be the same, the second TPMI field added in NR Rel-17 may be used as it is. Alternatively, in case that the layers of PUSCHs simultaneously transmitted via respective panels may be different, different numbers of layers may also be supported for scheduling, by configuring, unlike NR Rel-17, the number of bits of the second TPMI field to be the same as the number of bits of the first TPMI field. If an SRS resource set and SRS resources, which are indicated by the SRS resource set indicator and multiple SRI fields, are determined based on [associative relation 1], the base station may indicate a TPMI to the terminal, based on the indicated SRS resource. In this case, if only one SRS resource set and one SRS resource are selected, only a first TPMI may be indicated, and the indicated TPMI is applied to the selected SRS resource set and SRS resource. If one SRS resource set and multiple SRS resources (are selected, the first TPMI may be applied to a first SRS resource (SRS resource with lower SRS-ResourceId) among multiple SRS resources, and a second TPMI may be applied to a second SRS resource (SRS resource with higher SRS-ResourceId) among multiple SRS resources. Alternatively, only the first TPMI may be indicated, and the same TPMI may be applied to all of the indicated multiple SRS resources. If multiple SRS resource sets and one SRS resource for each SRS resource set are indicated, the first TPMI may be applied to an SRS resource indicated in a first SRS resource set, and the second TPMI may be applied to an SRS resource indicated in a second SRS resource set.

The above method describes the case where the numbers of SRS ports of SRS resources are the same. However, if the numbers of SRS ports of SRS resources are not the same, the number of all TPMI bits for the number of bits of each TPMI field may be determined based on the largest number of SRS ports among the numbers of SRS ports of SRS resources configured in an SRS resource set in which usage is "codebook". Alternatively, the number of bits of the first TPMI field may be determined based on the maximum number of SRS ports supportable by a first terminal panel, and the number of bits of the second TPMI field may be determined based on the maximum number of SRS ports supportable by a second terminal panel.

When an SRS resource determined in this way and a precoder for the SRS resource are determined via TPMI, the terminal configures an antenna port for PUSCH transmission identically to an SRS port for the determined SRS resource, and performs PUSCH transmission by applying the precoder indicated by the TPMI. In this case, the PUSCH transmission resource for transmission of each panel is distinguished in scheduled PUSCH resources, and the precoder and the PUSCH antenna port based on the SRS port of each SRS resource are applied to the resource for PUSCH transmission using each panel.

Figure 34:
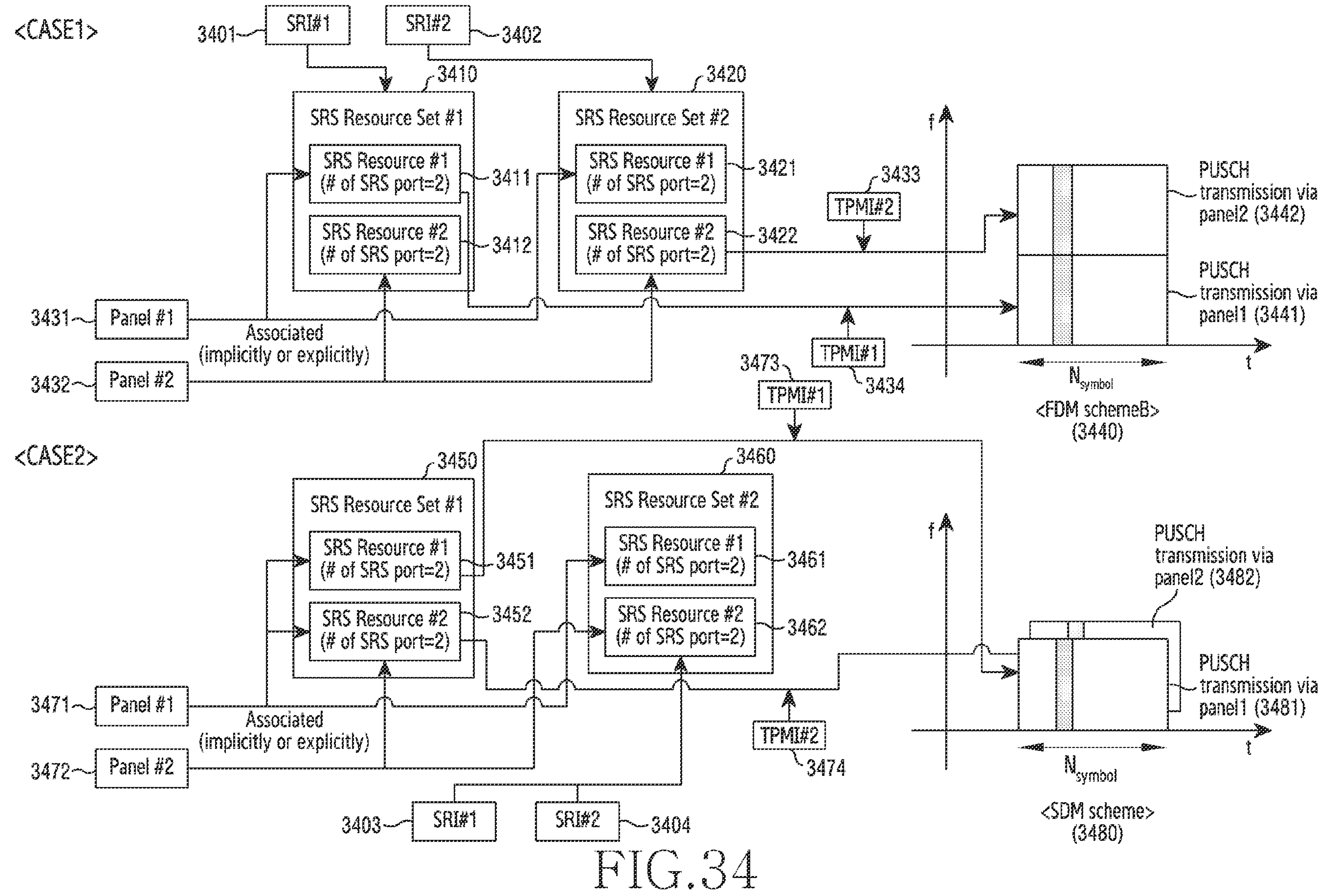
FIG. 34 illustrates an example of simultaneous PUSCH transmission using multiple panels in a wireless communication system according to an embodiment.

FIG. 34 illustrates an example of simultaneous PUSCH transmission using multiple panels in a wireless communication system according to an embodiment.

Referring to FIG. 34, a terminal may use two panels 3431 and 3432 or 3471 and 3472, and two SRS resource sets 3410 and 3420 or 3450 and 3460 are configured for the terminal, wherein two SRS resources are configured for each of the SRS resource sets. In Case 1, the two SRS resource sets are selected by an SRS resource set indicator, a first SRI field 3401 indicates a first SRS resource 3411 in a first SRS resource set 3410, and a second SRI field 3402 indicates a second SRS resource 3422 in a second SRS resource set 3420.

In case that FDM-based simultaneous PUSCH transmission using multiple panels is scheduled, a PUSCH port for PUSCH transmission 3441 using the first panel 3431 is configured using the indicated first SRS resource 3411 in the first SRS resource set 3410, and the PUSCH transmission 3441 using the first panel 3431 is performed by applying a precoder indicated by a first TPMI 3434. A PUSCH port for PUSCH transmission 3442 using the second panel 3432 is configured using the indicated second SRS resource 3422 in the second SRS resource set 3420, and the PUSCH transmission 3442 using the second panel 3432 is performed by applying a precoder indicated by a second TPMI 3433. This indicates that FDM-based simultaneous mTRP PUSCH transmission using multiple panels is supported. In Case 2, only the first SRS resource set 3450 is selected by the SRS resource set indicator, and two SRS resources 3451 and 3452 in the first SRS resource set 3450 are indicated using both a first SRI field 3403 and a second SRI field 3404. In case that SDM-based simultaneous PUSCH transmission using multiple panels is scheduled, a PUSCH port for PUSCH transmission 3481 using the first panel 3471 is configured using the indicated first SRS resource 3451 in the first SRS resource set 3450, and the PUSCH transmission 3481 using a first TPMI 3473 is performed. A PUSCH port for PUSCH transmission 3482 using the second panel 3472 is configured using the indicated second SRS resource 3452 in the first SRS resource set 3450, and the PUSCH transmission 3482 using the second panel 3472 is performed by applying a precoder indicated by a second TPMI 3474. This indicates that SDM-based simultaneous sTRP PUSCH transmission using multiple panels is supported.

FIG. 34 is based on only when a specific combination is selected by the SRS resource set indicator and the SRI fields, and when an example of simultaneous transmission using multiple panels includes FDM scheme B and SDM. However, even for other simultaneous transmission schemes using multiple panels or FDM scheme A and other combinations indicated by the SRS resource set indicator and SRI fields, a precoder and a PUSCH port configuration for performing simultaneous transmission using multiple panels may be applied in consideration of the aforementioned methods, and based on this, simultaneous PUSCH transmission may be performed.

SRS resource selection method based on associative relation 2 Multiple SRS resource sets may be configured to support multiple TRPs according to associative relation 2 described in the fourth embodiment, and multiple (or one of) SRS resources in the associative relation with one or multiple panels among panels supported by the terminal may be configured in each SRS resource set.

When an SRS resource is selected based on associative relation 2, unlike SRS resource selection based on associative relation 1, an SRI field may be used similarly to TDM-based mTRP PUSCH transmission in NR Rel-17. In case that PUSCH transmission using only a first SRS resource set is scheduled via the SRS resource set indicator, a first SRI field among a plurality of SRI fields included in the same DCI may be used to select SRS resources in the first SRS resource set. In this case, a second SRI field may be ignored or disregarded. In this case, in case that an SRS resource which has an implicit or explicit associative relation with one panel is selected via the first SRI field, the terminal may perform, based on the indicated SRS resource, single panel-based sTRP PUSCH transmission using the associated single panel. This is because PUSCH transmission is performed by referring to port configuration of the SRS resource associated with the single panel, based on a first SRS resource set associated only with a first TCI state. In case that SRS resources which have an implicit or explicit associative relation with multiple panels are selected via the first SRI field, the terminal may perform, based on the indicated SRS resources, multi-panel-based simultaneous sTRP PUSCH transmission using the associated multiple panels. Similarly, this is because PUSCH transmission is performed by referring to port configuration of the SRS resource associated with the single panel, based on the first SRS resource set associated only with the first TCI state. Similarly, in case that PUSCH transmission using only a second SRS resource set is scheduled via the SRS resource set indicator, the first SRI field among a plurality of SRI fields included in the same DCI may be used to select SRS resources in the second SRS resource set. As described above, the terminal may perform single-panel-based sTRP PUSCH transmission or multi-panel-based simultaneous sTRP PUSCH transmission depending on whether there is a single panel associated with the selected SRS resource or whether there are multiple panels associated with the selected SRS resources.

In case that PUSCH transmission using a plurality of SRS resource sets is scheduled via the SRS resource set indicator, a plurality of SRI fields may be used to determine SRS resources for PUSCH transmission in each of the SRS resource sets. If respective SRS resources selected via the multiple SRI fields have an implicit or explicit associative relation with different panels, the terminal performs multi-panel-based simultaneous mTRP PUSCH transmission using multiple panels. This is because multiple SRS resource sets are associated with multiple TCI states, and based on the selected multiple SRS resource sets, PUSCH transmission is performed by referring to port configuration of SRS resources associated with multiple panels. If respective SRS resources selected via the multiple SRI fields have an implicit or explicit associative relation with the same panel, the terminal cannot perform simultaneous mTRP PUSCH transmission using overlapping panels and may perform TDM-based mTRP PUSCH transmission. However, overlapping and unassociated panels may support simultaneous transmission. Specific operations will be described below with reference to FIG. 32 described above. The base station may configure two SRS resource sets 3210 and 3220 for the terminal, and since each SRS resource set includes two SRS resources, the first SRI field associated with the first SRS resource set is configured by $\log_2 2=1$ bit, and the second SRI field associated with the second SRS resource set is also configured by $\log_2 2=1$ in the same way.

If the SRS resource set indicator in DCI for PUSCH scheduling indicates "0", the terminal performs PUSCH transmission based on the first SRS resource set 3210. In this case, only 1 bit of the first SRI field is used, and the second SRI field is not used. A "0" value of the first SRI field may indicate the first SRS resource 3211 among the SRS resources in the first SRS resource set 3210. This may indicate, during PUSCH transmission, a terminal operation of performing PUSCH transmission to the first TRP, based on the first TCI state, by using the first panel among panels available to the terminal. That is, single panel-based sTRP PUSCH transmission directed to the first TRP may be indicated. A "1" value of the first SRI field may indicate the second SRS resource 3212 among the SRS resources in the first SRS resource set 3210. This may indicate, during PUSCH transmission, a terminal operation of performing PUSCH transmission to the first TRP, based on the first TCI state, by using the two panels available to the terminal. It is assumed that the number of SRS ports configured in the second SRS resource 3212 is four. The first two ports among the four ports may be associated with the first panel 3231 supported by the terminal, and the remaining two ports may be associated with the second panel 3232. As described above in the fourth embodiment, the relationship between the SRS ports and multiple panels may be implicitly associated in order, or may be explicitly indicated via a new higher-layer parameter. This may indicate, during PUSCH transmission, a terminal operation of performing PUSCH transmission to the first TRP, based on the first TCI state, by using the two panels available to the terminal. That is, multi-panel-based simultaneous sTRP PUSCH transmission directed to the first TRP may be indicated.

If the SRS resource set indicator in DCI for PUSCH scheduling indicates "1", the terminal performs PUSCH transmission based on the second SRS resource set 3220. Similarly, only 1 bit of the first SRI field is used, and the second SRI field is not used. A "0" value of the first SRI field may indicate the first SRS resource 3221 among the SRS resources in the second SRS resource set 3220. This may indicate, during PUSCH transmission, a terminal operation of performing PUSCH transmission to the second TRP, based on the second TCI state, by using the second panel among panels available to the terminal. That is, single panel-based sTRP PUSCH transmission directed to the second TRP may be indicated. A "1" value of the first SRI field may indicate the second SRS resource 3222 among the SRS resources in the second SRS resource set 3220. This may indicate, during PUSCH transmission, a terminal operation of performing PUSCH transmission to the second TRP, based on the second TCI state, by using the two panels available to the terminal. It is assumed that the number of SRS ports configured in the second SRS resource 3222 is four. The first two ports among the four ports may be associated with the first panel 3231 supported by the terminal, and the remaining two ports may be associated with the second panel 3232. As described above in the fourth embodiment, the relationship between the SRS ports and multiple panels may be implicitly associated in order, or may be explicitly indicated via a new higher-layer parameter. This may indicate, during PUSCH transmission, a terminal operation of performing PUSCH transmission to the second TRP, based on the second TCI state, by using the second panel among panels available to the terminal. That is, multi-panel-based simultaneous sTRP PUSCH transmission directed to the second TRP may be indicated.

If the SRS resource set indicator in DCI for PUSCH scheduling indicates "2", the terminal may perform PUSCH transmission using the two SRS resource sets 3210 and 3220. 1 bit which is the first SRI field is used to indicate the SRS resources in the first SRS resource set 3110, and 1 bit which is the second SRI field is used to indicate the SRS resources in the second SRS resource set 3120. If the first SRI field is "0" and the second SRI field is "0", the first SRS resource 3111 is indicated in the first SRS resource set 3110, and the first SRS resource 3121 is indicated in the second SRS resource set 3120. In this case, since the first SRS resource 3111 in the first SRS resource set 3210 is associated with the first panel, and the first SRS resource 3221 in the second SRS resource set 3220 is associated with the second panel, a terminal operation of performing, based on the first and second TCI states, a PUSCH transmission using the two panels available to the terminal may be indicated. That is, multi-panel-based simultaneous mTRP PUSCH transmission directed to two TRPs may be indicated. If a combination of values indicated by the first SRI field and the second SRI field indicates values other than {0,0}, such as {0,1}, {1,0} or {1,1}, the terminal may perform TDM-based mTRP PUSCH transmission to TRPs associated with the SRS resource set. For example, if a combination of values indicated by the first SRI field and the second SRI field is {0,1}, the terminal performs single panel-based PUSCH transmission to the first TRP by using the first SRS resource 3211 in the first SRS resource set 3210, and performs multi-panel-based PUSCH transmission to the second TRP by using the second SRS resource 3222 in the second SRS resource set 3220. Since mTRP PUSCH transmission is based on TDM, the terminal may perform PUSCH transmission in association with respective selected SRS resources in different PUSCH transmission occasions. That is, in the directions of two TRPs, the terminal may perform single panel-based PUSCH transmission for the first TRP and perform multi-panel-based PUSCH transmission for the second TRP, and the PUSCH transmission to respective TRPs may be performed based on TDM via different PUSCH transmission occasions. Similarly, if a combination of values indicated by the first SRI field and the second SRI field is {1,1}, the terminal performs multi-panel-based PUSCH transmission to the first TRP by using the second SRS resource 3212 in the first SRS resource set 3210, and performs multi-panel-based PUSCH transmission to the second TRP by using the second SRS resource 3222 in the second SRS resource set 3220. That is, in the directions of two TRPs, the terminal may perform multi-panel-based PUSCH transmission to both the first TRP and the second TRP, and the PUSCH transmission to respective TRPs may be performed based on TDM via different PUSCH transmission occasions. Alternatively, the terminal may not expect indication of different SRS resources associated with the same panel.

If the SRS resource set indicator indicates "3", SRS resources for mTRP PUSCH transmission may be selected using two SRI fields in the same way as in the case where the SRS resource set indicator indicates "2". In this case, the order of mapping, which will be described later, PUSCH transmission based on the SRS resources indicated in the first SRS resource set 3210 and PUSCH transmission based on the SRS resources indicated in the second SRS resource set 3220 to scheduled PUSCH resources may be different from the case where the SRS resource set indicator is "2".

SRS resources configured in SRS resource sets according to [associative relation 2] may have different numbers of SRS ports. Therefore, for the number of bits of each TPMI field, the number of all TPMI bits may be determined based on the largest number of SRS ports among the numbers of SRS ports of SRS resources configured in an SRS resource set in which usage is "codebook". Alternatively, with respect to SRS resources associated with multiple panels supported by the terminal, the numbers of SRS ports associated with respective panels may be compared, and thus the number of TPMI bits may be determined based on the largest number of ports associated with a single panel. In the example described above, since a set of two ports among four ports is associated with each panel, the number of TPMI bits may be determined based on two SRS ports. Herein, it is assumed that the number of all TPMI bits is determined based on the largest number of SRS ports among the numbers of SRS ports of SRS resources configured in the SRS resource set. Since the number of TPMI bits is determined based on the largest number of SRS ports, a codepoint, which is not used for an SRS resource configured with a small number of SRS ports other than the largest number of ports, may be configured to be reserved. In NR Rel-17, since the number of layers indicated by a first TPMI field and a second TPMI field are the same, the number of bits of the second TPMI field may be less than or equal to that of the first TPMI field. Even for simultaneous transmission using multiple panels, if, as in NR Rel-17, the number of layers of PUSCHs simultaneously transmitted via respective panels is restricted to be the same, the second TPMI field added in NR Rel-17 may be used as it is. Alternatively, in case that the layers of PUSCHs simultaneously transmitted via respective panels may be different, different numbers of layers may also be supported for scheduling, by configuring, unlike NR Rel-17, the number of bits of the second TPMI field to be the same as the number of bits of the first TPMI field. In this case, a condition for the number of layers is determined based on the largest number of SRS ports, and based on this, the number of bits of each TPMI field is determined. If an SRS resource set and SRS resources, which are indicated by the SRS resource set indicator and multiple SRI fields, are determined based on [associative relation 2], the base station may indicate a TPMI to the terminal, based on the indicated SRS resource. In this case, if only one SRS resource set and one SRS resource are selected, only a first TPMI may be indicated, and the indicated TPMI is applied to the selected SRS resource set and SRS resource. If multiple SRS resource sets (e.g., two SRS resource sets) and one SRS resource for each SRS resource set are indicated, the first TPMI may be applied to an SRS resource indicated in a first SRS resource set, and the second TPMI may be applied to an SRS resource indicated in a second SRS resource set.

When an SRS resource determined in this way and a precoder for the SRS resource are determined via TPMI, the terminal configures an antenna port for PUSCH transmission identically to an SRS port for the determined SRS resource, and performs PUSCH transmission by applying the precoder indicated by the TPMI. In this case, the PUSCH transmission resource for transmission of each panel is distinguished in scheduled PUSCH resources, and the precoder and the PUSCH antenna port based on the SRS port of each SRS resource are applied to the resource for PUSCH transmission using each panel.

Figure 35:
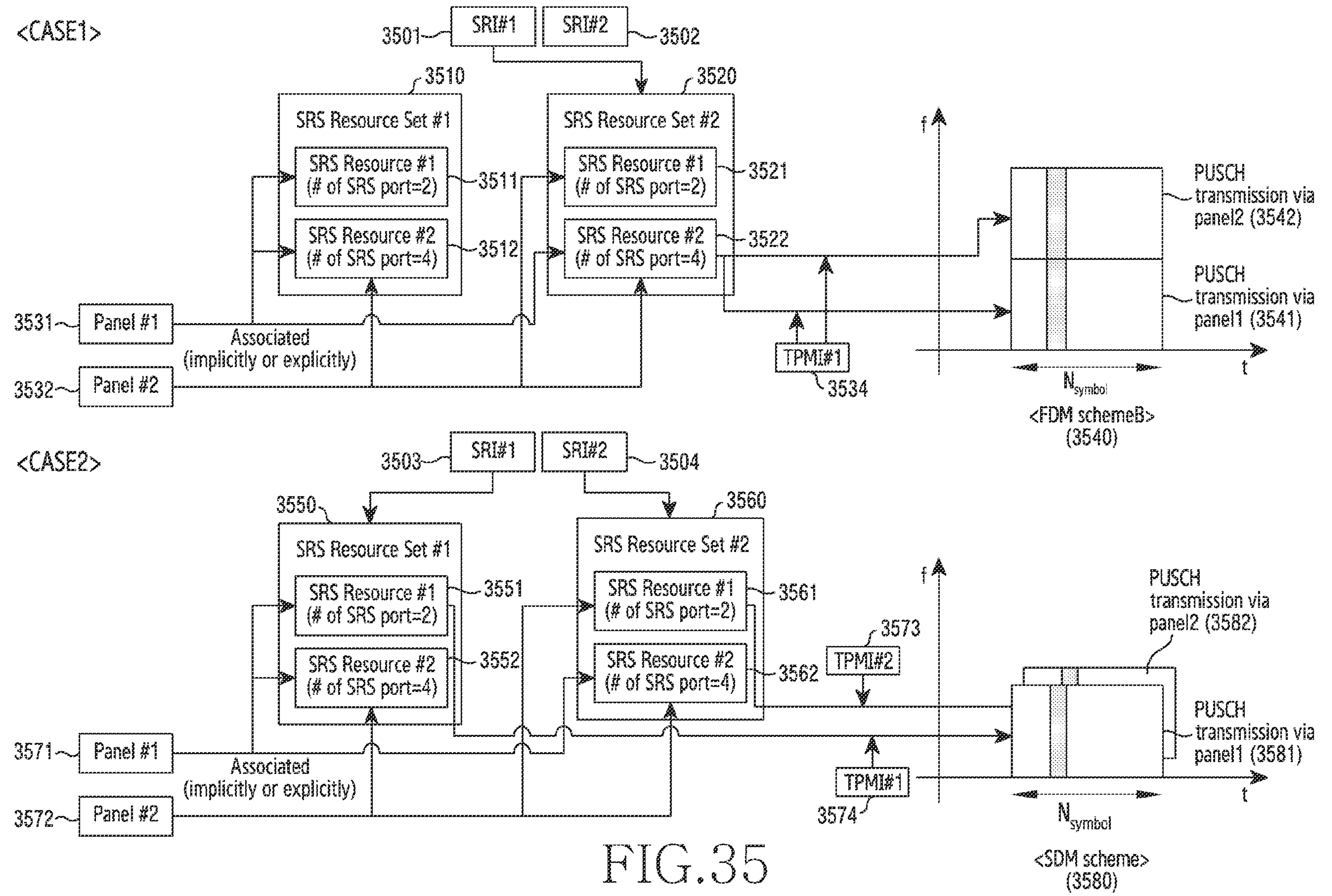
FIG. 35 illustrates simultaneous PUSCH transmission using multiple panels in a wireless communication system according to an embodiment.

FIG. 35 illustrates an example of simultaneous PUSCH transmission using multiple panels in a wireless communication system according to an embodiment.

Referring to FIG. 35, a terminal may use two panels 3531 and 3532 or 3571 and 3572, and two SRS resource sets 3510 and 3520 or 3550 and 3560 are configured for the terminal, wherein two SRS resources are configured for each of the SRS resource sets. In Case 1, only the second SRS resource set 3520 is selected via an SRS resource indicator, in which case, an SRS resource 3522 in the second SRS resource set 3520 may be selected via an associated first SRI field 3501. In this case, the terminal ignores a second SRI field 3502. If FDM-based simultaneous PUSCH transmission using multiple panels is scheduled, the terminal performs simultaneous PUSCH transmission using the two panels 3531 and 3532 according to the indicated SRS resource 3522. For example, for PUSCH transmission 3541 using the first panel, the terminal may configure a PUSCH port by referring to first two SRS ports of the indicated SRS resource 3522. For example, for PUSCH transmission 3542 using the second panel, the terminal configures a PUSCH port by referring to two SRS ports (the remaining two SRS ports other than the first two SRS ports) subsequent to the indicated SRS resource 3522. Multi-panel-based simultaneous sTRP transmission using both the first panel 3531 and the second panel 3532 is performed by applying a precoder to support four ports indicated via the first TPMI field. This indicates that FDM-based simultaneous sTRP PUSCH transmission using multiple panels is supported.

In Case 2, the two SRS resource sets 3550 and 3560 are selected by the SRS resource set indicator, a first SRS resource 3551 in the first SRS resource set 3550 is indicated via a first SRI field 3503, and a first SRS resource 3561 in the second SRS resource set 3560 is indicated via a second SRI field 3504. In case that SDM-based simultaneous PUSCH transmission using multiple panels is scheduled, the terminal configures a PUSCH port for PUSCH transmission 3581 using the first panel 3571, by using the indicated first SRS resource 3551 in the first SRS resource set 3550, and the terminal performs the PUSCH transmission 3581 using the first panel 3571 by applying a precoder indicated by a first TPMI 3574. The terminal configures a PUSCH port for PUSCH transmission 3582 using the second panel 3572, by using the indicated first SRS resource 3561 in the second SRS resource set 3560, and performs the PUSCH transmission 3582 using the second panel 3572 by applying a precoder indicated by a second TPMI 3573. This indicates that SDM-based simultaneous mTRP PUSCH transmission using multiple panels is supported.

FIG. 35 is based on when a specific combination is selected by the SRS resource set indicator and the SRI fields, and a case where an example of simultaneous transmission using multiple panels includes FDM scheme B and SDM.

However, even for other simultaneous transmission schemes using multiple panels or FDM scheme A and other combinations indicated by the SRS resource set indicator and SRI fields, a precoder and a PUSCH port configuration for performing simultaneous transmission using multiple panels may be applied in consideration of the aforementioned methods, and based on this, simultaneous PUSCH transmission may be performed via multiple panels.

Sixth Embodiment: SRS Configuration Method for Non-Codebook-Based Simultaneous PUSCH Transmission Using Multiple Panels In the sixth embodiment, description is provided for a method of configuring an SRS resource set and an SRS resource in order to support non-codebook-based simultaneous PUSCH transmission using multiple panels.

Similar to the description in the fourth embodiment, the terminal may configure, depending on supportable capability, a parameter such as "simulTx-PUCCH-PUSCH" (or a higher-layer parameter having a different name with a similar function) and report, to the base station, a UE capability report for simultaneous UL transmission using multiple panels, and based on this, the base station may configure, for the terminal, a higher-layer parameter for simultaneous UL transmission using multiple panels. In case that the base station configures, for the terminal, a higher-layer parameter for simultaneous UL transmission using multiple panels, an SRS resource set for PUSCH transmission may be configured. In this case, in case that a non-codebook-based PUSCH is supported using multiple panels, an SRS resource set in which "usage" of the SRS resource set is configured to be "nonCodebook" may be configured for the terminal. One or multiple (e.g., two) SRS resource sets, in which "usage" for non-codebook-based simultaneous PUSCH transmission using multiple panels is "nonCodebook", may be configured. Configuration of multiple SRS resource sets in which "usage" is "nonCodebook" may indicate that UL signals may be transmitted to multiple TRPs according to the relationship between as many TCI states to be described later as the number of configured SRS resource sets.

For example, in case that two SRS resource sets in which "usage" is "nonCodebook" are configured for the terminal by the base station, this may indicate that the terminal may transmit UL signals to up to two TRPs. For convenience of description, the case of up to two SRS resource sets has been described, but the described method may be extended so that UL signals may be simultaneously transmitted to more than two TRPs. As described in the fourth embodiment, "followUnifiedTCTstate-r17" may additionally configured, the terminal may transmit SRS resources in the SRS resource set according to a spatial relation referring to an RS (e.g., SRS) or an RS (e.g., CSI-RS or SSB) used to determine a UL transmission spatial filter in which "qcl-Type" in "QCL-Info" is configured to be typeD, such as indicated "DLorJoint-TCIstate-r17" or "UL-TCIstate".

It is assumed that higher-layer parameter "followUnifiedTCTstate-r17" is configured in configured multiple SRS resource sets, and SRS resources are transmitted according to spatial relations determined by referring to TCI states (e.g., DLorJoint-TCIstate-r17 or UL-TCIstate) indicated by DCI. In the same manner as described above in the third embodiment, a MAC CE for activation of TCI states may be received, and the TCI states indicated by DCI may be associated with respective SRS resource sets. The SRS resource set described in the sixth and seventh embodiments refers to an SRS resource set in which usage is "nonCodebook". A first SRS resource set among configured multiple SRS resources may indicate an SRS resource set having a smallest SRS-ResourceSetId value, and similarly a second one may also indicate an SRS resource set having a smallest SRS-ResourceSetId value excluding the SRS-ResourceSetId value for the first SRS resource set. Thereafter, the order of SRS resource sets may be similarly determined for more than two SRS resource sets. In this way, in case that N TCI states are indicated for N SRS resource sets, the terminal may transmit a UL signal according to a spatial relation determined by referring to an n-th TCI state in an n-th SRS resource set. When the terminal reports, via UE capability reporting, that the terminal is able to perform simultaneous UL transmission using multiple panels, and the base station configures, in consideration thereof, a higher-layer parameter for simultaneous UL transmission using multiple panels, associative relations may be established between SRS resources and multiple panels supported by the terminal so as to be implicitly or explicitly determined.

Associative relation 3—Each SRS resource included in SRS resource sets may be associated with one panel supported by the terminal, and since the SRS resource is to support a non-codebook-based PUSCH, each SRS resource includes one port and indicates each PUSCH transmission layer. For example, the first two SRS resources among four SRS resources included in a first SRS resource set may be associated with a first panel (The order of panels among multiple panels may be determined by implementation of the terminal if information on the panels is implicitly configured and indicated. Alternatively, the first panel may be determined by a lowest panel indicator if the information on the panels is explicitly configured and indicated, and then second and third panels, etc. may also be defined in a similar manner.) among panels supported by the terminal. The remaining two SRS resources except for the first two SRS resources among the four SRS resources included in the first SRS resource set may be associated with a second panel among the panels supported by the terminal. The described configuration method is merely an example, the number of SRS resources other than four SRS resources may be configured in one SRS resource set, and each SRS resource may be associated with any panel supported by the terminal.

However, this associative relation should be configured to allow the base station and the terminal to have the same understanding, and a method of defining associative relations between SRS resources and panels supported by the terminal may be considered in order as in the above example. The aforementioned group-based beam reporting information may be used in order for the base station and the terminal to have the same understanding of the associative relation between the SRS resource and the panel. Alternatively, configuration may be performed explicitly by adding information on the panel supported by the terminal to SRS-Resource configured via a higher-layer parameter. For example, a higher-layer parameter, such as "panel_Index", may be added to higher-layer parameter SRS-Resource, and indication may be made by one of values from 0 to $N_{panel}-1$.

Figure 36:
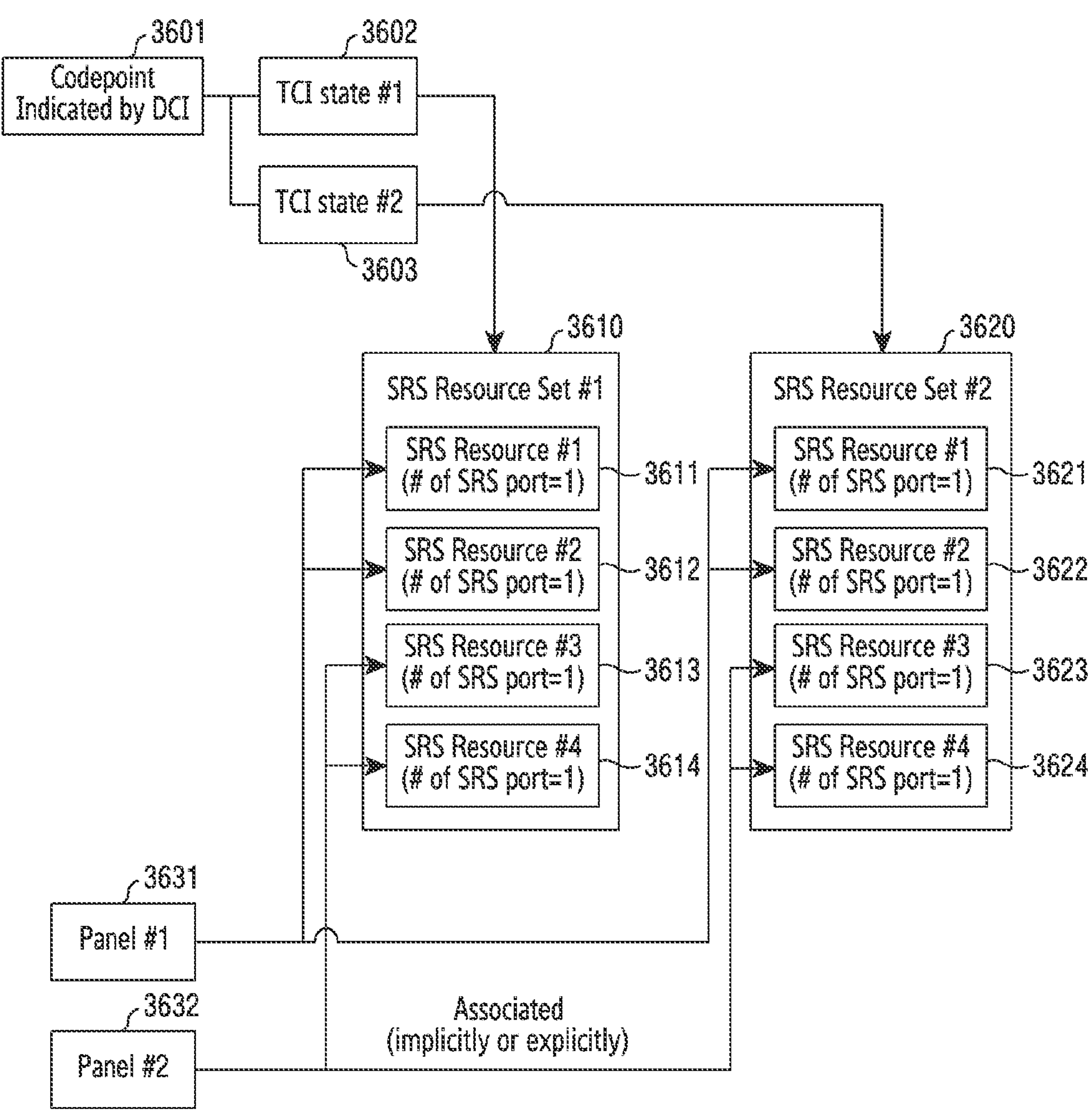
FIG. 36 illustrates when four SRS resources are included in each of two SRS resource sets, and a terminal may support simultaneous UL transmission using two panels in a wireless communication system according to an embodiment.

FIG. 36 illustrates when four SRS resources are included in each of two SRS resource sets, and a terminal may support simultaneous UL transmission using two panels.

Referring to FIG. 36, a codepoint indicated by a TCI field of DCI 3601 received by a terminal from a base station indicates two TCI states 3602 and 3603 for simultaneous transmission using multiple panels.

For example, a first TCI state 3602 may be used to determine a spatial relation for transmission of SRS resources 3611, 3612, 3613, and 3614 in a first SRS resource set 3610. A second TCI state 3603 may be used to determine a spatial relation for transmission of SRS resources 3621, 3622, 3623, and 3624 in a second SRS resource set 3620. A first panel 3631 of the terminal may be implicitly or explicitly associated with a first SRS resource 3611 and a second SRS resource 3612 in the first SRS resource set 3610.

If the first TCI state 3602 includes, as a reference RS, an RS transmitted from a first TRP among multiple TRPs, the terminal may understand that the first SRS resource 3611 and the second SRS resource 3612 in the first SRS resource set 3610 are configured to be transmitted to the first TRP by using the first panel 3631 of the terminal. A second panel 3632 of the terminal may be implicitly or explicitly associated with a third SRS resource 3613 and a fourth SRS resource 3614 in the first SRS resource set 3610. In case that the first TCI state 3602 includes, as the reference RS, the RS transmitted from the first TRP among multiple TRPs, the terminal may understand that the third SRS resource 3613 and the second SRS resource 3612 in the first SRS resource set 3610 are configured to be transmitted to the first TRP by using the second panel 3632 of the terminal. The first panel 3631 may also be implicitly or explicitly associated with a first SRS resource 3621 and a second SRS resource 3622 in the second SRS resource set 3620. In case that the second TCI state 3603 includes, as a reference RS, an RS transmitted from a second TRP among multiple TRPs, the terminal may understand that the first SRS resource 3621 and the second SRS resource 3622 in the second SRS resource set 3620 are configured to be transmitted to the second TRP by using the first panel 3631 of the terminal. The second panel 3632 of the terminal may also be implicitly or explicitly associated with a third SRS resource 3623 and a fourth SRS resource 3624 in the second SRS resource set 3620. In case that the second TCI state 3603 includes, as the reference RS, the RS transmitted from the second TRP among multiple TRPs, the terminal may understand that the third SRS resource 3623 and the fourth SRS resource 3624 in the second SRS resource set 3620 are configured to be transmitted to the second TRP by using the second panel 3632 of the terminal. The above example describes a case in which four SRS resources are included in one SRS resource set. However, fewer than four SRS resources may be included instead of four SRS resources. Alternatively, if simultaneous transmission using multiple panels is supported, more than four (e.g., eight) SRS resources may be allowed to be configured, wherein up to four SRS resources are allowed to be configured in an SRS resource set, in which usage is "nonCodebook", up to NR Rel-17. In this case, the number of bits of an SRI field indicated by DCI may increase as the number of SRS resources in an SRS resource set increases and according to the following description.

The descriptions in the sixth embodiment have been provided specifically on an assumption that SRS resources are transmitted based on the indicated TCT states. However, even if "followUnifiedTCTstate-r17" is not configured, simultaneous transmission using multiple panels may be supported by applying the aforementioned methods based on spatial relation info configured in SRS resources in each SRS resource set. In this case, the first TCI state described above may be replaced with spatialRelationInfo configured via a higher-layer parameter for the SRS resources in the first SRS resource set, and the second TCI state may be replaced with spatialRelationInfo configured via a higher-layer parameter for the SRS resources in the second SRS resource set.

Seventh Embodiment: Method of Indicating SRS Resources for Non-Codebook-Based Simultaneous PUSCH Transmission Using Multiple Panels, and Method of Simultaneously Transmitting UL Data Channels In the seventh embodiment, descriptions are provided for a method of indicating an SRS resource indicator (hereinafter, SRI) in DCI for non-codebook-based simultaneous PUSCH transmission based on the SRS resource set configuration described above in the sixth embodiment, and a method of non-codebook-based simultaneous PUSCH transmission via multiple panels by applying an indicated SRI to scheduled PUSCH resources.

Descriptions with specific examples have been provided for configuration which may be performed for the relationship between multiple TCI states and multiple SRS resource sets, and the implicit or explicit associative relation between multiple SRS resources included in the SRS resource sets and multiple panels supported by the terminal, according to associative relation 3 in the sixth embodiment. In the seventh embodiment, by referring to the examples described in detail in the sixth embodiment, description is provided for a method of applying the SRI indicated for the SRS resource sets and SRS resources configured as in [associative relation 3], according to the SRS resource set indicator field included in DCI.

As described above in the fifth embodiment, in NR Rel-17, it has been reinforced so that up to two SRS resource sets, in which usage is "codebook" or "nonCodebook" may be configured in order to support repeated mTRP PUSCH transmission. In order to support dynamic switching between sTRP transmission and mTRP transmission accordingly, a 2-bit SRS resource set indicator field is added to DCI format 0_1 or 0_2 for PUSCH scheduling. In order to support non-codebook-based repeated mTRP PUSCH transmission, operation is also performed similarly to interpretation of the SRS resource set indicator field described above in the fifth embodiment, and if a value for sTRP PUSCH transmission is indicated by the SRS resource set indicator field, the terminal uses a first SRI field to select an SRS resource in association with an associated SRS resource set and ignores a second SRI field. If a value for mTRP PUSCH transmission is indicated by the SRS resource set indicator field, the terminal selects SRS resources from respective SRS resource sets by associating two SRI fields with the respective SRS resource sets. In NR Rel-18, simultaneous mTRP PUSCH transmission using multiple panels or simultaneous sTRP PUSCH transmission using multiple panels may be additionally distinguished and indicated according to a value indicated via SRI, a value indicated via the SRS resource set indicator, the associative relation between SRS resources and panels supported by the terminal, and the SRS resource set configuration method described in the sixth embodiment.

The terminal may select an SRS resource set used for PUSCH transmission from among multiple SRS resource sets, by referring to the SRS resource set indicator field included in DCI for PUSCH scheduling received from the base station. For example, if the SRS resource set indicator is indicated as "0" or "1", the first or second SRS resource set is selected from among two SRS resource sets configured according to the example described in detail in the sixth embodiment, so as to be used for PUSCH transmission. For another example, if the SRS resource set indicator is indicated as "2" or "3", two SRS resource sets configured according to the example described in detail in the fourth embodiment are selected so as to be used for PUSCH transmission.

The terminal may interpret multiple SRI fields according to values indicated via the SRS resource set indicator field and may determine SRS resources to be used for PUSCH transmission. If the SRS resource set indicator is indicated as "0" or "1", all the multiple SRI fields may be used to select SRS resource(s) in the SRS resource set indicated by the SRS resource set indicator. If the SRS resource set indicator is indicated as "2" or "3", each SRI field may be used to select SRS resource(s) in each associated SRS resource set.

For example, description is provided for a method of performing simultaneous PUSCH transmission using multiple panels by interpreting multiple SRI fields according to values indicated by the SRS resource set indicator field and selecting, based on the interpretation, SRS resources in the SRS resource set.

SRS Resource Selection Method Based on Associative Relation 3

Multiple SRS resource sets may be configured to support multiple TRPs according to [associative relation 3] described in the sixth embodiment, and multiple (or one of) SRS resources in the associative relation with one panel among panels supported by the terminal may be configured in each SRS resource set. If PUSCH transmission using only the first SRS resource set is scheduled via the SRS resource set indicator, a first SRI field may be used to select an SRS resource in the first SRS resource set. The first SRI field is determined to be $$\left\lceil \log_2\left(\sum_{k=1}^{\min\{L_{max}, N_{SRS}\}} \binom{N_{SRS}}{k}\right)\right\rceil$$

bits according to the number $N_{SRS}$ of SRS resources included in an SRS resource set and the maximum number $L_{max}$ of supportable layers (ranks) configured via a higher-layer parameter. In the example of FIG. 36 above, if four SRS resources are included in an SRS resource set, and the maximum number $L_{max}$ of supportable layers is 4, the number of bits of the first SRI field may be configured to be 4.

For the second SRI field added in NR Rel-17, a constraint condition that the same number of layers as the number of layers indicated by the first SRI should be indicated needs to be considered. Therefore, if the number of SRS resources in the second SRS resource set is 4 which is equal to that in the first SRS resource set, and the maximum number $L_{max}$ of supportable layers is 4, the number of bits of the second SRI field may be configured to be 3. In case that simultaneous PUSCH transmission using multiple panels is supported, if the constraint condition that the same number of layers as the number of layers indicated by the first SRI should be indicated is disregarded, and thus the second SRI field may also indicate a different number of layers, 4 bits instead of 3 bits may be assigned to the second SRI field. In this example, for convenience of description, it is assumed that each SRI field includes 4 bits and different numbers of layers may be supported.

However, operations may be performed in the same manner except that, even if the constraint condition of supporting the same number of layers is added in the same way as in NR Rel-17, the number of bits of the second SRI field may be different, and during scheduling of mTRP PUSCH transmission, an additional condition that the number of selected SRS resources in the second SRS resource set should be equal to the number of selected SRS resources in the first SRS resource set needs to be considered. If only one SRS resource set is selected via the SRS resource set indicator field, and SRS resource(s) in an associative relation with the same panel in the selected SRS resource set is selected via the first SRI field, the terminal performs sTRP PUSCH transmission using only one panel. If only one SRS resource set is selected via the SRS resource set indicator field, and SRS resources in an associative relation with multiple (e.g., two) panels in the selected SRS resource set are selected via the first SRI field, the terminal performs multi-panel-based simultaneous sTRP PUSCH transmission using supportable multiple (or two) panels. Multiple (e.g., two) SRS resource sets may be selected via the SRS resource set indicator field, SRS resource(s) in the first SRS resource set may be selected via the first SRI field, and SRS resource(s) in the second SRS resource set may be selected via the second SRI field. In this case, if the selected SRS resources in the respective SRS resource sets are associated with one panel, and SRS resources in different SRS resource sets are associated with different panels, the terminal may perform multi-panel-based simultaneous mTRP PUSCH transmission. If multiple SRS resource sets are selected, and SRS resources in each SRS resource set are selected via each SRI field, the selected SRS resources in each SRS resource set may be associated with one panel. In this case, if SRS resources of different SRS resource sets are associated with the same panel, the terminal may not support multi-panel-based simultaneous PUSCH transmission. Instead, the terminal may perform TDM-based mTRP PUSCH transmission.

If multiple SRS resource sets are selected, and SRS resources in each SRS resource set are selected via each SRI field, the selected SRS resources in each SRS resource set may be associated with multiple panels. In this case, if SRS resources of different SRS resource sets are associated with multiple different panels (if more than two panels are supported), the terminal may perform multi-panel-based simultaneous mTRP PUSCH transmission and perform PUSCH transmission to one TRP by using multiple panels.

If SRS resources of different SRS resource sets are associated with some or all of multiple identical panels, the terminal may not support multi-panel-based simultaneous PUSCH transmission. Instead, the terminal may perform TDM-based mTRP PUSCH transmission, and may perform simultaneous PUSCH transmission using multiple panels for one TRP. Specific operations will be described below with reference to FIG. 36 described above. The base station may configure two SRS resource sets 3610 and 3620 for the terminal, since each SRS resource set includes 4 SRS resources, the first SRI field associated with the first SRS resource set may include $$\left\lceil \log_2\left(\Sigma_{k=1}^{4}\binom{4}{k}\right)\right\rceil = 4$$

bits under an assumption that the maximum number of layers is 4, and as previously assumed, the second SRI field may also include $$\left\lceil \log_2\left(\Sigma_{k=1}^{4}\binom{4}{k}\right)\right\rceil = 4$$

bits under an assumption that the number of layers different from the number of layers indicated by the first SRI may be supported. If the same number of layers as the number of layers indicated by the first SRI should be indicated via the second SRI field, 3 bits may be configured instead of 4 bits.

If the SRS resource set indicator in DCI for PUSCH scheduling indicates "0", the terminal performs PUSCH transmission based on the first SRS resource set 3610. In this case, the terminal uses only 4 bits of the first SRI field, and does not use the second SRI field. In this case, description is provided for an example of a case where the first SRI and second SRI fields include 4 bits, and 4 bits for each SRI field may determine SRS resources in an SRS resource set, which are indicated by each SRI field, by using Table 7.3.1.1.2-31 in 3GPP Technical Specification 38.212 for selection of four SRS resources in an SRS resource set in a conventional case where the maximum number of layers is 4. A "0" value of the first SRI field may indicate the first SRS resource 3611 among the SRS resources in the first SRS resource set 3610. Accordingly, the terminal is indicated to perform single-layer-based non-codebook PUSCH transmission using the first panel 3631 to the first TRP based on the first TCI state.

A "4" value of the first SRI field may indicate the first SRS resource 3611 and the second SRS resource 3612 in the first SRS resource set 3610. Accordingly, the terminal is indicated to perform two-layer-based non-codebook PUSCH transmission using the first panel 3631 to the first TRP based on the first TCI state. Similarly, a "9" value of the first SRI field may indicate the third SRS resource 3613 and the fourth SRS resource 3614 in the first SRS resource set 3610. Accordingly, the terminal is indicated to perform two-layer-based non-codebook PUSCH transmission using the second panel 3632 to the first TRP based on the first TCI state. A "5" value of the first SRI field may indicate the first SRS resource 3611 and the third SRS resource 3613 in the first SRS resource set 3610. Accordingly, the terminal is indicated to perform two-layer-based non-codebook PUSCH transmission using both the first panel 3631 and the second panel 3632 to the first TRP based on the first TCI state. That is, since multiple SRS resources associated with different panels are selected, multi-panel-based simultaneous sTRP PUSCH transmission is performed.

Similarly, a "14" value of the first SRI field may indicate the first SRS resource 3611, the second SRS resource 3612, the third SRS resource 3613, and the fourth SRS resource 3614 in the first SRS resource set 3610. Accordingly, the terminal is indicated to perform four-layer-based non-codebook PUSCH transmission using both the first panel 3631 and the second panel 3632 to the first TRP based on the first TCI state. That is, multi-panel-based simultaneous sTRP PUSCH transmission is performed using each panel for a set of two layers.

If the SRS resource set indicator in DCI for PUSCH scheduling indicates "1", the terminal performs PUSCH transmission based on the second SRS resource set 3620. In this case, only 4 bits of the second SRI field is used, and the first SRI field is not used. Alternatively, if the second SRI field is 3 bits instead of 4 bits due to restriction on the number of layers, the first SRI field may be used in association with the second SRS resource set 3620, and the second SRI field may be disregarded. Similar to when the SRS resource set indicator is "0", the aforementioned example describes a case where the second SRI field is configured to be 4 bits, and the number of layers different from the number of layers indicated by the first SRI may also be indicated. A "1" value of the second SRI field may indicate the second SRS resource 3622 among the SRS resources in the second SRS resource set 3620. This indicates the terminal to perform single-layer-based non-codebook PUSCH transmission using the first panel 3631 to the second TRP based on the second TCI state. A "4" value of the second SRI field may indicate the first SRS resource 3621 and the second SRS resource 3622 in the second SRS resource set 3620. This indicates the terminal to perform two-layer-based non-codebook PUSCH transmission using the first panel 3631 to the second TRP based on the second TCI state. A "9" value of the second SRI field may indicate the third SRS resource 3623 and the fourth SRS resource 3624 in the second SRS resource set 3620. This indicates the terminal to perform two-layer-based non-codebook PUSCH transmission using the second panel 3632 to the second TRP based on the second TCI state. A "6" value of the second SRI field may indicate the first SRS resource 3621 and the fourth SRS resource 3624 in the second SRS resource set 3620. This indicates the terminal to perform two-layer-based non-codebook PUSCH transmission using both the first panel 3631 and the second panel 3632 to the second TRP based on the second TCI state. That is, since multiple SRS resources associated with different panels are selected, multi-panel-based simultaneous sTRP PUSCH transmission is performed.

Similarly, a "14" value of the second SRI field may indicate the first SRS resource 3621, the second SRS resource 3622, the third SRS resource 3623, and the fourth SRS resource 3624 in the second SRS resource set 3620. Accordingly, the terminal is indicated to perform four-layer-based non-codebook PUSCH transmission using both the first panel 3631 and the second panel 3632 to the second TRP based on the second TCI state. That is, the terminal performs multi-panel-based simultaneous sTRP PUSCH transmission using each panel for a set of two layers.

In case that the SRS resource set indicator in DCI for PUSCH scheduling indicates "2", the terminal may perform PUSCH transmission using the two SRS resource sets 3610 and 3620. 4 bit which is the first SRI field is used to indicate the SRS resources in the first SRS resource set 3610, and 4 bit which is the second SRI field is used to indicate the SRS resources in the second SRS resource set 3620. If the first SRI field is "0" and the second SRI field is "0", the first SRS resource 3611 is indicated in the first SRS resource set 3610, and the first SRS resource 3621 is indicated in the second SRS resource set 3620. In this case, since the first SRS resource 3611 in the first SRS resource set 3610 is associated with the first panel, and the first SRS resource 3621 in the second SRS resource set 3620 is also associated with the first panel, multi-panel based simultaneous mTRP PUSCH transmission cannot be supported.

However, the terminal may perform TDM-based mTRP PUSCH transmission to respective TRPs according to the TCI states associated with respective SRS resource sets. Similarly, if the first SRI field is "5" and the second SRI field is "8", the first SRS resource 3611 and the third SRS resource 3613 are indicated in the first SRS resource set 3610, and the second SRS resource 3622 and the fourth SRS resource 3624 are indicated in the second SRS resource set 3620. In this case, since the two SRS resources selected from each SRS resource set are associated with the first panel 3631 and the second panel 3632, multi-panel based simultaneous mTRP PUSCH transmission cannot be supported, but TDM-based mTRP PUSCH transmission may be supported. If the first SRI field is "9" and the second SRI field is "4", the third SRS resource 3613 and the fourth SRS resource 3614 are indicated in the first SRS resource set 3610, and the first SRS resource 3621 and the second SRS resource 3622 are indicated in the second SRS resource set 3620. In this case, since the two SRS resources selected from the first SRS resource set 3610 are associated with the second panel 3632, and the two SRS resources selected from the second SRS resource set 3620 are associated with the first panel 3631, multi-panel-based simultaneous mTRP PUSCH transmission may be supported. That is, the terminal performs multi-panel-based simultaneous four-layer mTRP PUSCH transmission by mapping two layers per panel.

If the SRS resource set indicator indicates "3", SRS resources for mTRP PUSCH transmission may be selected using two SRI fields in the same way as in the case where the SRS resource set indicator indicates "2". In this case, the PUSCH transmission based on the SRS resources indicated in the first SRS resource set 3610 and PUSCH transmission based on the SRS resources indicated in the second SRS resource set 3620 to scheduled PUSCH resources may be different from the case where the SRS resource set indicator is "2".

The aforementioned examples are merely some examples of non-codebook-based PUSCH scheduling methods indicated by the SRS resource set indicator and two SRI fields, and even for other PUSCH scheduling indicated by the SRS resource set indicator and two SRI fields, simultaneous sTRP or mTRP transmission using multiple panels may be performed according to panels associated with selected SRS resources, or TDM-based simultaneous mTRP transmission may be performed. The examples describe when four SRS resources are configured in one SRS resource set, and a set of two SRS resources in one set is associated with each panel. However, more than four SRS resources or fewer than four SRS resources may be configured, and the relationship between SRS resources and panels may also be defined differently. The base station and the terminal need to agree on the relationship between SRS resources and the panels, and the relationship between SRS resources and panels may be implicitly or explicitly indicated by a newly added higher-layer parameter.

Figure 37:
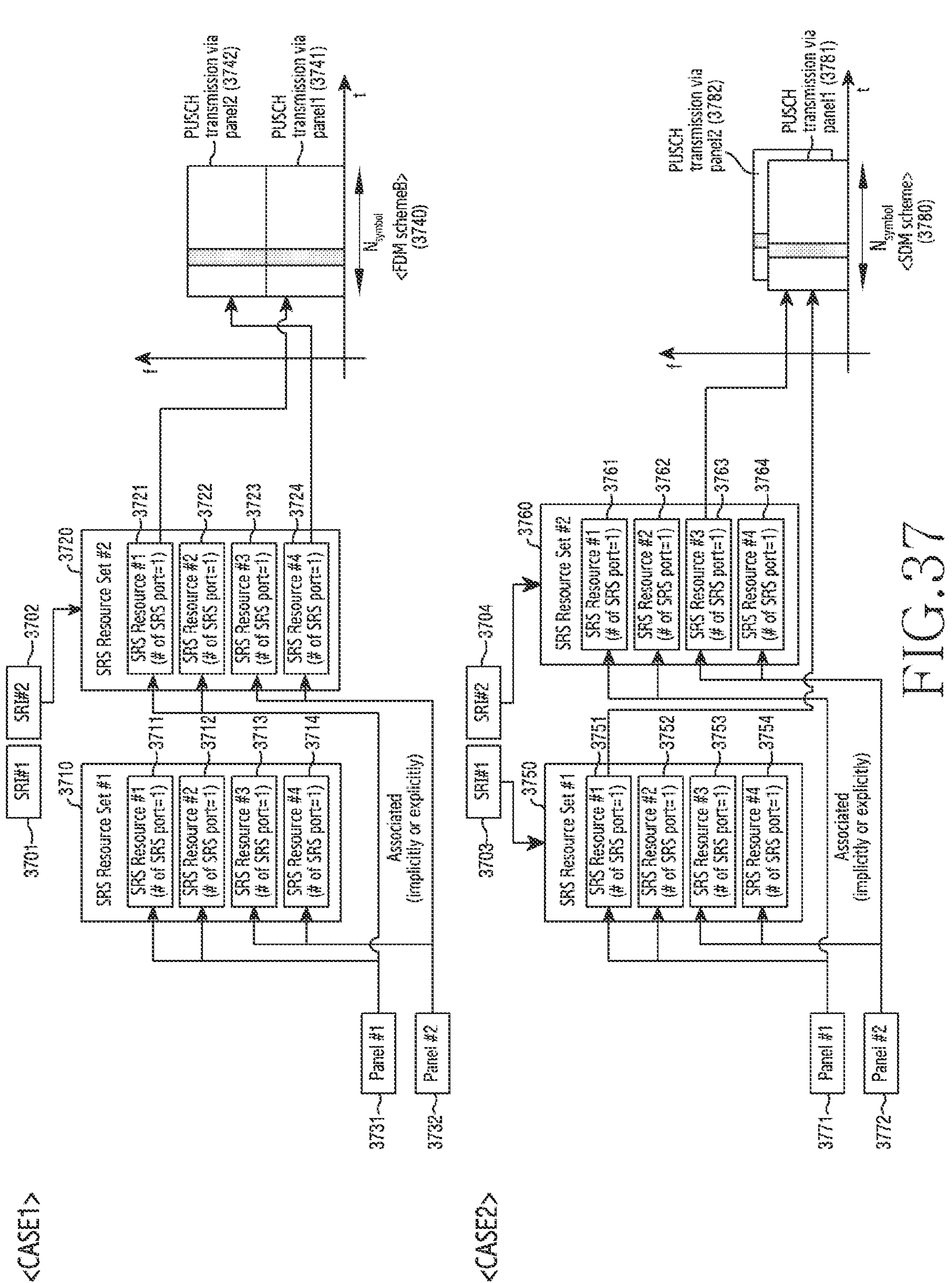
FIG. 37 illustrates operations of non-codebook-based simultaneous PUSCH transmission using multiple panels according to an embodiment.

FIG. 37 illustrates an example of operations of non-codebook-based simultaneous PUSCH transmission using multiple panels according to an embodiment.

Referring to FIG. 37, illustrated is an example of cases in which a terminal may use two panels 3731 and 3732 or 3771 and 3772, and two SRS resource sets 3710 and 3720 or 3750 and 3760 are configured for the terminal. four SRS resources are configured for each of the SRS resource sets. In Case 1, only the second SRS resource set 3720 is selected by the SRS resource set indicator, a first SRI field 3701 is disregarded, and a first SRS resource 3721 and a fourth SRS resource 3724 are indicated via a second SRI field 3702. In case that FDM-based non-codebook-based simultaneous PUSCH transmission using multiple panels is scheduled, the terminal may configure a PUSCH port for PUSCH transmission 3741 using the first panel 3731 by using the indicated first SRS resource 3721 in the second SRS resource set 3720 and transmits the same. Configuring a port indicates that the terminal applies a precoder, which is calculated for non-codebook-based PUSCH transmission, to the corresponding port based on associated CSI-RS or beam information.

The terminal may configure a PUSCH port for PUSCH transmission 3742 using the second panel 3732 by using the indicated fourth SRS resource 3724 in the second SRS resource set 3720 and transmits the same. This indicates that FDM-based simultaneous sTRP PUSCH transmission using multiple panels is supported.

In Case 2, the two SRS resource sets 3750 and 3760 are selected by the SRS resource set indicator (SRSI), a first SRS resource 3751 in the first SRS resource set 3750 is indicated via a first SRI field 3703, and a third SRS resource 3763 in the second SRS resource set 3760 is indicated via a second SRI field 3704. In case that SDM-based simultaneous PUSCH transmission using multiple panels is scheduled, the terminal configures a PUSCH port for PUSCH transmission 3781 using the first panel 3771 by using the indicated first SRS resource 3751 in the first SRS resource set 3750 and transmits the same. The terminal configures a PUSCH port for PUSCH transmission 3782 using the second panel 3772 by using the indicated third SRS resource 3763 in the second SRS resource set 3760 and transmits the PUSCH port. This indicates that SDM-based simultaneous mTRP PUSCH transmission using multiple panels is supported.

FIG. 37 is based on when a specific combination is selected by the SRS resource set indicator and the SRI fields, and simultaneous transmission using multiple panels includes FDM scheme B and SDM. However, even for other simultaneous transmission schemes using multiple panels or FDM scheme A and other combinations indicated by the SRS resource set indicator and SRI fields, a precoder and a PUSCH port configuration for performing simultaneous transmission using multiple panels may be applied in consideration of the aforementioned methods, and based on this, simultaneous PUSCH transmission may be performed.

In accordance with an aspect of the disclosure, A method performed by a user equipment (UE) in a wireless communication system is provided. The method comprises receiving, from a base station, downlink control information (DCI) including a sounding reference signal resource set indicator (SRSI), two sounding reference signal resource indicator (SRI) fields, and two transmission precoding matrix indicator (TPMI) fields and transmitting, to the base station, a physical uplink shared channel (PUSCH) based on the DCI. In case that the SRSI includes a first value associated with a first SRS resource set, the PUSCH is transmitted based on a first SRI field of the two SRI fields and a first TPMI field of the two TPMI fields which are associated with the first SRS resource set, and in case that the SRSI includes a second value associated with a second SRS resource set, the PUSCH is transmitted based on the first SRI field of the two SRI fields and the first TPMI field of the two TPMI fields which are associated with the second SRS resource set.

In case that the SRSI includes the first value or the second value, a second SRI field of the two SRI fields and a second TPMI field of the two TPMI fields are not used for the PUSCH.

In case that the SRSI includes a third value associated with the first SRS resource set and the second SRS resource set, a first PUSCH is transmitted based on the first SRI field and the first TPMI field which are associated with the first SRS resource set, and a second PUSCH is transmitted based on a second SRI field of the two SRI fields and a second TPMI field of the two TPMI fields which are associated with the second SRS resource set.

Each of the first value and the second value corresponds to a single transmission and reception point (s-TRP) transmission, and the third value corresponds to a spatial division multiplexing (SDM) of a simultaneous transmission across multi panels (ST×MP).

The method further comprises receiving, from the base station, a radio resource control (RRC) signaling for switching between a spatial division multiplexing (SDM) of a simultaneous transmission across multi panels (ST×MP) and multiple transmission and reception point (m-TRP) time division multiplexing (TDM).

In accordance with an aspect of the disclosure, A user equipment (UE) in a wireless communication system is provided. The UE comprises a transceiver and a controller coupled with the transceiver and configured to receive, from a base station, downlink control information (DCI) including a sounding reference signal resource set indicator (SRSI), two sounding reference signal resource indicator (SRI) fields, and two transmission precoding matrix indicator (TPMI) fields; and transmit, to the base station, a physical uplink shared channel (PUSCH) based on the DCI. In case that the SRSI includes a first value associated with a first SRS resource set, the PUSCH is transmitted based on a first SRI field of the two SRI fields and a first TPMI field of the two TPMI fields which are associated with the first SRS resource set, and in case that the SRSI includes a second value associated with a second SRS resource set, the PUSCH is transmitted based on the first SRI field of the two SRI fields and the first TPMI field of the two TPMI fields which are associated with the second SRS resource set.

In case that the SRSI includes the first value or the second value, a second SRI field of the two SRI fields and a second TPMI field of the two TPMI fields are not used for the PUSCH.

In case that the SRSI includes a third value associated with the first SRS resource set and the second SRS resource set, a first PUSCH is transmitted based on the first SRI field and the first TPMI field which are associated with the first SRS resource set, and a second PUSCH is transmitted based on a second SRI field of the two SRI fields and a second TPMI field of the two TPMI fields which are associated with the second SRS resource set.

Each of the first value and the second value corresponds to a single transmission and reception point (s-TRP) transmission, and wherein the third value corresponds to a spatial division multiplexing (SDM) of a simultaneous transmission across multi panels (ST×MP).

The controller is further configured to receive, from the base station, a radio resource control (RRC) signaling for switching between a spatial division multiplexing (SDM) of a simultaneous transmission across multi panels (ST×MP) and multiple transmission and reception point (m-TRP) time division multiplexing (TDM).

In accordance with an aspect of the disclosure, A method performed by a base station in a wireless communication system is provide. the method comprises transmitting, to a user equipment (UE), downlink control information (DCI) including a sounding reference signal resource set indicator (SRSI), two sounding reference signal resource indicator (SRI) fields, and two transmission precoding matrix indicator (TPMI) fields and receiving, from the UE, a physical uplink shared channel (PUSCH) based on the DCI. In case that the SRSI includes a first value associated with a first SRS resource set, the PUSCH is received based on a first SRI field of the two SRI fields and a first TPMI field of the two TPMI fields which are associated with the first SRS resource set, and in case that the SRSI includes a second value associated with a second SRS resource set, the PUSCH is received based on the first SRI field of the two SRI fields and the first TPMI field of the two TPMI fields which are associated with the second SRS resource set.

In case that the SRSI includes the first value or the second value, a second SRI field of the two SRI fields and a second TPMI field of the two TPMI fields are not used for the PUSCH.

In case that the SRSI includes a third value associated with the first SRS resource set and the second SRS resource set, a first PUSCH is received based on the first SRI field and the first TPMI field which are associated with the first SRS resource set, and a second PUSCH is received based on a second SRI field of the two SRI fields and a second TPMI field of the two TPMI fields which are associated with the second SRS resource set.

Each of the first value and the second value corresponds to a single transmission and reception point (s-TRP) transmission, and the third value corresponds to a spatial division multiplexing (SDM) of a simultaneous transmission across multi panels (ST×MP).

The method further comprises transmitting, to the UE, a radio resource control (RRC) signaling for switching between a spatial division multiplexing (SDM) of a simultaneous transmission across multi panels (ST×MP) and multiple transmission and reception point (m-TRP) time division multiplexing (TDM).

In accordance with an aspect of the disclosure, A base station in a wireless communication system, the base station comprises a transceiver and a controller coupled with the transceiver and configured to transmit, to a user equipment (UE), downlink control information (DCI) including a sounding reference signal resource set indicator (SRSI), two sounding reference signal resource indicator (SRI) fields, and two transmission precoding matrix indicator (TPMI) fields and receive, from the UE, a physical uplink shared channel (PUSCH) based on the DCI. In case that the SRSI includes a first value associated with a first SRS resource set, the PUSCH is received based on a first SRI field of the two SRI fields and a first TPMI field of the two TPMI fields which are associated with the first SRS resource set, and in case that the SRSI includes a second value associated with a second SRS resource set, the PUSCH is received based on the first SRI field of the two SRI fields and the first TPMI field of the two TPMI fields which are associated with the second SRS resource set.

In case that the SRSI includes the first value or the second value, a second SRI field of the two SRI fields and a second TPMI field of the two TPMI fields are not used for the PUSCH.

In case that the SRSI includes a third value associated with the first SRS resource set and the second SRS resource set, a first PUSCH is received based on the first SRI field and the first TPMI field which are associated with the first SRS resource set, and a second PUSCH is received based on a second SRI field of the two SRI fields and a second TPMI field of the two TPMI fields which are associated with the second SRS resource set.

Each of the first value and the second value corresponds to a single transmission and reception point (s-TRP) transmission, and the third value corresponds to a spatial division multiplexing (SDM) of a simultaneous transmission across multi panels (ST×MP).

The controller is further configured to transmit, to the UE, a radio resource control (RRC) signaling for switching between a spatial division multiplexing (SDM) of a simultaneous transmission across multi panels (ST×MP) and multiple transmission and reception point (m-TRP) time division multiplexing (TDM).

FIG. 38 illustrates a structure of a terminal in a wireless communication system according to an embodiment.

Referring to FIG. 38, a terminal may include a transceiver which refers to a terminal receiver 3800 and a terminal transmitter 3810, a memory, and a terminal processor 3805 (or a terminal controller or a processor). Based on the methods described above, the transceiver 3800 or 3810, the memory, and the terminal processor 3805 of the terminal may operate. However, the elements of the terminal are not limited to the aforementioned examples. For example, the terminal may include more elements or fewer elements compared to the aforementioned elements. The transceiver, the memory, and the processor may be implemented in the form of a single chip.

The transceiver may transmit a signal to or receive a signal from a base station. The signal may include control information and data. To this end, the transceiver may include a radio frequency (RF) transmitter configured to perform up-conversion and amplification of a frequency of a transmitted signal, an RF receiver configured to perform low-noise amplification of a received signal and down-conversion of a frequency, and the like. However, this is only an embodiment of the transceiver, and the elements of the transceiver are not limited to the RF transmitter and the RF receiver.

The transceiver may receive a signal via a radio channel and output the signal to the terminal processor 3805, and may transmit, via a radio channel, a signal output from the terminal processor 3805.

The memory may store a program and data necessary for operation of the terminal. The memory may store control information or data included in a signal transmitted or received by the terminal. The memory may include a storage medium or a combination of storage media, such as a ROM, a RAM, a hard disk, a CD-ROM, and a DVD. There may be multiple memories.

The terminal processor 3805 may control a series of procedures so that the terminal is able to operate according to the aforementioned embodiments. For example, the processor may receive DCI including two layers and control the elements of the terminal to simultaneously transmit multiple PUSCHs. There may be multiple processors, and the processor may control the elements of the terminal by executing programs stored in the memory.

Figure 39:
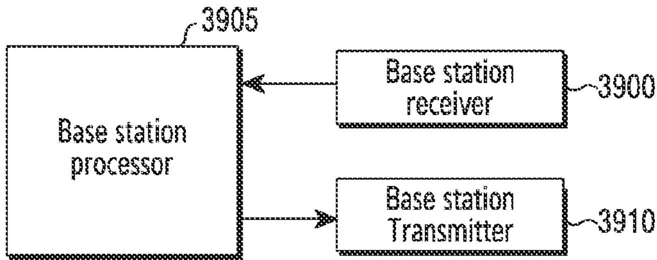
FIG. 39 illustrates a base station in a wireless communication system according to an embodiment.

FIG. 39 illustrates a structure of a base station in a wireless communication system according to an embodiment. For example, a base station of FIG. 39 may refer to a specific TRP described above.

Referring to FIG. 39, a base station may include a transceiver, which refers to a base station receiver 3900 and a base station transmitter 3910, a memory, and a base station processor 3905 (or a base station controller or processor). According to the communication method of the base station described above, the transceiver 3900 or 3910, the memory, and the base station processor 3905 of the base station may operate. However, the elements of the base station are not limited to the above examples. For example, the base station may include more elements or fewer elements compared to the aforementioned elements. The transceiver, the memory, and the processor may be implemented in the form of a single chip.

The transceiver may transmit a signal to or receive a signal from a terminal. The signal may include control information and data. To this end, the transceiver may include an RF transmitter configured to perform up-conversion and amplification of a frequency of a transmitted signal, an RF receiver configured to perform low-noise amplification of a received signal and down-conversion of a frequency, etc. However, this is merely an embodiment of the transceiver, and the elements of the transceiver are not limited to the RF transmitter and the RF receiver.

The transceiver may receive a signal via a radio channel, may output the signal to the base station processor 3905, and may transmit the signal output from the base station processor 3905 via the radio channel.

The memory may store a program and data necessary for operation of the base station. The memory may store control information or data included in a signal transmitted or received by the base station. The memory may include a storage medium or a combination of storage media, such as a ROM, a RAM, a hard disk, a CD-ROM, and a DVD. There may be multiple memories.

The processor may control a series of procedures so that the base station operates according to the aforementioned embodiments of the disclosure. For example, the processor may configure DCI of two layers including allocation information for multiple PUSCHs, and may control each element of the base station to transmit the DCI. There may be multiple processors, and the processor may control the elements of the base station by executing programs stored in the memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory (RAM) and a flash memory, a ROM, an electrically erasable programmable read only memory (EEPROM), a magnetic disc storage device, a CD-ROM, DVDs, or other type optical storage devices, or a magnetic cassette. Alternatively, any combination of some or all of them may form a memory in which the program is stored. Further, a plurality of such memories may be included in the electronic device.

The programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

It is understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur in a different order. For example, two blocks shown in succession may in fact be executed substantially concurrently or the blocks may sometimes be executed in the reverse order, depending upon the functionality involved.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. The above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Moreover, although the above embodiments have been described based on the FDD LTE system, other variants based on the technical idea of the embodiments may also be implemented in other systems such as TDD LTE, 5G, and NR systems.

While the disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a user equipment (UE), the method comprising:

receiving, from a base station, configuration information on a multiple panel simultaneous transmission;

receiving, from the base station, downlink control information (DCI) including a sounding reference signal resource set indicator (SRSI), a first sounding reference signal resource indicator (SRI), a second SRI, first precoding information, and second precoding information;

in case that the SRSI indicates a first value associated with a first sounding reference signal (SRS) resource set and two transmission configuration indicator (TCI) states are indicated to the UE, transmitting a physical uplink shared channel (PUSCH) using a first TCI state among the two TCI states, based on the first SRI and the first precoding information which are associated with the first SRS resource set;

in case that the SRSI indicates a second value associated with a second SRS resource set and the two TCI states are indicated to the UE, transmitting a PUSCH using a second TCI state among the two TCI states, based on the first SRI and the first precoding information which are associated with the second SRS resource set;

in case that the SRSI indicates a third value associated with the first SRS resource set and the second SRS resource set and the two TCI states are indicated to the UE:

transmitting a first PUSCH using the first TCI state, based on the first SRI and the first precoding information which are associated with the first SRS resource set; and transmitting a second PUSCH using the second TCI state, based on the second SRI and the second precoding information which are associated with the second SRS resource set, wherein a fourth value of the SRSI indicating that the first SRI and the first precoding information are associated with the first SRS resource set and the second SRI and the second precoding information are associated with the second SRS resource set is not used based on the multiple panel simultaneous transmission being configured.

2. The method of claim 1, wherein, in case that the SRSI indicates the first value or the second value, the second SRI and the second precoding information are not used for a PUSCH transmission.

3. The method of claim 1, wherein each of the first value and the second value corresponds to a single transmission and reception point (s-TRP) transmission.

4. The method of claim 1, further comprising:

receiving, from the base station, a radio resource control (RRC) signaling for switching between a spatial division multiplexing (SDM) of a simultaneous transmission across multi panels (STxMP) and multiple transmission and reception point (m-TRP) time division multiplexing (TDM).

5. A user equipment (UE) comprising:

at least one transceiver;

at least one processor communicatively coupled to the at least one transceiver; and at least one memory, communicatively coupled to the at least one processor, storing instructions executable by the at least one processor individually or in any combination to cause the UE to:

receive, from a base station, configuration information on a multiple panel simultaneous transmission;

receive, from the base station, downlink control information (DCI) including a sounding reference signal resource set indicator (SRSI), a first sounding reference signal resource indicator (SRI), a second SRI, first precoding information, and second precoding information, in case that the SRSI indicates a first value associated with a first sounding reference signal (SRS) resource set and two transmission configuration indicator (TCI) states are indicated to the UE, transmit a physical uplink shared channel (PUSCH) using a first TCI state among the two TCI states, based on the first SRI and the first precoding information which are associated with the first SRS resource set, in case that the SRSI indicates a second value associated with a second SRS resource set and the two TCI states are indicated to the UE, transmit a PUSCH using a second TCI state among the two TCI states, based on the first SRI and the first precoding information which are associated with the second SRS resource set, in case that the SRSI indicates a third value associated with the first SRS resource set and the second SRS resource set and the two TCI states are indicated to the UE:

transmit a first PUSCH using the first TCI state, based on the first SRI and the first precoding information which are associated with the first SRS resource set, and transmit a second PUSCH using the second TCI state, based on the second SRI and the second precoding information which are associated with the second SRS resource set, wherein a fourth value of the SRSI indicating that the first SRI and the first precoding information are associated with the first SRS resource set and the second SRI and the second precoding information are associated with the second SRS resource set is not used based on the multiple panel simultaneous transmission being configured.

6. The UE of claim 5, wherein, in case that the SRSI indicates the first value or the second value, the second SRI and the second precoding information are not used for a PUSCH transmission.

7. The UE of claim 5, wherein each of the first value and the second value corresponds to a single transmission and reception point (s-TRP) transmission.

8. The UE of claim 5, wherein the controller is further configured to:

receive, from the base station, a radio resource control (RRC) signaling for switching between a spatial division multiplexing (SDM) of a simultaneous transmission across multi panels (STxMP) and multiple transmission and reception point (m-TRP) time division multiplexing (TDM).

9. A method performed by a base station, the method comprising:

transmitting, to a user equipment (UE), configuration information on a multiple panel simultaneous transmission;

transmitting, to the UE, downlink control information (DCI) including a sounding reference signal resource set indicator (SRSI), a first sounding reference signal resource indicator (SRI), a second SRI, first precoding information, and second precoding information;

in case that the SRSI indicates a first value associated with a first sounding reference signal (SRS) resource set and two transmission configuration indicator (TCI) states are indicated to the UE, receiving, from the UE, a physical uplink shared channel (PUSCH) using a first TCI state among the two TCI states, based on the first SRI and the first precoding information which are associated with the first SRS resource set, in case that the SRSI indicates a second value associated with a second SRS resource set and the two TCI states are indicated to the UE, receiving, from the UE, a PUSCH using a second TCI state among the two TCI states, based on the first SRI and the first precoding information which are associated with the second SRS resource set, and in case that the SRSI indicates a third value associated with the first SRS resource set and the second SRS resource set and the two TCI states are indicated to the UE, receiving, from the UE, a first PUSCH using the first TCI state, based on the first SRI and the first precoding information which are associated with the first SRS resource set, wherein, in case that the SRSI indicates the third value and the two TCI states are indicated to the UE, a second PUSCH using the second TCI state is based on the second SRI and the second precoding information which are associated with the second SRS resource set, and wherein a fourth value of the SRSI indicating that the first SRI and the first precoding information are associated with the first SRS resource set and the second SRI and the second precoding information are associated with the second SRS resource set is not used based on the multiple panel simultaneous transmission being configured.

10. The method of claim 9, wherein, in case that the SRSI indicates the first value or the second value, the second SRI and the second precoding information are not used for a PUSCH transmission.

11. The method of claim 9, wherein each of the first value and the second value corresponds to a single transmission and reception point (s-TRP) transmission.

12. The method of claim 9, further comprising:

transmitting, to the UE, a radio resource control (RRC) signaling for switching between a spatial division multiplexing (SDM) of a simultaneous transmission across multi panels (STxMP) and multiple transmission and reception point (m-TRP) time division multiplexing (TDM).

13. A base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

transmit, to a user equipment (UE), configuration information on a multiple panel simultaneous transmission, transmit, to the UE, downlink control information (DCI) including a sounding reference signal resource set indicator (SRSI), a first sounding reference signal resource indicator (SRI), a second SRI, first precoding information, and second precoding information, in case that the SRSI indicates a first value associated with a first sounding reference signal (SRS) resource set and two transmission configuration indicator (TCI) states are indicated to the UE, receive, from the UE, a physical uplink shared channel (PUSCH) using a first TCI state among the two TCI states, based on the first SRI and the first precoding information which are associated with the first SRS resource set, in case that the SRSI indicates a second value associated with a second SRS resource set and the two TCI states are indicated to the UE, receive, from the UE, a PUSCH using a second TCI state among the two TCI states, based on the first SRI and the first precoding information which are associated with the second SRS resource set, and in case that the SRSI indicates a third value associated with the first SRS resource set and the second SRS resource set and the two TCI states are indicated to the UE, receive, from the UE, a first PUSCH using the first TCI state, based on the first SRI and the first precoding information which are associated with the first SRS resource set, wherein, in case that the SRSI indicates the third value and the two TCI states are indicated to the UE, a second PUSCH using the second TCI state is based on the second SRI and the second precoding information which are associated with the second SRS resource set, and wherein a fourth value of the SRSI indicating that the first SRI and the first precoding information are associated with the first SRS resource set and the second SRI and the second precoding information are associated with the second SRS resource set is not used based on the multiple panel simultaneous transmission being configured.

14. The base station of claim 13, wherein, in case that the SRSI indicates the first value or the second value, the second SRI and the second precoding information are not used for a PUSCH transmission.

15. The base station of claim 13, wherein each of the first value and the second value corresponds to a single transmission and reception point (s-TRP) transmission.

16. The base station of claim 13, wherein the controller is further configured to:

transmit, to the UE, a radio resource control (RRC) signaling for switching between a spatial division multiplexing (SDM) of a simultaneous transmission across multi panels (STxMP) and multiple transmission and reception point (m-TRP) time division multiplexing (TDM).

* * * * *